(12) United States Patent
Barry et al.

(10) Patent No.: US 11,477,111 B2
(45) Date of Patent: *Oct. 18, 2022

(54) FRAMEWORK FOR UNIVERSALLY SPECIFIED AFFINITY TOPOLOGIES WITH PARTIAL PATH INVALIDATION AND GENERALIZED NETWORK FLOWS

(71) Applicant: HEWLETT PACKARD ENTERPRISE DEVELOPMENT LP, Houston, TX (US)

(72) Inventors: Richard A. Barry, Los Angeles, CA (US); Lei Zhang, Lexington, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,889

(22) Filed: Jul. 1, 2021

(65) Prior Publication Data

US 2022/0006719 A1    Jan. 6, 2022

Related U.S. Application Data

(60) Continuation of application No. 16/456,681, filed on Jun. 28, 2019, now Pat. No. 11,070,459, which is a
(Continued)

(51) Int. Cl.
*G06F 15/173* (2006.01)
*H04L 45/02* (2022.01)
(Continued)

(52) U.S. Cl.
CPC .......... *H04L 45/02* (2013.01); *H04L 43/0817* (2013.01); *H04L 45/18* (2013.01);
(Continued)

(58) Field of Classification Search
CPC ....... H04L 45/02; H04L 41/12; H04L 47/125; H04L 49/254; H04L 45/16
See application file for complete search history.

(56) References Cited

U.S. PATENT DOCUMENTS 8,789,001 B1 *  7/2014  Sather ..................... G06F 17/16
                                                    716/121
8,826,255 B1 *  9/2014  Avadhanula ............ G06F 8/433
                                                    717/154
(Continued)

FOREIGN PATENT DOCUMENTS

EP         2774329        9/2014
WO    WO-2013066602       5/2013

OTHER PUBLICATIONS

Elatov, "Best Practices for Virtual Networking," Technical Support Engineer, GSS, VMWARE, 2009, pp. 1-37.
(Continued)

*Primary Examiner* — Oleg Survillo

(57) ABSTRACT

A method for setting up forwarding tables is described. A USAT part for a node is received. The USAT part includes glow definitions and a FGPL. Each glow describes network traffic flows and role instructions for the flows. Each FGP describes a role for the switching node; a validity rule; and relevant network topology. The method also includes determining a selected active FGP in the FGPL using the validity rule for the FGP, a network state and the ordering of the FGPs; initializing the glows, requesting a role identification to perform based on the selected FGP, determining the role instructions and instructing the TMS to update tables accordingly; and storing entries in software tables based on glows and the role instructions for the identified role, dynamically resolving conflicts among entries, and granting
(Continued)

table updates to hardware tables. The tables include a software table for each hardware memory for forwarding packets.

17 Claims, 23 Drawing Sheets

Related U.S. Application Data division of application No. 15/834,846, filed on Dec. 7, 2017, now Pat. No. 10,382,315.

(60) Provisional application No. 62/583,072, filed on Nov. 8, 2017, provisional application No. 62/431,678, filed on Dec. 8, 2016.

(51) Int. Cl.
| | | |
|---|---|---|
| *H04L 45/18* | (2022.01) | |
| *H04L 45/00* | (2022.01) | |
| *H04L 45/745* | (2022.01) | |
| *H04L 43/0817* | (2022.01) | |
| *H04L 45/42* | (2022.01) | |
| *H04L 45/48* | (2022.01) | |
| *H04L 45/50* | (2022.01) | |
| *H04L 47/125* | (2022.01) | |
| *H04L 49/101* | (2022.01) | |
| *H04L 49/253* | (2022.01) | |
| *H04L 12/46* | (2006.01) | |
| *H04L 45/16* | (2022.01) | |

(52) U.S. Cl.
CPC .............. *H04L 45/38* (2013.01); *H04L 45/42* (2013.01); *H04L 45/48* (2013.01); *H04L 45/50* (2013.01); *H04L 45/54* (2013.01); *H04L 45/66* (2013.01); *H04L 45/745* (2013.01); *H04L 47/125* (2013.01); *H04L 49/101* (2013.01); *H04L 49/254* (2013.01); *H04L 12/4641* (2013.01); *H04L 45/16* (2013.01)

(56) References Cited

U.S. PATENT DOCUMENTS

| | | | |
|---|---|---|---|
| 9,301,026 B2* | 3/2016 | Srinivas | H04L 45/20 |
| 9,871,712 B1 | 1/2018 | Sorenson, III et al. | |
| 10,243,845 B2* | 3/2019 | Agarwal | H04L 41/12 |
| 2005/0111375 A1* | 5/2005 | Ravindran | H04L 45/12 370/254 |
| 2006/0056288 A1* | 3/2006 | Powers | G06F 30/18 370/225 |
| 2007/0091811 A1* | 4/2007 | Thubert | H04L 45/123 370/252 |
| 2009/0154373 A1 | 6/2009 | Ye et al. | |
| 2011/0188865 A1* | 8/2011 | Lalonde | H04B 10/00 398/156 |
| 2013/0166773 A1* | 6/2013 | Armstrong | H04L 47/12 709/234 |
| 2014/0280900 A1* | 9/2014 | Mcdowall | H04L 45/02 709/224 |
| 2014/0293805 A1* | 10/2014 | Khaldoun | H04L 45/70 370/252 |
| 2015/0078200 A1* | 3/2015 | Kalkunte | H04L 41/0806 370/254 |
| 2015/0081855 A1* | 3/2015 | Zhang | H04L 41/12 709/220 |
| 2015/0188760 A1 | 7/2015 | Anumala et al. | |
| 2015/0350023 A1* | 12/2015 | Srinivas | H04L 41/12 370/254 |
| 2016/0142269 A1* | 5/2016 | Konduru | H04L 43/026 709/224 |

OTHER PUBLICATIONS

NETAPP, "Clustered Data ONTAP 8.3; Network Management Guide," Network Management Guide, Mar. 2015, 147 pages.
SAP, "SAP HANA Network Requirements," V1.2, Dec. 2014, 31 pages.
Extended European Search Report Received for EP Patent Application No. 17877974.0, dated Oct. 9, 2020, 11 pages.
Partial Supplementary European Search Report Received for EP Patent Application No. 17877974.0, dated Jul. 8, 2020, 12 pages.

* cited by examiner

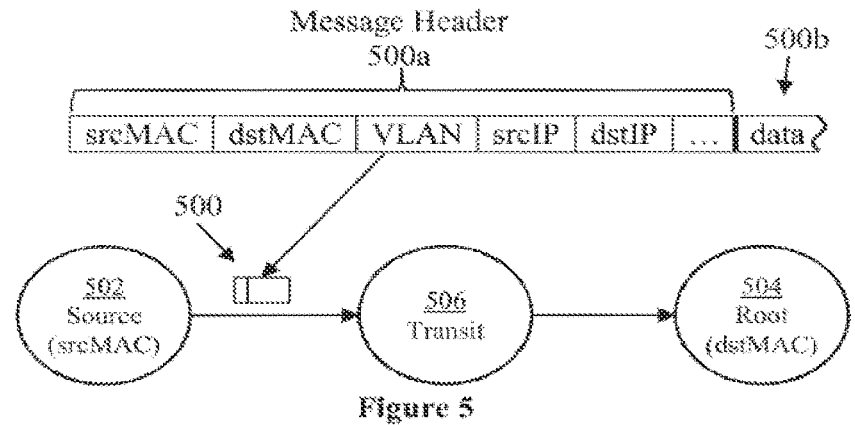
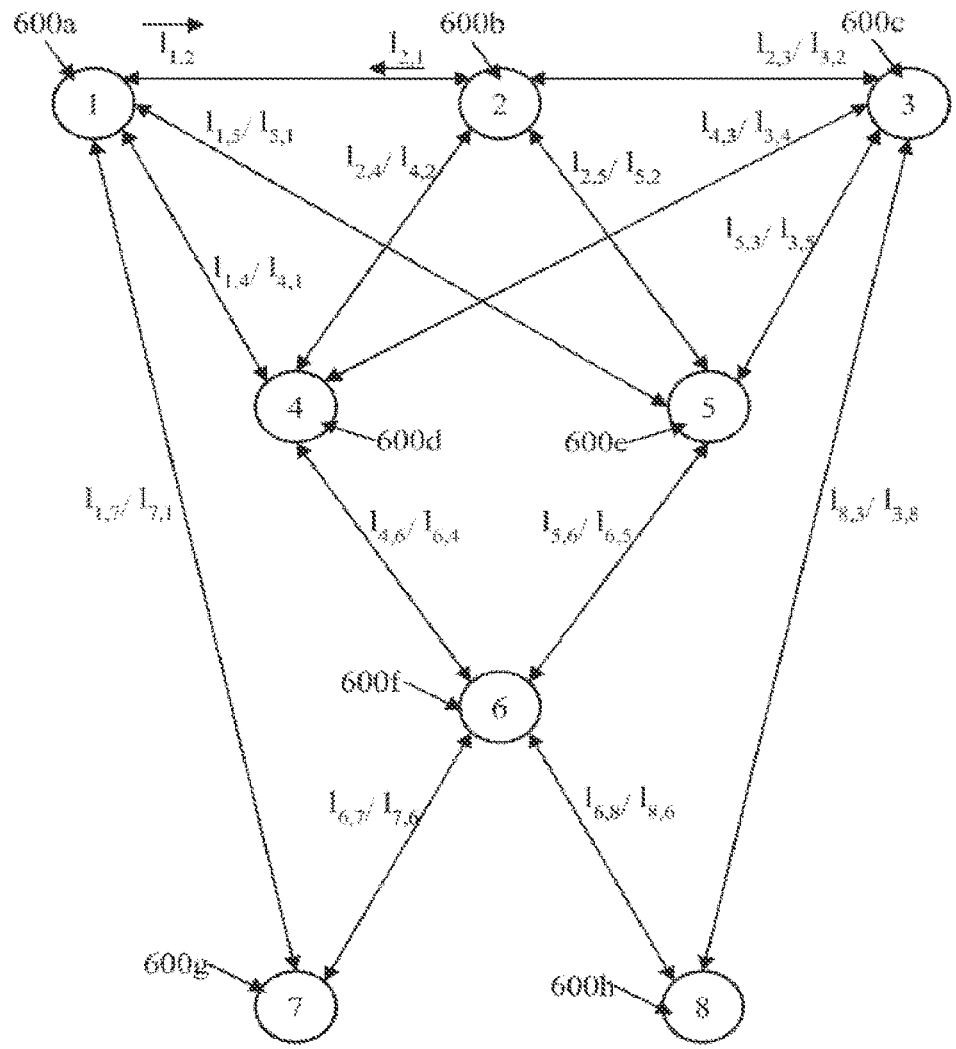
Figure 6A

_FRAMEWORK FOR UNIVERSALLY SPECIFIED AFFINITY TOPOLOGIES WITH PARTIAL PATH INVALIDATION AND GENERALIZED NETWORK FLOWS_

CROSS REFERENCE TO RELATED APPLICATION

This application is a continuation of co-pending U.S. patent application Ser. No. 16/456,681 filed Jun. 28, 2019, the entire contents of which are hereby incorporated by reference as though fully set forth herein.

STATEMENT REGARDING FEDERALLY SPONSORED RESEARCH OR DEVELOPMENT

N/A

BACKGROUND OF THE INVENTION

Various embodiments relate generally to network switch systems, methods, devices and computer programs and, more specifically, relate to network switch systems using partially validated trees which are specified for groups of flows.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

University, government, business, and financial service entities, among others, have increasingly relied upon data center networks. As such, data center networks are generally expanding in terms of the number of servers incorporated therein, as well as the networking equipment needed to interconnect the servers for accommodating the data transfer requirements of the applications that the servers are called upon to implement.

These conventional data center networks have several drawbacks. For example, data communications between servers that are not co-located within the same rack may experience excessive delay (also referred to herein as "latency") within the data center network, due in no small part to the multitude of switches and/or routers that the data may be required to traverse as it propagates up, down, and/or across the hierarchical architecture of the network. Further, because multiple paths may be employed to deliver broadcast and/or multicast data to different destinations within the data center network, such broadcast and/or multicast data may experience excessive latency skew. Such latency and/or latency skew may be exacerbated as the size of the data center network and/or its load increases. The hierarchical architecture of the data center network also generally suffers from increasingly complex fiber cabling requirements as the numbers of switches, routers, lavers, and their interconnections are increased to handle the expansion of the data center network.

As these data center networks grow in size, the routing between nodes also becomes more complicated. Each node in the data center network may be provided with a forwarding tree instructing the node how to handle traffic which flows through it. However, as the size of the tree grows, the number of potential failures on the tree also grows. This can lead to problems where a problem in one link may invalidate the entire tree for every node it touches. This can create additional work for the nodes as they are forced to adopt new trees which, from the perspective of the node, may be identical to the prior tree.

It would therefore be desirable to have data center network architectures, systems, and methods that avoid at least some of the drawbacks of the data center networks described above.

BRIEF SUMMARY OF THE INVENTION

The below summary is merely representative and non-limiting.

The above problems are overcome, and other advantages may be realized, by the use of the embodiments.

In a first aspect, an embodiment provides a method for setting up forwarding tables in a switching node having a switch. The method includes receiving a universally specified affinity topology (USAT) part specific to the switching node. The USAT part includes a definition for at least one glow and a fabric graph part list (FGPL) which is an ordered list of at least one fabric graph part (FGP). Each glow describes at least one flow of network traffic and role instructions for the switching node when handling the at least one flow. Each FGP describes at least one role that the switching node is to perform in the FGP; a validity rule for the FGP; and a description of a portion of a network topology relevant to the switching node. The method also includes managing the FGPL in a fabric graph management system (FGMS) by determining a selected active FGP in the FGPL based on the validity rule for the associated FGP, a current network status (or state) and the order of the FGPs in the FGPL, managing the at least one glow in a glow management system (GMS) by initializing the at least one glow, requesting the FGMS to identify which role to perform based on the selected active FGP in the FGPL, determining the role instructions for the identified role and instructing the TMS to update the plurality of tables; and managing a plurality of tables using a table management systems (TMS) by storing at least one entry in the plurality of software tables based on the definition for the at least one glow and the role instructions for the identified role, dynamically resolving conflicts among entries, and granting table update to hardware tables. The plurality of tables include a software table for each hardware memory that is pertinent to packet forwarding in the switch.

In another aspect, an embodiment provides a method for using a composite graph of a network. The method includes generating a set of candidate fabric graphs. Each candidate fabric graph combines a directed tree graph having vertices representing network switches and arcs representing simplex communication links in the network, each of which may or may not be currently operational, and each candidate fabric graph having a same root node r; a set of partial path validation rules (PP-VR), where each partial path validation rule is a Boolean formula based on at least one network state variable which evaluates to TRUE if and only if the unique path from a vertex n to the root node r is currently operational, including the operational status of root r; and node roles defining roles the nodes in the candidate fabric graph may serve. The method also includes establishing relative preferences for the candidate fabric graphs in the set of candidate fabric graphs; and ordering the candidate fabric graphs in the set of candidate fabric graphs based on the relative preferences. At least a portion of the set of candidate fabric graphs is provided to each of the network switches represented by the vertices, wherein the portion of the set of candidate fabric graphs provided to a network switch includes parts of the set of candidate fabric graphs relevant to the network switch. At each network switch, the network switch performs evaluating in preference order the set of candidate fabric graphs based on: the PP-VR, and implementing the first candidate fabric graphs which evaluates to TRUE.

BRIEF DESCRIPTION OF THE SEVERAL VIEWS OF THE DRAWINGS

Aspects of the described embodiments are more evident in the following description, when read in conjunction with the attached Figures, of which:

FIG. 5 is a block diagram of a packet message header, in accordance with the present disclosure.

FIG. 6A is a block diagram of a network topology, in accordance with the present disclosure.

DETAILED DESCRIPTION OF THE INVENTION

This patent application claims priority from U.S. Provisional Patent Application No. 62/431,678, filed Dec. 8, 2016, and U.S. Provisional Patent Application No. 62/583,072, filed Nov. 8, 2017, the disclosures of which are incorporated by reference herein in their entirety.

Data center networks can employ optical network topologies and optical nodes to efficiently allocate bandwidth within the data center networks, while reducing the physical interconnectivity requirements of the data center networks. Such data center networks provide a hierarchy of control for controlling and provisioning computing resources within the data center networks, based at least in part on the network topology and an application component topology. Such control and provisioning of computing resources includes determining a combined affinity-network topology for a data center network (e.g., a network topology which is designed based on requirements between applications running on various elements of the network), and controlling one or more optical nodes, and zero, one, or more optical junction nodes, to implement the affinity-network topology within the data center network, thereby providing an enhanced level of application program performance.

Figure 1:
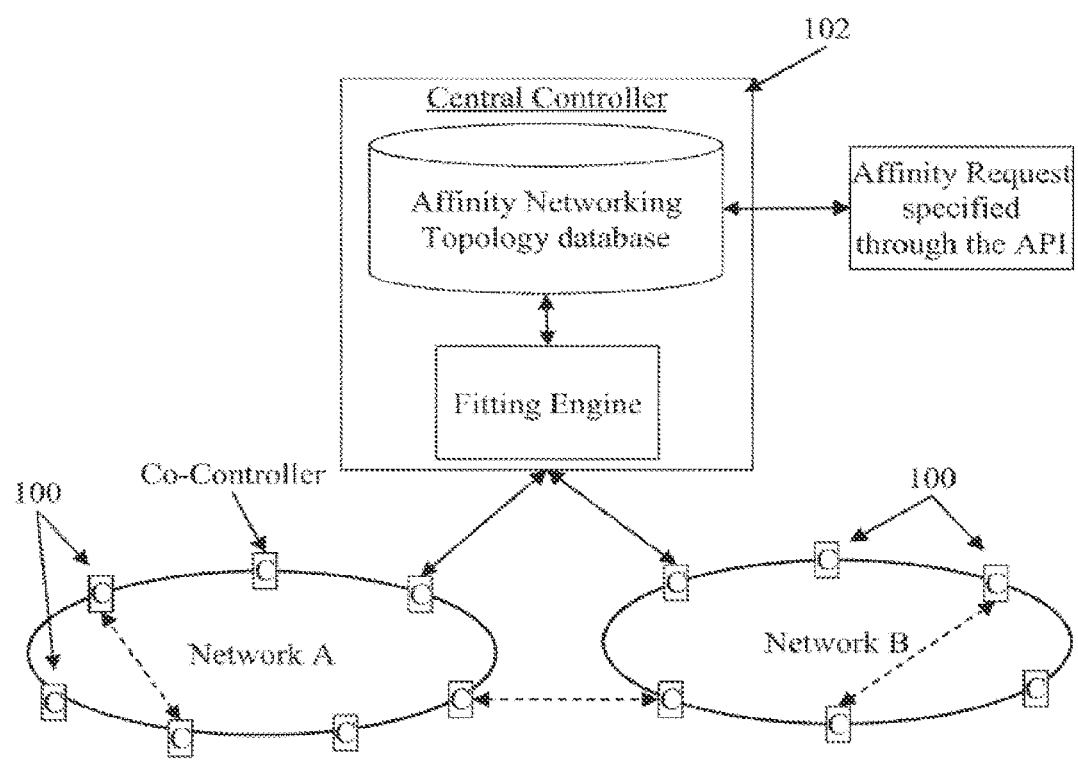
FIG. 1 is a block diagram of a data center network architecture, in accordance with the present disclosure.

FIG. 1 depicts an illustrative embodiment of a data center network. As shown in FIG. 1, the data center network includes a plurality of physical or logical optical networks A and B. Each of the optical networks A, B includes a plurality of optical nodes 100, each of which is defined herein as a network node that can include ports for connection to host computers or other attached devices, ports that are connectable to other optical nodes 100 in the network, and a packet switch, a circuit switch, and/or an optical switch, as herein described. The network is a fabric network since the nodes 100 are interconnected via their network switches.

Each optical node 100 includes or has an associated co-resident controller ("C"). For example, the optical network A includes seven (7) optical nodes 100 that each have an associated co-resident controller; and the optical network B includes six (6) optical nodes 100 that have associated co-resident controllers. The respective optical nodes 100 can further include multicast/broadcast capable circuit switches (such as electrical cross-point or electrical cross-bar switches) in addition to the packet switches to increase the functionality of the optical nodes 100 and the network in which they are deployed, allowing capacity to be shifted and switch hop counts to be reduced based on network traffic, application requirements, and/or deployment requirements.

The data center network further includes one or more governing central controllers 102, a component referred to herein as the "Fitting Engine" and an affinity networking topology database. While illustrated as components of the central controller 102, the Fitting Engine and affinity networking topology database may be located in another network element, such as a supervisory controller coordinating the operation of multiple central controllers 102. The one or more central controllers 102 may also be configured to receive network configuration requests which are specified through an API (which may be provided on a user interface on the central controller 102 or on a remote device). Such network configuration requests may specify affinity requirements (e.g., requirements between applications running on various elements of the network) and/or specific network topologies.

It is noted that the data center network may alternatively be configured in any suitable physical or logical network configuration(s), including, but not limited to, mesh network configuration(s), linear network configuration(s), ring network configuration(s), chordal ring network configuration(s), multidimensional chordal ring network configuration(s), and/or 2-dimensional or higher torus network configuration(s). It is further noted that such physical or logical network configuration(s) may include optical node(s), non-optical node(s), node(s) coupled to optical network(s), or node(s) coupled to non-optical network(s). For example, the optical nodes 100 within a network may be connected to non-neighboring nodes (such as through a direct physical connection or via a passive optical connection through intermediary nodes 100) and/or the optical nodes 100 in one network may be connected to optical nodes in another network.

In one embodiment, each of the co-resident controllers associated with the optical networks A and B is communicably coupled to a central controller 102. For example, the co-resident controllers associated with the optical network A are each communicably coupled to one central controller 102, and the co-resident controllers associated with the optical network B are each communicably coupled to the same central controller 102. Alternatively, multiple central controllers 102 may be provided such that co-resident controller associated with different networks may be communicably coupled to different central controllers 102.

Each co-resident controller can send one or more messages to the respective central controller 102 communicably coupled thereto. Moreover, each of the central controllers 102, can receive and process the messages sent to it by the co-resident controllers, and control the respective co-resident controllers. As shown in FIG. 1, the central controller 102 can control each of the respective co-resident controllers included in the optical networks A, B.

The central controller(s) 102 may perform load balancing with regard to both inter-network traffic carried between the optical networks A, B, and intra-network traffic within each individual network. In addition, the central controller(s) 102 can access information pertaining to the affinity-network topology from the affinity networking topology database. Having received the affinity-network topology information, the central controller(s) 102 can control some or all of the co-resident controllers to modify and/or implement the affinity-network topology across the respective optical networks A, B.

Figure 2:
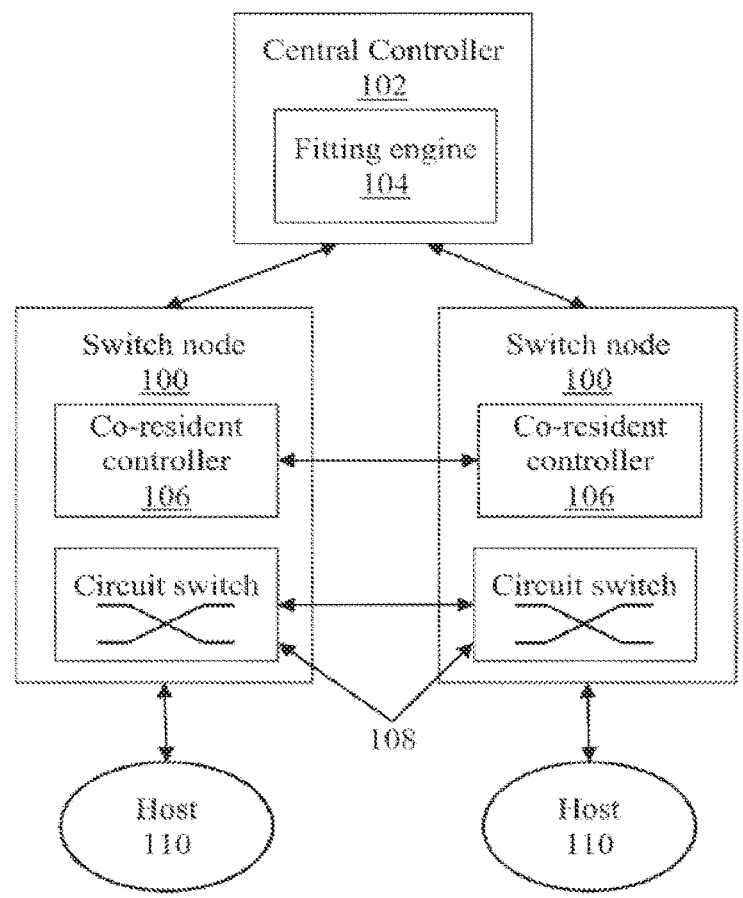
FIG. 2 is a block diagram illustrating details of the central controller of, and a plurality of switch nodes containing the respective co-resident controllers, in accordance with the present disclosure.

FIG. 2 depicts another view of the physical or logical optical network, in which the central controller 102 is communicably coupled to the plurality of switch nodes 100. As shown in FIG. 2, the central controller 102 includes a fitting engine. Further, the switch nodes 100 each include a co-resident controller 106 and a packet/circuit switch 108. The packet/circuit switches 108 are operative to interconnect the respective switch nodes 100 through their ports over a plurality of communication channels. In addition, the packet/circuit switch 108 is operative to connect the switch node 100 through its access ports to at least one host 110 over at least one access link, or, in some cases, through an external switch/router which then connects to a host 100, possibly through another network. In some embodiments, the switch may be a "white box switch" which is a switch that omits the circuit switch 108 such that there is no layer 1 crossbar and relies on L2/L3 routing.

As described above, the central controller 102 (such as the central controller 102 shown in FIG. 1) can modify the network topology and implement an affinity-network topology within the optical network(s) associated therewith, for providing enhanced application performance. In the optical network of FIG. 2, such modification of the network topology and implementation of the affinity-network topology can be achieved by the central controller 102 using the fitting engine. Alternatively, the central controller 102 may receive the affinity-network topology from an external source, such as another central controller 102, a user, etc.

The fitting engine within the central controller 102 can receive, as inputs, the following information (such as from the affinity networking topology database; see FIG. 1): the current network topology (e.g., circuit switch settings, wavelength settings, the layer-1 link status, the layer-2 link status, the MAC addresses of peer optical nodes 100 on each port (e.g., learned via the link layer discovery protocol (LLDP) or the supervisor channel), the learned MAC addresses on the access ports, the current configuration state of topology plane P3 (where the P3 plane is the fitting computed topology), and the current configuration state of topology plane P2 (where the P2 plane is the control plane topology autonomously created and managed by the switches)), and an affinity topology (e.g., the affinity elements, the affinity groups, and the affinity links, including affinity link requirements and attributes).

From the perspective of the fitting engine, the affinity-network topology represents a workload abstraction layer. The fitting engine can use the workload abstraction layer to access the information pertaining to the affinity-network topology. The fitting engine can further receive, as inputs, the following information pertaining to the supplemental non-affinity-network configuration (such as the supplemental non-affinity-network configuration): various network statistics (e.g., the aggregate link-level statistics such as link utilization, byte counts, queue depths, etc., per-VLAN link-level statistics, per-source/destination MAC pair link-level statistics, and per granular flow level statistics), and circuit switch configuration capabilities (e.g., a list of transceiver and circuit switch capabilities and internal connectivity diagram per switch).

As shown, the switch nodes 100 include both a co-resident controller 106 and a circuit switch 108. In some embodiments, the switch nodes 100 may omit the circuit switch 108 in order to operate with just the co-resident controller 106—for example, as a white box switch performing software defined routing/switching. In some embodiments, the actual routing/switching of a white box is performed by hardware elements.

Data packets traveling through the network may be handled at various layers—the L1 physical layer, the L2 data link layer or the L3 network layer. The circuit switch 108, such as a crossbar, operates as an L1 element by physically forwarding the data packets through electrical/optical elements. Using hardware and software based memory elements to determine data packet forwarding (as described below) allows the switch node 100 to provide L2 and L3 layer functionality.

Figure 3:
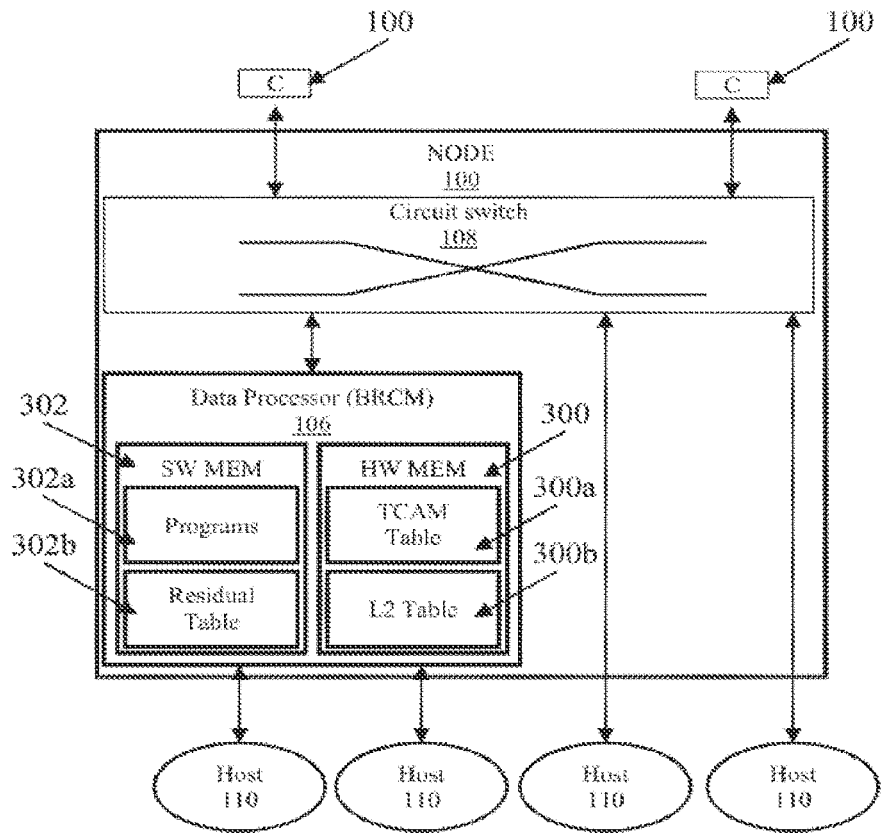
FIG. 3 is a block diagram of a switch node, in accordance with the present disclosure.

FIG. 3 is a block diagram of a switch node 100, in accordance with the present disclosure coupled to hosts 110. The switch node 100 includes a circuit switch 108 and a data processor (or co-controller) 106 such as a Broadcom chip. While the data processor is shown as housing hardware memory 300 and software memory 302, the memory may also be embodied in separate elements on the switch node 100.

The hardware memory 300 includes a first memory element, the ternary content addressable memory (TCAM), which stores a TCAM table 300a and a second, larger memory element storing the L2 table 300b. The TCAM table 300a may include a limited number of entries where each entry may include various fields. In contrast, the L2 table 300b may have many more entries (for example, ten (10) to twenty (20) times the number of entries in the TCAM table 300a or more) but with fewer fields per entry. This allows the TCAM table 300a to be more granular and powerful, such as by enabling the system to prioritize packets, differentiated by a combination of various fields in the packet header.

Software memory 302 provides much greater storage capability. However, such capability tends to be much slower. The software memory 302 may store software programs 302a in addition to a residual table 302b. The software memory 302 may also include back-up copies of the TCAM table 300a and the L2 table 300b.

Additionally, entries in the various tables can include information duplicated across the tables. In one embodiment, the residual table 302b includes entries with all data fields for each entry in either the TCAM table 300a or the L2 table 300b. Similarly, the TCAM table 300a and the L2 table 300b may have entries for the same flow but have different fields for those entries. In this way, if a flow's entry is removed from one table due to lack of use (e.g., from the TCAM), an entry in another may provide routing data should the flow resume.

As shown in FIG. 3, the switch node 100 is connected to other switch nodes 100 (or co-controllers 106) through the circuit switch 108. Hosts 110 connected to the switch node 100 may be linked directly to the data processor or to the circuit switch 108. The circuit switch 108 may be configured to directly connect inports to outports, for example, to provide L1 connections between neighboring switch nodes 100 or to provide an L1 connection between a neighboring switch node 100 and an attached host 110, such as through a crossbar element. The circuit switch 108 may also be configured to route various inports to the data processor which then controls the routing, for example, by reconfiguring the circuit switch 108 to provide L1 connections or by redirecting data packets to the appropriate outport/host 110.

Figure 4:
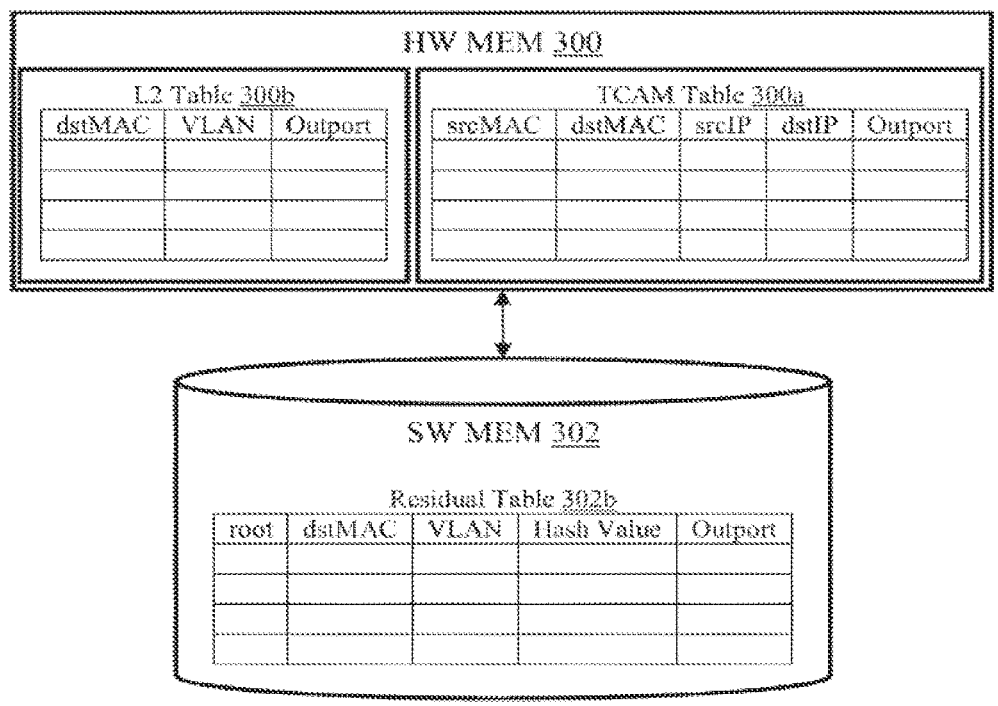
FIG. 4 is a block diagram of switch node memory elements, in accordance with the present disclosure.

FIG. 4 is a block diagram of switch node memory elements, in accordance with the present disclosure. The hardware memory 300 while shown as a single element includes multiple subcomponents, for example, a ternary content addressable memory (TCAM) is used for the TCAM table 300a. As shown, the TCAM table 300a includes fields for data to be compared to packet message headers. In this example, the TCAM table 300a has fields for the source MAC address, the destination MAC address, the source IP address, the destination IP address and an outport. The L2 table 300b in contrast has a more limited number of fields for each entry. As shown, the L2 Table 300b in FIG. 4 is limited to the destination MAC address, the virtual local area network (VLAN) and the outport. The software memory 302 is shown as including the residual table 302b having fields for the root node address, the destination MAC address, VLAN, hash value and the outport. The software memory 302 may also include local copies of the L2 Table 300b and the TCAM Table 300a. These may also be used as backup copies.

In further embodiments, the TCAM table 300a, L2 table 300b and residual table 302b may include more and/or different fields. For example, the TCAM table 300a may include VLAN and TCP port data.

In other embodiments, the residual table 302b may include a level field indicating which level in a plurality of levels within the table is assigned to the entry. The table may be evaluated for a matching glow entry in order of increasing levels and stopping once a match is found. In this embodiment, the order of the entries within an individual level may not matter. Glows may be assigned to higher levels in order to provide a granular approach and the lower level glow entries can be used to catch flows which do not match glow entries in the higher levels.

For example, a first glow encompassing all flow of a particular VLAN to a specific destination MAC address may be assigned to level 100 and a second glow which encompasses flows of the particular VLAN to any destination MAC address but which are within to a given hash bucket (e.g., Hash(VLAN, dstMAC)=[0, 60]) may be assigned to a lower level (e.g., level 300). In this example, a single flow may satisfy the destination of both glows; however, the higher level glow (level 100) would be matched to the flow first.

FIG. 5 is a block diagram of a packet 500 having a packet message header 500a, in accordance with the present disclosure. The network communicates by sending "flows" which comprise one or more message packets directed from a source to one or more destinations. Based on the context, "flows" can be defined as a combination of the header fields of a packet, or a function of the header fields and the derived meta-data when processing the packet on the switch. A flow may be used for any communications (such as L1, L2 or L3 communications) as well as for combinations of such communications. Flows may further include requirements for quality of service (QoS), bandwidth, etc. Individual packets within a single flow may travel along the same route from the source node to the destination node or they may take different routes (e.g., in order to provide load balancing).

As shown, a message packet 500 is sent along a path from a source node 502 at the source MAC address to the root node 504 at the destination MAC address. The path may travel through one or more transit nodes 506 (or none if the source node 502 is adjacent to the root node 504). The message packets 500 includes a header 500a with various fields and a data portion 500b. These header fields may correspond to the entry fields of the TCAM Table 300a, L2 Table 300b and the Residual Table 300b.

The nodes 502, 504, 506 may be considered as serving various roles along the path. In this example, the roles are source node, root node and transit node. In further embodiments, additional roles may be assigned: ingress, egress, add/drop, translate (for VLAN and Q-in-Q), police (for rate limiting), monitor, and security. Nodes may also serve multiple roles, such as transit and monitor.

In order to provide a universal forwarding framework, a universally specified affinity topology (USAT) may be used. A USAT includes a group of flows (or "glows") and a graph of the fabric network, or "fabric graph" (FG), which is a possible path that glows could take through the network, excluding the attachment points. The USAT represents a path (as included in the FG) or a list of paths through the network that can be used to route flows (glows). As one example, the USAT may be written as USAT={glow(s)}: (FG(s)).

By dividing glows ({glow(s)}) and graphs (FG(s)), the individual components may be managed separately. This separation allows multiple flows to re-use the same path, decreasing node processing requirements especially during times of topology changes. As an example, if a FG that serves a number of glows fails, one decision can be made to substitute a new FG, or partial FG, and this decision is applied to all the glows at once.

A "glow" is a group of flows that have been grouped together with common endpoints (e.g., source address and/or destination address) and/or attributes (e.g., quality of service (QoS) requirements, isolation requirements, VLAN, etc.), and a set of actions for those glows. These actions may be grouped into instruction sets which contain conditions on when to execute them. These conditions may be 1) conditions using local status variables, and 2) conditions based on the node role. The actions also contain the flows description and attachment information. For efficiency in rearranging glows, glows can be further grouped into glow sets.

Glows can be defined using source/destination pairs or a function of any header data and derived meta-data identified in the flows. Such definitions may also use wildcards to indicate any valid option, for example, a specific destination and a wildcard for source could be used to describe all flows traveling to that destination.

The FG is a path through the network that glows could take, excluding the attachment points which could be one or more ports on a switch, rather than the switch itself (e.g., an ingress point or egress point for the glows). FGs also contain validity rules which are used by the nodes to test the fabric graph to determine if the fabric graph is valid or not at that node in the current network state (or status). The network state may be represented by one or more Boolean network state variables. The validity rules may be Boolean operations on variables regarding network state conditions, e.g., time of day, time-to-line, link status, etc.

FGs can be combined into a fabric graph list (FGL) which consists of a primary fabric graph and, optionally, one or more back-up fabric graphs. FGs optionally also contain node roles which partly determine which actions to execute at which switch nodes when handling glows.

A FG may be separated into fabric graph parts (FGPs) each including the portion of the FG relevant to an associated node. Then, each node may receive an ordered set of FGPs representing the FGs in the FGL (the fabric graph parts list (FGPL)) to be used. The FGPL may be sorted in the order that the FGPs are to be used, for example, the first FGP would be the primary FGP to be used if valid, the second FGP would be a back-up FGP to be used if the first FGP is invalid, the third FGP to be used if the first and second FGPs are both invalid, etc. Generally the order in the FGPL would be consistent with the order in the FGL, however there are cases where each node could receive a FGPL with a unique ordering.

Similarly. USATs and glows may also be separated into parts relevant to an associated node. The USAT part for a node would include the glow part set for that node and the FGPL for that node (e.g., "USATPart={glow_part}: (FGPL)").

FIG. 6A is a block diagram of a network topology, in accordance with the present disclosure. As illustrated, the eight (8) nodes $600a$-$600h$ are connected by various links. The links shown are bi-directional and may be considered as having two uni-directional links, for example, the link between Node-1 $600a$ and Node-2 $600b$ includes the link from Node-1 $600a$ to Node-2 $600b$, the $l_{1,2}$ link, and the link from Node-2 $600b$ to Node-1 $600a$, the $l_{2,1}$ link. In other topologies, links between nodes $600a$-$600h$ may be uni-directional and not include a return link.

Figure 6B:
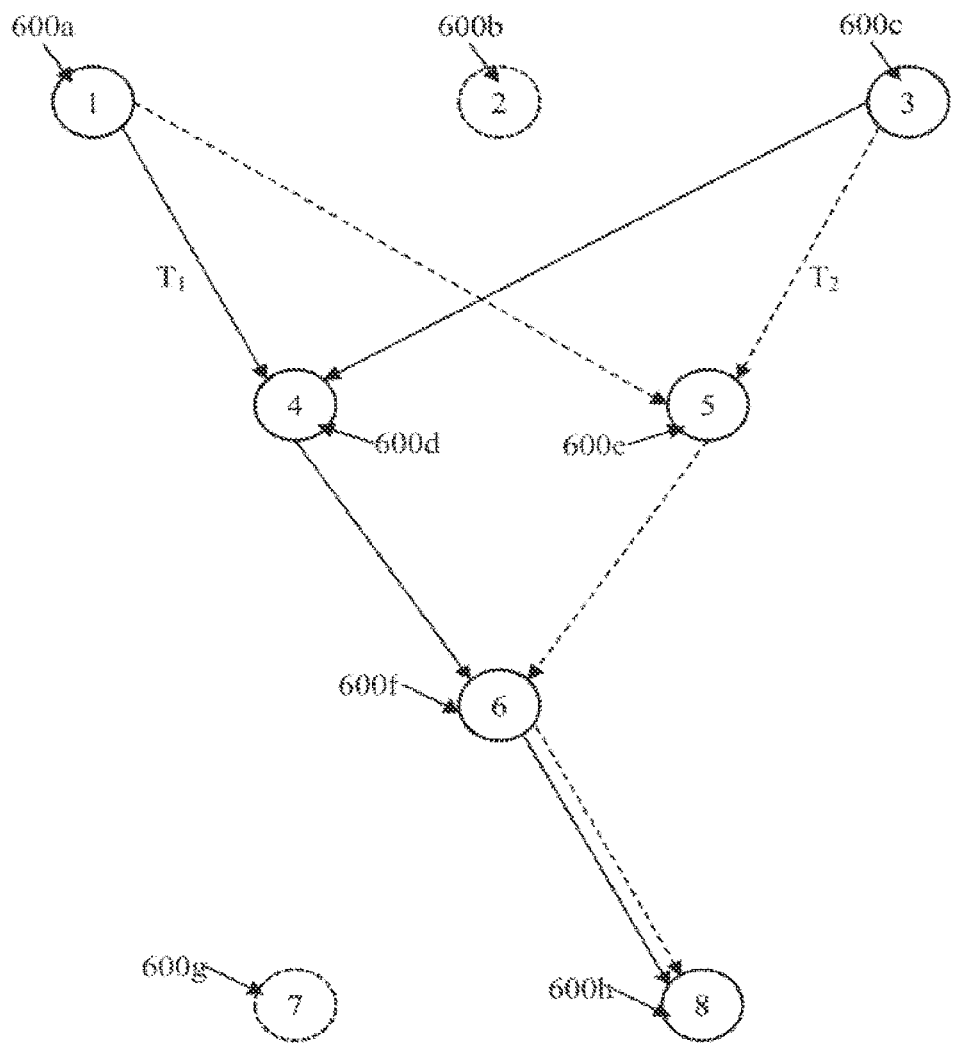
FIG. 6B is a diagram of network trees, in accordance with the present disclosure.

FIG. 6B is a diagram of two network trees, $T_1$ and $T_2$, in the network topology shown in FIG. 6A. Links in $T_1$ are shown in solid lines and links in $T_2$ are shown in dashed lines. $T_1$ includes Node-1 $600a$, Node-4 $600d$, Node-6 $600f$ and Node-8 $600h$, and $T_2$, includes Node-3 $600c$, Node-5 $600e$, Node-6 $600f$ and Node-8 $600h$. Node-2 $600b$ and Node-7 $600g$ are not used in either tree.

Figure 7A:
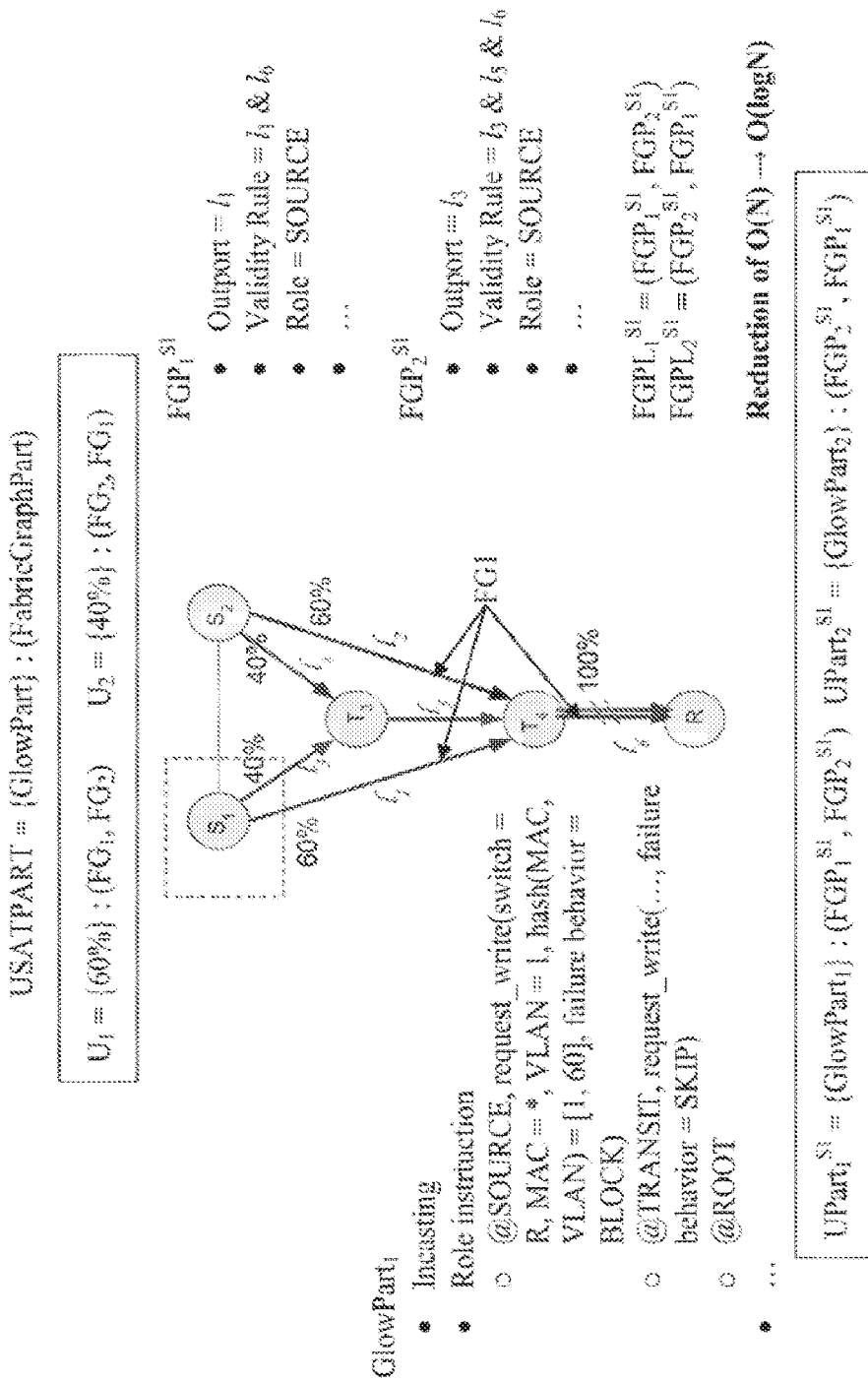
FIG. 7A is another diagram of network trees, in accordance with the present disclosure.

FIG. 7A is another diagram of network trees, in accordance with the present disclosure. The example topology includes five (5) nodes, $S_1$, $S_2$, $T_3$, $T_4$ and R. These nodes are connected by various links: $l_1$ (from $S_1$ to $T_4$), $l_2$ (from $S_2$ to $T_4$), $l_3$ (from $S_1$ to $T_3$), $l_4$ (from $S_2$ to $T_3$), $l_5$ (from $T_3$ to $T_4$), and $l_6$ (from $T_4$ to R). Two (2) FGs are shown labeled "$FG_1$," and "$FG_2$". $FG_1$ includes $l_1$, $l_2$ and $l_6$ and $FG_2$ includes $l_3$, $l_4$, $l_5$, $l_6$.

Focusing on $S_1$, FIG. 7A demonstrates how USATs may be used to perform load balancing. A first USAT, $U_1$, is defined as including 60% of the flows which are sent along $FG_1$ with $FG_2$ as backup. A second USAT, $U_2$, is defined as including 40% of the flows which are sent along $FG_2$ with $FG_1$ as backup.

The glow part for $U_1$. GlowPart$_1$ states the glow is an incasting glow type (stating "Incasting" at the first bullet point). The glow part also provides role instructions for the roles of source (beginning "@SOURCE"), transit (beginning "≈TRANSIT") and root (beginning "@ROOT"). The source role instructions specify that the glow as including flows where (a) the destination switch is R ("switch=R"), (b) the source MAC address is any address ("MAC=*"), (c) the VLAN is 1 ("VLAN=1") and (d) where a hash of the source MAC address and the VLAN returns a value between 1 and 60 ("hash(MAC, VLAN)=[1, 60]"). This hash is used to randomly select 60% of the flows. The role instructions also state that if there is a failure in routing (e.g., no FGPs are valid) then the node is to block the packets ("failure behavior=BLOCK"). The glow part for U2, GlowPart$_2$, is nearly identical except the hash values would be those between 61 and 100 in order to catch the remaining 40%.

The FGPs for $S_1$ include one for $FG_1$. $FGP_1^{S1}$, and one for $FG_2$, $FGP_2^{S1}$. $FGP_1^{S1}$ specifies that the outport to be used is hi which goes to $T_4$ ("Outport=$l_1$"). Additionally, this FGP includes a validity rule that states the FGP is 'valid' if both $l_1$ and $l_6$ are active ("Validity Rule=$l_1$ & $l_6$"). $FGP_1^{S1}$ also defines $S_1$ as having the source role ("Role=SOURCE"). $FGP_2^{S1}$ uses the $l_3$ outport and is 'valid' if each of $l_3$, $l_5$ and $l_6$ are active.

The FGPs are ordered into lists for the two USATs. $FGPL_1^{S1}$ specifies that $FGP_1^{S1}$ is to be used as the primary with $FGP_2^{S1}$ as the backup while $FGPL_2^{S1}$ specifies that $FGP_2^{S1}$ is the primary and $FGP_1^{S1}$ is the backup.

Based on the ordering of the FGPL, if link $l_1$ were to fail $S_1$ knows to automatically use the backup FGP for USAT$_1$ (that of $FG_2$, in this case) and route the traffic through 13 in accordance to $FGP_2^{S1}$. At the same time, the FGP for $USAT_2$ is unaffected since the validity rule for its primary FGP, $FGP_2^{S1}$, would still be valid.

Accordingly, the flow for $USAT_1$ is able to be rerouted quickly and efficiently without additional signaling from the controller. The initial assignment of $UPart_1^{S1}$ and $UPart_2^{S1}$ provides $S_1$ with sufficient instruction to handle the link failure. As shown, this routing can be done without forming loops.

Figure 7B:
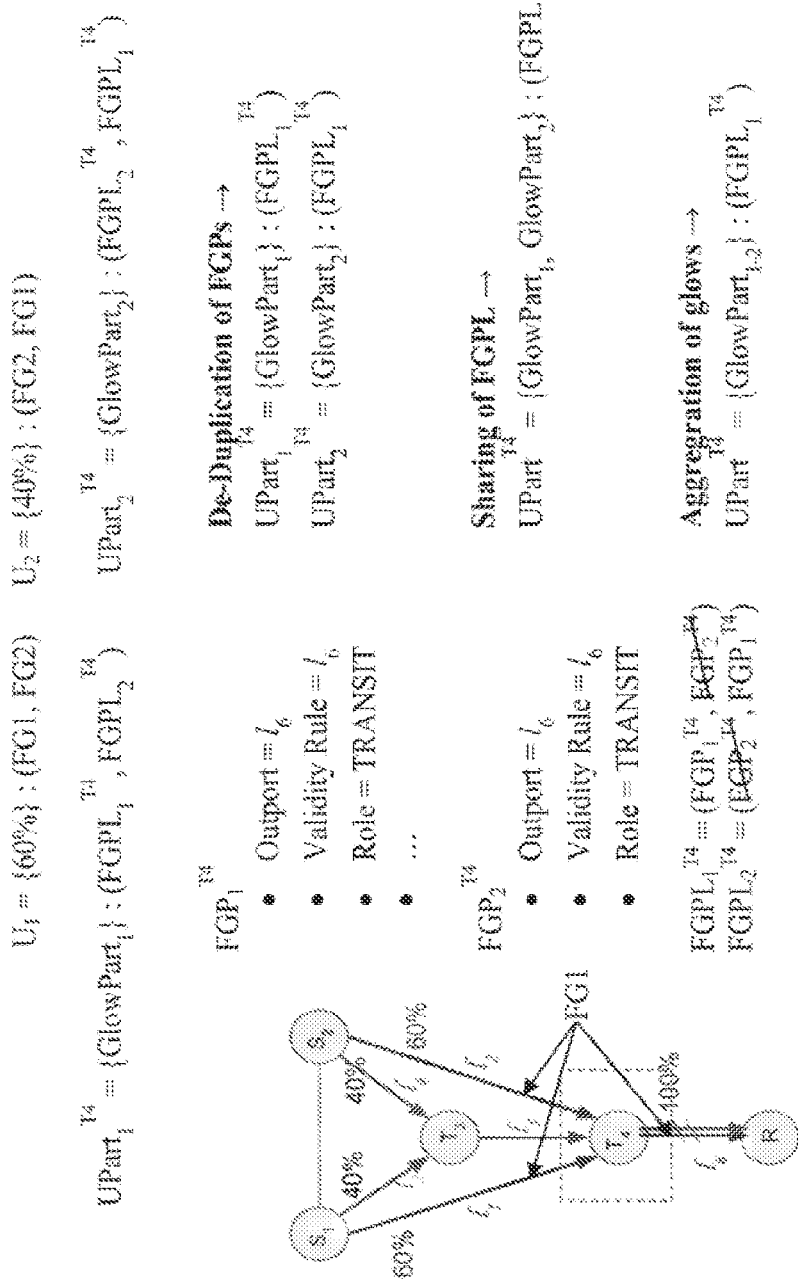
FIG. 7B is a further diagram of the network trees shown in FIG. 7A.

FIG. 7B is a further diagram of the network trees shown in FIG. 7A. In this example, the USAT parts and FGPs are focused on the transit node. $T_4$. In this case, both $FG_1$ and $FG_2$ use the same outport $l_6$ to the same root, R. This means both $FGP_1^{T4}$ and $FGP_2^{T4}$ are identical. Likewise, the FGPL at $T_4$ for $USAT_1$ and $USAT_2$ can be simplified as the FGP for either one (here, the FG part of $FG_1$ is used).

This leads to several options to simplify the USAT parts: (1) FGPs may be duplicated so that $UPart_1^{T4}$ and $UPart_2^{T4}$ use the same FGPL; (2) the USAT part for $T_4$ may define the USAT as having a glow set including both glows; and/or (3) a new glow may be defined which aggregates both glows, e.g., by removing the hash value definition.

Figure 8:
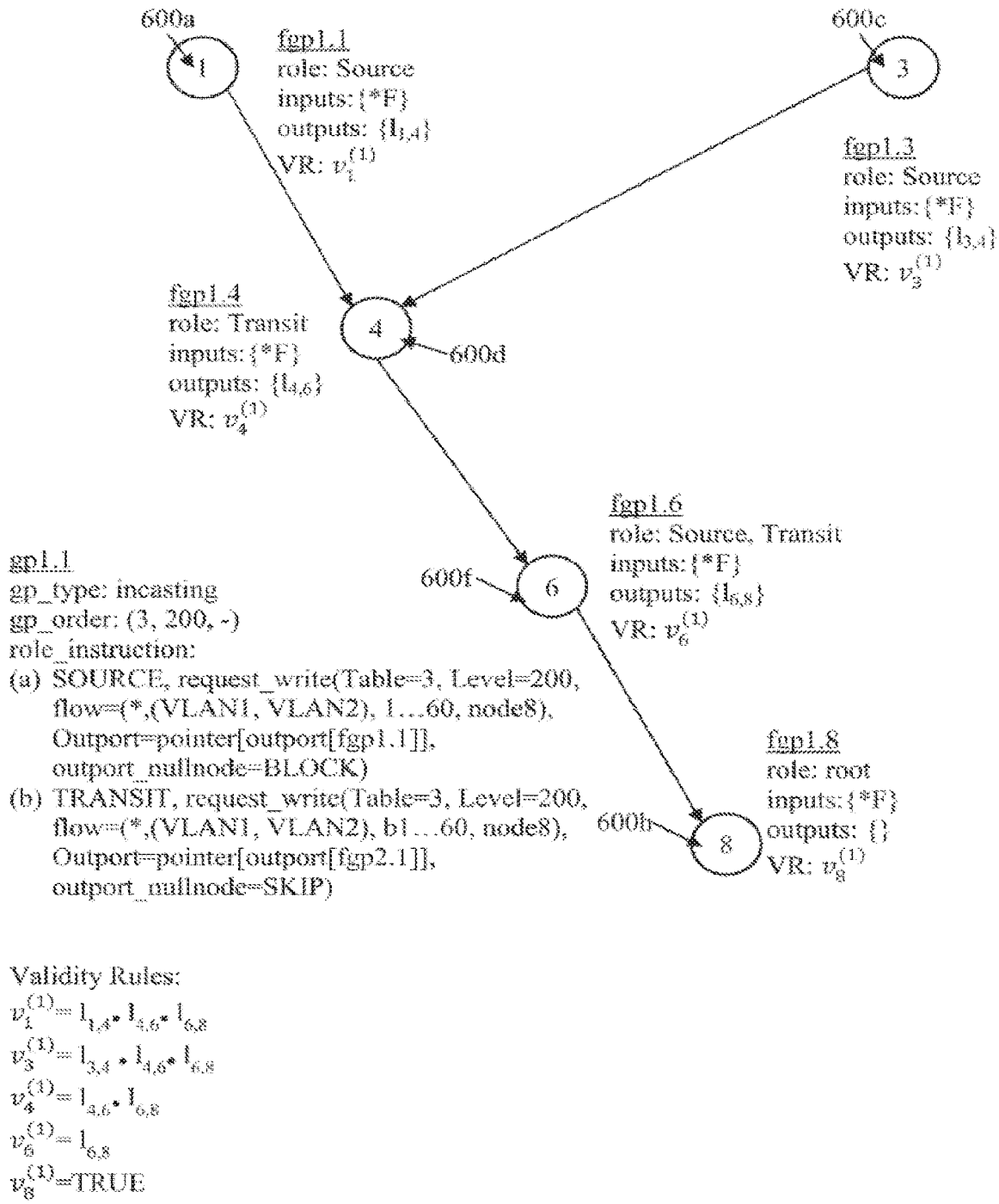
FIG. 8 is a diagram of the network tree shown in FIG. 6B.

Regardless of the option used, the USAT part provided to $T_4$ would not impact the USAT parts provided to $S_1$. Since the USAT parts provided to the different nodes are processed independently in the individual nodes, the FGP can be invalidated at one node without impacting other FGP at other nodes and without leading to loops. For example, if link $l_3$ becomes invalid (which in turn causes the FGP with that link to become invalid) and node $S_1$ switches $USAT_2$ to the backup path, $FG_1$, node $T_4$ can continue using the same USAT part since the link $l_3$ is not relevant to its flow handling process. FIG. 8 is an example diagram of the first network tree, $T_1$ shown in FIG. 6B. Each node 600a-600h is shown with the associated FGP for the network tree $T_1$. As shown, Node-1 600a. Node-3 600c and Node-6 600f are source nodes, Node-8 600h is the root and Node-4 600d is a transit node. Nodes may have multiple roles, for example, Node-6 600f is also a transit node for those flows coming from Node-1 600a and Node-3 600c.

Figure 9:
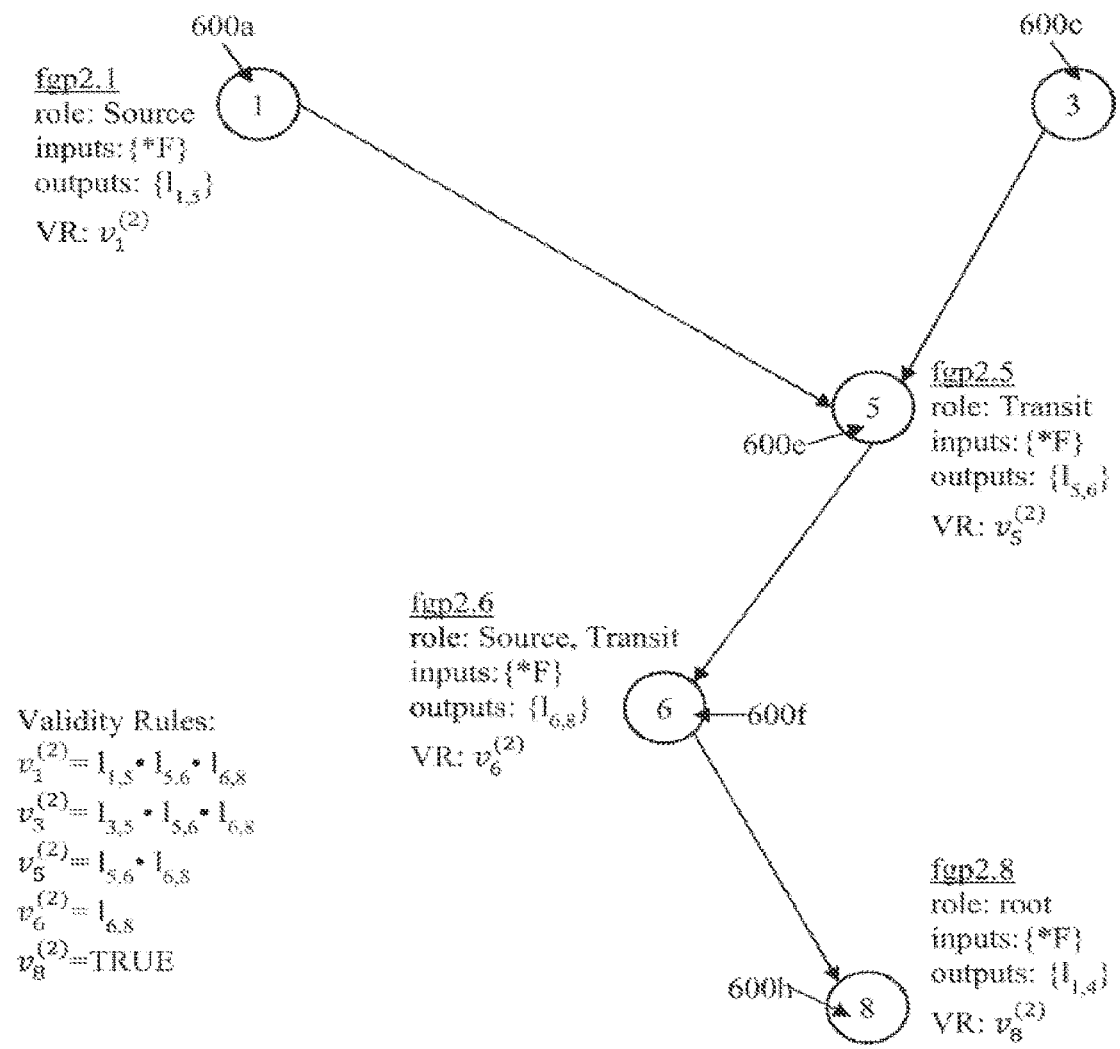
FIG. 9 is another diagram of the network tree shown in FIG. 6B.

FIG. 9 is an example diagram of the second network tree, $T_2$ shown in FIG. 6B. Similar to the situation in FIG. 8, Node-1 600a, Node-3 600c and Node-6 600f are source nodes and Node-8 600h is the root. Node-5 600e and Node-6 600f also serve as transit nodes.

As shown in FIGS. 8 and 9, Node-6 600f is listed as having both a source role and a transit role. In the network trees $T_1$ and $T_2$, Node-6 600f performs similar actions in order to serve source traffic and transit traffic (e.g., forwarding the traffic to outport $l_{6,8}$). In one, non-limiting embodiment, these roles may be simplified such that Node-6 600f may be treated as only a 'Source' node.

Figure 10:
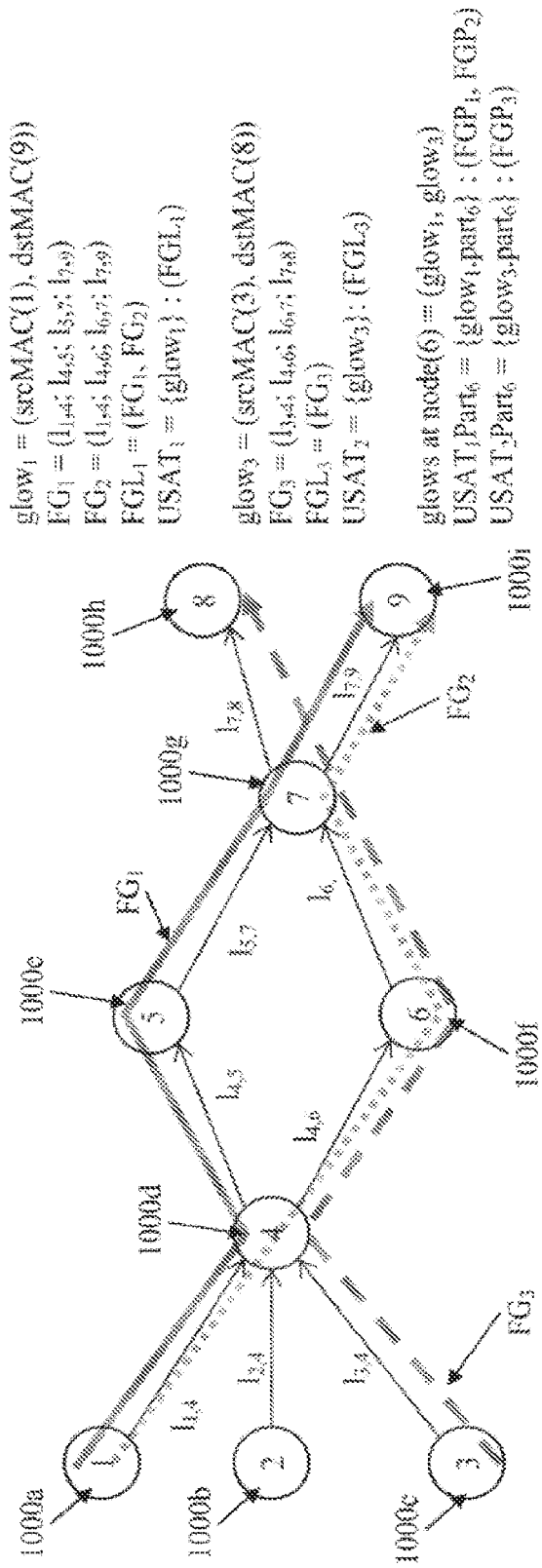
FIG. 10 is another diagram of network trees, in accordance with the present disclosure.

FIG. 10 is another diagram of network trees, in accordance with the present disclosure. In this example there are two glows illustrated—$glow_1$ which begins at the source Node-1 1000a with the destination at Node-9 1000i and $glow_3$ from Node-3 1000c to Node-8 1000h. There are two FG for $glow_1$, namely. $FG_1$, shown as a solid line, and $FG_2$, shown as a short dashed line. $FG_3$, shown as a long dashed line, is used by $glow_3$.

Node 6 1000f can be used in $FG_2$. $USAT_1$ may be using $FG_1$ sometimes, and $FG_2$ is not being used for $USAT_1$ during those times. Thus, Node 6 1000f is not using $FG_2$ in $USAT_1$ when $FG_1$ is being used. If Node-6 1000f continues to monitor/maintain $USAT_1$ when $FG_2$ is in use, it can be better prepared to quickly resume operation once the condition that invalidated $FG_1$ is corrected.

Figure 11:
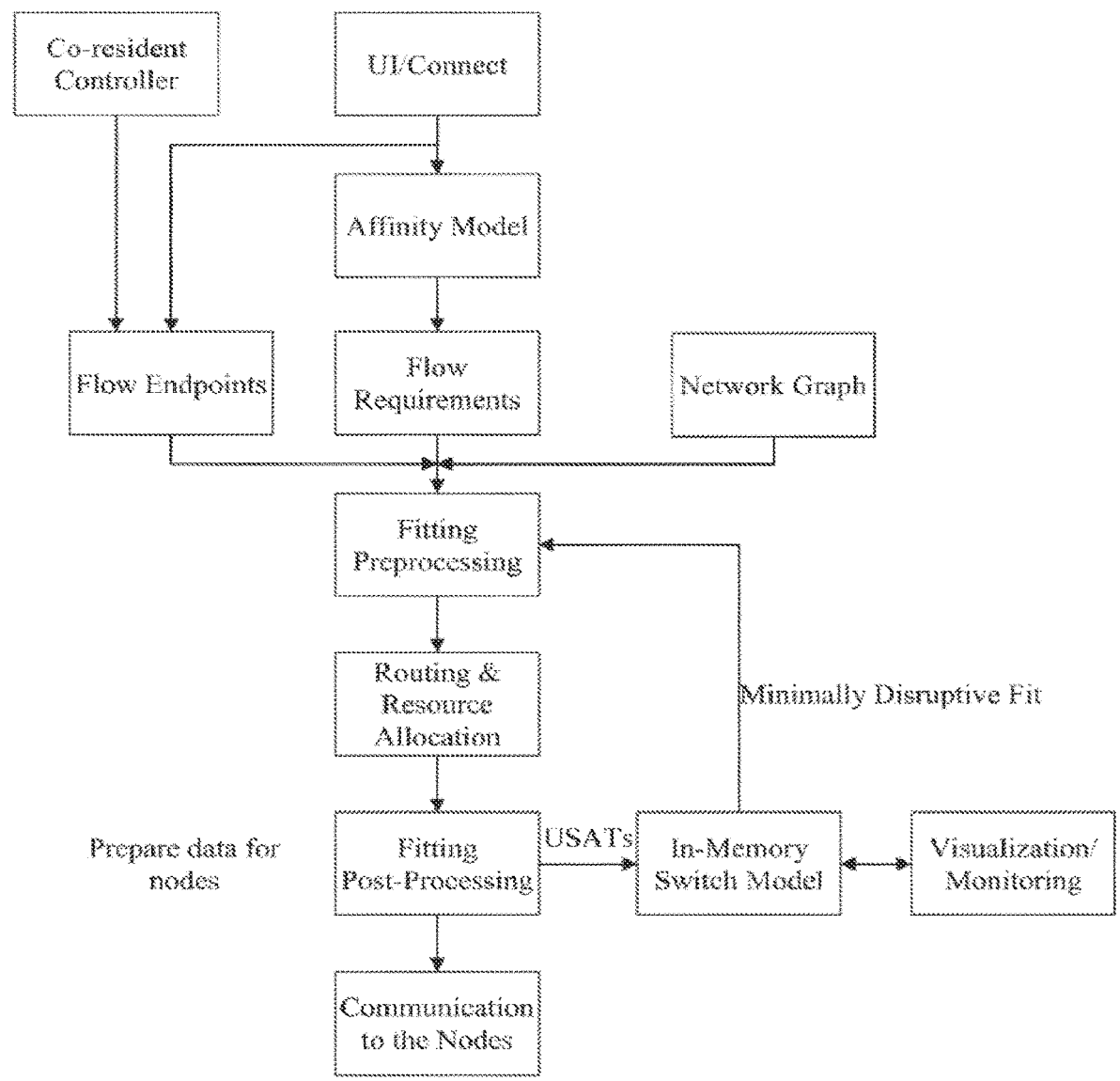
FIG. 11 is a logic flow diagram that illustrates the operation of a method, and a result of execution of computer program instructions embodied on a computer readable memory, in accordance with the present disclosure.

FIG. 11 is a logic flow diagram that illustrates the operation of a method for setting up USATs and providing the relevant information to nodes, and a result of execution of computer program instructions embodied on a computer readable memory, in accordance with the present disclosure. The process begins with a User Interface (UI)/Connect procedure. This can include automated processes where nodes in the network discover the network topology and determine a tree-spanning unicast and/or Broadcast, Unknown, Multicast (BUM) topology as a default communication tree, such as using the IS-IS protocol. UI/Connect can also include affinity specifying software.

Using the data found in the UI/Connect procedure and/or received through a co-resident controller, an affinity model can be prepared and flow endpoints determined. The affinity model can be used to describe flow requirements. This data is combined with a network graph and is then used for a Fitting preprocessing operation where various routing/processing requirements are checked for conflicts and validity, see further U.S. Pat. No. 9,301,026, titled "Affinity Modeling in a Data Center Network", issued Mar. 29, 2016. Additionally, preprocessing can prioritize flows. Based on the Fitting preprocessing, routing and resource allocation is performed. Next, Fitting post-processing is performed. This can be used to prepare the USAT Parts for the various nodes which are then sent to the nodes.

The results of the post-processing may also be used to create an In-Memory switch model. This model can be used for visualization and monitoring, for example, so that an administrator can validate and/or alter the network configuration. The model may also be used with a minimally disruptive fit to feed back into the fitting preprocessing in order to improve the fitting and/or to recover from a crash.

Various processes may be invoked based on time, network conditions or at the request of a user/administrator. For example, the UI/Connect process may be performed periodically and the fitting preprocessing may be run based on changes to the network status.

Furthermore, these processing blocks are intended for illustration only. Various aspects may be performed in parallel and/or functions may be combined or separated. Additionally, processing may be performed on one or more physical devices, for example, a central controller 102 (or co-resident controller) may perform all steps or a co-resident controller may operate in cooperation with another device such as a Fitting engine in order to perform various actions.

Upon receiving the USAT parts, the node may use various management systems in order to handle the routing of the glows. One way to organize the required functionality is to divide it into three managements: the glow management system (GMS), the fabric graph management system (FGMS or FMS) and the table management system (TMS).

The GMS manages the glow parts and glow parts sets. The GMS tracks the validity of the glow's endpoints, distributively turns the glow on or off, and executes the glow's role instructions. Alternatively, the TMS could be responsible for checking the validity of a glow's endpoints after a table entry is created in the TMS system corresponding to the glow.

The FGMS manages the FGPs and FGPLs. By monitoring the validity rules in the fabric graph parts, the FGMS selects the first valid, or active, graph in the FGPLs. In some cases, the FGMS also signals its choice to its USAT neighbors. The outputs of the FGMS are the input and output generalized ports to be used by that USAT at any point in time.

In a further non-limiting embodiment, the FGMS may select an active graph in the FGPLs based on predetermined rules, for example, a first rule (rule A1) to select the first valid FGP and a second rule (rule A2) to pick either (a) the first valid FGP in the list or (b) a direct link to the root if such a link exists. Each node using rule A2 can make its own decision, for instance, use the direct link if the first active FGP in the list gives an outport which the node has measured to be busy, or is being used by the control channel. Individual nodes in the network can use either rule (e.g., some nodes use rule A1 while other nodes use rule A2) and still avoid forming any loops in the network as long as the validity rules of the FGPs are appropriately selected, e.g. by using the PartialPath validity rules.

The TMS manages the USAT software tables and the chip hardware tables. It combines the output of the FGMS and the role instructions in the glows to determine the table entries, for example, using the outport described in the FGMS and the glow description in the instructions to fill out the table entry fields. It also deals with properly ordering the tables and opportunistically looking for table consolidations.

Figure 12:
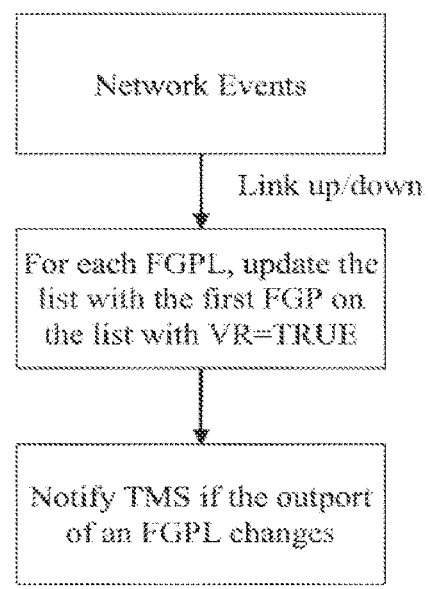
FIG. 12 is a logic flow diagram that illustrates the operation of a method, and a result of execution of computer program instructions embodied on a computer readable memory, in accordance with the present disclosure.

FIG. 12 is a logic flow diagram that illustrates the operation of a method for updating a switching node, and a result of execution of computer program instructions embodied on a computer readable memory, in accordance with the present disclosure. This diagram shows how the FGMS of a node may update the node based on network events, such as a link going up or down. The network event is communicated to the node. The node then reviews each FGPL and finds the first FGP on each of the ordered list which is valid based on the new network status. Once the FGPs are validated, the TMS is notified of any outports which may have changed, or alternatively, the TMS has a way of detecting a change.

Figure 13:
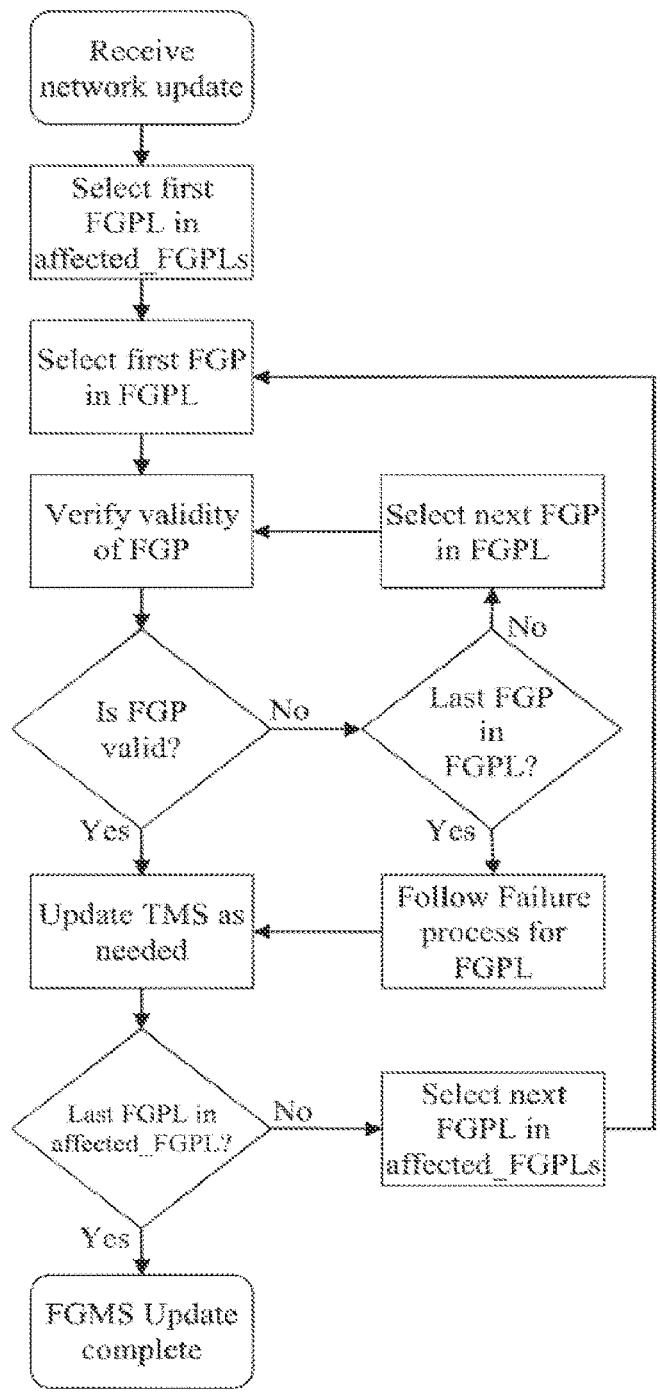
FIG. 13 is a logic flow diagram that illustrates the operation of a method, and a result of execution of computer program instructions embodied on a computer readable memory, in accordance with the present disclosure.

FIG. 13 is a logic flow diagram that illustrates the operation of another method for updating a switching node, and a result of execution of computer program instructions embodied on a computer readable memory, in accordance with the present disclosure. Similar to the diagram in FIG. 12, this diagram shows that the FGMS of a node may update the TMS of the node based on network events, for example, in order to reroute messages due to a link going down or becoming available. Upon receipt of a network update, the FGMS determines a list of all FGPL that may be impacted by the update, herein, the "affected_FGPLs", for example, if a particular link is reported as going down the list of affected FGPLs would include the FGPLs where that link appeared in one or more validation rules. The node may create and maintain such a list of affected FGPLs for each network link or other network condition.

After locating the proper list of affected FGPLs, the FGPs in the lists are checked for validity based on their order in the list. If no FGPs are valid, a failure process may be performed. In some embodiments, the last FGP in a FGPL is set so that it always resolves as a valid FGP (e.g., where the validity rule always returns "TRUE") in which case, the failure process would not be needed and/or it would be embodied in the final FGP.

As described, the TMS is updated after each valid FGP is determined (or the failure process is invoked). In an alternative embodiment, the TMS may be updated once the full list of affected FGPLs has been checked.

In a further embodiment, the switch node may generate/update lists of affected FGPLs at various times, e.g., periodically, during times when there is low processor demand, and/or as USATs are assigned or discontinued. This allows the switch node to maintain the list of affected FGPLs for quick access. Alternatively, the switch node may generate the list of affected FGPLs on demand using a reverse lookup of the elements in the various validity rules.

Some processes are described as series operation. In other embodiments, various actions may be performed in parallel. For example, checking the validity of multiple FGP in a FGPL can be performed simultaneously rather than performed sequentially. Likewise, multiple FGPLs in the list of affected FGPLs can be checked at the same time.

Figure 14:
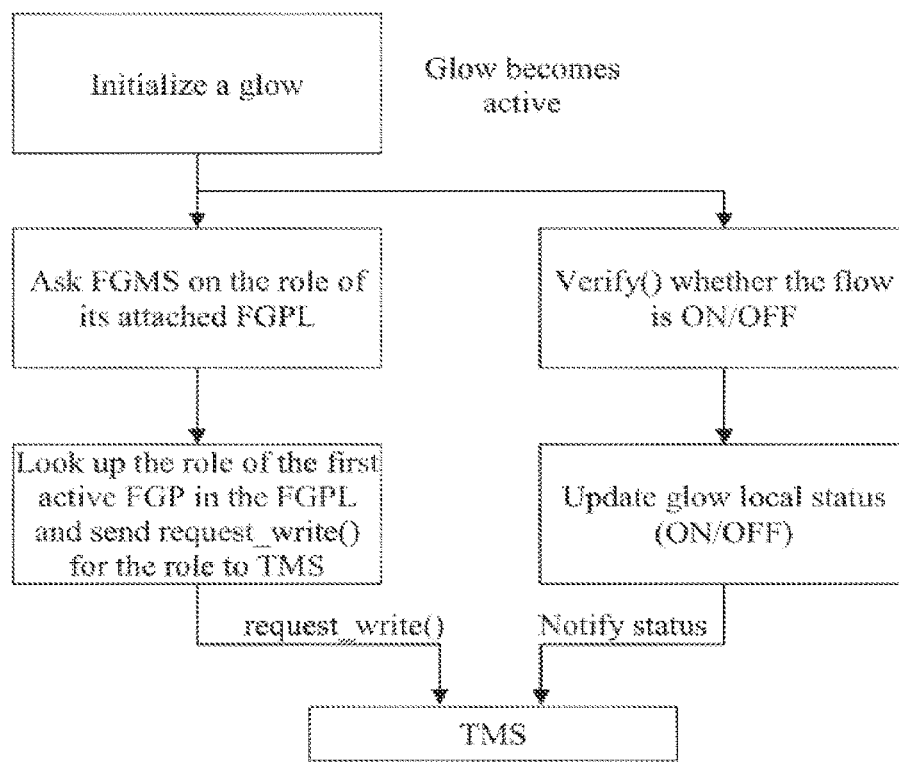
FIG. 14 is a logic flow diagram that illustrates the operation of a method, and a result of execution of computer program instructions embodied on a computer readable memory, in accordance with the present disclosure.

FIG. 14 is a logic flow diagram that illustrates the operation of a method for setting up an ON/OFF glow with flows which are verified as valid before indicating that the glow is ON in the associated USAT Table(s), and a result of execution of computer program instructions embodied on a computer readable memory, in accordance with the present disclosure. Such a process might be used for setting up a flow using the switching nodes TCAM tables, possibly with midpoint add/drop locations for service chaining and/or address translation.

FIG. 14 shows a glow which has been specified to be active at the time of initialization. Initialization might occur right after the glow has been installed at the switch node, after the switch node receives a signal indicating the completion of installation of glows and/or USATs at a set of switch nodes, or as the result of some other event. Alternatively, a glow could be specified to be inactive at the time of installation, in which case the glow would be saved in switch software for later use. The switch node then (a) checks with the FGMS for the role, or roles, assigned to the node, such as, source, transit or root; and (b) checks that the flow is valid by verifying the flow through the generic function Verify( ).

The FGMS determines the nodes roles depending on its mode of operational. Typically, the FGMS will find the first active, or valid, FGP in this USAT's FGPL and inform the GMS of the roles. The GMS then sends a request to create a new entry in a USAT Table by using the request_write( ) function from the glow's role instructions, the arguments of which may depend upon the switch node's roles, e.g. a source node may have a different request_write( ) than a transit node. The TMS then creates an entry corresponding to this glow, where each node using this glow may have different entries, depending upon the switch node's roles and fabric ports determined by the active FGP. The ports of the active FGP could be passed in this request_write( ) or a pointer to the FGPL provided which continually or periodically updates based on the current network state; the latter implementation minimizing interaction between the GMS and TMS.

The GMS also verifies that the flow is valid using the Verify( ) function. If the flow is considered valid, then the glow is indicated as "ON", else as "OFF", and that status variable is provided to the TMS to associate with the entry that has been or will be created with the request_write( ) commands. In addition, the local ON/OFF indication may be communicated to other participating nodes, and/or a distributed protocol may be used between participating nodes to determine a global ON/OFF status based on each switch node's local ON/OFF status. For example, a possible use of Verify, is to verify that the glow's flow's source and destination addresses are attached at appropriate points for this USAT, including possibly any midpoint add/drop locations used for service chaining, and taking into account any address translation that may occur at any of the switch nodes. For instance, for a simple flow from a single source address to a single destination address without any midpoint add/drop or any address translation, each node using this glow may verify that the flow's source address is a local attachment of the ingress node and that the flow's destination address is a local attachment of the egress node. The switch nodes may have this information already, or may request this information from one or another switch node.

Alternatively, the verification can be different at different nodes, with a switch node determining which verification to perform determined by a switch node's role, e.g. an ingress node may only be asked to verify that the flow's source addresses are local attachments, and similarly for the egress node and for the destination addresses (not shown in FIG. 14). If flow attachment verification is done locally, then some signaling can be done to inform other nodes of the local verification result, and a distributed protocol may be used to decide if the glow should be ON or OFF at one or more of the switch nodes using this glow.

In a third alternative, the glow can be considered to be always ON, e.g. by specifying that in the glow's header or by using role instructions which indicate that, or by providing function arguments to Verify( ) which always return that the glow is valid at each participating node. In this alternative, which may be a preferred implementation for glows representing typical Ethernet forwarding and IP routing flows, the TMS creates an entry for the glow and indicates it as ON. This software table, such as the L2/L3 Residual Table for the case of Ethernet/IP flows, is then referred to when a new hardware table entry is needed, e.g. upon receiving a hardware destination address look-up failure signal (DLF), or seeing an ARP request, or from other events.

Note that FIG. 14 shows these two functions happening in parallel, however alternative implementations may perform these functions serially, with either happening first. Also note that if a verification status can change at a later point, e.g. because a host moves to a new switch, the verification process may be rerun and the glow's local ON/OFF status may be updated accordingly. This verification refresh could be done by the GMS and sent to the TMS, or it could be done by the TMS, e.g. by using a field in the table entry indicating the Verify( ) argument associated with that glow. Furthermore, if a network state change leads to a node's roles changing, then the associated table entry in the TMS can be updated because of a change in the role instructions, such a change can be initiated by the GMS, or the TMS if provided with the correct trigger information, and through the execution of a table entry modification function. Alternatively a table entry could be deleted and a new entry installed, however that may lead to traffic disruption if such a change results in a change in a hardware table entry.

Figure 15:
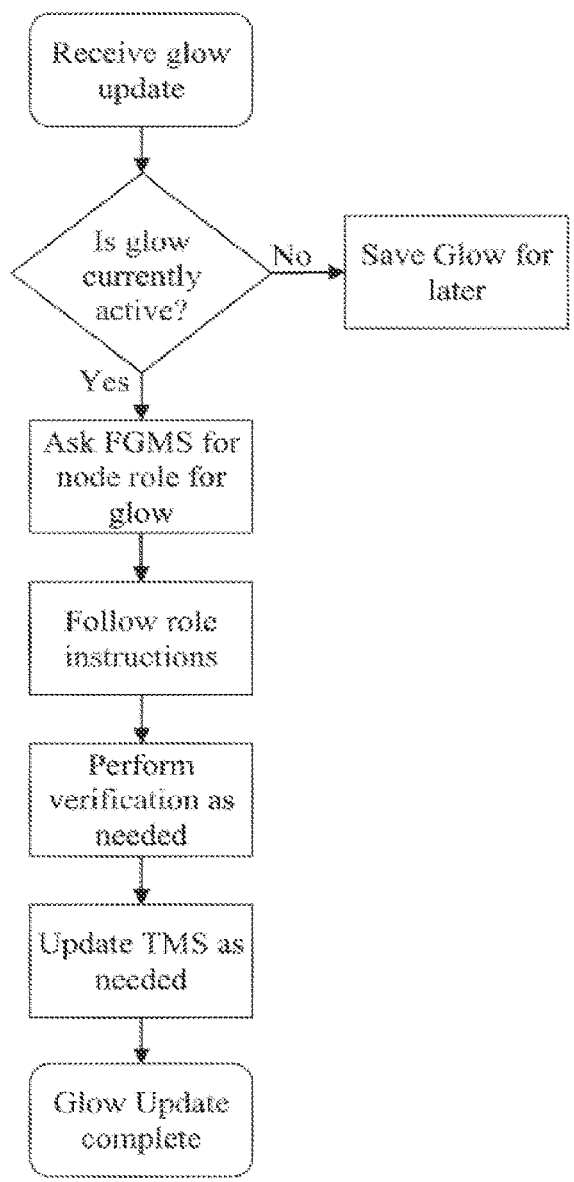
FIG. 15 is a logic flow diagram that illustrates the operation of a method, and a result of execution of computer program instructions embodied on a computer readable memory, in accordance with the present disclosure.

FIG. 15 is a logic flow diagram that illustrates the operation of a method for updating glows, and a result of execution of computer program instructions embodied on a computer readable memory, in accordance with the present disclosure. The process begins when the switch node receives a glow update, for example, from a central controller 102 or a neighboring switch node.

The switch node then checks that the glow is currently active. If the glow is currently inactive, and the update does not change that state, then the flow information is updated and the glow is stored for later. If the glow is currently active and the update makes the glow inactive, then the glow is made inactive, any additional changes to the glow are updated, and the glow is stored for later. When a glow is made inactive, any associated entries in the USAT Tables are deleted by the TMS typically. Therefore, it is not necessary to update the TMS with any glow changes in the update as new table entries are created if the glow is later made active. If the glow is active and the update indicates that the glow stays active, the switch node then checks if its roles have changed and if its role instructions have changed. In addition, the node performs any verification which may be needed. All the updated information is then sent to the TMS to change an already installed entry using either a request_write( ) to the same entry or through the use of a request_modify( ) command.

Note that an alternative glow modification procedure is to make the glow inactive, forcing its table entries to be deleted and any associated hardware entries, and then re-processing the glow according to FIG. 14 leading to the creation of new USAT Table entries and possibly associated hardware entries. However, such a procedure might be more disruptive to traffic than the one shown in FIG. 15.

Figure 16:
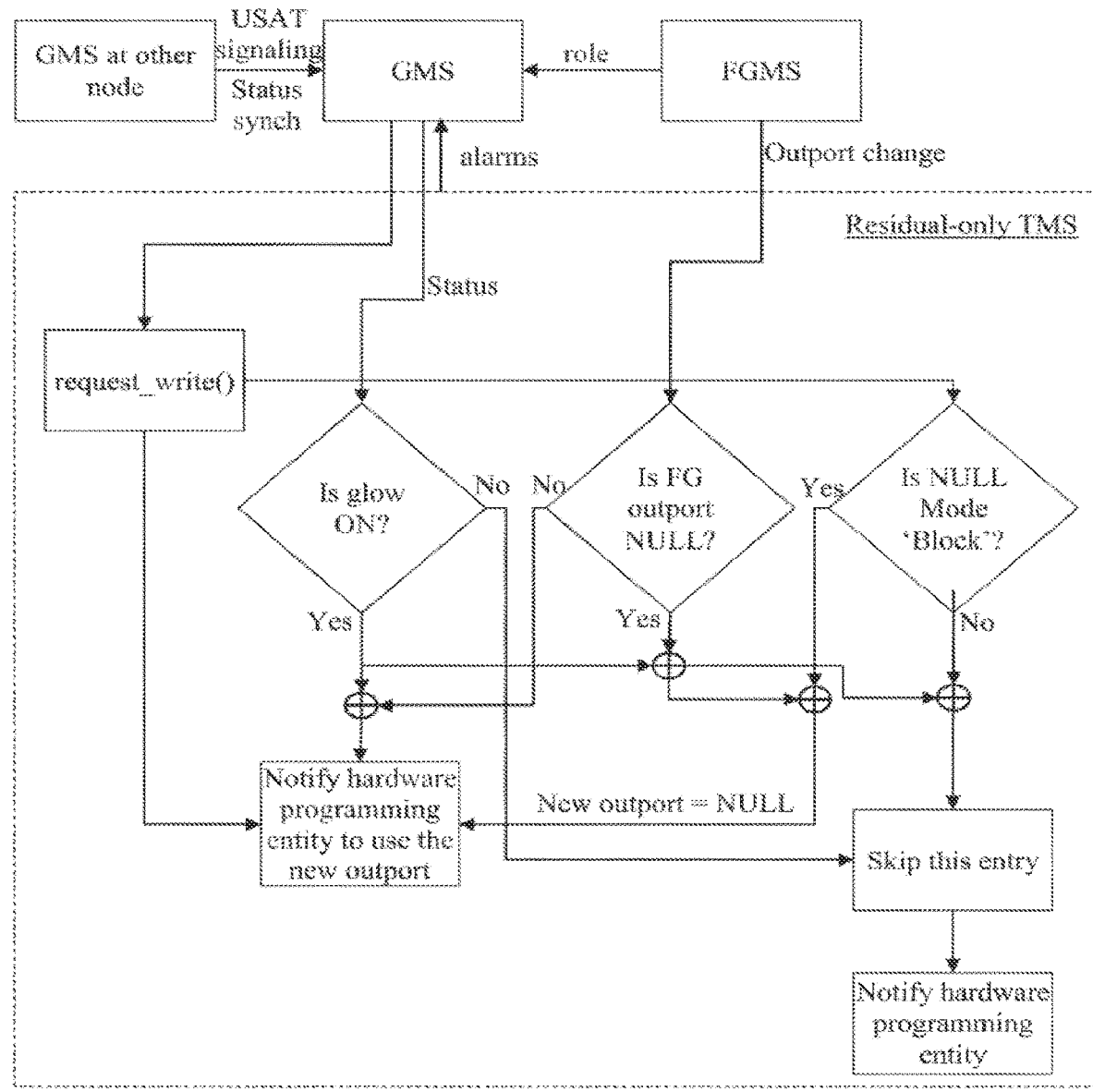
FIG. 16 is a logic flow diagram that illustrates the operation of a method, and a result of execution of computer program instructions embodied on a computer readable memory, in accordance with the present disclosure.

FIG. 16 is a logic flow diagram that illustrates the operation of a method for coordinating the various management systems to maintain the residual table by the TMS, as a result of execution of computer program instructions embodied on a computer readable memory, in accordance with the present disclosure. The switch node's GMS may receive USAT signaling (e.g., network updates from neighboring switch nodes) and/or status synch messages (e.g., requests from neighboring switch nodes to synchronize network status information) from GMS at other nodes. The GMS may also receive data from the FGMS (for example, role instructions). The TMS may also provide alarms back to the GMS, for example, if the actions dictated by the role instructions are not possible with the current network configuration.

The GMS provides requests to the TMS to write glows. The GMS also sends status updates to the TMS. The TMS can also receive outport change instructions from the FGMS. Each GMS request is checked to see if the NULL mode for the glow (such as when the pointer to the outport is assigned to "NULL" or becomes invalid) is 'Block' (meaning the flow will be blocked). If the NULL mode is not 'Block', the entry is skipped and the hardware programming entity (for example a software development kit (SDK) enabling software to control hardware elements such as hardware memory) is notified (in which case the node is to select an outport from the residual or P2 tables). On the other hand, if the NULL mode is 'Block' the hardware programming entity is notified to use a new outport of 'NULL'. The request to write the glow may also proceed to notifying the hardware programming entity to use a new outport, such as one specified in the request.

When the TMS receives status updates from the GMS, the glow is checked to determine if it is 'ON'. If so, the hardware programming entity is notified to use a new outport. If the FG outport is listed as 'NULL' (for example, as a placeholder outport to be updated later), then the hardware programming entity is notified to use the 'NULL' outport. If the glow is not 'ON' the entry is skipped.

The TMS may also check whether the FG outport is listed as 'NULL' in response to receiving an outport change instruction from the FGMS. If the listed outport is not 'NULL', the hardware programming entity is notified to use the outport. Otherwise, the hardware programming entity is notified to use the 'NULL' outport.

Figure 17A:
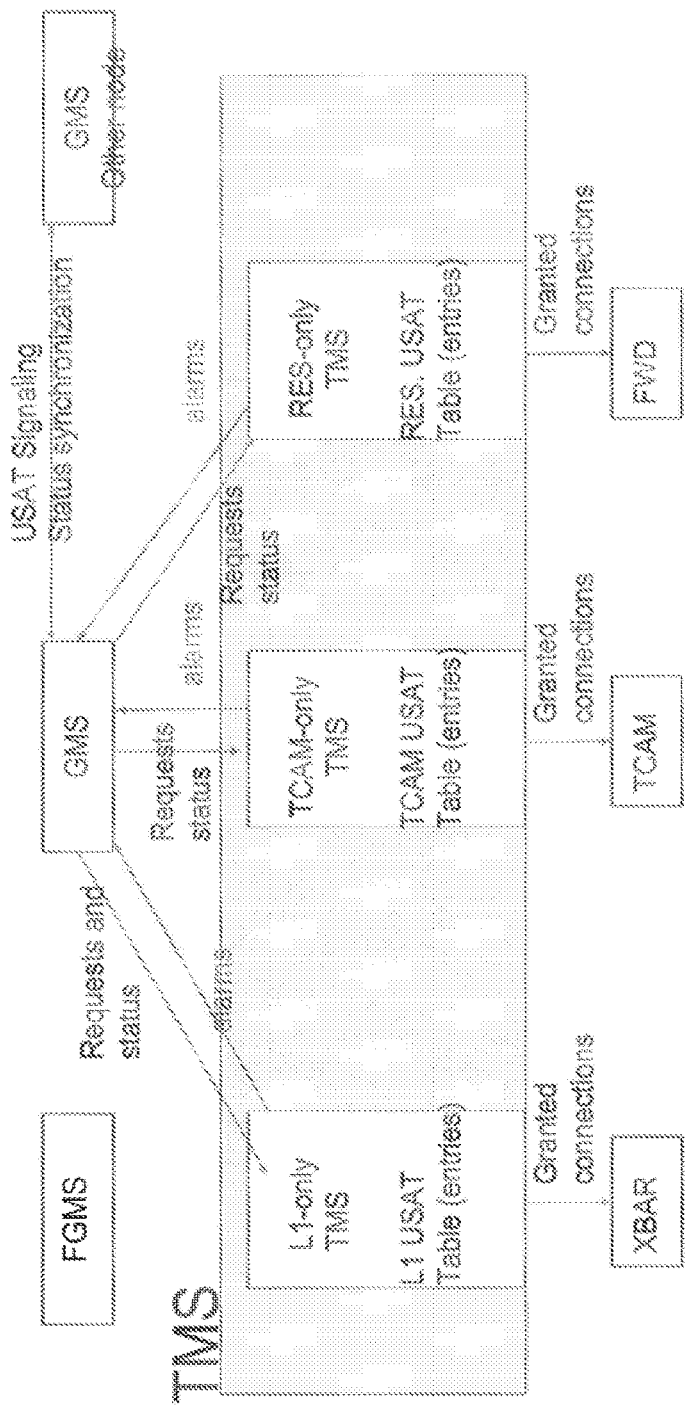
FIG. 17A is a logic flow diagram that illustrates the operation of a method, and a result of execution of computer program instructions embodied on a computer readable memory, in accordance with the present disclosure.

FIG. 17A is a logic flow diagram that illustrates the operation of another method for coordinating the various management systems, and a result of execution of computer program instructions embodied on a computer readable memory, in accordance with the present disclosure. As noted in the FIG. 16, the GMS may share USAT signaling and/or status synchronization request with GMS on other nodes. The status synchronization requests include instructions for one or more connections and requested behaviors (such as role instructions dictating which outports and/or links to use). These status synchronization requests are then relayed to the TMS in order for the TMS to determine whether or not to provide table entry updates (e.g., when a table entry is changed due to the instructions in the status synchronization request).

The TMS may also provide alarms to the GMS which may then be sent along to the GMS on other nodes, for example, when a hardware capacity limit prevents use of the assigned outport.

The TMS maintains software table versions of various hardware tables. For example, the TMS may maintain an L1 USAT table in the software memory which is used to update the XBAR hardware. Likewise, a TCAM USAT table may be stored for the TCAM table.

These software tables may include additional information, for example, the TMS may use such software tables to cache harder information for various flows and/or to store glow definitions. When conflicts occur, for example, if multiple flows are assigned the same outport, the TMS can use the software tables to resolve the conflict and then provide updates to the hardware tables.

The TMS takes the signals/requests received from the GMS and creates associated table entries in one or more software USAT Tables. The table entries may include the request, the glow status, and entry alarms and other data, such as a glow identifier and/or a timestamp. Upon any change to a USAT Table, e.g. the creation of a new entry, the deletion of an entry, the change in status of an entry, or a new alarm, the TMS may update the associated chip hardware tables changing the routing of one or more flows through the node.

FIG. 17A also shows one implementation where the TMS consists of individual TMS processes which manage one USAT Table, e.g. the TCAM-only TMS manages the TCAM USAT Table. In other implementations, a single process could be used to manage all the tables, or the tables could be combined into a large table. The latter implementation being useful if different kinds of flows can potentially interact or conflict at a node, for instance an L1 flow conflicting with a L2 flow. One way to resolve such conflicts is through the use of a priority field in the glow; an alternative method to handle conflicts from different types of glow, e.g., glows using different USAT Tables but which may request a common switch resource such as an output port, is to prioritize the tables, e.g. all L1 flows in the XBAR USAT Table take priority over all flows in the TCAM USAT Table, etc. Such a scheme can be particularly useful when individual TMS processes are used to manage each USAT Table.

Note also that other implementations are possible, e.g. that signaling may also or alternatively be performed by the FGMS, TMS, or another software process.

Figure 17B:
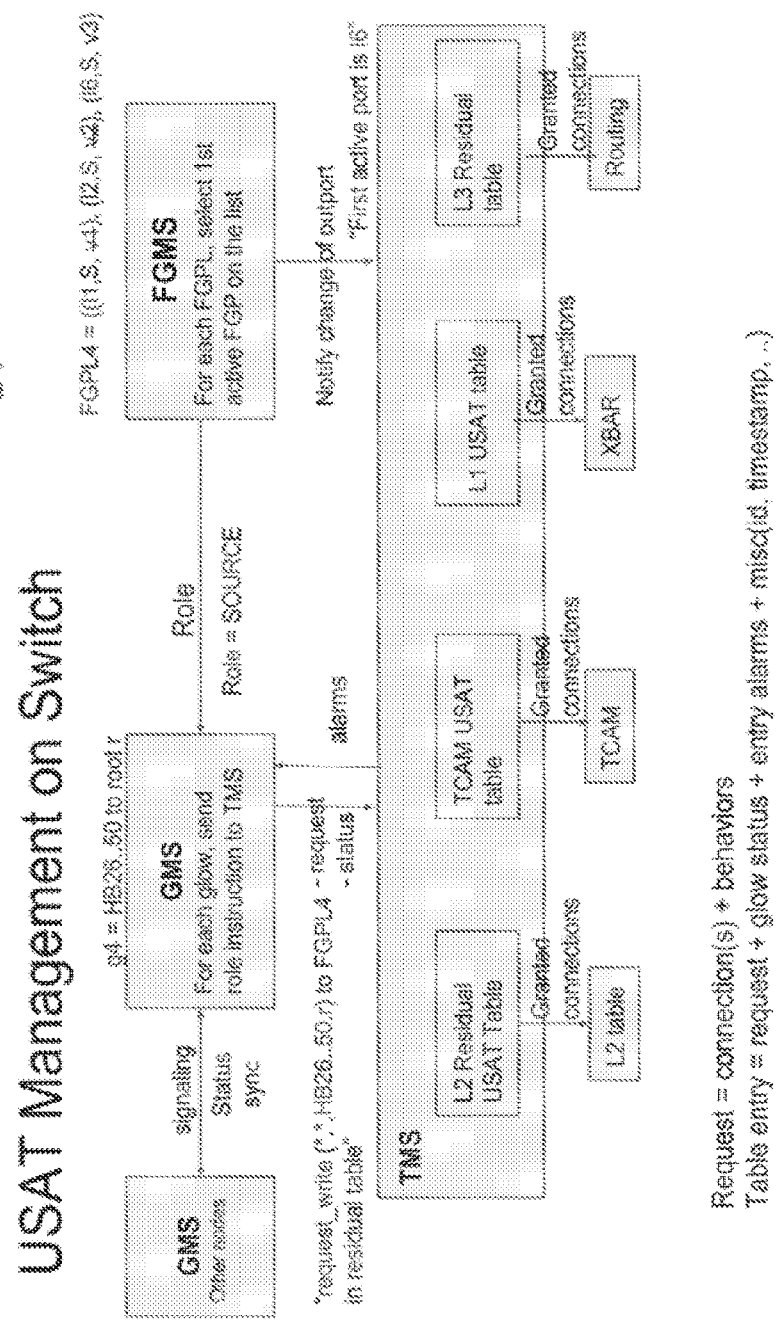
FIG. 17B is a logic flow diagram that illustrates the operation of a method, and a result of execution of computer program instructions embodied on a computer readable memory, in accordance with the present disclosure.

FIG. 17B is a logic flow diagram that illustrates the operation of a further method for coordinating the various management systems, and a result of execution of computer program instructions embodied on a computer readable memory, in accordance with the present disclosure. Similar to that shown in FIG. 17A, the GMS of the switching node receives signaling/requests from GMS in other nodes and provides that data to the TMS in order to update the associated tables. As shown in FIG. 17B, the TMS may also update either L2 or L3 residual tables.

Additionally, in this method for coordinating the various management systems, the FGMS communicates directly with the TMS. The FGMS finds the first, active FGP in each FGPL. Based on the active FGP, the FGMS provides role instructions to the GMS and/or notifies the TMS of any changes to the outport. For each glow, the GMS sends the role instructions received from the FGMS to the TMS.

As described above, the TMS maintains software table versions of various hardware tables. In FIG. 17B, the TMS also maintains an L2 residual USAT table for the L2 table in the hardware memory.

GMS signaling is just one possibility. There are multiple ways to signal between the nodes and this may be done by the software entity GMS. Signaling can also be done by a high level USAT software element, some signaling by the FGMS (if it related to FGPL's), etc. In some implementations some services can exchange status information between the nodes. If that information relates to a glow, one option is for the signaling software to be implemented within the GMS, however other implementations are possible.

Figure 18:
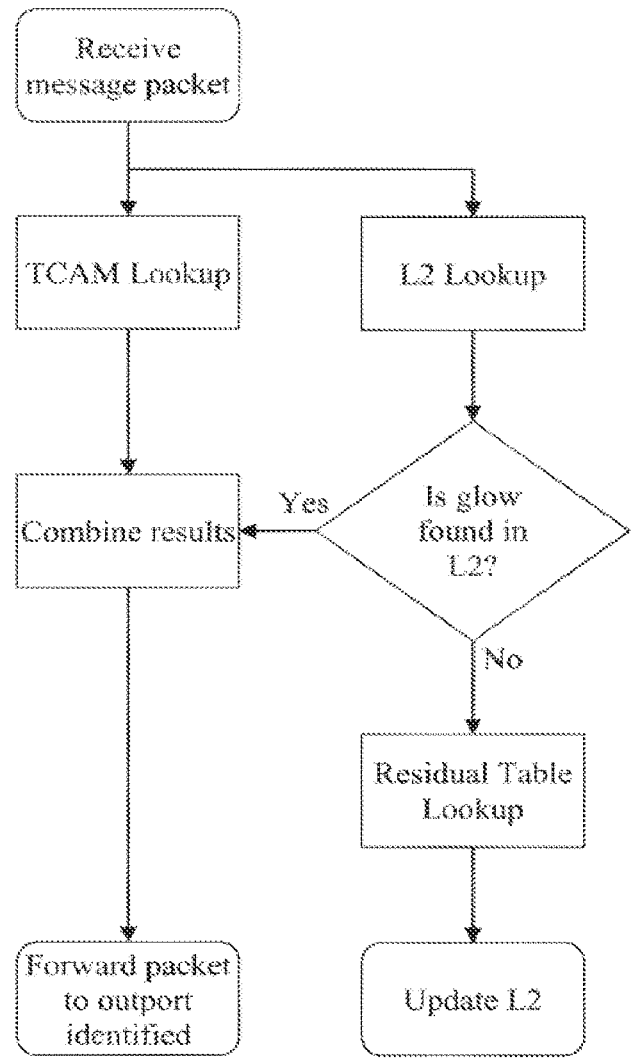
FIG. 18 is a logic flow diagram that illustrates the operation of a method, and a result of execution of computer program instructions embodied on a computer readable memory, in accordance with the present disclosure.

FIG. 18 is a logic flow diagram that illustrates the operation of a method for routing packets through the switch node based on the various table, and a result of execution of computer program instructions embodied on a computer readable memory, in accordance with the present disclosure. The process begins when the switch node receives a message packet. If the message packet is received at an inport which is electrically connected directly to an outport (e.g., through a crossbar) then the message is routed at the L1 layer.

If the inport connects to the data processor, the message is routed using L2/L3 routing. The glow is then looked-up in the TCAM table and the L2 table based on the header information. The results of the look-ups are combined. The TCAM results may be used without combining with the L2 lookup results in situations where the TCAM table response is sufficient to forward the packet. These hardware lookups may be performed in parallel.

In further embodiments, various steps may be combined or separated. For example, determining the glow may be performed as a precursor to the table lookups such as to determine which data fields from the packet header are to be supplied to the tables in order locate the results associated with the glow.

If the packet's glow is found in the TCAM and/or L2 table, the packet is forwarded to the outport identified. This outport may lead to another switching node or to an attached host. In various embodiments, one or more outports may be identified in the entry and copies of the received packet are sent to each.

If no glow entry for the received packet is found in the L2 table the packet is sent to CPU (such as the data processor 106) and triggers a Destination Lookup Failure Process in which the switching node checks the (software) residual table. As the residual table includes entries for each glow initiated at the switching node, an entry for the packet should be found there. Based on that entry, the L2 table may be updated.

If an entry is found in the TCAM table but not the L2 table, a copy of the packet is sent to CPU as described and the packet may still be forwarded to the outport from the TCAM table.

In a further embodiment, if no glow is identified in either the hardware (TCAM/L2) or software (residual) tables, the switching node may alert other switching nodes and/or the central controller 102. In other embodiments, the unidentified glow may simply be discarded.

As noted above, glows may be used to provide various services for network traffic, such as load balancing. Glows may also be used to enable merging and splitting of flows.

Glows from different sources (such as different incasts) may share routes in certain circumstances. As the packets get close to their destination the list of possible routes tend to collapse and sharing of routes is possible. In such situations the glows may be merged for ease in handling as multiple glows may be processed together as a single glow.

On the other hand, glows may share routes as they leave a source and then separate later (outcasting such as for multicast and/or broadcast messaging). Again, the glows may be combined for ease in handling until the individual glows split to reach different destinations.

In various, non-limiting embodiments, the USAT architecture includes a switch operation. Many examples are given. These USATs are:
1. Universal, in order to streamline Fitting and node development, as well as unify Fitting resource sharing algorithms:
2. Extensible, for future services and technologies; and
3. Scalable.

USATs are a universal forwarding framework capable of carrying all current (UDT, FSAT, PSAT) and future services. The USAT framework specifies:
1. The algorithmic output of Fitting,
2. The required information to be sent to the switches,
3. The subsequent behavior of the communication services on the network, and
4. The nodal algorithmic requirements to achieve that behavior, including resiliency.

Note that "universal" means that:
1. Fitting uses a common framework in its resource sharing algorithms for all its generated services including:
    a. Point to point, Incasting, Multicasting, and Broadcasting (e.g. for BUM trees)
    b. L1, L2, L3 as well as multi-layer services such as L1/L2 low latency multicasting
    c. Support for MLAG and midpoint add/drop for firewall applications
    d. Protected and unprotected services, along with options on protection types
    e. Security and visibility services
    f. Internal optimization services such as flyways, encapsulation, etc.
    g. Support for new Fitting modes, specifically for MDF, fast set-ups, and scoring
    h. extensible to new services, so specifically a USAT should be able to specify whatever our current chip and anticipated new chip functionalities can do.
2. Fitting uses this common framework to communicate the services to the nodes.
3. The nodes use this framework to configure and maintain the services.
4. The nodes use this framework as a common, but flexible, back-up mechanism for those services requiring resiliency.

Portions of USATs may be implemented as, e.g. partially valid tree PSATs, VLAN PSATs, or protected FSATs. and individual portions can be added to the USAT framework as more services are desired. USATs are PSAT/FSAT backward compatible, so these services could be added at any stage.

An embodiment of the USAT is described which has the global data structure created and monitored by Fitting.

USATs may come in three flavors: internal, external, and mixed.

External USATs are used to provide services between endpoints attached to the network. They carry external services, e.g. between endpoints connected to the switches through an access port. Examples of external USATs would be FSATs, PSATs, VLAN PSATs, Protected FSATs with source and/or destination MLAG. L1/L2 low latency multicast trees, L1 protected services, L2 Residual and routed (L3 residual) services, etc. Note that this definition of external services relies on the physical location of the endpoints, not the logical location of the communication address; thus routed services are considered external services even though an internal MAC address is present at the access port.

Internal USATs are used to provide services between endpoints internal to the network. They carry internal services, e.g. between endpoints within nodes. A key example of internal USAT is a flyway which connects two L2 ports on a packet chip directly with an L1 circuit. In this example, the internal service endpoints are the L2 ports. Other examples include more generic L2/L3 topology changes as well as encapsulation services such as MPLS between two switches. Timing distribution trees are another example of an internal USAT.

Mixed USATs are used for services with one endpoint in the network and another outside the network; mixed USATs are used for security and visibility services. For instance, mirroring a port and routing it to an access port is considered a mixed service.

These flavors of USAT are used for classification. There are no significant differences in the operation of an external, internal, or mixed USAT. It is possible to allow a mixed glow and an external glow to coexist on the same USAT. Using this generalization, then the above discussion is still valid and may be thought of as a description of the types of services USATs can offer.

External USATs are defined between two or more access ports and are used to provide external services. The following lists the currently defined external services:
1. (protected) (high speed) (bidirectional) Pt-to-Pt USATs with possible midpoint add/drops (midpoint add/drops are used for service chaining)
    1.1. L1 hard or soft circuit (An L1 soft circuit sends one access port's entire traffic to another access port, but is allowed to packet process at one or more intermediate nodes, e.g. through the TCAM. Flow filters are optionally permitted, e.g. send all TCP traffic from this port to this network monitor.)
    1.2. L2 (MLAG) FSAT with flow filters, VLAN generalized endpoints.
    1.3. L3 FSAT with flow filters and IP prefix generalized endpoints, and possible midpoint add/drop
2. (protected) Outcasting
    2.1. L1/L2 low latency mixed layer multicast (In general, for L1/L2, the signal is L2 processed at the destination nodes.)
    2.2. L2 multicast tree with flow filters and generalized endpoints
    2.3. L3 multicast tree (e.g., a low latency L1/L3 multicasting USAT) with flow filters and generalized endpoints
3. (protected) (high speed) Incasting
    3.1. L2 (VLAN) Residual Trees with flow filters with partially valid or fully valid trees
    3.2. L3 (IP Prefix) Residual Trees with flow filters with partially valid or fully valid trees 3.3. Generic incasting flow with flow filters, generalized endpoints, and validity rules 4. (protected) (high speed) Broadcasting 4.1. P2.5 BUM Trees, with B, U, and M all options.

Notes:

( ) means an optional parameter.

various protection mechanisms are currently defined (If a flow is unprotected or all its possible paths are invalid, then there is an option to Block the flow rather than having it fall back to residual):

Unprotected: flow falls back to residual

FullPath: entire path is backed-up with one or more alternative path(s).

FullTree: the entire tree is backed-up with alternative tree(s).

PartialPath: the path to the destination is backed up at each node.

PartialTree: the path to the root is backed up at each node. Same as PartialPath for incasting trees.

HotPath: Same as FullPath with one back-up. Flow is multicast on both paths and the destination selects one of them. Used for very fast restoration.

HotTree: Same as FullTree with one back-up tree.

high speed means the data rate of the service is larger than the fabric rate, with inverse multiplexing of some form.

Bidirectional means that the two point-to-point service directions are coupled together. The details can be expressed in the affinity link attributes. In this document, bidirectional means that each direction is operational for the service to be operational. In addition, there are service options that can occur on the flow, such as Encapsulation/Translation (VLAN translation, Q-in-Q, VxLAN)

Rate limiting

Blocking 3.1.2. Internal USATs

Internal USATs are defined between two or more fabric ports on the switch chip. The following lists possible internal USATs.

1. L2 flyway: an L1 circuit between two fabric ports
2. L3 flyway: a logical circuit (MPLS, ECMP, . . . ) between two virtual ports
3. Timing distribution trees Note that an L2 flyway induces a change to the L2 topology (the peering topology). By using the USAT framework, this change can be made resilient if so desired. Other features of the USAT such as priorities can also be incorporated for flexibility. Another way to change the L2 topology is for Fitting to change the base L2 topology of the network. Base topology changes are not resilient. The behaviors of these two approaches are different and both can be used simultaneously in the network.

Mixed USATs are defined between access ports and fabric ports. Mixed USATs may be used for visibility and security applications such as port movement, mirroring, and general visibility.

As used herein, the architectural specification of USATs into two non-limiting embodiments: USAT v1 and USAT v2.

USAT v1 includes

Internal, external, and mixed USATs, including translations such a VLAN translation and Q-in-Q, but not internal encapsulation mechanisms Multicasting and Incasting using composite point-to-point USATs As an option, (VLAN) residual Incasting using native multi-point graphs; otherwise residual handled with composites like other multipoint services.

USAT v2 may include

Native multipoint USATs using multipoint glows

Internal encapsulation USATs

It will be useful for discussion to have some terminology and a symbolic representation of a USAT.

Symbolically, a USAT U is represented as U={g}: (G), where {g} is a glow set (an unordered group of glows), and (G) is a graph list (G) (an ordered group of graphs). We say that {g} and (G) are assigned to U. Similarly, each glow in {g} and each graph in (G) is assigned to U, although technically it is the glow set and graph list that are assigned to U as units. When multiple glow sets {g}, . . . , {h} are assigned the same USAT, we similarly write U={g}, . . . , {h}(G).

USATs are not ordered, however each USAT can have a globally unique identification. Symbolically, we denote the ith USAT as $U_i$. For example, we could write $U_i$ as $U_i = \{g_{i,1}, g_{i,2}, \ldots g_{i,k}\}: (G_{i,1}, G_{i,2}, \ldots G_{i,m})$ if $U_i$ had just one glow set attached to it. $G_{i,1}$ is called the USAT's primary graph, and the other graphs are its m−1 back-up graphs. When a glow is carried over a graph, it is said to be attached to the graph.

Using this terminology, the operation of the USAT, $U_i = \{g_{i,1}, g_{i,2}, \ldots g_{i,k}\}: (G_{i,1}, G_{i,2}, \ldots G_{i,m})$, is to attach each valid glow in $\{g_{i,1}, g_{i,2}, \ldots g_{i,k}\}$ to the first valid fabric graph in $(G_{i,1}, G_{i,2}, \ldots G_{i,m})$. More precisely, with partially valid graph rules, or a more general validity rule is used, the operation of the USAT is for each active node to attach each valid glow to the first valid fabric graph part, as seen by that node.

A node which appears in any graph of $(G_{i,1}, G_{i,2}, \ldots G_{i,m})$ is said to participate in the USAT $U_i$. The set of nodes which participate in a USAT are called its participating nodes. As an example, consider a protected point-to-point FSAT implemented through a USAT. The participating nodes of the USAT would be the source node, the destination node, and any node which acted as an intermediate node along the primary or back-up paths. As another example, consider that in a PSAT implemented as a USAT the participating nodes would include all the nodes of the network.

Fitting also assigns a default status to the USAT: active or inactive. This is used to allow Fitting to send USATs to the nodes and turn them on later.

All the above information is stored in the USAT data structure.

We use a table representation of the USAT which we will use for the other data structures defined in this document. A point-to-point external USAT would be represented as (Internal and mixed USATs will look very similar, and in some embodiments may be the same):

usat_id: a globally unique identifier. By convention, USAT id's begin with "u".

usat_default_status: Active or Inactive usat_type: one of (External, Internal, Mixed)

usat_connectivity: Point-to-point usat_protection_type: one of {Unprotected, FullPath, PartialPath, Hot, Custom} usar_participating_nodes: an unordered set of the participating nodes of the USAT.

usat_glow_sets: List of glow sets assigned to the USAT usat_graph_list: The graph list id of the graph list assigned to this USAT.

Some more details on these fields:

usat_id USATs are unordered but are given a globally unique identification. By convention, it starts with the letter u. The USAT identification number is used in the glow and glow set data structures to signify that the glow and glow set, respectively, are assigned to the USAT. Similarly, the USAT id is used in the corresponding parts data structures that get sent to the nodes. The identification number can have various uses; for instance, the node may use this to identify information to their participating neighbors about a status change. In addition, since USATs can be modified by Fitting, e.g. moving a glow to a different USAT or adjusting a graph list with some mechanism for consistency amongst the nodes. The usat_id could play a part in that. e.g. by adding a time stamp to the end of the id of the last modification.

usat_default_status: Allows Fitting to create USATs that are not immediately active. Permits staging of network transitions, e.g. maintenance modes, etc.

usat_type: identifies the type of USAT for slightly different operational behavior. This field may not be used for all implementations. Behavior can be encoded in the glows and fabric graphs rather than the USAT type. For instance, internal USATs do not have the same attachment movement rules as external but this distinction is accomplished by giving an external glow an instruction to check its endpoint attachment validity.

usat_connectivity: specifies the USAT is point-to-point. Multipoint USATs may use other fields. Even if not, e.g. even if all behavior is encoded in the glows and fabric graphs, it may be desirable to have this field so that the node does not need to compute the USAT connectivity.

usat_protection_type: Unprotected USATs have graph lists with a single fabric graph. Protected USATs have graph lists with multiple fabric graphs. This field does not determine the behavior in any way—the validation rules included in the graphs determine the behavior. However, a node can be told the behavior rather than having to deduce it from the validation rules.

usat_participating_nodes: All the nodes which appear in any fabric graph in the fabric graph list. Note that although the participating nodes can be derived from the fabric graph set, it may be more efficient to store them as a separate set for quick access.

usat_glow_sets: The glow sets assigned to this USAT. Note that each glow in the glow sets are point-to-point in order to be in a point-to-point USAT.

usat_graph_list: The graph list assigned to this USAT. Graph lists can be assigned to multiple USATs.

Note that point-to-point external USATs can be divided into four different service layer categories:
1. L1: meaning that both the source and the destination attach using an L1 port
2. L2: meaning that both the source and the destination attach using an L2 port
3. L1/L2: meaning that the source attaches at L1 but the destination attaches at L2
4. L2/L1: meaning that the source attaches at L2 but the destination attaches at L1

Using these can create the variety of services types. Note that the layer refers to the input and output layers, not the entire path. So an L1 USAT need not be L1 end to end. If it were, the service is called pure L1. Similarly, a pure L2 service would have no flyways in it established by a USAT. In addition, the above choices can be further categorized by the layer of a midpoint add/drop. Since multiple midpoint add/drops may exist at different layers and in different orders, we see that the possible number of combinations can grow quite quickly. Therefore, these classifications not encoded operationally, they are just for ease of discussion. Rather, the determination of how to process a flow at a node is determined by a glow's role instructions, the role in turn is determined by the node's active graph from the graph list.

The USAT may be divided into a number of components to decouple the management of paths from the management of flows. This is achieved by logically dividing a flow's table entries at each node into two portions: a glow and a fabric graph.

A glow is flows grouped together by Fitting with common nodal endpoints and attributes, and a set of actions for those glows; these actions are grouped into instructions which contain conditions on when to execute them. There are two types of conditions: 1) conditions using local status variables, 2) conditions based on the node role. The actions implicitly contain the flows description and attachment information. For efficiency in rearranging glows, glows can be further grouped into glow sets.

A fabric graph is a possible path that glows could take through the network, excluding the attachment points. Fabric Graphs also contain validity rules which are used by the nodes to test the network state to determine if the fabric graph is valid or not. Graphs are combined into fabric graph lists which consist of at least a primary fabric graph and possibly back-up fabric graphs. Fabric Graphs also contain node roles which partly determine which glow actions to execute at which nodes.

It is thru this combination of a glow's role instructions and the fabric graph's node roles that enables Fitting to program the flows in the network in a very flexible manner.

At a very high level, the USAT is straightforward: Each node chooses the first operational fabric graph in the list and then programs its tables (FWD, TCAM, etc.) based on instructions in the glow, the status of the current local variables, and the active fabric graph's node roles (Nodes can opportunistically consolidate table entries as part of the Table Management System).

The separation of a flow into a glow and fabric graph allows multiple flows to re-use the same path, decreasing node processing requirements especially during times of topology changes. As an example, consider an affinity between AG1 and AG2, each with ten members. Under the USAT framework, these 100 flows could be divided into 100 glows all assigned to the same fabric graph. If that fabric graph fails, one decision is made to substitute a new fabric graph, or partial fabric graph for repair, and this decision applies to all 100 glows.

The glow is the data structure which contains information about the packets of a flow, including its source and destination attachment points (its location), L2/L3 address, and any flow filters. For efficiency, glows can have generalized addressing and multiple table entries to create glows which represent large and varied groups of flows. In addition, the glow data structure includes various attributes which define desired network behavior under changing network conditions such as attachment moves and network failures. A few examples of glows are:

L1, L2, or L3 point-to-point glows
bidirectional L1, L2, or L3 point-to-point glows
Residual glows representing a hash bucket of DA to a given destination node These can all be represented as the same data structure with varying role instructions.

A glow could exist on multiple USATs. Examples where this is useful are i) MLAG, ii) residual, and iii) pre-planned MAC movement services where glows are assigned to multiple USATs in anticipating of endpoint movement.

Fitting creates and modifies glows. Nodes do not create or modify a glow. In fact, nodes do not operate on glows at all. Instead, nodes have what are called node parts with associated local variables for real time management.

Fitting has a lot of flexibility in how to group flows into glows; however it should be kept in mind that a glow represents the smallest atomic unit managed by the USAT, so e.g., multiple flows within a glow all have similar behavior and this has implications in how to group flows. Providing some level of control within a glow is a topic to be considered for USAT v2.0 for multipoint glows. There is no limitation in USAT v1.0 since multiple glows and multiple glow sets can be assigned to a USAT.

For efficiency, Fitting combines glows into glow sets before assigning a glow set to a USAT. Glow sets are unordered groups of flows which share a common USAT. Therefore, the glows in a glow set share the same set of primary and alternate paths. However, each glow has its own attributes and instructions. For instance, one glow could have a Block attribute specifying that the glow should be deactivated if there is no valid fabric path available, whereas another one could fall back to residual in this case.

There is no network operational difference between creating one or more glow set per USAT; a difference is that Fitting can move a glow set to another USAT as an entire unit and this may be transactionally more efficient than individually moving a glow into another glow set and/or creating and deleting new glow sets.

In addition, it might be useful for central control to send a command to active all the glows in a set, and deactivate another set. For instance, using the example above with an AL between two AG's with ten hosts on each node. Fitting may choose to divide the 100 flows into two glow sets with fifty (50) glows each, and assign both glow sets to a USAT. At a later time, for load balancing or to achieve some other routing requirement, Fitting moves one of the glow sets to another USAT. This same behavior could also be achieved by creating two USATs with the two different glow sets but with identical graph lists; however this would likely be more processor heavy.

Fitting creates and modifies glow sets as well as assigns the glow sets to USATs. Fitting can move a glow set from one USAT to another. Nodes do not perform these functions. Nodes operate on what are called glow part sets. The glow part sets contain all the necessary information for a node and have associated local variables for real time management.

A fabric graph is a data structure which contains all the information about the physical path(s) of the flow through the network, excluding the attachment points. Including the attachment points in the glows rather than the fabric graphs has many advantages, one of which is the ability for flows from different access ports on the same switch to share the same fabric graph.

For every graph, there are validation rules which specify whether the graph is valid at a particular node. Note that in general, the validation rules are node specific. This allows Fitting to create validation rules based on part of a path rather than the complete path, e.g. as in residual partially valid trees. By specifying different validation rules for different graphs, various protection schemes can be simultaneously supported in the network.

A flow's table entries could vary from node to node. For instance, an FSAT could use forwarding table rules at the destination node but TCAM rules at the ingress. Another example is where there are extra table entries for add/drop at nodes with network service equipment such as firewalls, for those flows that are specified to be routed there. There are numerous other examples.

Therefore, each node of a graph is also assigned one or more roles in the graph. Some defined roles are ingress, egress, source, root, transit, add/drop, translate (for VLAN and Q-in-Q), police (for rate limiting), monitor, and security. The glows then specify abstractly what is to be done at a node of a particular role. For example, add/drop to these sets of access ports at an add/drop node and load balance between the access ports.

Note that this abstraction is used since a glow's path through the network could change and it's possible that a node in one path may have a different role than a node in an alternate path. For instance, the first node in a primary path could have role "ingress" and instructions to appropriately steer the input flow to the desired output and check for attachment validity. The same node may also have role "police" in all the back-up graphs so that this flow could be rate limited in the event of a primary path failure (The use of multiple roles/node is probably flexible and compact than defining more and more types of roles with different combinations of functions).

Fitting creates the fabric graphs and uses them to construct the graph lists, described next. Nodes cannot create or modify a fabric graph. In fact, nodes do not have a complete picture of a path from source to destination; rather than have only their portion, called a fabric graph part, which contains information on how to evaluate the global validity of it. The fabric graph parts also have associated local variables for real time network operation.

Fabric graphs and Fabric graph parts can be re-used across USATs. This enables re-use beyond the re-use that all the glows within a USAT use the same fabric graph, e.g., Multiple USATs with the same source and destination nodes could use the same fabric graph Multiple USATs with different source nodes but a common destination node could have merging fabric graphs at some node x. This is likely to occur due to normal routing and also likely to occur in incasting. Subsequently, the next node through the destination could use the same fabric graph parts if partially valid protection rules are being used. Node x may or may be able to use the same fabric graph part for the two USATs depending on the specification of the input ports at node x. Fixed Fabric Graphs use fixed ports, dynamic Fabric graphs have dynamic in or outports. Residual incasting would allow node n to have a common fabric graph part for merging USATs because all the fabric ports are inputs and thus can be fixed.

Similarly for outcasting

Note that a tree can efficiently be defined but that each source to destination on the tree can be managed as a separate point-to-point entity.

Fitting combines fabric graphs into fabric graph lists, aka graph lists, before assigning it to a USAT. Graph lists are ordered. The first graph in the graph list is the primary graph. Optional other fabric graphs are back-up graphs placed in the order they are to be evaluated.

Fitting creates the graphs to avoid loops in the network. This is done using well defined rules. Nodes do not create or modify fabric graph lists. Like the other components, nodes do not have the complete information contained in a graph list. Rather, each node has its graph part list, an ordered list of graph parts, each with its own validity rule.

In addition, each graph list, and graph part list, has a mode of operation parameter, which tells the nodes the selection rule to use in choosing a fabric graph part out of the list. Here, two modes are defined:

mode 0: use the first fabric graph part if valid, else fail
mode 1: use the first fabric graph part in the list that is valid; fail if there are no valid fabric graph parts.

Mode 0 is used for unprotected USATs. Mode 1 for protected USATs using either fully protected, partially protected, or 1+1 path rules. Note that mode 0 is the same as mode 1 when the list consists of a single fabric graph part. However, this is divided into two modes because an implementation may opt to only make use of mode 0.

Further modes may be defined. For instance, in all the above modes, the nodes always choose the fabric graph part based on the selection rule and must revert back to a previously failed graph if that graph becomes operational and has priority in the list. Other modes may adjust this behavior, e.g., not having nodes revert to a previously failed fabric graph.

Another possible mode is Mode 2, where a node uses the first fabric graph part in the list that is valid and for which the node evaluating the rule is not inactive in that part. The use case is a VLAN PSAT at nodes which are not source nodes but participate in some but not all back-up trees. Mode 2 allows all nodes to receive the same tree list and use totally valid tree rules without placeholders, but also puts unexpected routed packets onto the VLAN PSAT instead of the residual tree.

Note that fabric graph lists can be shared across USATs, so e.g. USAT 1 and USAT 2 could use the same fabric graph lists, and/or USAT 1 part x and USAT 2 part x could use the same fabric graph parts list at node x. This means that any dynamic port information which is USAT dependent is done within the USATs, but fixed port behavior is done by the Fabric Graph Lists.

The advantage of this division is that it enables re-use of fabric graph lists and reduced computation. In addition, this keeps to the philosophy that USATs communicate to each other across nodes, not any other software entity on a node—so, e.g. U1 and U2 may use the same fabric graph list FL1. Participating nodes of U1 may exchange information pertaining to the operation of U1, and similarly for the participating members of U2, but two nodes do not exchange information about FL1.

The base L2 topology is the default peering topology of the network prior to the placement of any USATs, specifically any USAT involving layer 1. It is determined by the nodal fiber interconnections as well as the default XBAR settings at each node. Currently, the baseline L2 topology drops all uplinks on the L2 switch chip adjusting for any UDT or user configuration changes.

In USATs, Fitting creates a base L2 topology optimized for the network traffic and passes it to the nodes. The USATs operating at the nodes are all evaluated in the context of this base topology; for instance, a reversion of an L1 back-up from being used to being idle might also cause a reversion of those links back to L2 links if so specified in the baseline topology. This situation may occur if an L1 circuit was routed over links which were previously supporting an L2 flyway.

Fitting creates the base topology and passes it to the nodes. The nodes install the baseline topology, monitor it, and use it to evaluate the USATs instructions.

The networks may consist of multiple domains. In this case, the base topology would indicate the interdomain connection points, and in some cases, define the domains themselves.

USATs and their behavior are global (e.g. end to end), sometimes involving multiple sources and/or destinations. USATs include data structures on the flows (glows and glow sets), as well as data structures on the paths these flows could take (graphs and graph lists). This is the view as seen by and generated by Fitting.

The nodes however see a more limited view and it is in concert that the end to end behavior is achieved. To distinguish the nodal view from the global view, the term SAT is used to be the global view of the USAT, and a USAT part to be a local nodal view of the USAT. Continuing with this terminology, the nodes use USAT parts which include glow parts and glow set parts data structures, as well as graph parts and graph list parts.

USATs also define the interface language between Fitting and the nodes. Not all nodes participate in all USATs but each node knows about the USAT it participates in (as a primary node or back-up). Further, as an implementation option, Fitting may send the relevant (USAT parts that a node participating in that particular USAT requires.

In one implementation option, the entire USAT can be sent to each node which participates in that USAT and the node uses the information as needed. This allows the node to perform additional validity checks. This also allows simpler reliable message transfer protocols between C3 and the nodes.

Note that unlike USATs, USAT parts have associated local real time variables that the nodes use to manage the USATs for situations like 1) endpoint movement and management, and 2) resiliency in the event of a network failure.

Using this terminology, Fitting produces USATs, divides those USATs into parts, and communicates the parts to the nodes. Fitting sends USAT parts to the participating nodes. Non-participating nodes of a USAT do not need any information on that USAT and participating nodes use the information in the USAT part, not the entire USAT. The nodes receive the parts and manage their respective portion of the USATs. The nodes operate autonomously with limited inter-nodal communication. Specifically, nodes communicate with the other nodes participating in the same USATs, and in fact, some of this communication is limited to communicating to their USAT neighbors involved in the previous or next possible hops.

The overall USAT behavior is managed on the nodes by the USAT management system. The primary role of the USAT management system is to interface with a controller, such as a C3, and to act as an umbrella operation for the underlying management systems. It accepts and installs USAT parts from Fitting.

The component management systems are:
The Glow Management System (GMS)
The Fabric Graph Management System (FMS)
The Table Management System (TMS)

The GMS manages the glow parts and glow parts sets. Its main job is to track the validity of the glow's endpoints, distributively turn the glow on or off, and execute the glow's role instructions. The initial on/off system accounts for generalized endpoints, midpoint add/drops, and wider variety of glow attributes. Glow attributes can specify fine tuned behavior such as if a glow should be reactivated if its endpoint moved attachment points and then reappeared.

In an embodiment of the USAT system, any participating node can participate in the on/off process. However, the source and destination nodes may participate alone (The transit nodes participate if the ingress node goes down, but they do not need the attachment information). The full system is used in complex situations like those involving service chaining where the validation process includes checking for the service devices being attached. In this case, many nodes could participate and each node is using its own local validation rule. In general this approach is very flexible and also limits the amount of attachment information that has to be sent around the network to the minimum required to perform this function. In USATs, attachment information can be limited to the local node except for residual and routed traffic. With ingress routing, all nodes use attachment information; in ingress/egress routing, attachment information can be limited to local. For residual, attachment information is used based on VLAN configurations. If VLANs are limited to a node, and routing is ingress/egress, then USATs use local attachment information, e.g. no attachment information is sent around.

The FMS manages the fabric graph parts and fabric graph list parts. By monitoring the validity rules in the graph parts, it selects the first active graph in the fabric graph list parts. In some cases, it also signals its choice to its USAT neighbors. The outputs of the FMS are the input and output generalized ports to be used by that USAT at any point in time.

The TMS manages the tables. It combines the output of the FMS and the instructions in the glows to determine the table entries. It also deals with properly ordering the tables and opportunistically looking for table consolidations.

As a non-limiting example, the affinity request to network flow transport process is as follows:
1. User/API make service requests using the affinity framework.
2. Fitting takes the valid requests and
    a. determines a baseline L2 topology for the network,
    b. organizes the flows into USATs,
    c. divides the USATs into USAT parts, and
    d. sends the baseline configuration and USAT parts to the network.
3. Each network node
    a. receives and installs the L2 baseline topology
    b. receives and installs the USAT parts, and
    c. runs the USAT logic to manage the USATs.

Fitting gets a request for residual service in the form of a switch to switch traffic matrix. Fitting maps that into groups of flows with a common destination and DA hash value. It then assigns these groups of flows to lists of destination trees.

In a non-limiting embodiment, Fitting performs the following functions (in any order):
1. Pre-processing and Organizing Service Requests:
    a. Gets a set of service requests from UI or API and a fulfillment
       mode on these requests (full Fit or MDF, etc.).
    b. Accepts/Rejects service requests as appropriate.
    c. Maps the service requests into glow data structures.
    d. Groups the glows into glow sets, with one or more glows each.
2. Routing and Resource Allocation:
    a. Determines if a change to the baseline L2 topology is desirable for the accepted requests, and if so, calculates new topology.
    b. Determines primary and if necessary back-up paths for the glow sets on the specified baseline topology.
    c. Assigns an order and priority to each glow (Note that glows are assigned orders and priorities. USATs themselves are not ordered or prioritized). Order is used in the TMS to insure relative table orderings, e.g. LPM. Priority is used in the TMS to resolve conflicts for a common output, e.g. an L1 circuit wanting the same output transceiver as an L2 affinity.
    d. Assigns each glow set to a USAT, where the USAT contains at least one primary graph and possibly back-up transport graphs (collectively the graph list of the USAT).
3. Communication to the nodes:
    a. Sends commands to the node if the baseline topology is to be changed.
    b. Divide the USATs into parts, with corresponding glow parts, glow sets parts, graph parts, and graph list parts.
    c. Sends the USAT parts and the fulfillment mode to the nodes.
4. Online Scoring and Monitoring Each node includes the following systems:
1. USAT Management System:
    a. Communicates with Fitting to receive its parts and baseline topology part (In some systems a node can receive the entire baseline topology.)
    b. Installs USATs, creates local variables, etc.
    c. Instantiates the USATs based on the given fulfillment mode for the USAT parts, e.g. to fulfill now or wait for further instructions, etc.
2. Glow Management System: For any active glow,
    a. Based on the node's role, check the local attachments for validity and participate in the distributed turn on process.
    b. Get the node's role from the FMS.
    c. Execute those role instructions which lead to requests being made to the TMS.
3. Fabric Graph Management System:
    a. Installs/changes its portion of the baseline topology. For an MDF, conflicts with existing L1 or mixed L1/L2 services must first be resolved.
    b. Monitors the validity of each graph part using the specified validity rule
    c. Sets the active graph for each fabric graph part list. Communicates the ports to be used to the USAT neighbors when dynamic fabric graphs are used. Determines input and output ports to use for the USAT part.
    d. Glows get the active graph part from the FMS, determining their roles and their in/out ports and are informed of any changes.
4. Table Management System:
    a. Receives requests from the glow's actions
    b. Resolves conflicts with use of the priority field
    c. Determines table order from the table and level portions of the table order field
    d. Manages splits and merges for composite services using the cell order portion of the table order field
    e. Consolidates table entries where possible
    f. Installs active glows onto active paths by programming the table entries Fitting creates the services laid out in above using composite and native USATs. In order to fully specify all the USAT services, Fitting creates one or more USATs, each USAT is assigned a Fabric Graph List and one or more Glow Sets. When multiple USATs fulfill a service, the USAT is composite. Otherwise, the USAT is called native. Note that technically, it is the combination of a glow and a FG which is composite or native, as it is possible to have two USATs that together form a composite service for two glows, but one of the USATs forms a native service for a different glow.

Even though they have no operational role in the network, it is also useful to talk about composite FGs and composite glows.

External services may be formed by assigning an appropriately formed glow to an appropriately formed fabric graph list. If protection is desired, the graph list contains multiple fabric graphs. If unprotected, the fabric graph list contains a single graph.

Point-to-point (pt-to-pt) USATs use pt-to-pt glows and pt-to-pt fabric paths.
An L1 USAT would use L1 glow and an L1 fabric path (L1 attachment ports at the 1st and last nodes).
An L2/L3 USAT would use an L2 glow and an L2 fabric path (L2 attachment ports at the 1st/last nodes).

The glows contain the attachment point rules. For L1, the attachment point would be an L1 port. For L2/L3, the attachment point could be a generalized port or multiple ports on the same switch (or multiple switches if glows can belong to more than one USAT). These ports are used by the glow management system to determine if a glow is considered valid. Note by saying that a glow has an attachment point, what is meant is that the glow has instructions for the ingress or egress which contains a steering action for the flow using that layer and that should be compatible with the USAT ports of the fabric path.

The glow should also contain instructions for at least an ingress node, an egress node, and a transit node if there is any primary or back-up path with more than two nodes. If intermediate add/drop is to be used, then the glow should contain instructions for an add/drop node as well. These instructions can be FWD table instructions, TCAM instructions, Routing instructions, or their respective generalizations, and can vary from role to role.

For L2/L3, VLAN translation and Q-in-Q are handled by provided instructions in the glow to perform those functions at the active fabric graph's source and destination nodes, or more likely, are handled by a separate glow on a stub node.

L1 or L2 Midpoint add/drop is supported for L1 and L2 USATs by providing fabric graphs with add/drop roles and providing the appropriate instructions in the glows. MAC address translation is provided by specifying this instruction for a node with an add/drop role.

For L2/L3, flow filters and generalized endpoints are handled with appropriate fields in the glow data structure.

Protection is provided by having a graph list with multiple fabric paths. The different types of protection are supported by creating different validity rules used in the fabric graphs.
Unprotected USATs have a single fabric graph in the fabric graph list
Hot: use a custom validity rule which will be given as an example later
FullPath: uses validity rules which check the entire path
PartialPath: uses validity rules which check the downstream path.

A glow attribute describes whether the flow should be blocked or fall back to residual if there is no valid fabric path. For L1, the validation rules use L1 links (L1 port to L1 port connections). For L2, the validation rules use these L1 links and L2 links (peering), or just the L2 links. The latter is the first implementation but it is possible that an underlining L1 change may not be noticed. That may not be desirable but will not cause operational problems.

L2 MLAG is supporting by creating multiple glows with distinct endpoints but the same order field, (or allowing glows to be part of multiple USATs). In either case, the table management system recognizes that the fields can be merged if they consolidate to a link. Each source/destination node pair has its own USAT and fabric graph list, but Fitting creates these lists to ensure loopfree operation. By properly constructing these lists, very flexible and protected MLAG affinities can be protected.

Bidirectional pt-to-pt USATs can be implemented natively using a bidirectional fabric graph and a glow with the appropriate instructions. Alternatively, they can be implemented with a composite of two glows and two USATs, one per direction. The coupling is achieved by using bidirectional validity rules ensuring that both directions have to be operational to establish the connection. However, this composite will not fail one direction if the other direction fails to install, e.g. a TCAM is full (Install failures of a glow are not network state variables that are available to all nodes of the network, which are used in a fabric graph validity rule. In addition, if an install failure leads to a fabric graph failure, that fabric graph may not be shared by multiple glows). This limitation can be overcome by using a glow group with the two directions. One side of the service can arbitrarily be declared the leader. A native implementation is simpler and can more easily deal with transients.

High speed FSATs are supported by creating multiple glows with flow hash TCAM table filters.

In USAT v1.0, outcasting USATs can be created by composites of point-to-point USATs with the same source node. In USAT v2.0, they also can be created using native multipoint glows and fabric graphs.

In USAT v1.0, a low latency outcasting L1/L2 FSAT, which has an L1 input attachment, multiple L2 output attachments, and a reverse path L2 attachment at the source, can be constructed by using multiple USATs:
one L1 USAT for each destination node, from the source to that destination.
Each USAT having one glow per desired output port on the destination node that can be individually controlled. For instance, if an output port is not to receive the multicast flow if there is no valid attachment, as defined thru the glow, then that is a separate glow.
All the glows having the same order and priority numbers (with glow src/dest indirection which should allow glows to be part of multiple USATs, then each glow could be identical with the multiple attachment points at a destination node handled by different destination node roles or instructions).
Creating an L2 USAT from the source to the source node (a stub)

In USAT v1.0, incasting USATs can be created by composites of point-to-point USATs with the same destination node. Partially and fully validated composite trees are supported in USAT v1.0 using point-to-point's with PartialPath and FullPath validation rules.

In USAT v2.0, incasting USATs can also be created using native multipoint glows and fabric graphs.

As one option, USAT v1.0 can include native incasting to support (VLAN) PSATs with a multipoint glow that is always ON.

For a generic composite incast, a point-to-point USAT is created per source node. Residual and VLAN residual can be supported as well as more general TCAM trees with flow filtering. This mechanism can also be used to build high speed trees.

Residual filtering is defined to be consistent with residual traffic. So, e.g. from a leaf to a root, a residual filter is a specification of which hash buckets are assigned to that flow for any destination attached there. In this case, the TMS interacts with the current residual software for unknown packets; specifically, the TMS programs it to comply with the USATs. VLAN residual filtering is similarly defined.

Note that a residual table entry means the table which is used to install a forwarding entry upon a lookup failure, not the forwarding table itself. So the USATs control the residual software table (updated to do partially valid trees). The current logic controls the behavior upon a lookup failure.

Broadcast USATs are used for P2.5 BUM trees, with B, U, and M all options.

Internal USATs are similarly defined as above. Internal USATs use internal glows without attachment port validity checks.

Mixed USATs use mixed glows with an attachment validity rule at one end.

Some conventional systems use a peering topology. The peering topology is the real time L2 view of the network. Any topology change, e.g. a fiber movement, or a XBAR being manually configured, changes this topology. This model is insufficient to change the base topology or any USAT involving L1. In addition, for networks involving L1 and L2 USATs, the preferred implementation is to use a full L1/L2 network model with each fabric path specifying a full <L1,L2,node> port specification at each ingress/egress of each node at each hop.

The situation with USATs is different:
1. In order to be able to select paths for L1 USATs, Fitting has a model of the L1 network.
2. Reconfiguration of a XBAR at a node changes the L2 topology. This occurs under three different scenarios:
   a. On purpose: Fitting changes the peering topology to optimize it. This can be done by either
      i. changing the base topology or
      ii. by establishing a flyway.
   b. As a side effect:
      i. establishment of an L1 USAT over its primary path
      ii. establishment of an L1 USAT over a back-up path
   c. As a transient or mistake Consider the following motivating example: Fitting has decided that a flyway f is to be established to optimize the L2 topology. In addition, an L1 circuit with a back-up has been established. The back-up path is carrying L2 traffic when not in use. The primary path breaks and so the L1 circuit is reestablished along the back-up path causing the L2 traffic to be rerouted, and changing the peering topology. At a later time the primary back is re-established. The question then arises as to what should happen to the L1 back-up path which used to be carrying L2 traffic? If the desired answer is to re-establish it "like it was before the break", then the nodes need to know what that means exactly. Since there could be flyways, it does not necessarily mean that it should revert the crossbar to the state where all uplinks are dropped at a node. This is where the baseline L2 topology comes in: the baseline L2 topology is the desired topology before the establishment of any USATs.

There are two types of ports of a node that can be modeled. These are used in the specification of the base topology, the fabric graphs, and the valid attachment points of the glows.

An L1 port is a transceiver. The in-direction of the port is the receiver. The out-direction of the port is the transmitter.

An L2 port is a port on the packet switch. Signals flow into the chip in the in-direction of the port, and out of the chip in the out-direction of the port.

Note that in traversing a node, whether between fabric ports or between an access port and a fabric port, or two access ports, there are two possible signal flows:

L1 signal flow: signal enters on an L1 port, possibly traverses an L1 circuit switch, and exits an L1 port.

L2 signal flow: signal enters on an L1 port, possibly traverses an L1 circuit switch, and enters the electronic packet switch at an L2 port. The signal then leaves the electronic packet switch at an L2 port, possibly traverses a packet switch, and exits the node at an L1.

If the signal flow through a node is an L1 signal flow, that node is layer 1, otherwise it is layer 2. Note that layer 2 nodes also process L3 packets since these terminate at L2 first.

Thus, in order to fully specify a path through a node, both the input and output L1 and L2 ports are specified (An alternative would be to specify just the L1 ports and let each switch independently decide its L2 port). The combination of an L1 and L2 port is called a generic port. One issue to think about in this context is dealing with issues where certain ports on the chip have to be used, e.g. to be bonded together into a 100 GBE service. Another alternative is to use L2 ports when needed and not specify the L1 ports. This also has issues when mixing L1 and L2 services on the same network as it leaves the L1 service specification ambiguous and up <L1,L2,node> where the first entry is the L1 port of a node, the second entry is the L2 port of the node, and the last entry is the node.

Typically the form <b,c,n> is used for a generic port, where b is a variable representing the L1 port, and c is a variable representing the L2 port of the node, and n is the node (The letter a is reserved for L0 which is not modeled here. For L0, the notation could be expanded to <L0,L1,L2,n>. For, MPLS it can be expand to <L0,L1,L2,L2.5,n>, etc.). In general b may or may not be connected to c and how this is interpreted depends upon the situation in which the generalized port is used. If b is connected to c, then the port is said to be valid, otherwise it is invalid. A specification of an invalid port may be interpreted to mean an instruction to change this mapping, or in other cases it could indicate that this instruction is invalid; it all depends upon the situation.

In summary, there are two types of generic ports:

L1 generic port, <b,-,n>

L2 generic port, which is either fully specified as <b,c,n> or partially specified as <-,c,n>.

Partially specified L2 ports can be used instead of fully specified L2 ports if the underlining L1 topology is irrelevant to the desired service.

The L1 or L2 generic ports can be generalized in a number of ways. The following are supported:

"–" means no port is used. So <b,–,n>, with c="–", indicates a pure L1 port address. This could be used for example in the specification of a pure L1 fabric path through the network, or as a valid attachment port for an L1 glow. Note that "–" means unused, not unspecified. So, e.g., if an L1 port b were connected to an L2 port c, then <b,–,n> is considered invalid.

<*A,n> means all the <b,c,n> which are configured as access ports, specifically the packet chip is configured so that c is an access port and b is connected to c. *A1 means all the L1 ports configured as access ports, and *A2 means all the L2 ports configured as access ports. Note <*A1, A2,n> is not the same as <*A,n> since the latter means those <b,c,n> which are configured.

<*F,n> means all the <b,c,n> which are configured as fabric ports, specifically the packet chip is configured so that c is an fabric port and b is connected to c. This may be used, e.g., in the specification of the input ports at a node in a residual tree. *F1 means all the L1 ports configured as fabric ports, and *F2 means all the L2 ports configured as fabric ports.

Note that in many cases, a subset of ports are used rather than full wildcard specification. This is represented as {<b1, c1,n1>, <b2,c2,n2>, . . . <bk,ck,nk>}. One example where such a set might be useful is as an input to a VLAN residual tree. This is called a generalized port set. A special case of this is where all the generalized ports exist on the same node. This set is called a generalized port group. Generalized port groups can be used in a glow's role instructions to abstract the midpoint or endpoint of a service. In this case, the midpoint or endpoint manages the mapping from port group to actual port. This allows functions such as load balancing to be locally administered across ports.

Indirection can also be used. Specifically, current_attachment_port(m,V) means the <L1,L2,n> port where (m,V) is currently believed to be attached based on the P2 table. Similarly, lag_port_list(n,lag_id) means the generalized port set of MLAG lad_id on node n. The variable me means the node evaluating the port. This is used extensively in glow instructions. So, e.g. <A2*,me> in a glow instruction would mean all the local access ports.

Also, note that for convenience, typically <b,c,n> is used to represent an input port, and <b',c,n> to represent an output port. Each b and c are globally unique, so, e.g., part of b may contain the node id.

It is useful to use the concept of generic ports to describe an end-to-end flow through the network. A path through the network with k nodes is an ordered list of generic ports, gp1, gp1', gp2, gp2', . . . , gpk, gpk' where gpi is the input port of node i and gpi' is the output port of node i. Note that gp1 and gpk' are access ports, and all other generic ports in the path are fabric ports.

A special case of a Fabric Graph is a Fabric Path. In the above case, the Fabric Path would consist of the fabric ports gp1', gp2, gp2', . . . , gpk, along with node roles and validity rules at each of the k nodes along the path. The access ports gp1 and gpk' would be in a glow, allowing multiple glows to share the same Fabric Path.

The internal connection through a node, gpi→gpi', can either be L1 or L2, so the type of generic port at the input of a node and the output of a node match. If all the internal connections through the nodes along a path are L1, the path is pure L1. Similarly, if they are all L2, then the path is pure L2.

In general, each node can have its own layer. So for k nodes, there are $2^k$ possible paths using the same set of transceivers. The ones that are useful at this time are pure L1, pure L2, and L1/L2, where an L1/L2 path is defined as one in which all the nodes are L1 except the egress node.

The L1 topology of the network is the interconnection of the L1 ports to each other. Specifically, each node of the L1 topology is a node of the network and each arc is a transmitter to receiver link. So, e.g., if node n's L1 output port <b',-,n> were connected via fiber, MTP cable, PSI, etc., to node m's input b,-,m> port, then <b',-,n>→<b,-,m> would be an arc in the L1 topology, and vice versa if the connection were duplex.

Fitting knows the L1 topology so that L1 or mixed layer USATs can be supported. Some form of L1 topology discovery can be done on the nodes and sent to C3. The nodes can monitor the L1 topology health.

The L1 topology is sufficient for proper USAT operation on the nodes when USATs involving L1 are used. However, there may be limited L1 switching capability at some nodes. Specifically, the following three situations can occur:

1. Not all nodes have XBARs
2. Some L1 ports may internally directly connect to an L2 port, bypassing a XBAR at a node
3. Nodes may contain multiple XBARs, the interconnection of which may have some blocking.

Fitting creates the USATs compatible with the internal L1 restrictions. To do this, a more general L1 network model can be constructed in order to select valid L1 paths through the network. This model incorporates the L1 topology and the internal switching capabilities of the nodes. However, this more general model is used for Fitting to create the USATs, not for USAT operation on the nodes.

One possibility for this model is to model each XBAR within a node, and their internal connections. This would produce a XBAR topology. For example, if each node had one non-blocking XBAR, this XBAR topology would be a subgraph of the L1 topology; the remaining arcs being the L1 arcs which directly connect L2 ports on different nodes.

An alternative L1 network model is to model each node as having a single fictitious expanded XBAR, where each L1 port connects to a port on the expanded XBAR. In addition, each L2 port of the node connects to the expanded XBAR. A connection matrix can then be created with fixed entries indicating direct L1 to L2 connects. This can be a simpler and more compact representation of a generic node.

Note that to support nodes with multiple XBARs, the XBAR topology may be used. This would allow Fitting to then not only specify the external L1 ports used in a USAT, but also the internal ports used between the XBARs (Accordingly, the definition of an L1 USAT can be expended to include these internal connections).

Alternatively, Fitting and the nodes could use the same algorithms to determine the paths so that Fitting is able to evaluate what happens inside the nodes if it placed L1 circuits through them.

The switches are able to provide an L1 model to Fitting, or provide enough information for Fitting to deduce it.

The L2 base topology is the L2 peering network prior to the placement of any external or internal USATs. In general, this is not identical to the L1 topology because Fitting is allowed to change the L2 base topology to bypass nodes. The L2 base topology is the default L2 peering topology.

The L2 base topology is uniquely determined by 1) the L1 topology (how the nodes' transceivers are interconnected), and 2) the default L1 switching states at each node.

In order to fully specify the USAT services, Fitting creates one or more USATs, and glows are then assigned to the USATs. When multiple USATs fulfill a service, the USAT is called composite. Otherwise, the USAT is called native.

Glows have various related data structures: glow, glow sets, glow groups, glow parts, glow part sets, glow group parts. Fitting creates these data structures and distributes the "parts" to the nodes which add local variables to them for real time operation. These data structures are managed by the Glow Management System (GMS) which operates independently from the Fabric Management System (FMS).

Glows specify groups of flows and how they should be handled thru the network. Specifically, a glow describes:
1. The constituent flows to be managed, including the valid ingress and egress locations
2. The conditions under which the glow is considered active
3. The actions to be taken on the constituent flows
   Steering actions include L1 XBAR, FWD, TCAM, etc.
   Non-steering actions include translation, policing, monitoring, security, etc.

Glows may not omit a description of the constituent flows to be managed. Rather, it is far more flexible for different parts of the description(s) to be included in either the description of the conditions under which the glow is considered active ("2 actions") or the description of actions to be taken on the constituent flows ("3 actions").

A glow is able to describe flows broader than currently supported by FSAT or PSAT, specifically:
- A flow could be point-to-point or multi-point
  - Point-to-point Glow: in which the ingress/egress locations are either on the same node (a Stub Glow), or on two different nodes (a Path Glow). A Path Glow may be unidirectional or bidirectional. Stubs are also used for port or node configurations.
  - Unidirectional Incasting Glow: with multiple ingress nodes and one egress node
  - Unidirectional Outcasting Glow: with one ingress node and multiple egress nodes.
  - Broadcast Glow: with multiple ingress and egress nodes, all interconnected
- The addressing of the sources and destinations are more general:
  - flows could be an L1 circuit, L2 addressed, L3 addressed, or a combination
  - flow could aggregate other flows, e.g. a VLAN or IP prefix addressing
- A flow could be unidirectional or bidirectional
- A flow's ingress/egress locations are more flexible:
  - The ingress/egress locations could be an L1 port or an L2 port, and these could differ on different endpoints for the same flow
  - The ingress/egress locations may be internal to the network
    - All internal for an internal USAT to create flyways, encapsulation tunnels, and timing distributions
    - Mixed internal/external for mixed USATs
  - Ingress/egress locations should not be hard coded so that flows can be easily moved In addition, the actions taken on a flow are broader than currently supported by FSAT and PSAT, including
- attachment verification (action: verify( )) and turning aglow ON
  - Verification rules differ for generalized addresses
  - ON rules for glows differ by use case as well
- flow steering (actions: direct, forward, xbar, residual forwarding, routing)
- Multi-layer steering
- Service chaining w/midpoint add/drops and load balancing
- Network restoration means fabric ports cannot be hard coded
- translations (actions: VLAN translations, Q-in-Q, MAC translation, etc.)
- performance (actions: priority, rate limit, policy, . . . )
- security (actions: block, . . . )
- monitoring Finally, flow may depend upon each other, e.g. in the case of internetworking domains USAT v1.0 supports external point-to-point glows since multipoint can be supported by composites. Optionally, a residual only incasting glow could also be supported. Internal and mixed glows are an easy extension of these concepts.

Point-to-point glows can be classified according to the attachment endpoints.
- Type L1 glow attaches to a fabric graph at L1 at each end,
- Type L2 glow attached to a fabric graph at L2 at each end,
- Type L1/L2 glow attaches to a fabric graph at L1 at the ingress, L2 at the egress
- Type L2/L1 glow attaches to a fabric graph at L2 at the ingress. L1 at the egress To support L2 only services, only type 2 is needed. Note however, an explicit description of the type of glow in the glow data structure may be omitted. The same structure can be used for all four types. Rather, what is really meant by a type is what kind of steering function is used at the ingress and egress in the role instructions, the type of generalized addresses supported, the type of locations supported, the conflict, merging, and splitting rules supported in the TMS, etc. In fact, it's possible to have multiple steering functions in the same glow, one for L1 and one for L2, allowing for instance a soft L1 to be routed along an L1 or an L2 path.

Note that the description of a flow, the conditions under which it is ON, and the actions taken are all inter-related and the combinations are large. For instance,
- The conditions of when a glow is considered active can vary significantly from glow to glow, e.g.
  - L2 flow may require valid attachment information, whereas an L3 glow may not
  - VLAN and IP subnet attachment validation is not the same as an atomic L2 or L3 address
  - A flow may become invalid not because of the endpoint attachment points, but because of some other network state such as the lack of an available midpoint add/drop port
  - A bidirectional flow may become invalid if, for instance, one direction fails to install because of TCAM is full or some other install failure.
  - A flow may be on if and only if another flow is also on, example use cases are
    - Bidirectional services
    - USAT internetworking
      - Alternate node midpoint add/drop for various failure scenarios (install failures, midpoint port failures, service box failures)
- the steering actions of a glow depend upon the role that node is playing in the service:
  - at the ingress, egress, and transit nodes all use different part of a flow's description and locations, and the flow description could be different than used above for validation for a number of reasons, e.g. VLAN translation at the ingress/egress, routing, etc.
  - Midpoint add/drops add complication to this, especially if load balancing is used on the ports or the service is made to be resilient to add/drop port failures
  - steering actions could change midway through a path, e.g. with MAC translation after a midpoint service device, or L1 steering at the ingress and all the way thru but L2 steering at the egress.
  - the steering actions could change from path to path when protected paths are used Rather than enumerate all the possibilities and build logic around them, instead glows include instructions. These instructions include actions which determine the conditions under which a flow is considered ON and the other actions to take at different places in the network. In this way, Fitting can program the flows in the network.

The instructions differ from node to node, e.g. the instructions at the ingress node are different from the egress. Also, the node where an action occurs may change with network state when alternate paths are used. For instance, if the primary path with a midpoint add/drop device fails, a secondary point on another node may be used. Therefore, Fitting does not hard code which nodes perform which instructions in the glows, rather Fitting provides instructions based on a node's role. E.g., "at the add/drop, do the following . . . " The node gets its roles in the USAT from the FMS, which it takes from the current active fabric graph part at that node. Therefore, these instructions are called role instructions.

Role instructions make it easier to re-use a glow on different paths since the ingress/egress locations are not hard coded. So, e.g., if a glow g was coded with some affinity whose service endpoints moved, perhaps from a vMotion, then Fitting could easily move g to a new location (USAT). In fact, Fitting could pre-move g to the new location and the automatic ON procedure could be used when the endpoint move was complete.

Role instructions also makes it possible to take conditional instructions on flows, e.g. rate limit a flow only if its primary path has failed and it is taking a secondary shared back-up path.

The role instructions are very useful to handling flows within a glow. To handle relationships between flows in different glows, e.g., for internetworking, there has to be a way to inter-relate glows. This inter-relation is called a glow group. For instance, glow groups can be used to guarantee that all the constituent glows of a composite USAT which crosses domain boundaries are all ON or all OFF/FAILED. Preliminary specification of glow groups is given at the end of this section.

Since glows provide instructions for flows, it is useful to more precisely define what is meant by a flow in a USAT. From a glow's perspective, a unidirectional flow can be described with these main 5 elements:

ingress location (gp): a generalized port, typically either an access port or a set of access ports
flow source generalized address (gSA): a (MAC,VLAN) address, an IP address, or a generalization (VLAN/IP Prefix)
flow filter (F): which includes filters for protocol, ports, etc., as well as flow hash values
flow destination generalized address (gDA): a generalized address
Egress location (gq'): a generalized port A flow descriptor is the 5-tuple, (gp, gSA, F, gDA, gq'). Flow descriptors could be extensible so that other fields could be added in the future. For instance, it is possible to add in a Time of Day field for flows that turn on at certain times during the day. A bidirectional flow can be specified as two tuples, one per direction where the two descriptors have common nodal endpoints. A stricter requirement of the flows having common port interfaces is not required so a broader definition can be used.

A flow descriptor can be expressed in three different equivalent ways
1. Ingress Location+Flow Qualifier+Egress Location
2. Ingress Location+Source Address+Flow Filter+Destination Address+Egress Location
3. Ingress Endpoint+Flow Filter+Egress Endpoint Where, Qualifier=source address+flow filter+destination address, (gSA, F, gDA),
Endpoint=a generalized address+a location, with special cases of an ingress and egress endpoints A flow descriptor is more of a Fitting concept: a glow can omit any flow descriptor field. Instead, the glow contains instructions and actions which use one or more parts of one or more flow descriptors, e.g. endpoints or qualifiers. This provides a lot more flexibility. For instance, this allows the creating and steering of a glow which validates on the attachment verification of an entity whose address is not part of the flow, e.g.

Fitting may steer flows to an output port based on the flow's source or destination IP prefix when there is a device (e.g. router) on that output port with a certain MAC address. An alternative architectural choice of having an explicit flow descriptor field with a standard way to use the field in the actions is not as flexible. However, it is of course possible to add multiple flow descriptors with different uses, add in lots of attributes, etc., to get similar functionality.

Generalized addresses and locations can be combined into endpoints. However, usually locations and addresses are used separately as it provides greater flexibility and clarity.

There are two primary uses of locations:
1. As a requirement to test for the validity of an attachment
2. As one or more points where an action should occur
   a. As the starting point of a flow steering action at the ingress node or a midpoint add point
   b. As the ending point of a flow steering action at the egress node or a midpoint drop point
   c. As the point where an address translation should occur, or be undone
   d. As the point where rate limiting or policing should occur
   e. As the point where monitoring should occur
   f. As the point where blocking a flow could occur A point-to-point glow may contain actions with many different locations, especially with service chaining. In addition, the locations may be specified differently for verifying a glow and steering a constituent flow. For instance, a glow might be declared invalid if the gDA was not attached to the node, but the flow steering command specifies the actual access port of the attachment. Fitting accommodates these variations by using locations in different instructions/actions at different nodes (based on the fabric graph roles), with no restrictions on how many different locations are used within a glow or within what actions. It's up to Fitting to ensure that the combinations make sense.

A location is a generalized port, often using a variable instead of a specific node or port or wildcard. Two location variables have been defined: me and current_location( ).

me is defined to be the node evaluating the instruction. This enables the glow to be abstracted from its ingress/egress node locations. So, for instance, if in the USAT the node had role ingress, then the instruction might say to verify that a certain attachment was attached to me. Since nodes evaluate instructions based on the role, the ingress node will perform this verification using me. The egress node may perform a similar function, as might a add/drop node, but with different attachment addresses to verify that they are locally attached. The use of me in a location allows a glow to exist on multiple nodes in different USATs. One of those glows may be active at any time depending on where the attachment is found. Without the me variable, glows could be defined based on the possible pairwise ingress/egress nodes.

In addition, it may be useful to use the specific access port where an address is located. Define current_location(gA) to be the current location of generalized address gA. Note that attachment information is not required to be globally distributed as discussed previously since a node will not call current_locatlon(gA) if the attachment has not been verified to exist at me.

Symbolically a location can be represented as <a,b,n> where (here the node is explicitly listed, whereas for generalized ports the node information can be implicit in the L1 and L2 ports):

a is the L1 port which could be a specific port, unspecified "−", all "*", all fabric ports "F*", or all access L1 ports A1*.

b is the L2 port which could be a specific port, unspecified "−", all "*", all fabric ports "F*", or all access L2 ports A2*, b could also be current_location(gA) of a general address.

n is the node id which could be a specific node n, all nodes "*", a group of nodes (e.g. a data center location), or me. me means the current node evaluating the location.

Note: a and b can be replaced by A2*f when L2 ports are fully specified, as shown below.

Example Useful Locations

<a,b,n>: General location used for point-to-point glow. Could be the ingress, add/drop, or egress.

<a,−,n>: An L1 location used for glows with an L1 endpoint at the ingress, add/drop, or egress <−,b,n>: An L2 location used for glows with an L2 endpoint at the ingress, add/drop, or egress <a,b,n>: A fully specified L2 location <−,A2*,n>: All the L2 access ports on node n, e.g. as the input to a residual service or any service which is input port agnostic on a node.

<A2*f,n>: Fully specified version of <−,A2*,n>

<−,current_location((m,V)),me>: The current L2 port where (m,V) is attached, assuming (mV) is attached to me.

The above notation is fairly general, for instance, it could also specify all the L1 access ports on the node, <A1*,−,me>, or a specific node <A1*,−,n>.

Similar to ports, multiple locations can be combined in a set called a location group. Location groups are used when the above format is insufficient to specify the group, for instance, two ports on two different nodes. Location groups are not needed in USAT v1.0, but might be a useful concept for Fitting, e.g. all the locations of a VLAN PSAT. They are not needed in USAT v1.0, because multipoint connections are handled by composites.

A special type of generalized address is an atomic address, such as, an [L2,L3] address. As its name implies, an atomic address identifies one particular source or destination of a flow. A generalized address, is as the name implies, a generalization of this identifying multiple sources or destinations of a flow through the use of wildcards, VLAN, and IP prefixes.

The most common use cases of a generalized address are to specify

An atomic L2 or L3 addresses,

A VLAN, and/or

An IP Prefix in a flow descriptor's gSA or gDA fields.

However, the definition is more general allowing more use cases. Specifically, a generalized addresses can be symbolically represented as (m,V,i) where (m,V) is the addresses L2 address. Valid L2 addresses are:

(m,V) specifying an atomic L2 address with MAC address m in a VLAN V. m could be a multicast or broadcast address.

(*,V) specifying all the MAC addresses m in a VLAN V.

(*,*) specifying all packets i is the L3 or IP address of the generalized address. Valid L3 addresses are:

An atomic L3 address where i specifies a full IP v4 address

A generalized L3 address where i specifies an IP prefix. In this case, P may be used instead of i.

As a special case, P=* indicating all IP addresses

Generally, the L2 or L3 address can be specified as a source or destination address. For instance, a current FSAT would have a source or destination specified as (m,V,*). An L3 FSAT would use addresses of the form (*,*,i) or (*,*,P). However, there may be cases where it's desirable to specify an L2 and L3 address, e.g. Fitting may want to address all the packets to an IP prefix P which are headed to some router designed by an atomic L2 address (mV), in which case the full generalized destination address would be gDA=(m,V,P).

A soft L1 circuit is one which routes all the traffic from an inport to an outport but is allowed to packet process. It's also possible to filter a soft L1 circuit, e.g. route all the TCP traffic from an input to an outport. In this case, the source and destination addresses would be specified as (*,*,*). Note that this address could be used in combination with a location forming an endpoint. Note also that this is also the address of a hard L1 circuit and it's thru the attachment of the glow to a FG which indicates how the flow is to be served.

Finally, a generalized address set is a set of generalized addresses. Generalized address sets are used when there are multiple addresses which do not fit into the above format. For instance, an arbitrary group of L2 addresses would be specified as a generalized address set. That might be useful for a multicast USAT which is not using an L2 multicast address.

Generalized addresses do not need to be supported in USAT v1.0 because Fitting can divide services into point-to-points and provide multiple instructions per point-to-point. For instance, if a multicast service was desired with two destinations on the same switch, a point-to-point USAT and glow could be used with two steering functions included, or one per destination at the egress node. However, use of generalized endpoint sets (a set of generalized endpoints) would enable the multidrop to be done with one command. A single command might make the TMS simpler, so there is an implementation trade off here.

The TCAM flow filters, protocol, source and destination ports, etc. are supported. In addition, the flow filter also includes flow hash values for inverse multiplexing of high speed flows and/or the hash values of the glow for residual traffic. One glow is able to identify an arbitrary set of hash buckets to a given root node.

The point-to-point data structures are described below. USAT v1.0 supports point-to-point with one ingress node and one egress node.

Note that point-to-point glows can also include the case of a stub glow where the ingress and egress node are the same, in which case they are called "stub" and given the role "stub". Stubs are used for intra-node communication services as well as for port and node configurations that are not flow specific.

Point-to-Point Glow Data Structure glow_id: a globally unique identifier of the glow. By convention, glow id's begin with "g".

glow_set_ids: The glow sets that this glow belongs to. A glow can belong to as many glow sets as desired. By convention, glow set id's begin with "gs".

glow_type: Point-to-point glow_default_status: one of {ACTIVE/INACTIVE} turn_on_mode: {standard, fast, slow, . . . } glow_priority: non-negative integer used to conflicts between incompatible flows for the same output link glow_order: specifies the relative order in tables to prevent hijacks and track mergers and splits for composites glow_attributes: One or more of {Persist, Do_not_Revert, Do_not_Merge, Do_not_Split, Block_if_Failed, ... } role_instructions: an ordered list of role instructions: (instruction(1), instruction(2), instruction(3), ... ), All the fields above are fixed values installed by Fitting. They can be changed by commands from Fitting to a node's USAT management system. These are described in more detail below:

glow_id is a globally unique identifier. Every glow in the network has a different glow_id, but a glow can be re-used in different glow sets, which in turn can be assigned to different USATs.

glow_set_ids are the glow sets that this glow belong to. Glow sets are assigned to USATs. So this field indirectly determines the glow's USAT.

glow_type is point-to-point. Multipoint glows may use additional fields.

glow_default_status is a fixed value provided by Fitting. Two states are defined: ACTIVE and INACTIVE. The GMS will follow the glow's role_instructions if the glow default_status is ACTIVE. INACTIVE glows enable Fitting to install glows to be used later. Fitting can change the glow_default_status.

Turn_on_mode is used to specify the algorithm the nodes use to turn a glow ON. This allows different glows to use different turn on algorithms beyond the standard which can be developed as needed. For instance, a reservation turn on mode might be useful for USAT internetworking. L1 may use a different tune on mode.

glow_priority is used by the Table Management System (TMS) to resolve connection conflicts. This is discussed in the TMS section below.

glow_order is a field used to ensure that tables are programmed in the proper order when two or more action requests from two or more glows overlap in some way. Fitting defines the glow_order to ensure proper operation. For instance, for L3 routing entries, the glow_order fields might be set to follow longest prefix match rules.

A sample form of the glow_order field is one where the ordering is more general than using a single number and help prevent table re-ordering when possible. The strawman field is specified as a 3-tuple (Table, Level, Cell).

The table field specifies which table is to be programmed, with:

Table 0: node configurations like VLAN translations
Table 1: the XBAR, if available
Table 2: the TCAM, or next generation equivalent
Table 3: the L2 forwarding table
Table 4: the L3 routing table Note that this field is valid for single layer services. When multiple tables are to be programmed and the table orders matter, then we will need multiple 4-tuples, one per table.

The Level field indicates relative order of the elements in the table, similar to the order field in the TCAM. So all Level 1's proceed all Level 2's, etc.

The cell field is used to track composite services. All services are given a unique service identifier which is used to populate the cell field; for composites, multiple glows will have the same identifier. Glows with the same cell field are said to be part of the same service group. The TMS will track glows with identical cell groups to determine if a merging or splitting of the signal is permissible.

So the glows are divided into Tables. Each table is divided into Levels, and each Level is grouped into cells.

glow_attributes are used to fine tune the behavior of the glow in the network. Attributes can be defined as needed. The main use of attributes is to control the behavior of the glow in response to some sort of network status change, such as an attachment move or a network or install failure. The currently defined attributes are:

Persist—specifies that the resources should not be released upon failure of the glow. Used mainly for services involving L1. Default behavior is not to persist. For L1 circuits, if Persist is not set then L1 ports would revert back to whatever the L2 baseline topology specified, e.g. an L1 ingress port might connect back to the packet chip.

Do_not_Revert—specifies that a glow's current status in the network should not revert back to ON after becoming OFF or FAILED, even if it meets all ON requirements. Default behavior is to revert.

OK_to_Merge—used to indicate that a glow can be merged by the TMS with another glow with the same cell identifier. Multipoint incasting composites and MLAG should allow merging. The default is to not allow merging so as to reduce transients at a node that can arise during protection switching or if a glow were ON in multiple USATs. That situation could occur in pre-planned situations where the glow is present on multiple USATs on different nodes in anticipation of a MAC movement completion.

OK_to_Split—used to indicate that a glow can be split by the TMS with another glow with the same cell identifier. Default behavior is to not allow splitting to reduce transients.

Block_if_Failed—used to indicate that a glow should be blocked if it enters FAILED state, rather than fall back to residual. For L1 circuit, indicates that the ingress and egress locations be blocked.

Note that all these attributes are used in the context of the role instructions, e.g. for Block, what should be blocked? So it is possible to eliminate some or all of these attributes and specify them as part of the individual role instructions. That can accomplish the same behavior and be more flexible.

role_instructions: are used to program the glow's actions on the network. They are the main part of a glow.

A glow set is a set of glows. Glow sets may be assigned to multiple USATs at the same time. Glow sets are used by Fitting to perform functions on a group of glows, such to install a new glow set on a USAT, move a glow set to a new USAT, etc.

It may also be useful to allow Fitting to send commands to modify all the glows in a glow set with one command. For instance, turn change all the glow's default status within a glow set to ACTIVE from INACTIVE, or vice versa.

From a node's perspective, there is no such thing as a glow, glow set, or glow group, rather the node sees the parts. A glow part is the locally administered data structure of a glow.

Consider a glow assigned to a glow set which is assigned to a USAT. In the full process, Fitting would create a glow part for each participating node of the USAT. Each node would then add local variables that the GMS uses to manage the real time operation of the glow. Currently, a single variable is defined: glow_status which can be OFF, ON, or FAILED (More states may be used for USAT internetworking). Glows all start OFF. If a glow's default status is ACTIVE, then the USAT participating nodes follow a distributed process to turn a glow ON, or fail the glow.

Therefore, the glow part data structure is identical to the glow's data structure with two added fields: 1) a field indicating which node this glow part belongs to, and 2) the local_status variable for this part.

Since a glow can exist on multiple USATs, there can be one instance of the node's glow part per USAT on each participating node. For instance, if glow g is assigned to USAT U1 with participating nodes {1,2,3} and U2 with participating nodes {1,4,6}, then node 1 has a glow part instance for g for U1 and for U2, whereas nodes 2, 3, 4, 6 have one instance. This is to allow g have potentially different local variables in different USATs, e.g. be FAILED in U1 and ON in U2.

A glow part contains the information used by that node and may omit any other information. For instance, transit nodes can omit the role_instructions relating to actions which occur at the ingress and egress. However, since node roles could change if a path failed and there were back-up paths, and since the amount of information which could be trimmed from a glow to form a part is minimal, a glow part contains a complete copy of the glow and its local variables.

If desired, reduced glow parts which contain some information can be used. If so, note that Fitting can create a node's glow parts which contains the role instructions for any role that node could assume in any of the fabric graphs in the USAT's graph list (if it's desired that the node should execute those instructions). In addition, if a glow set was later assigned to a new USAT, then a node's glow part may need to be modified if that new USAT had a Fabric Graph which assigned a new role to the node.

If the glow exists on multiple USATs, then the glow part contains the role instructions for any role that a node could assume in any of the fabric graphs in any of the graph lists associated with that glow.

Glow part sets are unordered sets of glow parts. Glow part sets are assigned to USATs. Each participating node of a USAT gets a glow part set for each glow set assigned to the USAT.

The TMS receive instructions from the GMS. The normal operation includes the GMS sending an action to the TMS and the TMS programming the specified table in response. For steering commands, a USAT inport or outport can be used. The GMS can get these ports from the FMS prior to sending the requests to the TMS, however, the TMS requesting it from the FMS is also possible.

The TMS has a way to parse these instructions and deal with any conflicts as well as ensure that the tables are ordered properly. It does that thru the use of two glow fields: priority and order. Order consists of two fields: table, level, and cell.

In addition, since an instruction may have multiple actions, the order of those actions can be preserved in the table programming. Therefore, the action instructions, or the TMS, adds a 4th order field action #. The rule is that within a cell, the actions are relatively ordered based on their action #. This would apply if a glow contained instructions for multiple glows. In many cases, action # does not matter, e.g. it does not matter which direction of bidirectional flow gets programmed into a TCAM first.

A conflict occurs when two incompatible glows vie for the same outport. This can occur, e.g.
  With two or more L1 glows with different order fields request the same outport.
  An L1 and an L2 glow could request the same outport.

Conflicts are resolved with the priority field which indicates which glow would win. The other connection requests would fail, which in turn would cause the glow installation to fail, which in turn triggers a distributed process to turn the glow_status to FAIL so that all the participating nodes of the glow know about the failure and remove any table entries associated with the glow (Assuming a fast install mode where all nodes act independently and uninstall in the event of a failure somewhere).

Fitting decides these priorities. For proper operation. USATs which result in a change to the peering topology, e.g. a flyway, should have the highest priorities. That insures that subsequent USATs may make use of those topology changes. If this order is violated, then the USAT's L2 FG may fail because the underlining flyways have not been established yet and therefore the validation rules will fail. It may make sense to stage flyways prior to other services. Note that if a USAT does fail, then the ON process should try to establish the USAT again unless an attribute is set to prevent this.

Another conflict is when two compatible glows vie for the same output link but the associated table is full. The priority field determines which glow wins these conflicts in the event of a race. At turn on or during network restorations, TMS can aggregate requests to best serve them. The TMS will not remove a table entry if a table is full even if the new request has a higher priority that some elements of the table.

Similarly, there are potential conflicts on the inports. The TMS will have to maintain a table indicating which glows are using which ports to check for conflicts.

MLAG and composites use the splitting or merging of cells. On the other hand, the TMS may receive connection requests which would result in the undesired merging or splitting of flows because of network transients.

USATs use the order field in the glows to manage this process. Specifically, a special case occurs when multiple requests to the TMS for table resources have identical cell fields. In this case, the requests could be part of the same composite service and the glows should be split or merged. Note that the requests could come from the same glow, the same glow in different USATs, or different glows on the same or different USATs.

The TMS keeps track for each table-level-cell combination all the glows in that cell. Since Fitting has given these glows the same order fields, there are two possibilities: 1) they should be merged or split, or 2) it's a mistake or transient caused by a change of network state. If all the glows in the cell have an OK_to_Split attribute (or OK_to_Merge attribute), then the TMS will split (merge) the flows based on the connection requests. Otherwise, the TMS will fail the new (old) connection requests (A new request may be treated as the correct request and the old one as the transient which will disappear soon. This is controlled by the glow installation algorithm).

Note that re-using a glow on two different USATs by definition can produce transients at a node which could lead the node to split or merge flows. This is why the default attributes are to not allow splitting or merging. Therefore, it is recommended that glows which are used for composite multipoint USATs are not re-used on different USATs.

A node's role in a USAT is determined by the active graph at that node. Nodes may have multiple roles, and each role corresponds to performing multiple actions. Therefore, a node could have multiple actions to take and which actions to take may vary depending upon the network state through the change of active graph.

These actions come in two forms: inherent actions defined as part of one of the predefined roles and programmed actions as defined in the glow's role instructions. This allows multiple glows to share the same nodes and perform different actions (for convenience two different types of actions are defined, but they can also be further separated. e.g., assigned inherent actions using one set of role names and programmable actions using another set of names. However, this approach avoids proliferating more names). Some of the common predefined roles include:
1. ingress or source (ingress for point-to-point services and source for incasting services like residual.)
2. egress or root (egress for point-to-point services and root for the endpoint of an incasting tree.)
3. transit
4. add/drop
5. gateway
6. translator
7. Rate Limiter (generally used at a node which is also a source)
8. Blocker In addition, Fitting can create arbitrary custom rules which have no inherent actions. This should allow creation of any UDT type flow through the network, although most UDT's should not need these roles.

The most common roles are those used in a multi-node basic fabric path: ingress, egress, transit, and add/drop. A multi-node fabric path can have at least an ingress and egress node, which are not the same; the other roles are optional. Not all glows through a fabric path have to use the add/drop.

So, e.g., suppose node n is the ingress node of a fabric path of a USAT. Then node n will perform all the inherent actions of an ingress node for all the glows in this USAT, but may also perform actions specific to that glow.

The special case where there is a single node is called a Stub Network, and it should have role "stub."

In general, standard housekeeping actions, especially those that require inter-nodal coordination are inherent actions, whereas anything glow specific, especially those that use the independent action of a node are programmed actions. Examples of programmable actions include attachment verification, directing packet flows, and configuring residual tree routing tables. An example of an inherent action is the process of bringing up a new glow, which might be done from ingress to egress in order to avoid transients. However, the conditions under which to bring up a glow is a programmable action.

Inherent actions can be programmable if desired. As an implementation option, it is possible to make most, if not all, actions programmable. This provides greater flexibility and extensibility at the minor cost of making each glow a slightly larger data structure. As an example of the benefit of this approach, consider the important action of attachment verification. In some embodiments attachment verification is an inherent action of the ingress and egress nodes. However, there are important examples where 1) the verification occurs on a different address than the glow's flow address, 2) verification may not be desired to occur or have different attribute like behavior, and 3) other nodes may also perform this function as well, e.g. a midpoint add/drop with an L3 firewall. This all can be addressed in by adding more fields and attributes to the glow data structure, or by using verification a programmable action (which is more economic and flexible).

A glow contains role instructions for all roles it could possibly be assigned and that it's desired for the node to execute. Consider the following example; A glow g exists in a USAT U1 and then at a later time an MDF changes it to U2. One or more FGs of U2 contain an extra role at the ingress node, e.g. to rate limit. Then if g is to be rate limited on U2, if and when g became active there, then g needs to have rate limiting role instructions. Therefore, in this case, an MDF may go back and modify g on the network as well as assign it to U2. Since g was operational on U1, this may present complications. Therefore, it is possible to create a new glow g' which contains the same flows as g and give it appropriate order, priority, and merge attributes.

A FG may have a role for which there are no instructions in the glow. The most common example would be a Fabric Path (FP) with a midpoint add/drop. The midpoint add/drop node would have roles "transit" and "add/drop" so that glows which were meant to add/drop have extra instructions. In the above example, it would not be necessary to modify g to add instructions for rate limiting if g was not to be rate limited on U2.

A node may have multiple roles in a single Fabric Graph, and these roles could change with network state if the USAT's active graph changes. These changes in turn indicate potentially different actions that can be taken at a node. So the GMS and/or TMS monitors if its node's role changes within a USAT and act appropriately—e.g. undoing its old actions and installing its new actions, in that order, when there's a difference. For example, in the above rate limiting example, upon the event of a failure, a new rate limiting action would get created, and then removed upon the reversion to the primary path; actions which do not require change should be left alone to reduce disruptions.

Rather than being a complete scripting language, role instructions can simply be a methodology to express all the potential actions that could exist with all the various variables which could be used in those actions, and the conditions under which they should occur. Although described here as a generic script, it is perfectly reasonable to break these into categories, e.g. one set of instructions for the validation and turn-on actions, one for steering, one for configurations, etc.

Each element of the list role_instructions=(instruction(1), Instruction(2), . . . ), is called a role instruction. The list may be empty or may contain many entries. An active node of the USAT that this glow is assigned to performs those actions specified for its roles. Note that role_instructions is ordered (Recall the convention in this document is 0 are ordered and { } are unordered), meaning that lower ordered instructions are executed before larger numbered instructions.

Role instructions are executed for a glow if the glow's default status is ACTIVE. Different instructions can be specified based on the glow's current status, e.g. ON, OFF, or FAILED. For instance, block the flow if the glow is FAILED (If block is used. Fitting can make sure the flow is not being served by another glow, e.g. by using a glow group. In this case, the last glow in the glow group can initiate a block).

Each instruction is conditioned on one or more roles indicating where in a fabric graph that instruction should be executed. Each instruction contains one or more actions. Instructions can contain explicit fields like flow locations, or can use indirection like current_location(gSA) or usat_in-port, role_instructions A role instruction is itself a 3-tuple, e.g. instruction(i)= (role(i), condition(i), actions(i)). For easier readability, a role instruction is written as @role(i), If condition(i) then do actions(i) meaning that any active node in the USAT with role(i) should perform actions(i) associated with this glow iff conditions(i) are met. Note that @role(i), means the GMS of a node interprets @role(i) to mean "if I am a node currently with role(i) in this USAT as provided by the FMS based on the active graph."

Directional role instructions are handled like any other role. Fitting could create different roles for nodes based on the direction of the flows, e.g. one role for the forward direction of a bidirectional flow and one for the reverse. In this case, directional roles are just another node role and interpreted identical to above. There can be a format for the role instructions to specify a direction, e.g. @role(1) in dir1.

Note that actions(i) is itself an ordered list of actions. So an instruction may look like:

```
instruction(1) =@ingress if condition(1) then do (
    action1.1,
    action1.2,
    action1.3
    )
``` where actions(1)=(action 1.1, action 1.2, action 1.3). Actions within an instruction should be performed in order and when actions lead to a table being populated, the table order should be preserved. This is the use of action # described earlier. The simplest mechanism is for the glow to provide the action # to the TMS along w/any requests.

Note that inactive or standby nodes, e.g. those not on the currently active path do not have a role and therefore do not execute any instructions in role_instructions (This limitation can present complications in situations like 1+1 hot L1 circuits where the back-up path is live and thus XBARs need to set along that path).

A role's actions can be broken up into multiple instructions, e.g.

```
instruction(1) =@source if condition(1) then do (action1.1, action1.2);
instruction(2) =@source if condition(2) then do (action2);
```

Since the conditions may be different. The instructions can execute in order, and thus the actions are performed in order, if the conditions are met. E.g., if both of these instructions execute, then it should be equivalent to performing the actions in the order action 1.1, action 1.2, action 2. This can be accomplished with the action # field.

As an option, it would be useful to be able to specify compound roles matching conditions. For instance, @role 1 & @role2, . . . means a node performs the conditional actions at any node in which it has both roles role1 and role2. The above is a useful feature. However, it is not required and can always be accomplished in other ways by Fitting.

Note that Fitting has flexibility in how it constructs the role instructions. In one extreme, a role has a single or small number of actions associated with it and nodes have multiple roles. For example, in the rate limiting example, the back-up path ingress node n has two roles associated with it: "ingress" and "rate limiter", each with one or conceptually one set of actions. In the other extreme, each node has a single role, and each role has therefore more actions. For example, node n could be given the role "primary ingress" for the primary path and "back-up ingress" for the back-up path. In this case, the back-up ingress would have the source actions and rate limiting actions associated with it. This approach may tend to proliferate node roles and complicate glows. For instance, in this case, each glow would require instructions for "back-up ingress" even if those instructions were the same as for the primary ingress role. In addition, the GMS would need to be able to identify "back-up ingress" and "primary ingress" as ingress nodes with their inherent actions.

Using the construction of very modular roles that can be mixed and matched to create a variety of services, there is a very close relationship between a role and the set of actions it takes. However, the architecture can support the general structure and Fitting is free to choose whichever methodology makes sense based on the context.

The actions verify( ) and set( ) are used in the glow turning on process.

verify(gA,gp) returns TRUE or FALSE depending on whether the generalized address gA is considered attached to the generalized port gp, gp could include one of the local variables me so technically it is a location.

The typical use of this would be at the ingress and egress nodes, checking the validity of the SA and DA respectively, however this could also occur at a midpoint, and also the address being checked need not match the glow's flow addresses. If FALSE, the glow is turned off and this information is communicated to the other participating nodes. This behavior is described below.

Some guidelines for deciding when a generalized address is considered attached to a port are:
L2 attachment verification
L1 attachment verification returns TRUE if the port is operational and configured to be an access port
Generalized addresses can take a liberal approach to verification, verifying in general if it's possible that an atomic packet that matches the general description could be attached there. For example, a VLAN address should verify as TRUE if the VLAN is configured on that port.
When no attachment verification is to be made, this action can be omitted. For instance, IP prefix, or even IP addresses may not use attachment verification.
Initial versions of the function support whatever generalized addresses are being supported.

To initiate a turn ON process, a node attempts to set glow_local_status to ON (This occurs if glow_default_status is set to ACTIVE, otherwise the role instructions would not be executed). This is a distributed process between the USAT participating nodes. This is done through the command set(var,state,location,mode), where var is the variable to be set, the state is the state the variable to set to, location is either "local" or "usat", and node describes different distributed protocols. In the case of local, the set( ) command is equivalent to var=state. In the case of global, set( ) means that the local node performing this action( ) is initiating a distributed global change to the usat variable var. Mode is the method used to globally decide on the variable setting. For instance, the default mode could be a simple mechanism where an initiator turns on the variable and waits for confirmations or vetoes from other nodes. The other USAT nodes respond based on their roles and local conditions: 1) inactive or standby nodes confirm any changes, 2) active nodes with no role instruction that sets this variable also confirm any changes, 3) active nodes with a role instruction that also sets this variable confirm if their local set matches the incoming message, otherwise veto.

So for instance, an FSAT like verification process can be expressed as:

```
@ingress, if verify((s,V,*),<*A2,me>) then do
    set(glow_local_status,ON,usat,0)
@egress, if verify((d,V,*),<*A2,me>) then do
    set(glow_local_status,ON,usat,0)
```

Where s is the source MAC, d the destination MAC and <A2,me> means any L2 access port on the node evaluating the instruction.

Note that verify( ) works local to the node so that attachment information does not need to be globally distributed. set( ) works distributively across the USAT. For instance, suppose the FSAT above had a midpoint add/drop, then the role instruction:

```
@add/drop, if verify((*,*,*),{<gp,me>,<gq',me>}) then do
set(glow_local_status,ON,usat,0)
``` can be added to the glow which instructs the add/drop node to participate in the turn on process (setting glow_local_status) by checking if ports gp and gq' are operational. By changing these commands, a more complex turn on processes can be used, such as the add/drop checking the presence of a service device.

All of services can be verified this way, using multiple verify and set commands at the participating nodes. For instance, and L1/L2 low latency multicast could verify an L2 attachment at the egress and just the L1 port at the ingress.

Use of a general set( ) functions allow multiple variables to be set distributedly in a USAT. This could allow fine grain control under attachment verification failures. For instance, if gp or gq' were not operational, then the glow could distributively try to set a second local status variable to ON and the steering commands could be conditioned on these variables in order to add/drop to different port pairs on a different node. Alternatively, port groups can be used to abstract the ports which will work as long as the alternate ports are on the same node. Port failures can also be handled by making the ports part of the fabric graph, but this limits the glows which can share that path. So there are multiple ways to achieve the same goals with different efficiencies and different functionality can be rolled out as needed.

Note the following:
1. If a glow is to be permanently on, e.g. because there is no known attachment information, then the verify( ) command could be left out at one of both of the ingress or egress. Cases where there are no known attachment information include: L3 FSATs first implementation, external IP prefixes, and sometimes L1 circuits.
2. If verify( ) is included in the instructions for an L1 glow from port p, then it should return TRUE iff port p is configured up and operational.
3. the gA used in verify may not in many occasions match the generalized source address of the glow used in its steering actions (direct, forward, route, etc.). Examples where gA would not match the glow's include:
   a. Any situation where address translation is involved. For instance, attachment verification would occur on pre-translated VLAN, whereas direct( ) actions on post-translated VLAN. Other translations include Q-in—Q and Mac address translations.
   b. Situations where there is no attachment information on the flow but there is an external endpoint attachment which could be verified, such as
      i. Checking that a router is attached to a port by using its line card MAC, indicates that certain IP prefixes be routed to the router. Disappearance of the router invalidates the prefix routes.
      ii. Initial implementation of L3 flows may not have any attachment information, but this mechanism allows L2 attachment information to be used in its place if desired.
      iii. Checking for the presence of an L3 firewall on a midpoint add/drop. We may use the L2 of the firewall port to verify, but an L3 address end-to-end to direct.
   c. Multiple of the above situations can occur for the same glow.

Note that the turn on process is described as involving some nodes, those nodes being programmable. This can be extended to allowing all the nodes be involved but conditioned on the ingress and/or egress nodes being operational; this extension allows any USAT member to FAIL a glow if the ingress node goes down.

The direct( ) action is described as if it were the TCAM in the current hardware implementation. In some embodiments, it is possible to generalize direct( ) so that it is hardware independent, and includes XBAR, FWD, etc., all in one universal command.

An example of direct( ) that might occur at an ingress node, after the turn on process actions is:

```
@ingress, if (glow_local_status = ON) then do (
    direct(input address = gSA,
    inport = current_attachment_port(gSA)
    filter = F
    output address = gDA,
    outport = outport[USAT_id]
    )
    ...
)
``` which indicates to the node to direct flows from gSA to gDA matching flow filter F, from the access port to where gSA is currently attached to the current output port of the USAT USAT_id, where USAT_id is the USAT for this glow. A few notes on this:

The current_attachment_port( ) function returns the current location of gSA and is appropriate where that information is available. Note also, this function is part of the instructions when they execute, the actual TCAM entry would be a specific port—not an instruction to always use the current port. It is the GMS responsibility to inform the TMS of any changes if an attachment were to move. Other options for specifying the input port are:

If it's desired to capture the flow from all the input ports, then input port=<*A2> would be used instead, indicating all the generic access ports.

a specific input port gp could be specified.

If desired, this action could be preceded by verify(gSA,*) to make sure that gSA is actually attached to the node. So note in this case, the attachment verification is on all the access ports, but the actual table entry will be a specific port; this is an example where verify( ) and direct( ) use different generalized addresses—although in this case their L2/L3 addresses match.

If a specific port gp is used in direct, this should also be reflected in the verify( ) command, but it is not an architectural requirement, that is up to how Fitting designs the service.

Flow filters are used to refine the definition of the flows. Filters can be applied anywhere direct( ) is applied. For instance, a filter can be applied at the destination node in an L1/L2 multicast.

Here is an example of what the full action set could look like if a specific port gp were used but no attachment verification was done:

```
@ingress, if TRUE, then do set(glow_local_status,ON,usat,0)
@ingress, if (glow_local_status = ON), then do
        direct(
                input address = gSA,
                inport = gp
                filter = F
                output address = gDA,
                outport = outport[USAT_id]
                )
        ...
        )
```

At a transit node, neither the input nor output ports are apriori known, but rather are a function of the active graph, and provided to the GMS as a variable from the FMS. Thus, the glow's direct( ) might be:

```
@transit, if (glow_local_status = ON), then do (
        direct(
                input address = gSA,
                inport = inport[USAT_id]
                filter = F
                output address = gDA,
                outport = outport[USAT_id]
                )
        )
```

At a transit node with add/drop, direct( ) might be used as:

```
@add/drop, if (glow_local_status = ON), then do (
        direct(
                input address = gSA,
                inport = inport[USAT_id]
                filter = F
                output address = gDA,
                outport = drop_port
                ),
        direct(
                input address = gSA,
                inport = add_port
                filter = F
                output address = gDA,
                outport = outport[USAT_id]
                )
        )
```

At an egress node, direct( ) might be used as:

```
@egress, if (glow_local_status = ON), then do (
        direct(
                input address = gSA,
                inport = inport[USAT_id]
                filter = F
                output address = gDA,
                outport = current_attachment_port(gDA)
                )
        ...
        )
```

If it's desired to use the FWD table at the egress, then this command can be omitted. Notes on direct( ):
  Although not shown, direct( ) can include a QoS field to specify which queue the flow should be directed to.
  direct( ) can be generalized to include FWD and Routing, and L1. It might be preferable to develop a universal action with a field indicating which table to program.

A forward action installs a forwarding entry into the forwarding table, as needed. In some cases, the attachment could be learned and no action is taken. This can be used to install a specific MAC address in the forwarding table overwriting or above any residual table elements for this MAC. This allows Fitting to more finely tune residual tree traffic and/or offload the TCAM. This functionality could be folded into direct( ).

A Residual Forwarding action installs the instructions into the residual tables which govern what happens for an unknown packet.

Two residual filters are available. The first is VLAN which restricts the flows to within a certain VLAN, set of VLANs, or VLAN range. The second are hash values which specify which hash buckets this glow includes. This functionality could be folded into direct( ).

The Broadcast action sets of a TCAM broadcast structure between the input and output fabric ports, and add/drops to the specified access ports. It can be used in the establishment of P2.5 BUM trees. This functionality could be folded into direct( ).

The XBAR action is the L1 version of direct( ). This functionality could be folded into direct( ).

The VLAN translate action, vtranslate (v1,v2) performs a translation of v1 to v2. This could occur at the ingress or egress nodes, or at nodes designated as translate nodes (which are often the same physical nodes, just different rolls). VLAN translation could occur as part of a point-to-point glow, or more likely as part of a Stub glow on a port.

The rate limit action polices a flow. Maybe we should have a more general policing action.

The Block action puts an ACL block on a flow. An example use case is to block a failed glow,
    @ingress, if(glow_local_status=FAILED), then do block (gp).

The Monitor action instructs a node to monitor a flow using sFlow or other monitoring/DPI technologies.

Glows can be organized into glow groups to create interdependencies. Let (g1, g2, . . . , gn) be a glow group and the glows can be in different USATs. Groups are ordered. Then the group mechanism can be used to create logic around these, e.g.
  If g1 fails, set g2 to active, if g2 fails, set g3 to active, etc.
  Distributively set up g1, g2, . . . , so they are either all on or all off.

The mechanism to do this is thru the node role "leader" and the set( ) command in the case of distributed variables.

The simplest case is when there is one leader and this is the ingress node of all the glows. This could be the case to allow a secondary USAT to take over in there was an install fail on the primary USAT, e.g. the service device failed, or the TCAMs were full.

Another simple case is USAT internetworking with two domains. Then the gateway node between the two domains can act as leader and ensure that two glows, one in each domain, either both go up or down.

For more domains, a distributed algorithm is needed and a version of set could be used across the domains. The leaders participate and each domain could be given a leader.

More and more logic on the groups can be defined in order to accomplish more complicated interdependencies.

USAT v1.0 supports point-to-point glows. Multipoint services are handled by composite USATs (There is some flexibility for residual since the endpoints are essentially always ON. It could be supported with a composite USAT using point-to-point glows, or USAT v1.0 could support a multipoint glow which is valid for residual). The reason is that this provides greater control over turning on/off a leaf node of a multipoint service. Note that point-to-point glows means that there is a single ingress node and egress node; there may be multiple ingress locations on that node, e.g. for residual incasting, or multiple egress locations on the egress node, e.g. for multicasting to multiple destinations on the same node, or multiple midpoint add/drop service points.

Fabric Graphs (FG) and the related data structures include: FG lists (FGL), FG parts (FGP), and FG part lists (FGPL). Fitting creates all these data structures and distributes FGP and FGPL to the nodes, which add local variables to them for real time operation. FGP and FGPL are managed by the Fabric Management System (FMS) on the nodes which operates independently from the Glow Management System (GMS). From a node's FMS perspective. FG and FGLs are essentially non-existent; they are Fitting entities which are intermediate steps to get to the FGPs and FGPLs. The FGPs and FGPLs determine how the network fabric will operate for a USAT.

For discussion purposes, we break up the release of USAT v1.0 into two steps. The first step uses only what are called fixed FG parts and requires no inter-node USAT signaling. The second step uses dynamic FG parts and requires USAT inter-node signaling.

To fulfill a desired service, e.g. L1 Unprotected pt-to-pt or a low latency L1/L2 multicast service, Fitting creates one or more USATs. When multiple USATs are used to fulfill parts of the same service, we call the collection of USATs a composite. Otherwise, the USAT is called native. Similarly, the FGs used by a native (composite) USAT are called native (composite). Each service may have multiple FGs associated with it because of back-ups and a given FG can be used in multiple USATs, e.g. as a primary in one USAT and a back-up in another.

Among other functions. FGs specify a switching topology which specifies the connectivity between the switching nodes. In order to implement all the USAT services, the FGs are able to specify the following switching topologies, either natively or using composites.
  1. Fabric Paths (FP): Stub (ST), Unidirectional (UFP), Bidirectional (BFP), Parallel (PP), Join (JP)
  2. Unidirectional Incasting Fabric Trees (IFT)
  3. Unidirectional Outcast Fabric Trees (OFT)
  4. Broadcast Fabric Trees (BFT)

There are some important subcases of FPs.

A Stub Topology (ST) consists of a single node and is used for intra-node services and port/node configurations like VLAN translations (A stub node is considered a switching node even though they do not specify any fabric links).

A UFP is exactly what it sounds like and is used for point-to-point services as well as multipoint composites.

A BFP has two directions and is used for bidirectional services

A PP splits the flows at the start node, travels along two disjoint paths, and selects one path at the destination, and is used for 1+1 protected service.

A Join Path (JP), where all the fabric ports are inports at each node, are used for (VLAN) Residual services.

Note that a ST and PP are not paths in the graph theoretic sense. In general, the FGs are not identical to the switching topologies; there are many cases where a FG is more general than the above switching topologies.

Unlike FSATs and PSATs, the FG structure can also specify a large number of variations of these topologies and how they are used. Specifically, each node of a switching topology could
  perform circuit switching, packet processing, or both, where packet processing could be L2 forwarding, L3 routing, or directing TCAM flows, with optional other functions such as rate control and address translation,
  have its own set of roles assigned to it indicating what switching and non-switching functions are to be implemented at that node, and/or
  be participating both unprotected and protected USATs, with one of several different forms of protections specified.

For instance, a UFP could be used for an L1 point-to-point unidirectional unprotected circuit, or a collection of UFPs could be used for a protected L2 FSAT with midpoint add/drop. A TCAM IFT could be used for an IP storage application, or an IFT could be used for VLAN residual PSATs. An OFT where the all the nodes perform circuit switching with the leaf nodes performing circuit and packet switching could be used for an L1/L2 low latency multicast service.

All four switching topologies are supported in USAT v1.0. However, USAT v1.0 does not support a true multipoint glow and therefore composite USATs are still needed. All of the multipoint switching topologies can be supported using composite UFPs, and thus all services built on top of those topologies can be supported by composite UFPs. Specifically,
  PP: the two paths start and end at the same node and a glow is assigned to each USAT.
  BFP: use one FP per direction
  IFT: an incasting tree can be supported by multiple UFPs, one per source node of the tree (Residual trees require what's called a Join Path (JP), defined later).
  OFT: an outcasting tree can be supported by multiple unidirectional FPs, one per leaf of the tree.
  BT: a broadcasting tree can be supported by having one bidirectional FP per node-node pair.

For example, to create a composite IFT USAT with four source nodes and destination node r, Fitting could create:
  Four USATs,
  Ua={ga}: (fga)
  Ub={gb}: (fgb)
  Uc={gc}: (fgc)
  Ud={gd}: (fgd)

Where fga is a UFP from source a to destination r, fgb is a UFP from source b to destination r, etc. In order to construct this, fga, fgb, fgc, and fgd, might have been derived first from an incasting fiber tree, or Fitting may have used a different algorithm. For these USATs, ga, gb, gc, and gd, represent the flows from the four source nodes to r, and all glows are given the same priority and table cell order fields.

The exact constructions depend on the service definition and details (One detail is that a node may end up having different roles in different UFPs, and this shouldn't lead to conflicts in the overall composite USAT service. For instance, in a composite IFT for residual, a node will be both an ingress node and a transit node on different native FPs used to build the composite. The TMS understands this and Fitting appropriately builds the entire USAT composite structure, glows, etc. In general, this is handled thru the use of the glows' table order cell fields). However, in order to accomplish this, glows that use these composites are given a cell identifier in their order field which informs the table management system that these glows are to be split or merged at nodes where the individual FGs of a composite FG overlap.

A composite FG may exist as an intermediate step in Fitting; they have no operational reality in the network. In fact, what Fitting really does is create composite USATs, not composite graphs, and these composite USATs operate independently of each other (A composite USAT is a collection of USATs created to form one service. For instance, an internetworking service might be composed of multiple USATs tied together through their glow group).

Composites using UFPs have the advantage that there is individual control over the individual paths and glows attached to them. This leads to at least two advantages:

Simplicity in adding or removing a leaf node: Add/removing a leaf node is done by adding or removing a UFP, or adding/removing a glow onto an existing UFP.

A possible reduction in the number of FGPs managed by the network: Even though composites use multiple FPs, there can be a reduction in the total number of FGPs managed by the network because 1) The FGPs often overlap and can be consolidated, and 2) a small set of FGs can create a large number of composite FGs versus the alternative of creating a separate native FG for each multipoint service. So, for instance, it is possible in an N node network to create N−1 FPs from each node to each other node and these N−1 FPs serve all possible combinations of services by putting the glows on one or more of each of them (The node roles can match, or nodes can be given multiple roles).

However, there are some potential disadvantages as well:

In some cases, composites may be inefficient. For instance, BTs may scale quadratically with the number of nodes There is less control of glow interaction in a composite, and this could lead to more transients in the network during transitions.

Therefore, it's a balance and individual decisions will have to be made on each type of service. One reasonable approach would be:

All Fiber Paths (UFP, BFP, PP) are native
(VLAN) Residual is composite built from Join Paths
Other IFTs are composite built from UFP
Multicasting is composite built from UFP For the residual trees, use of a composite requires an (N−1)-fold increase in the number of FGs in a network of N nodes (N−1 FPs/root node instead of 1 IFT/root node). However, nodes do not manage FGs, they manage FGPs. Since these FPs overlap based on the tree topology, there are many identical FGPs that can be combined into a single consolidated FPGs. The end result is that the same number of FGPs need to be managed by a composite residual IFT and a native IFT. In fact, by combining FGPs, Fitting can create structures which mimic multipoint FGs that the distinction may be one without a difference. The real difference lies in how the individual flows are controlled, via one glow or many, which is not very relevant for an always ON service like residual.

The general overview of how FG are created and utilized is as follows:
1. Fitting creates FGs to create primary and back-up switching topologies with instructions,
2. Fitting organizes the FGs into FGLs, and assigns those lists to USATs.
3. Fitting divides each FG into parts,
4. Fitting combines the FGPs into FGPLs,
5. (Optional) Fitting consolidates and optimizes the FGP and FGPLs,
6. Fitting distributes the FGPs and FGPLs to the nodes, which install them and add local variables for real time operation.

Fitting creates FGs to create primary and back-up switching topologies with instructions. A FG specifies a switching topology, e.g. the nodes and links that flows could take through the fabric. The switching topology could be a circuit switching topology, a packet switching topology, or a mixture of both.

A FG switching topology specifies fabric links; it does not include any access links (Validation rules may depend on the state of an access port). Assigning a glow to a USAT determines which access links get associated with what FG. This allows FGs to be shared by glows with differing source/destination access ports that share the same source and destination nodes. As an added benefit, FGs can also serve internal USATs for which there are no access ports, or mixed USATs for which there are access ports on one end (It is also possible to extend the Fabric Graphs to include the input port to the packet chip).

FGs perform other functions so it's important not to think of a FG as a switching topology. Rather, a FG can be thought of as a set of instructions to some of the participating nodes of a USAT, and some of those instructions include switching instructions which specify path(s) through the network. In addition to the switching topology specification, a FG also includes 1) validity rules and 2) roles for each node of the FG.

In some cases, a node may be given an instruction which does not include any switching topology specification. The common use case of this is a placeholder, which tells a node that it is a standby node instead of a primary path node. Placeholders are used for FullPath protect services in lieu of USAT inter-node signaling. Therefore, in general a FG may contain more nodes than in the switching topology it specifies.

Fitting may create multiple FGs for the same service. This occurs either because 1) the service requires back-up topologies, or 2) the service is being fulfilled by creating a composite USAT, each of which requires one or more FGs.

FGs are globally unique; let fgi represent the network's ith FG.

Fitting organizes the FGs into FGLs, and assigns those lists to USATs. A Fabric Graph Lists (FGL) is an ordered list of FGs. Like FGs, FGL are globally unique; let FGLi represent the network's ith FGL, e.g. for an unprotected FGL, FGL1=(fg1)

Or for a protected FGL,

FGL2=(fg1,fg2)

Note that FGs may be re-used in different FGLs, e.g. fg1 is used in both FGL1 and FGL2. Common use cases of this are where a primary path is used for both unprotected and protected services, like in FGL1 and FGL2 above, or where two or more primary path services share one or more back-up paths.

Fitting then assigns a FGL to a USAT, e.g.

U1=GS1: FGL1={g1, . . . gk}: (fg1)
U2=GS2: FGL2={g1, . . . gk}: (fg1,fg2)

In this example, the glows of U1 are unprotected on path P1, which is specified by fg1. The glows of U2 are unprotected on P1, but in the event of a failure would fall back to P2, which is specified by fg2. In Full Path protection, all the nodes of U2 would select the same FG; in Partial Path protection, some nodes of U2 could use fg1 and some fg2.

FGLs can also be re-used by different USATs, e.g.:
U3a=GS3a: FGL3
U3b=GS3b: FGL3
in which case the glows of U3a and U3b will always follow the same paths in the network. In terms of overhead, there is far more to be gained by allowing FGs to be re-used in different FGLs than for FGLs to be re-used by different USATs. Re-using FGL is useful in staging MDFs; for instance, in the above example Fitting may be setting up U3b to replace U3a and one of them is set to be active at any time.

Fitting divides each FG into parts. From a nodal perspective, there is no such thing as a fiber graph, rather nodes operate on their individual fabric graph part. A FG can symbolically be represented as a set of parts, e.g. for FG fg1,
 fg1={fg1.pn1, fg1.pn2, fg1.pn3, . . . }
where f g1.pnj is the FG part for node nj. Each FG part has its own set of inputs, outputs, validation rule, and node roles. All switching and non-switching nodes needing instructions about the FG needs a part.

There are two types of FGPs: fixed and dynamic. Fixed FGPs have fixed inports and outports and do not require inter-node USAT coordination. Dynamic FGPs have some inports and/or outports which are determined by inter-node USAT coordination. Fixed FGs uses all fixed FGPs. Dynamic FGs use at least one dynamic FGP.

Each FGP can be thought of as a set of instructions to a node, telling it
1. how to determine if that FG part is valid at that node at that time, based on the network state,
2. the node's roles in the FG, e.g. ingress, egress, transit, so that the node knows which role instructions to implement for each glow assigned to it,
3. (sometimes) if the node is on the primary path or a standby path, using placeholders
4. the inports and outports to use for any glow using the FGP part for fixed (dynamic) FGPs.

In general, there could be more parts of a FG than the switching nodes. One case of this is the case of placeholders. For FullPath protect systems without USAT signaling, each node of the USAT has a complete FGL in order to know if it should be active or in standby mode. For instance, each switching node of fg2 needs the full FGL2 list. Therefore, Fitting can create placeholders for fg1 at the switching nodes of fg2 that are not switching nodes of fg1. So, in our example, suppose P1 traverses nodes 1, 2, 3, 4, 5 and P2 traverses nodes 1, 6, 7, 8, 9, 10, 5. Then Fitting would divide fg1 and fg2 into ten parts each, one for every node of P1 and P2 (An alternative would be to modify the validity rules of the switching parts to invalidate them if a placeholder part would have validated in the FGPL in an earlier position. USAT internodal signaling eliminates the need for placeholders by indicating to a node if it's on the primary or a back-up path. However, it's also possible to use partially valid path rules). These placeholders are viewed as part of fg1, although other strategies are possible.

Residual trees do not need placeholders since all nodes are switching nodes. In addition. VLAN residual trees do not need placeholders if a subset of the nodes are all made switching nodes, e.g. there's no node x which is only transit in some graphs.

Note that the placeholders of a FG depend upon the FGLs that FG is a part of. For instance, fg1 in FGL1 has the switching nodes of fg1, whereas fg1 in FGL2 has placeholder nodes at the switching nodes of fg2 that are not switching nodes of fg1. So in this example, either Fitting would create two FGs, fg1 and fg1', that used common switching parts (FGPs) but had different placeholder FGPs, or Fitting uses a single fg1 for both situations but tracks which nodes get which parts. Note that if the switching portion of fg1 is used in a 3rd FGL, or a third FG is added to FGL2, then even more placeholders can be created.

Switching parts and Placeholder parts are but two categories of parts with use cases, however Fitting could create FGs with arbitrary non-switching parts. For instance, in order to block a signal on some node x if a path P was operational. Fitting can create switching parts for P but also a non-switching part for node x with a validity rule giving the node a role, e.g., Block, and then assigning a glow with specific instructions for the block. In this particular example, the part at node x could be part of the FG specifying P or a separate FG: Fitting has a lot of flexibility.

Fitting has a lot of flexibility in deciding which parts are part of which FGs. In one extreme, Fitting could define each part independently, in other cases, parts are defined as needed in order to induce an end-to-end switching topology. In addition, in some situations Fitting is able to combine parts into a single fg part. For instance, if a node x appeared on both P1 and P2 in the above example, then it may opt to not define multiple parts for it (Note that this can complicate tracking placeholders since multiple parts which may be combined might have been derived from FGs which appear in different FGLs and thus have different placeholder nodes. However, this is something that Fitting can easily track).

Note that in general, because of placeholders, Fitting can construct the FGLs prior to dividing the FG into parts. Fitting combines the FGPs into FGPLs. Each participating node of the USAT gets a FGPL. The FGPL is an ordered list of FGPs, e.g.:
 FGPL1.px=(fg1.px)
 FGPL2.px=(fg1.px, fg2.px)
Unprotected services use a FGPL with a single FGP entry.

A node reduces a FGPL to a FGP by picking the first valid FGP in the list. The chosen FGP at a node is called its active part. Each node chooses its own active part based upon the validation rule included in the FGP for that node (in PartialPath, the validation rule for a FG will vary from node to node). Because each node independently chooses without any coordination with other nodes, the actual path a flow takes through the fabric may jump from FG to FG from the ingress to the egress.

Fitting can optimize the FGP and FGPLs. To improve scalability, Fitting can reduce both the number of elements and required computations of the nodes by re-using the FG components. This can be done in a number of ways:

Re-using validation rules: Specifically, at a node, two or more different FGPs are able to use the same validation rule which is evaluated once. This reduces computation for PartialPath services where paths have merged at some node x and remain the same to the destination. This also can be used in FullPath or Unprotected when two or more FGs completely overlap but Fitting does not use the same FG, e.g. because FG re-use has not been implemented.

Re-using and consolidating FGPs: Re-using FGPs in different FGs can reduce the number of FGPs. So, in the above example, the FGPs downstream of node x are identical, except for the indication of which FG they originally derived from (which has no operational effect). So in this case, all nodes downstream of x could use the same FGP. The FGP at node x can be re-used if that part is dynamic, else they need to be different if they have different inports. Similarly, identical FGPs at a node could be combined into a single part.

Consolidating Placeholders: Placeholder parts that are continuous to each other in a FGPL could be combined into a single placeholder. For example consider a case of a protected FSAT with nine back-up paths. Suppose there is some node x on back-up path 10 but not on any of the other paths. Then x will have nine placeholder parts proceeding the switching part. Those nine placeholder parts could be combined into a single placeholder with a composite validity rule.

Re-using FGPLs: Allowing USATs to re-use FGPLs could be very beneficial, especially with PartialPath protection. In the above example, the FGPLs downstream of node x (including node x for dynamic FGPs), could be combined. Looked at another way, re-using FGPLs with PartialPath allows flows originating at a node and flows transiting the node to re-use the same FGPLs.

Overall, the re-use validation rules reduces the computation at a node. Also, since this computation is dependent on information from other nodes, transients should be reduced if identical calculations are eliminated which could evaluate at slightly different times.

How a node handles a FGP or FGPL may not require knowledge of what FG the parts in the list were constructed from. That knowledge may be useful for consistency checks, either at installation, or as part of a network monitoring system. However, what is used for correct operation, is that FGPLs be correctly installed at each USAT participating node that uses the original FGL. Thus, it's not clear at all that the nodes need any knowledge of a FG.

A FGL is a data structure used by Fitting consisting of an ordered list of FGs, a mode of operation which specifies how the active FG is to be selected from the FGL, and a list of the participating nodes of the FGL. Two modes may be defined as:

mode 0: a node selects the first fabric graph part if valid, else fail mode 1: a node uses the first fabric graph part in the list that is valid; fails if there are no valid fabric graph parts.

Mode 0 is used for unprotected USATs. Mode 1 for protected USATs using either fully protected, partially protected, or 1+1 path rules. Mode 0 is the same as mode 1 when the list consists of a single fabric graph part; it can be divided into two modes because the first implementation might make use of mode 0. Other modes of operation are possible. For instance, it might make sense for a node to select the first active graph in the list for which it has role instructions.

The participating nodes of the FGL are the participating nodes of any USAT using it.

A Fabric Graph List Data Structure may include:
fgl_id: A globally unique identifier. By convention, graph lists start with fgl.
fgl_fg_ids: Ordered list of fabric_graph_id's
fgl mode: {0, 1, 2, . . . }
fgl nodes: list of all the participating nodes in the FGL, e.g. the union of all the nodes in the list's FGs.

A FG is a data structure used by Fitting which specifies the switching and non-switching nodal instructions. Because nodes operate on FGPs. and because there is a huge number of possible fabric graphs, a bottoms up approach can be used to define a Fabric Graph. Specifically, a Fabric Graph is defined as an unordered set of Fabric Graph Parts. The set is unordered (that is to say not specifically ordered), emphasizing that each node operates independently on its FGP.

A Fabric Graph Data Structure may include:
fabric_graph_id: A globally unique identifier, by convention starting with fg
fabric_graph_nodes: Unordered set of nodes which participate in the FG.
fabric_graph_parts: List of Fabric Graph Part IDs, one per every node in fabric_graph_nodes
Notes:
This data structure supports both fixed and dynamic FGPs.
The graph nodes include all the participating nodes of the FG, switching and non-switching. These nodes are added to the participating nodes (flg_nodes) of any FGL that contains this FG.
This data structure can specify all the required USAT switching topologies and more, given a flexible definition of a fabric graph part (For instance, a graph which multicasts source s1 to destinations d1 and d2 on different nodes, and unicasts source s2 to d2. An example of that graph can be represented as having nodes s1, s2, d1, d2, x and y, with arcs (s1,x),(x,d1), (x,y),(s2,y),(y,d2). Another example would be one of the USAT switching topologies with a flyway which passes through one of the nodes of the switching topology).
Since the nodes use FGP and FGPL, this is just an intermediate structure used by Fitting.

FGPs are data structures created by Fitting and distributed to the nodes which add one local variable. They come in two flavors: fixed and dynamic. Fixed FGP data structure is used for all the services that can be built with it.

A Fixed FGP Data Structure may include:
fgp_id: A globally unique identifier; by convention, FGP id's begin with fgp.
fgp_fgids: Indicates which fabric graphs this part is associated with
fgp_node: the node_id of the Fiber Graph Part
fgp_roles: The roles for this node (node_id fgp_node)
fgp_validity_rule: The validity rule for this FGP, evaluated by node node_id fgp_node
fgp_num_directions: 0, 1, 2, . . .
For each direction,
fgp_dir: 0, 1, . . . .
fgp_inports(fgp_dir): a list of generic input ports, [gp1, gp2, . . . gpn}, for direction fgp_dir
fgp_outports(fgp_dir): a list of generic output ports, [gq'1, gq'2, . . . gq'n} for direction fgp_dir
fgp_roles(fgp_dir): unordered list of roles for direction fgp_dir Local Variables:
fgp_validity: [TRUE,FALSE}
Where,
fgp_id: Is the globally unique id of the FGP. Each FGP has to have a unique id. These id's are used to construct the fabric graph part lists (FGPLs) that will be distributed to the nodes.
fgp_fgids: Each FGP may be re-used in many FG's. This field is for Fitting to track which FGPs are used by which FGs. They have no operational role in the nodes as each node operates on its part and those rules do not depend upon which FG the FGP was derived from.
fgp_node: The node that this FGP will be installed in. A node can have every FGP that is used in its FGPLs, and similarly a node can have a FGPL for each USAT the node participates in.

fgp_roles: The roles of the node in this FGP. If this FGP is the active FGP, then this node is assigned these roles. The node may also have roles specific to a direction. Important examples are given below.

fgp_validity_rule_id: The validity rule id used for this FGP. Validity rules are discussed in a later section. Note here that this field refers to a rule_id so that different FGPs can re-use the same validity rule. Note also that there is a single validity rule for the FGP so either all the directions are considered valid or all the directions are considered invalid. Note also that the validity rules are in the FGPs, not in the FGs, and in general the validity rule could vary from node to node for the same FG.

fgp_validity: The real time local variable which tracks the current value of the validity rule. TRUE iff the validity rule is currently TRUE, and FALSE otherwise.

fgp_num_directions specifies the number of directions of the node. Most services will use FGPs with 0, 1, or 2 directions, with typically 0 direction being used for node configurations and intra-node services 1 direction being used for unidirectional services, or to build composites 2 directions being used for bidirectional services For instance, a bidirectional inter-node service may use FGPs with two directions, where the two directions have independent directional connectivity to make it easier for Fitting to find an available bidirectional path (The two directions may travel over different paths, in which case the endpoint nodes use two directions and the transit nodes would be one direction, defining two separate paths. In general, any node carrying the flow in both directions uses two directions, whereas a node carrying one of the flows uses one direction). More than two directions gives Fitting the flexibility to create FGs which overlap at a node in more than two directions (For instance, to establish an incasting service from nodes 1, 2, and 3 to node 4 using one native FG. The nodes are connected 1-*2-*3-*4 and it's desired to create flyways 1-*4 and 2-*4 to meet the service. Then node 3 will have three directions, one for the node 3 to node 4 traffic, and two for the two flyways which go thru it. If this is undesirable, then composite USATs could be used, or the 1-*4 and 2-*4 links could be partially specified using L2 ports instead of fully <L1,L2> specified).

Directional connectivity variables (fgp_dir, fgp_inports (fgp_dir), fgp_outports(fgp_dir), fgp_roles(fgp_dir)): Each direction has a set of inports and output ports. If this FGP is selected to be active, then a glow connected to the FGP can refer to these ports in its (directional) role instructions. Typically, the glow will instruct the node to internally connect the generic inports {gp1,gp2, . . . gpn} to the generic outports {gp'1,gp'2, . . . gp'n} (If this were to be represented as a graph, it would be a complete bipartite graph with loopback arcs removed), however the instructions may vary. For instance, the node may have role "add/drop" in which case the glow may instruct the node to add/drop to a specific generic port, or generic port group for load balancing. Note that there is no connectivity specified between directions. Loopbacks are suppressed so that if a port appears in both the inports and outports sets, there is no loopback connection (Since loopback is a useful network test feature, it will have to be handled in a different way).

In each direction, the inports and outports have matching types. Specifically, they can both be either of type L1 or of type L2 (fully or partially specified). Different directions could have different types, e.g. L1 in Dir 1 and L2 in Dir 2. If the ports are of type L1 in a direction, the node is called an L1 node in that direction, or just an L1 node if there is only one direction. If they are of type L2, then the node is called an L2 node in that direction, or just an L2 node if there is only one direction. Glows which are attached have the appropriate connection commands, e.g. a glow connected to an L1 node should have an appropriate L1 attachment instructions otherwise the connect( ) instruction will fail (This approach is flexible by allowing a glow to have layer dependent instructions. These layer dependent instructions are implemented with the role instruction mechanism, so no separate mechanism is used). However, a glow may have multiple types of attachment instructions for different node roles. This allows a single glow to specify a multilayer path thru the network. This also allows for create back-up services, where for instance, an L1 circuit is backed up by a soft L1 circuit.

Note that a node with 0 directions has no fabric ports specified. The node is called multi-layer and it can be used for glows with any kind of attachment.

The matching attachment requirements do not apply on the fabric side, e.g. L1 nodes can connect to fully specified L2 nodes and vice versa, creating a multilayer end-to-end service (A partially specified L2 node can be allowed to connect to an L1 node). The reason is they connect at L1. For instance, a glow could attach at L2 to an L2 FGP at the ingress and egress, but then be circuit switched at all intermediate nodes.

There are some special node/FGPs worth noting here:

0 directions: Used for Stub nodes and Placeholder nodes.
  Stub nodes are used for intra-node services as well as configurations on a node, like altering the VLAN translation table. Stub nodes include node role "stub" in fgp_roles.
  Placeholder nodes are used for FullPath protected services to indicate if a node is currently a primary or a back-up. Placeholder nodes have node role "standby" in fgp_roles.

1 direction: Used for unidirectional point-to-point, incasting, and outcasting services. There are many variants, including:
  Start node: No inports, one outport. Node roles includes "ingress."
  Transit node: one inport, one outport. Node roles includes "transit" and potentially "add/drop"
  End node: one inport, no outports. Node roles include "egress."
  Join node: >1 inport, one outport. Used for incasting services. An important example is the main FGP used for residual service in which the inports are specified to be all the fabric ports, <A FGP with inports set to <*F> is said to be input agnostic. Otherwise, it is said to be input specific. Input agnostic joint nodes are used for standard and VLAN residual services. In this case, the node's role should include "source". For more general incasting trees, a join node may not allow local sources and its role should then include "transit."
  Root node: >1 inport, 0 outports. The destination of an incasting service. The node's role should include "root." The FGP could be input agnostic or input specific.
  Split node: one inport, >1 outports. Used for multicasting service. Comes in input specific version.
  MC start node: 0 inputs, >=1 outports. Used to start a multicasting service. If the MC start node has a single output, then the part has the same form as a start node but its role should include "MC ingress" instead of "ingress."

A dynamic FG part has either its inports or outports set to be dynamic. A dynamic port is set by communication with a USAT neighbor and thus requires inter-node USAT signaling.

A data structure for a dynamic FGP might simply be the same as the fixed FGP with the option of specifying "?" for the directional inports or outports. However, other fields may be needed or useful. For instance, it may be useful to specify possible allowable values for a dynamic port.

Note that since FGP and FGPLs may be re-used by different USATs, each USAT is able to make its own dynamic port selections. This means that the chosen dynamic port cannot be part of the FGP or FGPL data structure. Rather, the chosen port should be part of the USAT part. So, for instance, for a point-to-point service using PartialPath and dynamic FGPs, the outport of a node is fixed and contained within the active FGP, whereas the inport of a node is dynamic and contained within the USAT. The upstream port is received from its USAT upstream neighbor. So the internode signaling requirement is for two USAT parts which are part of the same USAT to be able to talk to each other; there are no signaling requirements for USAT parts from different USATs to talk to each other, or for FGP or FGPLs to talk to each other. Thus, the signaling protocol supports intra-USAT, inter-node, messaging.

Another application of the signaling is to distributively turn a glow ON or indicate an installation failure. That signaling will likely be needed prior to signaling for supporting dynamic ports.

To improve robustness and reduce transients, it might be useful to include some safety parameters around the flexibility port fields, e.g. the maximum number of ports to be active at any one time. However this could be associated with a fabric graph part, or associated with a fabric graph list, or the USAT itself.

FGPL is a data structure created by Fitting and distributed to the nodes which adds local variables. It is just a list of FGPs, a mode of operation for those parts, a real time status variable, and a real time selection of the active part.

A Fabric Graph Part List Data Structure may include:
fgl_part_id: A globally unique identifier. By convention, graph lists start with fglp.
fgl_part_fg_partss: List of fabric graph part id's
mode of operation: {0, 1, 2, . . . }
fgl_part node: The node that this part is assigned to
Local Variations:
fgl_current_status: {Valid,Invalid}
fgl_activefgp: The fgp_id of the selected part using the mode of operation Validity rules determine if a given graph is valid at a node. A validity rule is a TRUE/FALSE Boolean operation on network state variables.

A validity rule is specified by Fitting, given an id, and distributed to the nodes. FGPs at a node refer to the validity rules thru the rule id, and the nodes need not have any concept of what this validity rule checks, e.g. the downstream path, upstream path, an entire tree, etc., in order to implement it. In fact, changing a validity rule to a group of standard representations is counter productive as validity rules are more general than those concepts. For example, there are use cases for invalidating a path to a destination if one or more links on a different path becomes invalid. Thus, restricting validity rules to fit into standard forms like full path validation, partial path validation will limit the use cases of USATs. The most common example of this would be placeholders. Another example would be 1+1 protected constructions.

USAT v1.0 uses AND type validity rules. So each validity rule can be symbolically represented as: AND(ns1,ns2, . . . nsj), where ns1 is a network state variable, generally indicating the operational status of a node or link.

One non-limiting example of network state variables that can be used in validity rules are:
Node status: up/down
L2 fabric link status: each L2 link in the peering graph has an up/down status (Which may be before/after LAG).
L1 fabric link status: each L1 link has an up/down status (Based on CDR and LOL, and assumes L1 topology known). L1 state variables are not needed for L2 only services using partially specified L2 ports.
Generic access port status: each generic access port is either up/down. If port groups are used, the group is considered UP if at least one port is up. Access port status is used to invalidate FGPs which make use of them for midpoint add/drop (If they are used, the FGP turns invalid and a new FGP can be chosen. If they are not used, the glow should indicate that the glow will fail if the midpoint add/drop port does not verify. Failed glows do not reroute to alternate paths, so these two approaches have different behavior).

The variable can be true iff the element exists and is operational; so it will return false if the link is not operational or does not exist. Transient suppression may be introduced into the state variable itself, and/or into the validity rules.

The FMS deals with changes to these variables. So, e.g., upon notification of a change in network state, the FMS determines if any validity rule has changed value, and if so, to then change the active graph selection of any FGPL that has been affected.

To support smart graphs, a more generic Boolean structure may be used that can perform AND's of OR's, e.g.:
AND(OR(ns1, ns2), OR(ns3,ns4), ns5)

For instance, ns1 and ns2 could be the operational status of two parallel links between the same set of nodes, either of which could be used on in the FG. Similarly, for ns3 and ns4, whereas the ns5 represents a 3rd hop downstream from this node which has a single link choice.

Other logical combinations may be useful in the future.
Additional state variables include:
L2 bidirectional link status: If each direction of an L2 link is operational.
L2 link congestion: TRUE if some traffic threshold exceeded for some length of time.
Time of Day: TRUE during a specific time of day, used for maintenance windows, time of day traffic engineering, etc.
Attachment Rule: TRUE if some attachment rule is set that is different than the attachment table, for instance a stricter rule based on time last seen, or a looser rule for a source/destination which is known to go quiet but trusted to be at a location.

Anything that the network measures could be made into a state variable and used in a validity rule in a generic Boolean operation.
Other USAT options:
There is no USAT validity rules. A USAT is declared active or inactive by Fitting but there is no real time operation. The USAT's fabric graph list has real time operation, but not the USAT itself. USAT validity has been considered for USAT internetworking but such functionality is not needed so the extra complication has not been added. Rather, internetworking is achieved through the use of glow groups. So glows can be made to depend upon each other, but USATs are not.

Generalized ports and locations can be expanded to include internal addresses for internal USATs and mixed USATs. Example use case would be to address the timing chip and build a timing tree using an internal USAT.

The USATs could be organized into Fits. This would allow multiple Fits to be stored on the nodes and central control could then easily switch between them with a single command.

Load balancing can be done onto a group port for midpoint servicing. Generally this can be accomplished by forming a group port, consisting of the desired generic ports. The local switch manages the connections to them. The glows could contain load information to help in the load balancing.

Alternate ON variables might be useful in a glow, to deal w/alternate path routings e.g. if the midpoint add/drop port fails on a switch.

Table 2 describes various service examples. These include the unprotected examples and protected examples. Also shown is the priority of each service which is used to resolve resource conflicts.

TABLE 2 illustration of service examples

| | Unidirectional | | Bidirectional | |
|---|---|---|---|---|
| Unprotected | Protected | Unprotected | | Protected |
| 1: Pt-to-Pt Stub (1) | | 1-B: Bidirectional Pt-to-Pt Stub (3) | | |
| 1a: w/multi-dest. (2) | | | | |
| 2: Pt-to-Pt Path (4) | 2-P1: TPV Protected | 2-B | | 2-B-P1 |
| | 2-P2: PVP Protected | | | 2-B-P2 |
| | 2-P3: 1 + 1 Protected | | | 2-B-P3 |
| 2a. w/multi-dest (5) | 2a-P1 | | | |
| | 2a-P2 | | | |
| | 2a-P3 | | | |
| 2b. w/add/drop (6) | 2b-P1 | 2b-B | | 2b-B-P1 |
| | 2b-P2 | | | 2b-B-P2 |
| | 2b-P3 | | | 2b-B-P3 |
| 3. Pt-to-multipoint multicast w/multi-dest. (7) | 3-P1 | | | |
| | 3-P2 | | | |
| | 3-P3 | | | |

The first three services (1, 1a, and 1-B) are L1 services on a stub node. Let the node be node 1, and denote the three services as:

Service 1: b1→b2'
Service 1a: b3→{b4', b5', b6'}
Service 1-B: b7↔b8

All three services can be served with a single USAT, U1, $$U1 = GS1 : FL1 = \{g1, g1a, g1-B\} : (fg1)$$

Note that a single Fabric Graph is used, even for the bidirectional case. The ports in g1, g1a, and g1B, do not conflict. If they did, then the priority field would resolve the conflicts. The priority is: g1>g1a>g1B. Multi-glow examples which could conflict or compete for table resources will be done later.

A USAT U1 data structure includes:
usat_id: U1
usat_default_status: Active
usat_type: External
usat_connectivity: Point-to-Point
usat_protection_type: Unprotected
usar_participating_nodes: {1}
usat_src_attachment_layer: L1
usat_dest_attachment_layer: L1
usat_glow_sets: GS1
usat_graph_list: FL1

The src/dest attachment layer fields are shown as included. However, these may not be used in all examples, for example, stubs where there are no fabric ports.

The common stub fabric graph is defined as follows. Let node 1 be the stub node. A fabric graph is an unordered set of fabric graph parts. Let fg1 be the fabric graph which consists of one part, fg1={fg1.p1}, The stub's Fabric Graph Part includes:
fg_part_id: fg1.p1
fg_id: fg1
fg_part_directionally: NULL
fg_part_node: 1
fg_part_fixed_inports: { }
fg_part_dynamic_inports: { }
fg_part_fixed_outports: { }
fg_part_dynamic_outports: { }
fg_part_roles: (stub)
fg_part_validity: I(1)

Instead of Stub, the dual roles (ingress and egress) could be defined. In this option, the glows specify instructions of the form @(ingress & egress), @ v(ingress & NOT egress), and @(NOT ingress & egress). Since stub instructions are significantly different than ingress or egress instructions, the less verbose approach is used here. But both are architecturally supported.

In this non-limiting embodiment, the fabric graph parts are not re-used across fabric graph id's. If they were, fg_id could be replaced with a set of fabric graphs instead of a single ID. However, each fabric graph part is managed by the nodes as part of a USAT, even if it's used across USATs. An advantage of re-using fabric graph parts is to reduce the number of validity checks that are made. It may make more sense to let these validity checks be re-used.

Since there are no fabric ports, this graph part is equally valid for L and L2 attachments.

An example stub Glow 1 Data Structure may include:
glow_id, g1
glow_set_id: GS1
glow_type: Point-to-Point
glow_default_status: ACTIVE
glow_priority: 1
glow_order: (1,1)
glow_attributes: {Do not split, Do not merge}
role_instructions: @stub ON=verify(<b1,→) & verify (<b2',→); If ON, connect(<b1,→→<b2',→,L1)

An example stub Glow 1a Data Structure may include:
glow_id: g1a
glow_set_id: GS1
glow_type: Point-to-Point
glow_default_status: ACTIVE
glow_priority: 2
glow_order: (1,2)
glow_attributes: {Do not merge}
role_instructions: @*stub ON=verify(<b3,→) & (verify (<b4',→) OR verify(<b5',→) OR verify(<b6',→)); If ON, connect(<b3,→→{<b4',→.<b5',→,<b6, →},L1)

An example stub Glow 1b Data Structure may include:
glow_id: g1-B
glow_set_id: GS1
glow_type: Point-to-Point
glow_default_status: ACTIVE
glow_priority: 3
glow_order: (1,3)
glow_attributes: {Do_not_merge, Do_not_split}
role_instructions: @stub ON=verify(<b7,→) & verify (<b7',→) & verify(<b8,→) & verify(<b8',→); ON, connect({<b7,→→<b8',→, <b8,→→b7',→. L1)

The action verify(<x,→) should return TRUE iff port x is operational and configured properly for traffic.

Connect( ) is used as a generic steering function with options, like L1 in this case, to indicate the type of connection that is desired.

The glow_order field has no meaning for pure L1 circuits because the XBAR is order invariant. The convention here is that L1 circuits get order (1,priority).

Do_not_split and Do_not_merge do not play any role here as those are mainly for transient suppression and composite USATs.

Since U1 has a default state of Active, it starts out active at the participating nodes, which in this case is just node 1. Since the USAT is active, node 1 will perform the following:

The FMS monitors U1's fabric graph list, FL1, and determine its state based on the validity rule. In this case, there is just a single graph part fg1.p1 with a validity rule testing if node 1 is operational. Therefore, the FMS will set fg1.p1 as active unless the node is in a non-operational state, e.g. maintenance mode, in which case it will set fg1.p1 as inactive. Furthermore, it will set FL1 as active or inactive based on the state of fg1.p1 and note FL1's roles for itself (node 1).

If FL1 is active, the FMS reports its roles in U1 to the GMS, which in this case is just "stub." If inactive, the FMS reports "inactive" to the GMS for U1.

The FMS continually monitors the validity of fg1.p1 and reports any changes in roles to the GMS.

The GMS monitors each glow in U1's glow sets, which in this case are g1, g1a, and g1B. After installation, the GMS assigns ON/OFF local status variables to g1, g1a, and g1B for each USAT they are a part of (in this case, just U1). The glows start OFF.

Since g1's default status is active, node 1 will look at its role instructions in g1

If its role is "inactive," then the GMS will do nothing.

If its role includes "stub", then the GMS looks at its instructions, which

First tells node 1 to verify b1 and b2'. If they both verify. e.g. both are operational, then it will turn the g1 part local status to ON. If there were other participating nodes, it would inform the other participating nodes of g1 part's local status. If either one does not verify, the g1 part is OFF.

Second, if g1 is ON, it instructions node 1 to directionally connect b1 to b2'. The TMS then sends a request to the TMS along with g1's priority and order fields and instructions not to merge or split the signal (if the TMS fails, then GMS retries the request again with an exponential back-off algorithm).

If at a later time, b1 or b2' become unoperational, or the FMS reports U1 is inactive, then the GMS turns g1 off and requests the TMS to release the connection between b1 and b2' (since Persist was not set as an option). The TMS will then reconnect b1 and b2' based on the base topology—e.g., that could be to connect b1 and b2' to the packet chip, or it could be something completely different.

Since g1a's default status is active, node 1 will look at its role instructions in g1a, If its role is "inactive," then the GMS will do nothing.

If its role is "stub", then the GMS looks at its instructions, which

First tells node 1 to verify b3, b4', b5', and b6'. If b3 verifies and at least one of b4', b5', b6', verify, then it will turn the g1 part local status to ON. If there were other participating nodes, it would inform the other participating nodes of g1a part's local status. If either one does not verify, the g1a part is OFF.

Second, if g1a is ON, it instructions node 1 to connect b3 to {b4', b5', b6'}. The GMS remove the unoperational ports from the destination list and then sends a request to the TMS to make the multicast connection between b3 and the operational destination ports along with g1's priority and order fields and instructions not to merge or split the signal (The failure behavior may be specified. If for instance, all three ports were operational, but one port had an output conflict, then the TMS would fail the request since it was a joint request. The GMS would then decide if to resubmit the request with fewer ports, which in this case it would).

If at a later time, b3 becomes unoperational OR all the destinations {b4',b5',b6'} become unoperational OR the FMS reports U1 is inactive, then the GMS turns g1a off and requests the TMS to release the connections (since Persist is not set). The TMS will then reconnect b3, b5', b5', and b6' to the base topology.

If at a later time, some operational port becomes unoperational, then that connection is released. If at a later time, an unoperational port becomes operational, then the connection request is remade with the new connection. Since there is no do not split attribute, and since this request will have the same order as the previous connections, the TMS will split the signal at b3 to add the new request. Alternatively, the entire request could be submitted again (Note that the TMS keeps the state, including order and priorities, of existing connections and works closely with the GMS to manage the node's resources. In some embodiments, parts of this functionality could be put in the GMS).

Since g1B's default status is active, node 1 will look at its role instructions in g1B, which in this case, If its role is "inactive," then the GMS will do nothing.

If its role is "stub", then the GMS looks at its instructions, which

First tells node 1 to verify b7, b7', b8, and b8'. If they all verify, then it will turn the g1 B part local status to ON. If there were other participating nodes, it would inform the other participating nodes of g1B part's local status. If either one does not verify, the g1B part is OFF.

Second, if g1B is ON, it instructions node 1 to connect b7→b8' and b8→b7'. The GMS then sends a request to the TMS along with g1's priority and order fields and instructions not to merge or split the signal. Note this is sent as a compound request so that either it is all executed or all fails.

if at a later time, g1B fails verification OR the FMS reports U3 is inactive, then the GMS turns g1B off and requests the TMS to release the connections (since Persist is not set). The TMS will then reconnect the ports to the base topology.

If at a later time, g1B verification passes again, then the connection requests are re-made.

There are two attributes which could be chosen: block and persist, creating three possible variations of the above for each glow.

Block instructs the node to block the service access ports if either the glow is OFF or the fabric path returns and inactive role. The former occurs primarily with an attachment verification failure; the latter with lack of a viable path on the path list. The block behavior is either done in both cases, or not done in both cases. If separation is desired, e.g. block upon lack of a path, but do not block upon a verification failure, then an action block( ) could be used in the role instructions to act upon @inactive role. Note that care must be taken when using Block to build composite structures so as to not block the common input port to an L1 multicast.

Persist instructs the node to maintain the resources for the glow even if the glow turns OFF or its role becomes inactive. Note that a glow has to first be turned ON to grab the resources, after which it holds them indefinitely unless the glow's default status is turned OFF by Fitting. Persisting a resource is a software mechanism, it does not need to be done in hardware. The resource can be there waiting for the glow if it becomes active again and be there relatively quickly. A persisted glow would still get bumped for a higher priority glow if competing for the same resource.

Below are details on how these attributes affect the three services.

glow 1.
1. If g1 contains Block, then either g1 being OFF or the node's role being inactive will cause both ports b1 and b2' to be blocked (Note that the requirement is to block the input port b1 and the output port b2', not the corresponding reverse directions of each port).
2. If g1 contains Persist, then the connection between b1 and b2' will be maintained even if the glow transitions from ON to OFF, or the node's role in inactive.
3. If both Persist and Block are present, then combine the above two features.

So, for example, for the 3rd case:
The GMS monitors each glow in U1's glow sets, which in this case is just g1. Since g1's default status is active, node 1 will look at its role instructions in g1, which in this case,
  If its role is "inactive," then the GMS will ask the TMS to block input port b1 (receiver) and output port b2' (transceiver). The Block attribute is set using the XBAR or by turning those ports off.
  If its role is "stub", then the GMS looks at its instructions, which
    First tells node 1 to verify b1 and b2'. If they both verify, e.g. both are operational, then it will turn the g1 part local status to ON. If there were other participating nodes, it would inform the other participating nodes of g1 part's local status. If either one does not verify, the g1 part is OFF. If g1 part is off, then ports b1 and b2' are blocked.
    Second, if g1 is ON, it instructions node 1 to connect b1 to b2'. The TMS then sends a request to the TMS to connect b1 and b2' along with g1's priority and order fields and instructions not to merge or split the signal.
    If at a later time, b1 or b2' become unoperational, or the FMS reports U1 is inactive, then the GMS turns g1 off, blocks b1 and b2', but persists the connection between the two (since Persist was specified). The main feature of this persist is that it will continue to block conflicting requests for b1 and b2'; it does not need to be a hardware persist in this situation.

glow g1a
The three possible variations of the above are:
1. If g1a contains Block, then either g1a being OFF or the node's role being inactive will cause all ports b3,b4', b5',b6', to be blocked. If an individual destination port goes down, then that port is blocked.
2. If g1 contains Persist, then transition of a glow from ON to OFF will not cause the release of the connection. Similarly, an output port going down will not cause the release of the connection to that port so that if that port comes back up there will be no conflicts for this resource.
3. If both Persist and Block are present, then combine the above two features.

g1B
The three possible variations of the above are:
1. If g1B contains Block, then either g1B being OFF or the node's role being inactive will cause all ports to be blocked. Note any port going down turns g1B off.
2. If g1B contains Persist, then transition of a glow from ON to OFF will not cause the release of the connection.
3. If both Persist and Block are present, then combine the above two features.

Now consider providing L1 services between nodes 1 and node 5. Let the L1 ports on node 5 be j1, j2, . . . . The shorthand notation (p,n) is used to mean L1 port p on node n, rather than the more complete notation (<p,→,n). The full notation is used in the glows. The three unprotected unidirectional services are:
  Service 2: (b9,1)→(j1',5)
  Service 2a: (b10,1)→{(j2',5),(3',5),(j4',5)}
  Service 2b: (b11,1)→(f1',3)→(f2,3)→(j5',5)
where Service 2b means that there is a midpoint add/drop where the signal is dropped out of port f1' on node 3, and then into port f2 on node 3, before reaching its destination at j5' on node 5. Note the reverse direction of this service 2b-B will start at (j5,5), drop at (f2',3), add at (f1,3), and terminate at (b11',1). Note that all of these are access ports and fabric ports should not appear in external service descriptions.

If these were packet services, they could be served with a single USAT. However, since L1 circuits cannot share a fabric link, three different USATs are used with three different link-disjoint paths through the network, fg2, fg2a, and fg2b, fg2b goes through node 3; the others are not required to do so. However, for simplicity we will assume that fg2a=fg2b=fg2, which means that only one of these USATs can be active in the network. So in this case, we have
  Services 2: U2=GS2: FL2={g2}: (fg2)
  Services 2a: U2a=GS2a: FL2={g2a}: (fg2)
  Services 2b: U2b=GS2b: FL2={g2b}: (fg2)

Since only one of these services can served at any time, we will set U2 to be active and the other USATs to be inactive.

The three USAT data structures are all very similar, differing in their glow set and fabric list fields.

The USAT U2 Data Structure may include:
usat_id: U2
usat_default_status: Active
usat_type: External
usat_connectivity: Point-to-Point
usat_protection_type: Unprotected
usat_participating_nodes: {1, 2, 3, 4, 5}
usat_src_attachment_layer: L1
usat_dest_attachment_layer: L1
usat_glow_sets: GS2
usat_graph_list: FL2

The USAT U2a Data Structure may include:
usat_id: U2
usat_default_status: Inactive
usat_type: External
usat_connectivity: Point-to-Point
usat_protection_type: Unprotected
usat_participating_nodes: {1, 2, 3, 4, 5}
usat_src_attachment_layer: L1
usat_dest_attachment_layer: L1
usat_glow_sets: GS2a
usat_graph_list: FL2a The USAT U2b Data Structure may include:
usat_id: U2
usat_default_status: Inactive
usat_type: External
usat_connectivity: Point-to-Point
usat_protection_type: Unprotected
usat_participating_nodes: {1, 2, 3, 4, 5}
usat_src_attachment_layer: L1
usat_dest_attachment_layer: L1
usat_glow_sets: GS2b
usat_graph_list: FL2b We choose fg2 to go through nodes 1, 2, 3, 4, 5. Let fg2.px be the fabric graph for node x. So
fg2={fg2.p1,fg2.p2,fg2.p3,fg2.p4,fg2.p5},
where the Fabric Graph fg2 is shown in Table 3.

$I(<h98,\rightarrow\rightarrow<j92,\rightarrow)$ "directional link from 4 to 5 operational"

The Glow 2 Data Structure includes:
glow_id: g2
glow_set_id: GS2
glow_type: Point-to-Point
glow_default_status: ACTIVE
glow_priority: 4
glow_order: (1,4)
glow_attributes: {Do_not_split, Do_not_merge}
role_instructions: @ingress—ON=verify(<b9,→); If ON, connect(<b9,→→outport; @transit—If ON, connect (inport→outport); @egress—ON=verify(<j1',→): If ON, connect(inport→<j1',→)

The Glow 2a Data Structure includes:
glow_id: g2a
glow_set_id: GS2
glow_type: Point-to-Point
glow_default_status: ACTIVE
glow_priority: 5
glow_order: (1.5)
glow_attributes: (Do not merge)
role_instructions:@ingress—ON=verify(<b10,→); ON, connect(<b10,→→outport; @transit—If ON, connect (inport→outport); @egress—ON=verify(<j2',→) OR verify(<j3',→) OR verify(<j4',→); If ON, connect (inport→<j2',→, <j3',→, <j4',→)

The Glow 2b Data Structure includes:
glow_id: g2b
glow_set_id: GS2
glow_type: Point-to-Point
glow_default_status: inactive
glow_priority: 6
glow_order: (1,6)
glow_attributes: {Do_not_merge, Do_not_split}
role_instructions: @ingress—ON=verify(<b11,→); If ON, connect(<b11,→→outport; @transit & NOT add/drop1 & NOT add/drop2-If ON, connect(inport→outport); @transit & add/drop1—ON=verify(<f1',→) & verify(<f2,→); If ON, {connect(inport→<f1',→; connect(<f2,→→output);}@transit & add/drop2—ON=verify(<p1,→) & verify(<p2,→); If ON, {connect

TABLE 3 illustration of Fabric Graph fg2

| fg_part_id | fg2.p1 | fg2.p2 | fg2.p3 | fg2.p4 | fg2.p5 |
|---|---|---|---|---|---|
| fg_id | fg2 | fg2 | fg2 | fg2 | fg2 |
| fg_part_directionality | UNI | UNI | UNI | UNI | UNI |
| fg_part_node | 1 | 2 | 3 | 4 | 5 |
| fg_part_fixed_inports | { } | <d95, -> | <f90, -> | <h100, -> | <j92, -> |
| fg_part_dynamic_inports | { } | { } | { } | { } | { } |
| fg_part_fixed_outports | {<b100', ->} | <d96, -> | <f95', -> | <h98, -> | { } |
| fg_part_dynamic_outports | { } | { } | { } | { } | { } |
| fg_part_roles | {Ingress} | {transit} | {transit, add/drop1} | {transit} | {Egress} |
| fg_part_validity | vr1 | vr1 | vr1 | vr1 | vr1 |

As used in Table 3, vr1=I(1) & I(2) & I(3) & I(4) & I(5) & "all the nodes are operational"

$I(<b100',\rightarrow\rightarrow<d95\rightarrow)$ & "directional link from 1 to 2 operational"

$I(<d96',\rightarrow\rightarrow<90,\rightarrow)$ & "directional link from 2 to 3 operational"

$I(<f95',\rightarrow\rightarrow<h100,\rightarrow)$ & "directional link from 3 to 4 operational"

(inport→<p1',→; connect(<p2,→→output);}
@egress—ON=verify(<j5',→); If ON, connect (inport→<j5',→)

Each participating node of a USAT gets its fabric graph part. Since U2a and U2b are inactive, the nodes do nothing with those USATs unless they are made active by Fitting. U2 is active, so node 1 installs fg2.p1, node 2 installs fg2.p2, etc.

Consider node x, x=1, 2, 3, 4, 5. After installation of U2 and fg2.px,

Since U2 is Active, node x sets local variables associated with fg2.px in U2 (In embodiments where fabric graph parts are re-used on different USATs, then these local variables are tracked per (fabric graph part, USAT) pair),
status: inactive
inport: NULL
outport: NULL
roles: {inactive}

Node x then evaluates the fg2.px validity function.
If v1 returns FALSE, it does nothing and keeps evaluating v1.
If v1 returns TRUE, meaning that those elements are operational, then the node changes its status to active and sets its roles, inport and outport based on the values in the fabric graph part.

The above describes the operation of the FMS for an unprotected system with a single fabric graph part. These systems are unique in that the input/output ports are fixed and there are no alternate paths.

If the service was protected, then there would be alternate paths and therefore a node cannot just change its fabric graph status to active based on its validity rule being TRUE. For example, if all links and nodes are operational, then the above would set all the participating nodes to active causing their GMS to install table entries for every glow that is turned on. Rather, some coordination with other nodes is required to determine the local active/inactive status. In addition, if partially valid rules are used, then the input ports of the fabric graph should be dynamic which also requires neighbor coordination.

Since U2 is active, g2 is installed at the node. Note that g2b default status is Active but it is not installed because it is part of U2b which is inactive.

At node 1:
After installation, g2 is given a local ON/OFF status variables for each USAT it is a part of. They are all set to OFF.
The GMS will monitor each glow in U2's glow sets, which in this just g2.
Since g2's default status is active, the GMS will check its instructions. It will ask the FMS for its role.
If its role is inactive, then the GMS will do nothing and the glows stay OFF. If asked to be turned ON by another participating node, it will vote No, thereby vetoing the glow ON process.
If its role is ingress, then the GMS will verify input port b9. If it passes verification, the GMS will signal all the other participating nodes that it wishes to turn glow g2 ON. It waits until it gets an "ok" acknowledgement from all the other participating nodes. If it receives a message indicating not to turn the glow on, then it leaves it off. If all other participating nodes say "ok", then it turns the glow ON (This check may be limited to other active nodes since no response from an inactive node may be received, such as, in cases where inactive nodes are not operational or reachable).
If g2 is on,
it first requests the value of "outport" from the FMS, which should return b100'.
it then asks the TMS to connect b9→b100' along with priority and order fields
If at a later stage, b9 becomes inoperative, the GMS tells all the participating nodes that g2 is turning OFF using a robust protocol, and asks the TMS to release the local b9→b100' connection. The TMS will then reconnect b9 and b100' using the base topology. (if the Persist attribute had been set, then the connection is not released.)
if at a later stage, node 1 receives a message that g2 should be turned off, it turns it off, communicates this to the other nodes, and asks the TMS to release the connection unless Persist is set.

At nodes 2, 3, 4:
After installation, g2, is given an ON/OFF status variables for each USAT it is a part of. They are all set to OFF.
The GMS will monitor each glow in U2's glow sets, which in this just g2.
Since g2's default status is active, the GMS will check its instructions. It will ask the FMS for its role.
If its role is inactive, then the GMS will do nothing and the glows stay OFF. If asked to be turned ON by another participating node, it will vote No, thereby vetoing the glow ON process.
If its role includes transit, then the GMS will wait until it receives a notification that the glow is to be turned on (Node 3 ignores the "add/drop" role for g2 and g2a because they do not have add/drop instructions). If the GMS receives a request to turn ON the glow from the ingress, it will respond OK It will then wait to get a verification that the glow is turning on. If it gets that verification then it will turn the glow on locally.
If g2 is on,
it requests the values of "inport" and "outport" from the FMS.
For node 2, this will return d95 and d96'
For node 4, this will return h100 and h98'
it then asks the TMS to connect inport→outport along with priority and order fields
If the TMS fails, then this information has to be propagated to the other participating nodes.
if at a later stage, the node gets an instruction to turn the glow off, the GMS asks the TMS to release the local inport→outport connection. The TMS will then reconnect inport and outport using the base topology. (If the Persist attribute had been set, then the connection is not released.)
The GMS of a transit node ALMOST never itself requests that a glow be turned ON or OFF.
The one exception is in the event that the ingress node fails and is unable to turn off the glow at the other nodes. In this case, the egress node takes responsibility. If both the ingress node and the egress node fail, then we will need a protocol for the other nodes to turn a glow OFF. One method might be to just add commands to the glow's instructions. For instance, this to the glow's instructions.
One approach is to add an ON=I(1) & I(5) action at the transit nodes indicating that the transit nodes should check for the operational status of nodes 1 and 5. Having this action means they have the responsibility to reply with a negative response to a glow request if their ON indicator is different. Also this means they can initiate requests to turn a glow ON/OFF. One disadvantage to this approach is that nodes 1 and 5 are now hard coded into the action instructions meaning that this glow cannot exist on another USAT with a different ingress or egress node. Instead, node 1 could request the identity of ingress and egress from the FMS and this would have to be worked into the protocols.

At node 5.

After installation, g2 is given an ON/OFF status variables for each USAT it is a part of. They are all set to OFF.

The GMS will monitor each glow in U2's glow sets, which in this case is just g2.

Since g2's default status is active, the GMS will check its instructions. It will ask the FMS for its role.

If its role is inactive, then the GMS will do nothing and the glows stay OFF. If asked to be turned ON by another participating node, it will vote No, thereby vetoing the glow ON process.

If its role is egress, then the GMS will verify output port j1'. If it passes verification, the GMS will signal all the other participating nodes that it wishes to turn glow g2 ON. It waits until it gets an "ok" acknowledgement from all the other participating nodes. If it receives a message indicating not to turn the glow on, then it leaves it off. If all other participating nodes (or just those which are active) say "ok", then it turns the glow ON. Since it has an ON( ) action, it also has the responsibility to reply in the negative to a request if its local status is different (One way to view this is that each node has a local status variable which is either ON/OFF/NULL. Nodes with ONO actions have ON/OFF, other nodes have NULL. There is a distributed protocol which synchronizes everybody such that they are all ON iff there are no OFFs).

If g2 is on,
it first requests the value of "inport" from the FMS, which should return j92.
it then asks the TMS to connect inport→j1' along with priority and order fields
If at a later stage, j1' becomes inoperative, the GMS tells all the participating nodes that g2 is turning OFF using a robust protocol, and asks the TMS to release the local inport→j1' connection. The TMS will then reconnect inport and j1' using the base topology. (If the Persist attribute had been set, then the connection is not released.)
if at a later stage, node 5 receives a message that g2 should be turned off, it turns it off, confirms this with the other nodes, and asks the TMS to release the connection unless Persist is set.

If instead of U2 being active, U2a was made active, then g2a is installed in nodes 1, 2, 3, 4, 5 as part of U2a instead of g2 being installed as part of U2.

The operation of the GMS is the same as for g2 except at node 5 since there are multiple destination ports. Here the operation is similar except for the details of handling many destination ports.

If instead of U2 being active, U2b was made active, then glow g2b would be installed at nodes 1, 2, 3, 4, 5.

However, then nothing would happen because g2b's default status is Inactive. If at a later time, g2b's default status was made active, then nodes 1, 2, 4, 5 would behave the same as for g2, and the add/drop node 3 would behave as:

At node 3:
After installation, g2b is given a local ON/OFF status variables for each USAT it is a part of. They are all set to OFF.
The GMS will monitor each glow in U2b's glow sets, which in this is g2b.
Since g2b's default status has been made active by fitting, the GMS will check its instructions. It will ask the FMS for its role.
If its role is inactive, then the GMS will do nothing and the glow stay OFF. If asked to be turned ON by another participating node, it will vote No, thereby vetoing the glow ON process.
If its role includes transit and add/drop, then
it first executes the ONO action, which verifies the drop f1' and add ports f2. Presence of the ONO action indicates that this node will participate in the glow ON/OFF voting protocol described earlier. In particular, what is needed is that the ports verifying is a gating condition for the glow to be on at the other participating nodes.
Note that failure of one of these ports leads to the glow being turned OFF, not being moved to an alternate path if protection were available. The reason is that in USAT v1.0, an individual glow must follow the same path as all the other glows on the USAT, e.g. a USAT cannot have two active paths at once, except during transitions. So the ports are not part of the protection domain, similar to MLAG. Like MLAG, we are able to provide a similar service using a composite structure. This is an example where glow groups are useful.
If g2b is on,
it requests the values of "inport" and "outport" from the FMS.
For node 3, this will return f90 and f95'
it then asks the TMS to connect inport→f1' and f2→outport along with priority and order fields
If the TMS fails either of these, then this information has to be propagated to the other participating nodes (Similar to an add/drop port failing, the failure of a glow to install does not cause the glow to move to another path).
if at a later stage, the node gets an instruction to turn the glow off, the GMS asks the TMS to release the local inport→outport connection. The TMS will then reconnect inport and outport using the base topology. (If the Persist attribute had been set, then the connection is not released.)
The GMS of an add/drop node does participate in the glow ON/OFF voting protocol as described above. Also, it must also participate like a transit node in the event an ingress node fails.

In some embodiments, the Block attribute may be set, then failure of the glow to initially turn ON will cause the signal to be blocked at the ingress and egress. Similarly, for a later failure of the glow. Note that failure of the path causes the nodes to declare themselves as having role inactive which leads to the glow turning off.

If Persist is not set, then the L1 links are returned to the base topology. The one exception to this is the ingress and egress access ports if the Block attribute is set.

Consider just a single service:
Service 3: (b12,1)→(b13',1), (b14',1), (d1',2), (d2',2), (j6',5), (r1',9), (t1',10), (t2',10)

In other words, the L1 multicast starts at port b12 on node 1, and is delivered to two ports on node 1, two ports on node 2, one port on node 5, one port on node 9, and two ports on node 10. This is an unprotected service.

Composite USATs can be used to fulfill this service in order to support native multicasting, in particular, to divide Service 3 into 5 services:

Service 3i: (b12,1)→(b13',1), (b14',1) for traffic from 1 to 1

Service 3ii: (b12,1)→(d',2), (d2',2) for traffic from 1 to 2

Service 3iii: (b12,1)→(j6',5) for traffic from 1 to 5

Service 3iv: (b12,1)→(r1',9) for traffic from 1 to 9

Service 3v: (b12,1)→(t1',10), (t2',10) for traffic from 1 to 10 all with the same priority 7 and table order (1,7). Notice that all the services are similar to those in the examples above. In particular, Service 3i is the same as Service 1b, an unprotected stub with multi-drop Services 3ii, 3iii, 3v are the same as Service 2a, unprotected pt-to-pts with multi-drop Service 3iv is the same as Service 2, unprotected pt-to-pt We then form five USATs which together satisfy Service 3:

Services 3i: U3i=GS3i: FL3i={g3i}: (fg3i)
Service 3ii: U3ii=GS3ii: FL3ii={g3ii}: (fg3ii)
Service 3iii: U3iii=GS3iii: FL3iii={g3iii}: (fg3iii)
Service 3iv: U3iv=GS3iv: FL3iv={g3iv}:(fg3iv)
Service 3v: U3v=GS3v: FL3v={g3v}: (fg3v)

where there is one USAT per source node—destination node pair.

Since U3i is for intra-node traffic at node 1, we can re-use the fabric graph given above. Thus, we have U3i=GS3i: FL1=(g3i): (fg1). Using the symbols from above, we have FL3i=FL1, fg3i=fg1, and thus fg3.p1=fg1.p1.

Also, since U3i has a multi-drop, the glow g3i is the same as g1a except with the port numbers changed.

The USAT U3i data structure may include the following fields:
usat_id: U3i
usat_default_status: Active
usat_type: External
usat_connectivity: Point-to-Point
usat_protection_type: Unprotected
usat_participating_nodes: {1}
usat_src_attachment_layer: L1
usat_dest_attachment_layer: L1
usat_glow_sets: GS3i
usat_graph_list: FL1

Note: There is an implementation choice here on re-using fabric graphs. In particular, a fabric graph can be re-used by multiple USATs. In one model, a fabric graph is USAT specific but validity rules are shared across USATs so the major computation of a fabric graph is not unnecessarily repeated. In another model, a fabric graph can be re-used across USATs. In this case, fabric graph parts' local variables, e.g. active v, inactive, are maintained per USAT. Although the fabric graph may be re-used, the fabric graph list may vary from USAT to USAT, thus a fabric graph may be active in one USAT but inactive in another. In addition, for dynamic ports, the active in or out ports may vary from USAT to USAT.

Per USAT local variables are not used if the fabric graph lists are identical. There are some special cases where this occurs naturally: a) a stub network, b) unprotected USATs with fixed fabric graphs. However, in general, if the fabric graph lists are identical, then it's possible the USATs can be combined into a single USAT. However, this might not be desirable because maybe one USAT is set to be inactive and the other as active, because the inactive one is going to replace the active one.

The Glow g3i Data Structure may include:
glow_id: g3i
glow_set_id: GS3i
glow_type: Point-to-Point
glow_default_status: ACTIVE
glow_priority: 7
glow_order: (1,7)
glow_attributes: {Do not merge}
role_instructions: @stub ON=verify(<b12,→) & (verify (<b13,→) OR verify(<b14',→); If ON, connect (<b12,→→{<b13',→, <b14',→},L1)

U3ii is satisfied with the direct path from node 1 to node 2. Note however that fg3ii< >{fg2p1,fg2p2} since 1) the fg3 parts use different validation rules as the fg2 parts since fg3ii is focused on the link between nodes 1 and 2

2) there is no outport at node 2 in fg3ii 3) node 2 has role "egress" in fg3ii, but role "transit" in fg2.

The Fabric Graph fg3ii parts are shown in Table 4.

TABLE 4 illustration of Fabric Graph fg3ii

| fg_part_id | fg3ii.p1 | fg3ii.p2 |
|---|---|---|
| fg_id | fg3ii | fg3ii |
| fg_part_directionality | UNI | UNI |
| fg_part_node | 1 | 2 |
| fg_part_fixed_inports | { } | <d95, -> |
| fg_part_dynamic_inports | { } | { } |
| fg_part_fixed_outports | {<b100', ->} | { } |
| fg_part_dynamic_outports | { } | { } |
| fg_part_roles | {Ingress} | {Egress} |
| fg_part_validity | vr3ii | vr3ii | where vr3ii=I(1) & I(2) "all the nodes are operational"
I(<b100',→→<d95,→) & "directional link from 1 to 2 operational"

The glow g3ii is the same as glow g2a.

The Glow g3ii Data Structure includes:
glow_id: g3ii
glow_set_id: GS3ii
glow_type: Point-to-Point
glow_default_status: ACTIVE
glow_priority: 7
glow_order: (1,7)
glow_attributes: {Do_not_merge}
role_instructions: @ingress ON=verify(<b12,→), and If ON, connect(<b12,→→outport: @transit If ON, connect (inport→outport); and @egress ON=verify(<d1',→) OR verify(<d2',→), and If ON, connect(inport→<d1',→, <d2',→).

U3iii is satisfied with the direct path on nodes 1,2,3, 4, 5 using fg2, so fg3iii=fg2.

Glow g3iii is the same as g2 but with different ports.

The Glow g3iii Data Structure may include:
glow_id: g3iii
glow_set_id: GS3iii
glow_type: Point-to-Point
glow_default_status: ACTIVE
glow_priority: 7
glow_order: (1,7)
glow_attributes: {Do_not_merge}
role_instructions: @ingress—ON=verify(<b12,→), and If ON, connect(<b12,→→outport: @transit—if ON, connect(inport→outport); and @egress—ON=verify(<j6',→), and if ON, connect(inport→<j6'→).

U3iv is satisfied with the path on nodes 1, 2, 3, 4, 9. The links on 1, 2, 3, 4 will use the same links as on fg2 but do not use the same validation rule since the link from node 4 to 5 is not included. So fg3iv={fg3iv.p1, fg3iv.p2, fg3iv.p3, fg3iv.p4, fg3iv.p9}, where the Fabric Graph fg3iv is shown in Table 5.

TABLE 5 illustration of Fabric Graph fg3iv

| fg_part_id | fg3iv.p1 | fg3iv.p2 | fg3iv.p3 | fg3iv.p4 | fg3iv.p9 |
|---|---|---|---|---|---|
| fg_id | fg3iv | fg3iv | fg3iv | fg3iv | fg3iv |
| fg_part_directionality | UNI | UNI | UNI | UNI | UNI |
| fg_part_node | 1 | 2 | 3 | 4 | 9 |
| fg_part_fixed_inports | { } | <d95, -> | <f90, -> | <h100, -> | <r100, -> |
| fg_part_dynamic_inports | { } | { } | { } | { } | { } |
| fg_part_fixed_outports | {<b100', ->} | <d96', -> | <f95', -> | <h99, -> | { } |
| fg_part_dynamic_outports | { } | { } | { } | { } | { } |
| fg_part_roles | {Ingress} | {transit} | {transit} | {transit} | {Egress} |
| fg_part_validity | vr3iv | vr3iv | vr3iv | vr3iv | vr3iv | where vr3iv=I(1) & I(2) & I(3) & I(4) & I(9) & "all the nodes are operational"

I(<b100',→→<d95,→) & "directional link from 1 to 2 operational"

I(<d96',→→<f90,→) & "directional link from 2 to 3 operational"

I(<f95',→→<h100,→) & "directional link from 3 to 4 operational"

I(<h99,→→<r100,→) "directional link from 4 to 9 operational"

U3v is satisfied with the path on nodes 1, 2, 3, 4, 9, 10. The links on 1, 2, 3, 4, 9 are the same as the links used for U3iv, but the fabric graph parts are unique because they use a different validation rule which includes the link from 9 to 10.

fg3v={fg3v.p1, fg3v.p2, fg3v.p3, fg3v.p4, fg3v.p9, fg3v.p10},
where the Fabric Graph fg3v is shown in Table 6.

TABLE 6 illustration of Fabric Graph fg3v

| fg_part_id | fg3v.p1 | fg3v.p2 | fg3v.p3 | fg3v.p4 | fg3v.p9 | fg3v.p10 |
|---|---|---|---|---|---|---|
| fg_id | fg3v | fg3v | fg3v | fg3v | fg3v | fg3v |
| fg_part_directionality | UNI | UNI | UNI | UNI | UNI | UNI |
| fg_part_node | 1 | 2 | 3 | 4 | 9 | 10 |
| fg_part_fixed_inports | { } | <d95, —> | <f90, —> | <h100, —> | <r100, —> | <t100, —> |
| fg_part_dynamic_inports | { } | { } | { } | { } | { } | { } |
| fg_part_fixed_outports | {<b100', —>} | <d96', —> | <f95', —> | <h99', —> | { } | { } |
| fg_part_dynamic_outports | { } | { } | { } | { } | {r98, —>} | { } |
| fg_part_roles | {Ingress} | {transit} | {transit} | {transit} | {Egress} | {Egress} |
| fg_part_validity | vr3v | vr3v | vr3v | vr3v | vr3v | vr3v | where vr3v=I(1) & I(2) & I(3) & I(4) & I(9) & I(10) "all the nodes are operational"

I(<b100',→→<d95,→) & "directional link from 1 to 2 operational"

I(<d96',→→<f90,→) & "directional link from 2 to 3 operational"

I(<f95',→→<h100,→) & "directional link from 3 to 4 operational"

I(<h99,→→<r100,→) & "directional link from 4 to 9 operational"

I(<r98,→→<t100,→) "directional link from 9 to 10 operational"

and glow g3v is the same as glow g3ii but with different ports used in the egress instructions (and different glow set).

The Glow g3v Data Structure may include:
glow_id: g3v
glow_set_id: GS3v
glow_type: Point-to-Point
glow_default_status: ACTIVE
glow_priority: 7 glow_order: (1,7)
glow_attributes {Do_not_merge}
role_instructions: @ingress—ON=verify(<b12,→), and If ON, connect(<b12,→→outport; @transit—If ON, connect (inport→outport); and @egress—ON=verify(<t1',→) OR verify(<t2',→), and If ON, connect(inport→<t1',→, <t2',→):

Each USAT operates independently, so the operation of the GMS and FMS for each is similar as described above.

The TMS consolidates the multiple requests at a node. It does this by tracking each connection request using the order field. In particular, call each order (x,y) a cell. For each cell, at each node, the TMS keeps a list of the glows that are programmed and their inports and outports. Ideally, the TMS does not need to coordinate requests across cells (TBD if this statement is 100% true). In this case, each node keeps the glow requests in the cell (1,7). Not all nodes handle all glows. In particular.

node 1 handles all the glows g3i, g3ii, g3iii, g3iv, g3v
node 2 handles all the glows g3ii, g3iii, g3iv, g3v
nodes 3 and 4 handle the glows g3iii, g3iv, g3v
node 5 handles the glow g3iii
node 9 handles the glows g3iv and g3v
node 10 handles the glows g3v So, e.g., in full operation, cell (1,7) at node 9 would contain glows g3iv and g3v. Since these glows have the same priority and neither of them have do_not_split attributes, the TMS could interpret this as a composite USAT and split the signal from the common input from node 3 to the drop at node 4 and the output at node 5. If either of these glows were turned off, the appropriate path thru the node would change (as Persist) is not set, but the other path with the common input would not be affected.

For the protected versions of these services, the glows may be reused, but alternate fiber graphs and fiber graph lists are used. In addition, for Service 2b, alternate add/drop ports on an alternate node are used unless node 3 appears in all the fabric graph lists which would be a single point of failure. We will use ports p1' and p2 on node 8 as the alternate add/drop ports and reserve their reverse ports for the bidirectional protected services (Fitting insures that nodes 3 and 8 appear on each path if the add/drop is essential to the service. The USAT may skip checks for the absence of a role in a path. So although Block( ) could be set if all the paths fail, the USAT itself does not check if a valid path has the add/drop role. This is similar to other affinity attributes where the USAT is not responsible for guaranteeing it meets the affinity requirements, just executing what it is given). We can symbolically represent Service 2b then instead as Service 2b: (b11,1)→[[(f1',3)→(f2,3)] OR [(p1',8)→(p2, 8)] ]→(j5',5)

Since there are three protection options P1, P2, and P3, we would need three different USATs for each USAT, or nine total. Note that these nine would not operate simultaneously since we would not be protecting the same glow three different ways, it's just that the three different protection options lead to three different USATs.

So for instance, for protected service 2, we have

Services 2-P1: U2-U1=GS2: FL-2P1={g2}: (fg2P1.1, fg2P1.2)
Services 2-P2: U2-P2=GS2: FL-2P2={g2}: (fg2P2.1, fg2P2.2)
Services 2-P3: U2-P3=GS2: FL-2P3={g2}: (fg2P3.1, fg2P3.2)
Services 2a-P1: U2a-P1=GS2a: FL-2aP1={g2a}: (fg2aP1.1, fg2aP1.2)
Services 2a-P2: U2a-P2=GS2a: FL-2aP2={g2a}: (fg2aP2.1, fg2aP2.2)
Services 2a-P3: U2a-P3=GS2a: FL-2aP3={g2a}: (fg2aP3.1, fg2aP3.2)
Services 2b-PL: U2b-P1=GS2b: FL-2bP1={g2b}: (fg2bP1.1, fg2bP1.2)
Services 2b-P2: U2b-P2=GS2b: FL-2bP2={g2b}: (fg2bP2.1, fg2bP2.2)
Services 2b-P3: U2b-P3=GS2b: FL-2bP3={92b}: (fg2bP3.1, fg2bP3.2)

where for instance fg2Px.1 and fg2Px.2 are two alternative paths between nodes 1 and 5. They could all be different, but in the below examples we make the paths identical but with different validation rules.

We set the first alternate path to 1, 6, 7, 8, 9, 10, 5 since it includes node 8 as the alternate add/drop point and is path and node disjoint. P1 uses totally valid path rules.

Note that Service 2b requires that alternate paths do not contain add/drop1 and add/drop2 in the path, else the signal would experience two add/drops along the way. This illustrate one limitation with USAT v1.0, there is no check of the current active path to see if a role exists at another node, and if duplicates conflicting roles exist, to mediate between them.

A non-limiting example of a Service Description follows:
Service 2-B: (b9,1)←→(j1,5)
Service 2b-B: (b11,1)←→(f1,3)←→(f2,3)←→(j5',5)
We can serve these two services with two USATs,
U2-B=GS2-B: FL2-B={g2-B}:(fg2-B)
U2b-B=GS2b-B: FL2-B={g2b-B}: (fg2-B)
where they both use the same fabric graph and thus one of them can be operational at a time so we set U2b-B to inactive.

The USAT U2-B Data Structure may include:
usat_id: U2-B
usat_default_status: Active
usat_type: External
usat_connectivity: Point-to-Point
usat_protection_type: Unprotected
usat_participating_nodes: {1, 2, 3, 4, 5}
usat_src_attachment_layer: L1
usat_dest_attachment_layer: L1
usat_glow_sets: GS2-B
usat_graph_list: FL2-B The USAT U2b-B Data Structure may include the following fields:
usat_id: U2b-B
usat_default_status: Inactive
usat_type: External
usat_connectivity: Point-to-Point
usat_protection_type: Unprotected
usat_participating_nodes: {1, 2, 3, 4, 5}
usat_src_attachment_layer: L1
usat_dest_attachment_layer: L1
usat_glow_sets: GS2b-B
usat_graph_list: FL2-B We choose fg2-B to go through nodes 1, 2, 3, 4, 5 and use the links of fg2 in the forward direction of 1→5 and the reverse links in the backward direction of 5→1. Let fg2-B.px be the fabric graph for node x. So fg2={fg2-B.p1,fg2-B.p2,fg2-B.p3, fg2-B. p4, fg2-B.p5}, where the Fabric Graph fg2 is shown in Table 7

TABLE 7 illustration of Fabric Graph fg2

| fg_part_id | fg2.p1 | fg2.p2 | fg2.p3 | fg2.p4 | fg2.p5 |
|---|---|---|---|---|---|
| fg_id | fg2 | fg2 | fg2 | fg2 | fg2 |
| fg_part_directionality | BI | BI | BI | BI | BI |
| fg_part_node | 1 | 2 | 3 | 4 | 5 |
| fg_part_fixed_inports_fwd | { } | <d95, -> | <f90, -> | <h100, -> | <j92, -> |
| fg_part_dynamic_inports_fwd | { } | { } | { } | { } | { } |
| fg_part_fixed_outports_fwd | {<b100', ->} | <d96', -> | <f95', -> | <h98, -> | { } |
| fg_part_dynamic_outports_fwd | { } | { } | { } | { } | { } |
| fg_part_fixed_inports_back | { } | <d96, -> | <f95, -> | <h98, -> | { } |
| fg_part_dynamic_inports_back | {<b100, ->} | { } | { } | { } | { } |
| fg_part_fixed_outports_back | { } | <d95', -> | <f90', -> | <h100', -> | <j92', -> |
| fg_part_dynamic_outports_back | { } | { } | { } | { } | { } |
| fg_part_roles | {Ingress} | {transit} | {transit, add/drop1} | {transit} | {Egress} |
| fg_part_validity | vr1 | vr1 | vr1 | vr1 | vr1 | where vr2=I(1) & I(2) & I(3) & I(4) & I(5) & "all the nodes are operational"

I(<b100,→←—→<d95,→) & "bidirectional link from 1 to 2 operational"

I(<96,→←—→<f90,→) & "bidirectional link from 2 to 3 operational"

I(f5,→←—><h100,→) & "bidirectional link from 3 to 4 operational"

I(<h98,→←—><j92,→) "bidirectional link from 4 to 5 operational"

where a bidirectional link is operational only if both directions are operational.

The Glow 2-B Data Structure may include:

glow_id: g2-B glow_set_id. GS2-1B glow_type: Point-to-Point glow_default_status: ACTIVE glow_priority: 4 glow_order: (1.4)

glow_attributes: {Do not split, Do_not_merge} role_instructions: @ingress—ON=verify(<b9,→) & verify(<b9%,→), and If ON, {(<9→→outport_fwd; connect(inport_back→<b9',→)}, @transit If ON, {connect(inport_fwd→outport_fwd); connect (inport_back→outport_back);}; and @egress— ON=verify(<j1,→) & verify(<j1',→), and If ON. {(inport_fwd→<j1',→); connect(<j1,→, outport_back);}

The Glow 2b-B Data Structure may include:

glow_id: g2b-B glow_set_id: GS2 glow_type: Point-to-Point glow_default_status: Active glow_priority: 6 glow_order: (1,6)

glow_attributes: {Do_not_merge, Do_not_split} role_instructions: @ingress—ON=verify(<b11,→) & verify(<b11',→) If ON, {connect(<b11,→→outport_fwd); connect(inport_back→<b11',→);}; @transit & NOT add/drop1 & NOT add/drop2-If ON, {connect(inport_fwd→outport_fwd); connect (inport_back→outport_back);}; @transit & add/drop1—ON=verify(<f1',→) & verify(<f2,→) & verify (<f1,→) & verify(<f2',→); ON, {(inport_fwd→ <f1',→; connect(<f2,→→outport_fwd); (inport_back→<12',→: (<f1,→→outport_back);}; @transit & add/drop2—ON=verify(<p1,→) & verify (<p2,→) & verify(<p1',→) & verify(<p2',→); If ON, {connect(inport_fwd→<p1',→; connect(<p2,→→output_fwd); connect(inport_back→<p2',→; connect (<p1,→→output back);}; and @egress—ON=verify (<j5',→) & verify(<j5,→): If ON, {connect (inport_fwd→<j5',→); connect(<j5,→→outport_back);}

Note the instructions for add/drop2 are for when this glow is put onto a protected path.

Service examples are shown in Table 8. First, the unprotected examples are done, then the protected. Also shown in Table 8 are the priority of each service which is used to resolve resource conflicts.

TABLE 8 illustration of Fabric Graph Pure End-to-End L2 Services

| | Unidirectional | | Bidirectional | |
|---|---|---|---|---|
| | Unprotected | Protected | Unprotected | Protected |
| 4: Pt-to-Pt Stub (8) | | | 4-B: Bidirectional Pt-to-Pt Stub (9) | |
| 4a: w/multi-dest. (10) | | | | |
| 5: Pt-to-Pt Path (11) | 5-P1: TPV Protected 5-P2: PVP Protected 5-P3: 1 + 1 Protected | | 5-B | 5-B-P1 5-B-P2 5-B-P3 |
| 5a. w/multi-dest (12) | 5a-P1 5a-P2 5a-P3 | | | |
| 5b. w/add/drop (13) | 5b-P1 5b-P2 5b-P3 | | 5b-B | 5b-B-P1 5b-B-P2 5b-B-P3 |
| 6. Pt-to-multipoint multicast w/multi-dest. (14) | 6-P1 6-P2 6-P3 | | | |

Unlike L1 services, there are many variants of the above, mainly due to how a service can be addressed. The baseline services will be to use any port on the ingress/egress node that has the attachment and an L2 multicast address is used for any service with multiple destinations. Variations on this include:

inclusion of a flow filter f ingress and/or egress being port specific non-multicast addressed dropped to multiple locations— attachment verification suppressed.

intervening flyways

VLAN addressing

L3 services are handled in a different section because of different baseline behavior. However, the description there will be very similar to this section and we will just highlight the differences.

The first three L2 services (4, 4a, and 4-B) are L2 services on a stub node. Let the node be node 11, and denote the three services as:

Service 4: e1→f4→e2'

Service 4a: e3→f4a→{e4', e5', e6'}

Service 4b: e7←>f4b←>e8 where e1, e3 are the source endpoints for Service 4 and 4a, respectively, e2', e4', e5', e6' are the destination endpoints for Service 4 and 4a, respectively, and e7 and e8 are the source and destination endpoints of the bidirectional service 4b.

We expand ei=[(gpi, 11), (Smi, SVi), (−,−)] and ej'=[(gpj', 11), (Dmj, DVj), (−,−)], where gpi is a generic input port on node 11, e.g. gpi=<vi,wi>, and gpj' is a generic output port on node 11, e.g. gpj'<vi',wi'>. So, expanding it all out, we have:

Service 4: [(<v1,w1>, 11), (Sm1,SV1), (−,−)]→f4→ [(<v2',w2'>, 11), (Dm1,DV1), (−,−)]

Service 4&: [(<v3,w3>, 11), (Sm3,SV3),(−,−)]→f4a→{ [(<v4',w4'>, 11), (Dm4,DV4),(−,−)], [(<v5',w5'>, 11), (Dm5,DV5),(−,−)], [(<v6',w6'>,11), (Dm6,DV6), (−,−)]}

Service 4b: [(<v7,w7>, 11), (Sm7,SV7),(−,−)]→f4b→ [(<v8',w8'>, 11), (Dm8,DV8), (−,−)] [(<v7',w7'>, 11), (Sm7,SV7),(−,−)]←f4b←[(<v8,w8>, 11), (Dm8,DV8), (−,−)]

In describing the services below, the baseline services will be:
- all access ports of switch 11 can be the input/output ports of the services, e.g. gpi=<A*> and gpj'=<A*'>. This is just like our current FSATs.
- the L2 addresses are atomic, e.g. (Sm,SV) and (Dm,DV) are atomic L2 addresses (unicast for service 4 and 4b and multicast for 4a)
- The variations to these will be
- specific input/output ports are used, e.g. gpi=<vi,wi> and/or gpj'=<vj', wj'>.
- the L2 addresses can be generalized to a VLAN, e.g. Sm=* and/or Dm=*, meaning all the addresses in VLAN SV and/or DV respectively.

Note that when a specific port is used, e.g. <vi,wi>, it means that the service is valid on this combination of transceiver v1 and chip port wi, it does not mean that the service should connect vi to wi using the XBAR. If such a connection were desired, the preferred method of achieving that is to change the baseline topology. If it were desirable to do it within a service, then the connect( ) instruction can be used in a glow, but the above service descriptions do not imply that functionality.

We can serve all three services, with any of the variations, with a single USAT, U4, $$U4 = GS4 : FL4 = \{g4, g4a, g4-B\} : (fg4)$$

Note that a single Fabric Graph is used, even for the bidirectional case.

We assume that Fitting has eliminated any conflicts and the glows have the proper order field to deal with any qualifier overlaps. If the glows did conflict, then the priority field would resolve the conflicts. We have arbitrarily set the priority of g4>g4a>g4-B. Multi-glow examples could conflict or compete for table resources.

The USAT U4 data structure may include:
- usat_id: U4
- usat_default_status: Active
- usat_type: External
- usat_connectivity: Point-to-Point
- usat_protection_type: Unprotected
- usat_participating_nodes: {1}
- usat_src_attachment_layer: L1
- usat_dest_attachment_layer: L1
- usat_glow_sets: GS4
- usat_graph_list: FL4

Let fg4 be the fabric graph which consists of one part, fg4={fg4.p11},

The Fabric Graph Part may include:
- fg_part_id: fg4.p11
- fg_id: fg4
- fg_part_directionality: NULL
- fg_part_node: 11
- fg_part_fixed_inports: { }
- fg_part_dynamic_inports: { }
- fg_part_fixed_outports: { }
- fg_part_dynamic_outports: { }
- fg_part_roles: {stub}
- fg_part_validity: I(11)

The Glow 4 Data Structure may include:
- glow_id: g4
- glow_set_id: GS4
- glow_type: Point-to-Point
- glow_default_status: ACTIVE
- glow_priority: 8
- glow_order: (2.1)
- glow_attributes: {Do not split, Do_not_merge}
- role_instructions: (@stub ON=verify(e1) & verify(e2'); If ON, connect(e1-+e2', f, L2)

The Glow 4 Part Local Variables may include glow_status which can be {ON, OFF, NULL, FAIL}.

Note: GS4→U4→FL4. We don't just include FL4 in the data structure so that entire GS's can be assigned to a USAT.

The verify(e1) behaves as follows:
- if e1 has an atomic L2 address and is fixed (a specific port), then verify(e1) returns TRUE iff the atomic address is on that port.
- if e1 has an atomic L2 address and is floating (a non-specific port), then verify(e1) returns TRUE iff the atomic address is on the switch
- if e1 has a VLAN address and a specific port, then verify(e1) returns TRUE iff that port is provisioned for that VLAN (and there exists at least one attachment?)
- if e1 has a VLAN address and a non-specific port, then verify(e1) returns TRUE iff at least one access port is provisioned for that VLAN (and there exists at least one attachment on that port?) connect( )
- for f< >*, use TCAM
  - e1 fixed atomic,
  - e2 fixed atomic
  - e2 floating atomic
  - e2 fixed generalized
  - e2 floating generalized
- e1 floating atomic Sixteen (16) combinations for f< >*; sixteen for f=*. The connect( ) is defined for each and need to prescreen for conflicts.

Below is the behavior at each participating node, which in this case is just node 11.

1) USAT Initialization: after installation of U4,
   The node will check the USAT's default state, which in this is Active—since U4 is Active, it will set U4's local status variable to ON.
   If FL4 is a new fabric graph list, then the FMS installs it, including any new fabric graph parts, and assigns it local variables with an initial status of invalid and input/output ports of NULL. Each fabric graph part will get an initial local status variable of NULL for its current state.

2) The FMS continuously monitors FL4, at any point in time, the FMS assigns the following local variables to the FL4 part.
   Valid/Invalid—In this case, FL4 will be valid iff fg4.p11 is valid.
   Role—if FL4 is valid, its local role is "stub". If FL4 is invalid, its local role is "failed."
   Inport—NULL in this case.
   Outport—NULL in this case.

3) Since U4 is ON, the GMS continuously monitors each glows in U4's glow sets, which in this are g4, g4a, and g4B.
   If its role, provided by the FMS, is "failed", then
2) Since the USAT is ON, the GMS will monitor each glow in U4's glow sets, which
   The FMS monitors U1's fabric graph list, FL1, and determine its state based on the validity rule. In this case, there is just a single graph part fg1.p1 with a validity rule testing if node 1 is operational. Therefore, the FMS will set fg1.p1 as active unless the node is in a non-operational state, e.g. maintenance mode, in which case it will set fg1.p1 as inactive. Furthermore, it will set FL1 as active or inactive based on the state of fg1.p1 and note FL1's roles for itself (node 1).

If FL1 is active, the FMS reports its roles in U1 to the GMS, which in this case is just "stub." If inactive, the FMS reports "inactive" to the GMS for U1.

The FMS continually monitors the validity of fg1.p1 and reports any changes in roles to the GMS.

The GMS monitors each glow in U1's glow sets, which in this case are g1, g1a, and g1B. After installation, the GMS assigns ON/OFF local status variables to g1, g1a, and g1B for each USAT they are a part of (in this case, just U1). The glows start OFF.

Since g1's default status is active, node 1 will look at its role instructions in g1

If its role is "inactive," then the GMS will do nothing.

If its role includes "stub", then the GMS looks at its instructions, which

First tells node 1 to verify b1 and b2'. If they both verify, e.g. both are operational, then it will turn the g1 part local status to ON. If there were other participating nodes, it would inform the other participating nodes of g1 part's local status. If either one does not verify, the g1 part is OFF.

Second, if g1 is ON, it instructions node 1 to directionally connect b1 to b2'. The TMS then sends a request to the TMS along with g1's priority and order fields and instructions not to merge or split the signal (In cases where the TMS fails, then GMS retries the request again with an exponential back-off algorithm).

If at a later time, b1 or b2' become unoperational, or the FMS reports U1 is inactive, then the GMS turns g1 off and requests the TMS to release the connection between b1 and b2' (if Persist was not set as an option). The TMS will then reconnect b1 and b2' based on the base topology—e.g., that could be to connect b1 and b2' to the packet chip, or it could be something completely different.

Since g1a's default status is active, node 1 will look at its role instructions in g1a, If its role is "inactive," then the GMS will do nothing.

If its role is "stub", then the GMS looks at its instructions, which

First tells node 1 to verify b3, b4, b5, and b6'. If b3 verifies and at least one of b4', b5' b6', verify, then it will turn the g1 part local status to ON. If there were other participating nodes, it would inform the other participating nodes of g1a part's local status. If either one does not verify, the g1a part is OFF.

Second, if g1a is ON, it instructions node 1 to connect b3 to {b4', b5', b6'}. The GMS remove the unoperational ports from the destination list and then sends a request to the TMS to make the multicast connection between b3 and the operational destination ports along with g1's priority and order fields and instructions not to merge or split the signal (If for instance, all three ports were operational, but one port had an output conflict, then the TMS would fail the request since it was a joint request. The GMS could then decide if to resubmit the request with fewer ports, which in this case it would).

If at a later time, b3 becomes unoperational OR all the destinations {b4',b5',b6'} become unoperational OR the FMS reports U1 is inactive, then the GMS turns g1a off and requests the TMS to release the connections (if Persist is not set). The TMS will then reconnect b3, b5', b5', and b6' to the base topology.

If at a later time, some operational port becomes unoperational, then that connection is release.

If at a later time, an unoperational port becomes operational, then the connection request is re-made with the new connection. Since there is no do not split attribute, and since this request will have the same order as the previous connections, the TMS will split the signal at b3 to add the new request. Alternatively, the entire request could be submitted again (The TMS can keep the state, including order and priorities, of existing connections and works closely with the GMS to manage the node's resources. Some of this functionality could be handled in the GMS).

Since g1B's default status is active, node 1 will look at its role instructions in g1B, which in this case, If its role is "inactive," then the GMS will do nothing.

If its role is "stub", then the GMS looks at its instructions, which

First tells node 1 to verify b7, b7', b8, and b8'. If they all verify, then it will turn the g1 B part local status to ON. If there were other participating nodes, it would inform the other participating nodes of g1B part's local status. If either one does not verify, the g1B part is OFF.

Second, if g1B is ON, it instructions node 1 to connect b7→8' and b8→b7'. The GMS then sends a request to the TMS along with g1's priority and order fields and instructions not to merge or split the signal. Note this is sent as a compound request so that either it is all executed or all fails.

If at a later time, g1B fails verification OR the FMS reports U3 is inactive, then the GMS turns g1B off and requests the TMS to release the connections (if Persist is not set). The TMS will then reconnect the ports to the base topology.

if at a later time, g1B verification passes again, then the connection requests are re-made.

VLAN Topologies using USATs with example

VLAN topology is an affinity with potential attributes ISO, HC, and BLOCK.

1. Fitting breaks up the topology into a set of USATs a. The glows represent one or more residual flows and contain role instructions which are used to program the residual table (thru the TMS).

b. The FGPL determine which switching topologies are primary and which are back-up as well as the type of protection (PartialPath or FullPath).

The topology is scored 1-100 for being in operation and T/F for being in or out of policy.

The situation is that Fitting is presented with a request for a VLAN Affinity with one or more VLANs in the AG and with possible attributes HC, ISO, BLOCK. HC means to minimize the HC of the affinity flows, ISO to isolate the affinity flows from other flows, and BLOCK to block any flows which are out of policy. In this case, ISO is the possible policy so BLOCK is an option if ISO is specified.

So there are five possible types of requests: 1) HC, 2) HC+ISO+BLOCK, 3) HC+ISO, 4) ISO+BLOCK, and 5) ISO. The affinity flows are any flow within a specified VLAN or between the specified VLANs.

The VLANs in the affinity group are the affinity elements of this group and called the constituent VLANs. Example: an affinity request with VLANs {V1,V2} and attributes ISO and BLOCK. V1 and V2 are constituent VLANs.

If there is an FSAT with an affinity flow that falls into this affinity request, then that FSAT is treated independently of the VLAN affinity. If that FSAT fails, then it may get blocked, or it may then fall back to the underlining VLAN affinity. So, e.g., it is possible that an FSAT between SA and DA in the same VLAN is not isolated from other traffic but the underlying VLAN is an ISO. Note that by definition, an ISO VLAN w/BLOCK is never out of policy since no affinity traffic will be mixed with other traffic.

To fulfill the request, Fitting creates a VLAN topology between a set of VLAN nodes using a composite USAT. The VLAN nodes are all the nodes of the network with at least one access port configured for at least one of the VLANs of interest at the time of the Fitting. So the VLAN nodes are the union of the VLAN nodes of the constituent VLANs.

The traffic carried by the VLAN topology is:
1. Any traffic originating at a VLAN node, destined to another VLAN node with DA in any of the VLAN topologies.
2. Any traffic originating at a transit node, if that transit node is active, destined to a VLAN node with DA in any of the VLAN topologies.

Note that #1 includes routed and L2 traffic. #2 includes routed traffic only. Also note that routed traffic which originates at a node not on the topology is not carried by the topology. The above definition is broader than the SOI specifies and so more traffic than specified will be carried on the topology. See example below.

To build the VLAN topology, Fitting creates one or more USATs. Specifically, one or more USATs are created for all the affinity residual flows to each VLAN node (residual flows are defined in the USAT Spec for VLAN PSAT . . . ). Each USAT is an incasting tree, with possible back-up trees, using PartialPath or FullTree protection carrying some fraction of traffic to a root node. For a given incasting tree, the destination is called the root node, the other VLAN nodes are the source nodes, and any other tree node would be a transit node.

Example: If V1 is configured on an access port of nodes 1, 2, 3 and V2 is configured on an access port of nodes 2, 3, 4, then the VLAN nodes are {1, 2, 3, 4}. Fitting would create one or more USATs to each of these nodes, with the other VLAN nodes being the source nodes, and with possible transit nodes. So, in this example Fitting will create five USATs
  1 USAT to root 1: U1=GS1:FGL1 carrying 100% of the traffic to node 1
  1 USAT to node 2: U2=GS2:FGL2 carrying 100% of the traffic to node 2
  2 USATs to node 3: U3a=GS3a FGL3a and U3b=GS3b: FGL3b, each carrying 50% of the traffic to node 3
  1 USAT to node 4: U4=GS4:FGL4 carrying 100% of the traffic to node 4
{U1, U2, U3a, U3b, U4} form the composite USAT for the affinity request.

If there were a VLAN V3 configured on node 1, then the topology will also capture routed traffic to V1 or V2 which originates on V3 at node 1. This will also be true at intermediate transit nodes.

Note that Fitting is aware of the relationship between these USATs but the nodes do not know about the composite. The cell field in the glow order field can be used to identify glows which are part of the same composite. In this case, glows assigned to any USAT in the composite are allowed to mix on network links but are not mixed with glows from other USATs. Fitting builds the USATs to be in policy and thus the nodes do not need the cell field yet.

Fitting remembers the composite so that scoring and policy audits can be performed on the entire composite. For instance, if U3a were out of policy, then the entire composite is out of policy.

Fitting creates glows and puts them into glow sets, which are then assigned to USATs. The nodes use glow parts and glow part sets to manage the glows on the nodes. Each glow part has the same information as its mother glow. This is in contrast to a FGP which has a subset of the information of a FG.

Either Fitting creates the parts and distributes to the nodes, or Fitting distributes the nodes and the node instantiate the parts on the nodes (one part per glow per USAT that the glow is assigned to). The latter ca be a more compact message if glows can exist in multiple USATs. In addition, the latter seems more convenient if a glow set (part) is moved from one USAT (part) to another since then the parts do not need to be retransmitted to any node which already had it. Note, however, in this case, glow (parts) may still be distributed to nodes which didn't already have the glow (participating nodes of the moved to USAT that are not participating nodes of the moved from USAT).

A glow specifies the role instructions for one or more residual flows. For the VLAN affinity service described here, a residual flow is of the form (*,V,HB,r), where V is a set of VLANs, HB is a set of hash buckets, and r is the root node.
  Example:
    g1 consists of all the affinity traffic to node 1, which is represented as (*,{V1},{1 . . . 100},1)
    g2 consists of all the affinity traffic to node 2, which is represented as (*,{V1,V2}{1 . . . 100},1)
    g3a consists of all 50% of the affinity traffic to node 3, which is represented as (*, {V1,V2}, {1 . . . 50},1)
    g3b consists of all 50% of the affinity traffic to node 3, which is represented as (*,{V1,V2},{51 . . . 100},1)
    g4 consists of all 100% of the affinity traffic to node 4, which is represented as (*,{V2},{51 . . . 100},1)
  However, note that there are some options for how Fitting could design the glows:
    g1 contains residual flows to DAs in V1 since V2 is not configured on Vt. We could define g1 as (*,{V1,V2}, {1 . . . 100},1). In this case, the traffic to V2 would be carried over the topology if node 1 were configured for V2 after the Fit.
    Similarly, g4 consists of flows to V2 since node 4 is not configured for V1. This is an option and instead we could add V1 to g4.
    For glows g2, g3a, g3b with two VLANs in them, we could break these up into two glows without any loss of functionality. For instance, we could define glows g3a.1 and g3a.2 as
      g3a.1 consists of all 50% of the affinity traffic to node 3 in V1, (*,{V1},{1 . . . 50},1)
      g3a.2 consists of all 50% of the affinity traffic to node 3 in V2, (*,{1V2},{1 . . . 50},1)
  The glow may also know role instructions which vary by the node role and the attributes of the affinity:
    Source nodes request a write to the Residual table for their flows. The request should have a null_outport mode of BLOCK if the affinity request has both ISO and BLOCK attributes, otherwise the null_outport mode is SKIP. The nodes pass a pointer to the usat outport for use in the table.

Transit nodes should request a write to the Residual table for their flows. The request should always have a null_outport mode of SKIP. The nodes pass a pointer to the usat outport for use in the table.

Root nodes do not have any role instructions.

The TMS can write and maintain the residual table. Specifically, it can program the entry with the usat outport pointer. If that pointer ever turns invalid, e.g. outport=NULL, then the TMS can change the entry to either skip that entry or block the flow, depending on which option was passed in the request_write( ) command.

In one, non-limiting embodiment, a configuration always ON glow is used. The GMS tracks the status of the glow. The following is the rough process for the glow:

1. Upon activation (either a new glow with default_status=ACTIVE) or an existing node whose status has been changed from INACTIVE to ACTIVE, and when the glow is assigned to an ACTIVE USAT, then
   a. Get the node's role
   b. Run the role instructions While active, the GMS/TMS will maintain the glow_local_status and policy_integrity local variables as follows:
   a. @root, glow_local_status=ON, policy_integrity=TRUE
   b. @source or @transit
      i. For HC (request type 1)
         1. If outport=NULL, then glow_local_status=FAIL, policy_integrity=TRUE
         2. If outport<>NULL, then glow_local_status=ON, policy_integrity=TRUE
      ii. For ISO (request types 3 and 5):
         1. If outport=NULL, then glow_local_status=FAIL, policy_integrity=FALSE
         2. If outport<>NULL, then glow_local_status=ON, policy_integrity=TRUE
      iii. For ISO+BLOCK (request types 2 and 4).
         1. If outport=NULL, then glow_local_status=FAIL, policy_integrity=TRUE
         2. If outport<>NULL, then glow_local_status=ON, policy_integrity=TRUE
         3. If outport=NULL and the entry has been set to SKIP, then policy_integrity=FALSE, else policy_integrity=TRUE.

Upon deactivation (either Fitting has deleted the glow or set the glow_default_status to INACTIVE), the role reversals should be reversed and the table entries deleted. Table 9 provides an Example of g3a, an Always ON Multipoint Residual Glow.

TABLE 9

| illustration of Always ON Multipoint Residual Glow | | |
|---|---|---|
| FIELD | VALUE | NOTE |
| glow_id | g3a | g3a in our example carries 50% of the traffic to V1 and V2 destined to node 3 |
| glow_set_ids | GS3a | This is U3a's glow set |
| glow_type | Incasting | |
| glow_default_status | ACTIVE | |
| turn_on_mode | FAST | Indicates that each node operates in isolation if the glow is ON. It does not specify the conditions under which the glow should be considered ON. |
| glow_priority | 1 | doesn't matter since we're not using it yet |
| glow_order | (3,200,-) | Table 3, level 200. Table 3 is the Residual table, Level 200 is VLAN PSATs, cell is unused in first release. |
| glow_attributes | Do_not_Split | |
| role_instructions | | gls = ON; [Indicates that this is an always ON glow] @source, request_write(Table = 3, Level = 200,flow = (*,{V1,V2},1..50,3),Outport = pointer[outport[USAT_id]], null_mode = BLOCK); @transit, request_write(Table = 3, Level = 200, flow = (*,{V1,V2},1..50,3),Outport = pointer[outport[USAT_id]], null_mode = SKIP); |

Notes on Glow g3a:

The role instructions for each role could have been broken up into two pieces, one request_write for V1 and one for V2, if desired.

The traffic to each root node is segmented into glows, which are then grouped into glow sets.

Each glow has a part for each participating node of the USAT that it is assigned to. This includes transit nodes that might not be part of the primary tree.

The glow part has the same information as the glow, except that it has local variables (glow_local_status and policy_integrity) and there is one glow part instance per USAT it is assigned to per participating node of that USAT. Symbolically we represent the parts of a glow g with glow id as gid.uid.pn1, gid.uid.pn2, . . . gid.uid.pnk, where {n1, . . . nk} are the participating nodes of USAT uid.

Example: Suppose two trees are used to support U1, one primary tree and one back-up tree. The primary tree consists of nodes 1, 2, 3, 4 with node 1 as the root and nodes 2, 3, 4 are sources. The back-up tree consists of nodes 1, 2, 3, 4, 5 with node 1 as the root again, nodes 2, 3, 4 as sources, and node 5 has a transit. Then g1 which is assigned to GS1, which is U1's glow set, has five parts: g1.u1.p1, g1.u1.p2, g1.u1.p3, g1.u1.p4, and g1.u1.p5. We use the full notation which supports glows being assigned multiple USATs even though this may not occur in residual.

Note that in residual, transit nodes do not use source instructions, and vice-versa. Roots don't use any instructions. Since for residual, nodes do not change roles, glow parts can be used with different information in the instruction field.

Note that if a glow set is moved to another USAT, this may cause the creation of new glow part instance for that USAT. So either Fitting sends the new glow part with the move command, or glow part instances are derived from glows.

Glow part sets are the glow part sets assigned to a USAT part at a participating node. They are the analogs of the glow sets.

Example: Glow Set 1 has five parts, one per participating node of U1. Each set consist of a single glow part.
GS1.p1={g1.u1.p1}
GS1.p2={g1.u1.p2}
GS1.p3={g1.u1.p3}
GS1.p4={g1.u1.p4}
GS1.p5={g1.u1.p5}

Note that the information contained in these parts is identical except that the glow parts have local variables associated with them. If Fitting changes the default_status of a glow, then it should change the status of all the glows. The local variables could differ from node to node in that one node might indicate a failure and policy violation but another node may not.

For (VLAN) residual, the FGs are an incasting trees to a root such that
Roles:
    The VLAN nodes are given role "source",
    the root node is given role "root" and
    any other node is given role "transit."
Validation Rules:
    The root has a VR that always validates
    The other nodes use either PartialPath or FullTree validation rules
Each root may have one or more FGs associated with it.
Example:
Root 1 has two FGs: fg1i and fg1ii
    Node 1 is root in both FGs
    Nodes 2, 3, 4 are sources in both FGs
    Node 5 is a transit in fg1ii
Root 2 has one FG: fg2
    Node 2 is root, nodes 2, 3, 4 are sources, no transits
Root 3 has three FGs: fg3i, fg3ii, fg3iii
Root 4 has one FG: fg4

The FGs are organized into FGLs. The first FG in the list is the primary, the last FG in the list is an end-FG, and any others are back-up FGs. The end-FG always validates and has roles source, transit, or root, depending. Each FG in the list must assign a consistent role to each node.
Example:
U1 has FGL1=(fg1i, fg1ii, fgl1-end) with participating nodes {1, 2, 3, 4, 5}
    U1's primary is fg1i and is backed up by fg1ii.
    fgl1-end indicates that node 1 is a root, nodes 2, 3, 4 are sources, and node 5 is a transit node.
U2 has FGL2=(fg2, fg2-end) with participating nodes {1, 2, 3, 4}
    U2 is unprotected
    fgp2-end indicates that node 2 is root, nodes 2, 3, 4 are sources.
U3a has FGL3a=(fg3i, fg3ii, fg3iii, fgl3a-end)
U3b has FGL3b=(fg3ii, fg3i, fg3iii, fgl3b-end)
    Note that fgl3b may be different than fgl3a because FGL3a and FGL3b may use different transit nodes.
U4 has FGL4=(fg4)

Each FG is divided into parts. There is one part per node of the FG. Note that in other situations, there could be one part per participating node of any FGL that the FG is a part of.

Example:
fg1i is an incasting tree to root 1 with sources 2, 3, 4 and no participating nodes. It has four parts:
    fg1i={fg1i.p1, fg1i.p2, fg1i.p3, fg1i.p4}
fg1ii is an incasting tree to root 1 with sources 2, 3, 4 and transit 5. It has five parts:
    fg1ii={fg1ii.p1, fg1ii.p2, fg1ii.p3, fg1ii.p4, fg1ii.p5}
fgl1-end is an endgraph for FGL1. Since FGL1 has participating nodes {1, 2, 3, 4, 5), fgl1-end has five parts
    fgl1-end=(fgl1.p1, fgl1.p2, fgl1.p3, fgl1.p4, fgl1.p5}

For each USAT, Fitting creates a FGPL for each participating node of the USAT. The FGPL for a node consists of the FGPs for that node in the constituent FGs.
Example:
U1 has FGL1=(fg1i, fg1ii, fgl1-end) with participating nodes {1, 2, 3, 4, 5}, so Fitting creates five FGPLs
    Node 1 gets FGL1.p1=(fg1i.p1, fg1ii.p1, fgl1-end.p1)
    Node 2 gets FGL1.p2=(fg1i.p2, fg1ii.p2, fgl1-end.p2)
    Node 3 gets FGL1.p3=(fg1i.p3, fg1ii.p3, fgl1-end.p3)
    Node 4 gets FGL1.p4=(fg1i.p4, fg1ii.p4, fgl1-end.p4)
    Node 5 gets FGL1.p5=(fg1ii.p5, fgl1-end.p5)

Note that Node 5 gets a shorter FGPL because fg1i does not use node 5. Alternatively, we could define a FGP for fg1i, fg1i.p5 which always fails to validate. So node 5 is effectively part of the primary graph; however, since node 5 is not used on the primary graph, none of the affinity traffic should be directed to it if fg1i validates at every node. Since there could be routed traffic originating at node 5, this node will capture that traffic for the affinity topology.

The various FGPs created to put in the FGPLs could have duplicates. Any two FGPs which are duplicates can be replaced by a single FGP. In addition, if multiple duplicate FGPs are next to each other in a FGPL, then all but one of them can be removed from the list.

Example
U3a has FGL3a=(fg3i, fg3ii, fg3iii, fgl3a-end). At node 3, Fitting would create the FGPL FGL3a.p3=(fg3i.p3, fg3ii.p3, fg3iii.p3, fgl3a-end.p3).
Node 3 also has FGL1.p3=(fg1i.p3, fg1ii.p3, fgl1-end.p3) for U1.
Suppose fg3ii.p3=fg1i.p3. Then both can be replaced with fg1i.p3', e.g. after replacement we have
    FGL1.p3=(fg1i.p3', fg1ii.p3, fgl1-end.p3)
    FGL3a.p3=(fg3i.p3, fg1i.p3', fg3iii.p3, fgl3a-end.p3).
Where fg1i.p3' is the same as fg1i.p3 except the field fgp_fgids is amended to include both fg1i and fg3ii indicating that this part is used in two FGs. Also, optionally, the FG fg3 can be amended to eliminate the redundant part and replace it with fg1i.p3'.
Alternatively, the validation rules may be consolidated. Here fg1i.p3 and fg3ii.p3 are maintained, however they both will point to the same validation rule. So when fg31i.p3 is created, a validation rule is created, and then either fg3ii.p3 uses this rule upon creation or a consolidation step is performed at the end looking for duplicates and replacing fg3ii.p3 validation rule with the original one.

Visualization can be used to see the actual operational path of a USAT. It can be done by harvesting the Residual table at each node.

Scoring indicates the amount of the topology that is in operation (for example, a percentage). It can be a weighted average of the operating residual flows to a root, averaged over all the roots. It can take into account the amount of traffic in the traffic matrix as well as the # of HBs assigned to a given USAT. This forms a weighted linear sum with indicator variables I/O which are 1 if the sum term relates to a node and glow with glow_local_status=ON and 0 if FAIL.

Scoring can also be broken down to, or built up from

The score for a VLAN out of the VLAN set

The score for a root node, or a VLAN—root node pair

The score for a single USAT

The U1 can also indicate if a policy has been violated. For VLAN affinities, the affinity is out of policy if one of its constituent glows is out of policy, and in policy otherwise.

Another, non-limiting embodiment, is the USAT spec for FSAT that is additional to USAT Spec for VLAN PSAT and PartialPath Validation. As before, symbolically we represent a USAT U as U={g}:(G), where {g} is a glow set (an unordered group of glows), and (G) is a graph list (G) (an ordered group of graphs). Some differences between FSAT USAT and PSAT USAT are:

1. The glow encodes a FSAT flow instead of a residual flow. For basic operation, an FSAT flow is defined by an L2 SA and DA in the same VLAN.
2. The glow encodes validation rules for the FSAT. An FSAT is considered valid if the SA is located on the source node AND the DA is located on the destination node, where location is determined by the current attachment table. The GMS must be able to change the validation status variable, and the TMS must know to skip invalid glows.
3. The connections are written to the USAT FSAT table instead of the USAT residual table
4. MLAG can be implemented using a composite of point-to-point glows, so the TMS operation has to be updated to handle composites. The changes are minimal in this case.

FSAT USATs use mode 1, just like PSAT USATs. Since they are unprotected, each FGL contains the primary fabric graph and an end-FG.

Fitting can convert the existing FSAT paths into fixed single direction FGPs by assigning the first node the role "source", giving it a FullPath validation rule, and specifying the outport assigning the last node the role "root", giving it an always TRUE validation rule, and specifying no inport or outport. Note that the FWD table is used at the last node so the root node has no table entries.

assigning any other node the role "transit", giving it a FullPath validation rule, and specifying the outport Fitting can convert the existing MLAG FSAT trees into FGPs by creating a path from each source to each root using the tree, and then use the above rules to create the FGPs for each of those paths. Each of these paths is used in a separate USAT and can have a separate glow assigned to it. The glows can be assigned the same composite number—specifically, the request_write( ) commands in the glow's role instructions can have a common order field, with the same table, same level, and same cell number. The common cell number identifies these table entries as being part of the same composite. Within Fitting, we can characterize this as the glow's being part of the same composite.

Fitting can use FullPath validation rules from the source to the root. There is no change to the network state variables, e.g. they will be LAGed L2 link status and whether the node is in S3p.

In embodiments where a BLOCK option is not implemented for FSATs at this time, there is no difference in the actions the source, transit, and root nodes take when there is no valid FGP in a FGPL. In each case, the TMS can skip the glow's table entry and the TCAM is not programmed with anything. Alternatively, the same convention may be adopted as used for PSATs, e.g.

Source and transit nodes should have an end-FGP that always validates but with an outport of NULL.

Root nodes are the same as for PSATs, a single FGP that always validates

So if the path is down, then each node's TMS should indicate a topology failure except the root node. The root node does not have any table entries and so it does not monitor for topology failure. This is different than where these things were handled by the GMS.

The general structure is similar to that seen above but some of the values of the fields change. Below is a sample FSAT glow.

TABLE 10 illustration of FSAT glow

| FIELD | VALUE | NOTE |
| --- | --- | --- |
| glow_id | g123 | a globally unique identifier of the glow. By convention, glow id's begin with "g". |
| glow_set_ids | gs1 | The glow sets that this glow belongs to. A glow can belong to as many glow sets as desired. By convention, glow set id's begin with"gs". |
| glow_type | Incasting | |
| glow_default_status | ACTIVE | |
| turn_on_mode | FAST | Indicates that each node operates in isolation if the glow is ON. It does not specify the conditions under which the glow should be considered ON. |
| glow_priority | 1 | Each glow of a composite FSAT should have the same priority. Each composite should have a unique priority number. However, this version's TMS won't do anything with this field. |

TABLE 10-continued illustration of FSAT glow

| FIELD | VALUE | NOTE |
|---|---|---|
| glow_order | (T,L,C) | Table T, level L, cell C. |
| glow_attributes | OK_to_Merge | Since OK_to_Split is omitted, we may choose to enforce no splitting in the TMS to reduce transients. |
| role_instructions | | The instructions to perform based on the node role provided from the active FGP this glow is attached to. For basic FSAT, @source, REQUEST_WRITE(order, flow = (SA,DA),Outport = pointer[outport[USAT_id]], null_mode = SKIP); @source, VERIFY( {(SA, source_node), (DA, destination_node)} ) @transit, REQUEST_WRITE(order, flow = (SA,DA),Outport = pointer[outport[USAT_id]], null_mode = SKIP); @transit, VERIFY( {(SA, source_node), (DA, destination_node)}) where order = (T, L, C) and T = 2 for USAT FSAT table, Level = 100 for L2 FSATs, C = cell number = composite number. Each MLAG FSAT given a unique composite number. |
| Local Variables | | |
| glow_local_status | ON=TRUE | We can continue to use an always-ON glow |
| | VALID=TRUE/FALSE | Based on result of VERIFY( ) command at each node |
| | TOPOLOGY=TRUE/FALSE | |
| | FAIL=TRUE/FALSE | Based on presence of lack of TMS alarm |
| | CONFLICT=FALSE | The TMS could not install a valid connection for some reason |
| | ERROR | No conflicts in this version. All things bad |
| policy_integrity | TRUE | not used at this time |

Notes
1. Above describes case where GMS does VERIFY( ). Alternatively, the functionality could be pushed to the TMS in which case the VERIFY( ) command should be included in the REQUEST_WRITE( ) call so that TMS can continue to process a single request from a glow.

1. Using this approach, we could define a basic flow to be (SA, DA, src, dest). In this case, the write commands looks like REQUEST_WRITE( . . . , flow=(SA,DA, src,dest), . . . ) and this means the TMS continues to monitor for SA being attached at src and DA being attached at dest.
2. The current view on glow_local_status is that it is a collection of Boolean variables. One or two bytes is sufficient. Currently five variables are defined. Since there is no USAT signaling, VALID and TOPOLOGY are in one-to-one correspondence with the TMS alarms. The TMS alarms can indicate the local conditions at a node, and glow_local_status variables are synchronized between nodes. For instance, a local node detect a policy conflicts so the TMS sets a CONFLICT alarm, which in turn sets the glow_local_status CONFLICT variable to TRUE. This then is commuted to the other nodes which also set their CONFLICT to TRUE so that all nodes now know there is a conflict. This could also trigger each node to turn itself. OFF. Note that the node(s) which detect conflicts have TMS CONFLICT alarms set to TRUE. In other embodiments, FSAT will always be ON and VALID will be TRUE iff both SA and DA verify( ) true. For FSATs with block, ON=TRUE if SA validates and off otherwise. So in this case, if glow is ON and INVALID then the block will be implemented at source.
3. Each glow in an MLAG FSAT is given a unique glow id. The reason is that they each have a unique SA or DA VERIFY( ) command.
4. Table Level 100 corresponds to the TCAM level 1. The T2 TCAM has eight levels.

The operation of an always-ON FSAT stays the same as with PSAT USATs, except the addition of the following function:

The GMS can evaluate the VERIFY( ) commands given to it in the role instructions and set the value of the glow_local_status VALID status variable.

The glow will always stay ON.

A basic FSAT flow is described as

SA: MAC address (MAC, VLAN) pair

DA: MAC Address (MAC, VLAN) pair. DA VLAN must match SA VLAN.

Excluding the source and root nodes from the flow description allows the flow to be re-used by different glows in an MLAG FSAT. However, these may be included in the flow description.

Additions to TMS:

USAT FSAT Table to record glow entries

TCAM programming (optional) TMS does attachment verification.

status/alarms now include VALID

BLOCK functionality is not used; only SKIP

ERROR flag

The USAT TCAM Table can use the Residual Table as a template. The flow fields are different and there are additional status/alarms.

In addition, to handle composites, the driver could combine all the entries of a composite into one TCAM entry with a common outport. If the composite specifies more than one outport, then the driver may not allow that since OK_to_Split is not specified. In this case, the newest entry should be used (under the logic that this is a transient) and ERROR flag set, which cases glow_local_status to ERROR to be TRUE.

Proof of the Loop-Free solution:

Simplified Algorithm

For a given destination r, each node has a list of candidate trees $T\_1, T\_2, \ldots, T\_K$. All nodes (except r) have the same list and in the same order.

At each node, each tree is labeled valid or invalid. A tree $T\_k$ is labeled valid at node n if there is a valid path from n to r on $T\_k$, e.g. all intermediate nodes and links between n and r on $T\_k$ are operational. Otherwise, node n labels $T\_k$ invalid. Once a node labels a tree invalid, it stays invalid even if the path to the root becomes operational again.

For each packet needing to be delivered to r, node n sends the packet on the lowest number valid tree. If there is no such tree, the packet is not delivered.

The above algorithm is simplified because it does not consider 1) P2, or 2) weights for different MAC addresses attached to r.

Hypothesis: When all nodes have an active tree to all other nodes, the above algorithm produces no loops in steady state.

Proof: At each steady state instant, each node chooses its lowest number valid tree, picks the unique out-link on that tree, and labels that link with its tree number. So, for instance, if n's lowest number valid tree is $T\_k$ and its unique out edge at n is (n,m), then link (n,m) is labeled k.

Now consider a packet being sent from n to r. n's first hop is m and the label on that hop is k. Now the packet is at node m. Call node m's first valid tree $T\_1$ and its out edge is (m,j), so edge (m,j) is labeled with 1.

Suppose 1>k. That means $T\_k$ was not valid at m since m must choose the lowest number valid tree. However, that is not possible since if $T\_k$ was not valid at m, then n would not have declared it valid at n since m is downstream of n in $T\_k$. So this is a contradiction and therefore 1<=k.

Therefore the path that the packet takes through the network is through links which are non-increasing. Therefore, if a loop existed, that loop must have links which are all the same label which means they are all part of the same tree. But a tree has no loops so there can't be a loop.

QED.

Alternative Proof

For each pair of nodes s and d, let a(s,d) be the active tree at node s to node d. So every packet that s has to deliver to d is sent out on $T\_a(s,d)$. By assumption, a(s,d) exists for each (s,d).

Now consider any two nodes n_1 and r. We will show that the above algorithm does not produce any loops to packets sent from n_1 to r. n_1 may be the originating node of the packet or an intermediate node. Since we will show that there are no loops between n_1 and r for all n_1 and r this will then complete the proof.

Consider any packet and let n_1, n_2, . . . be the list of nodes that packet is routed through based on these forwarding rules. If there is a loop then the list is infinite. If there is no loop, the list is finite and terminates at r.

Let t_h=a(n_h,r) be the active tree used by this packet at node n_h. So t_h is the active tree used by the packet at its $h^{th}$ node hop, where its first node hop is n_1. Note we are assuming steady state so a(n_h,r) is the same as when the packet started its journey at n_1.

Now consider any n_h<>r in the sequence. Then either n_(h+1)=r and we are done or n_(h+1)<>r. In the latter case, since t_h is valid at n_h, t_h must also be valid at n_(h+1). Since a node must choose its lowest valued valid tree, t_(h+1)<=t_h.

So the sequence t_1, t_2, . . . is non-increasing and therefore there cannot be a loop. To see this, suppose there was a loop that started at node n_j, j>=1. So there is some other node k where the next hop is j again. Since the sequence is non-increasing, it must be that t_k=t_j, and therefore all the nodes in between n_j and n_k on this loop also have the same tree number. But this means there is a loop in t_j which is not possible since it is a tree.

Q.E.D.

In further embodiments, the network switch systems may be configured to provide Layer-2 VPN services.

Layer Two Virtual Private Network (L2VPN) is a network service that allows multiple Layer two networks to be created on one physical network. Users or applications that uses a VPN is normally called a tenant. Typical and widely-used L2VPN solutions are VLAN-based, e.g., each tenant traffic is tagged with a VLAN flag on the packet header. This VLAN flag is be used in table lookups in the data plane together with the destination MAC address, creating a logical data plane separation among tenants and thus a virtual private network.

VLAN-based L2 VPN solutions has a fundamental limit, as it only allows up to 4 thousand (4k) VPNs to be created in one L2 network domain. This is because the VLAN flag in the packet header has a fixed length of 12 bits, leading to 4096 VLAN values at most.

Encapsulation techniques like Virtual Extensible LAN (VxLAN), or MAC-in-MAC (MiM) have been leveraged to provide L2 VPN services that go beyond the 4k limits. The L2VPN solution leverages the chip capability of VxLAN and MiM to create tunnels but does not necessarily follow the rest of the VxLAN or MiM protocols; the same L2VPN service could also be built on other encapsulation technologies, e.g., NvGRE, MPLS, etc. In one approach, both VxLAN and MiM provide packet encapsulations of an otherwise normal L2 packet either with VLAN tag or not. In the encapsulation header of VxLAN, there are Layer 2, Layer 3, Layer 4 and a VXLAN header, and thus the VxLAN encapsulated packet can also be transported by a layer 3 network as shown in FIG. 19.

Figure 19:
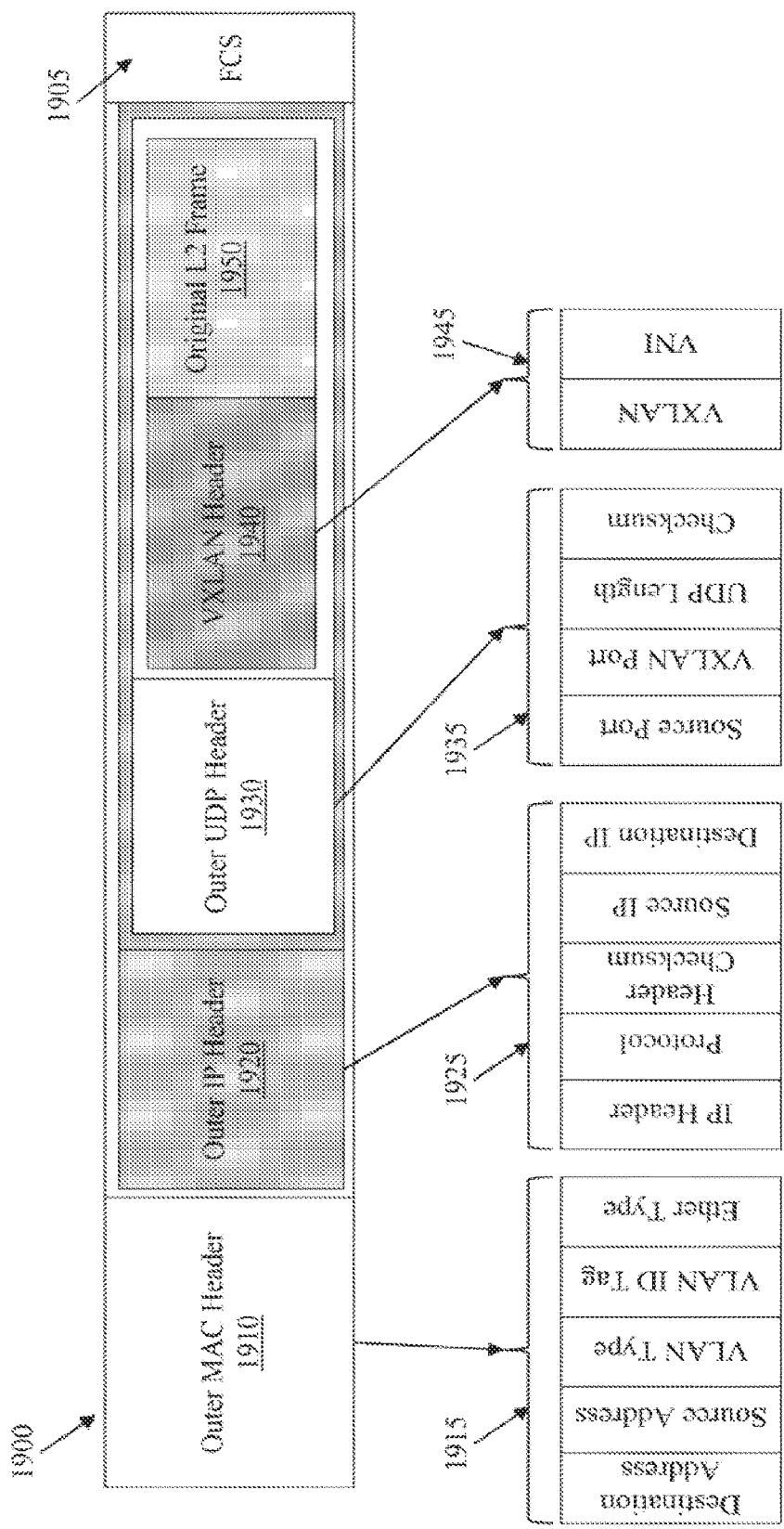
FIG. 19 is a diagram that illustrates a VXLAN header format.

FIG. 19 is a diagram that illustrates a VXLAN header format 1900. The header 1900 includes an Outer MAC Header 1910, with various fields 1915, and a frame check sequence (FCS) 1905. Within the header 1900 are various sub header sections, such as Outer IP Header 1920 (with fields 1925), Outer UDP Header 1930 (with fields 1935), VXLAN Header 1940 (with fields 1945), and Original L2 Frame 1950. The various sub-headers 1920, 1930, 1940, 1950 may be encapsulated in the data fields of the outer headers.

In contrast, the MiM encapsulation header only has a Layer 2 header, and thus needs to be transported by a Layer 2 network. However, both of these two encapsulation header has a 24-bit VPN ID (VNI in VxLAN, and I-SID in MiM), which can be used as the VPN tag. A 24-bit VPN tag can identify 16 million VPNs, enough for most multi-tenanting and cloud computing situations.

Besides being a scalable L2VPN solution, a L2VPN service is also resilient, and can be affinitized (see the above definition of affinity service). For instance, a L2VPN service may be isolated, or transported using paths with minimum hops. In the following sections, the L2VPN residual service (Such as a residual L2VPN service that provides the default fabric transport for L2VPNs that is load-balanced using multi-paths and is resilient) is further described. Other affinitized L2VPN service can be created by mapping L2VPN to different transport USATs meeting the affinity requirements.

Figure 20:
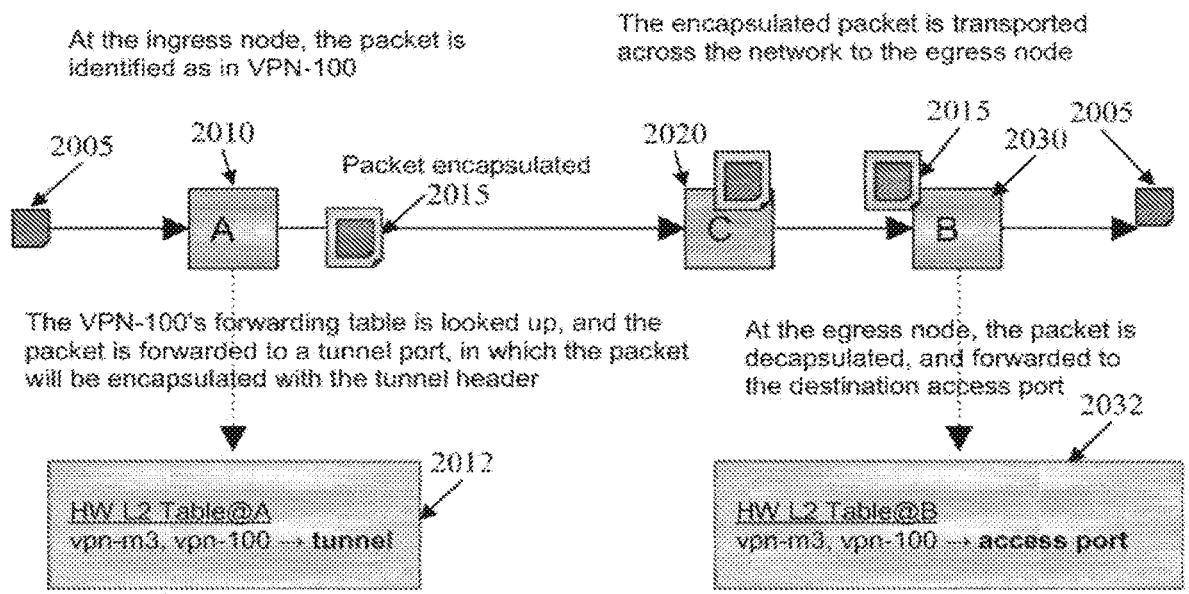
FIG. 20 is an illustration of a packet flow of unicast traffic of L2VPN.

L2VPN residual service provides the default unicast and broadcast, unknown, and multicast (BUM) transport for L2VPN traffic. To briefly describe the packet of L2VPN, see the example in FIG. 20. In FIG. 20, a packet 2005 from an endpoint connected at port a of node A 2010 is going to another endpoint connected to point b at node B 2030. Port a of node A 2010 and port b of node B 2030 are classified as VPN 100; this means a VPN configuration entry is added to the hardware table at both A and B so that packet entering port a and port b will be classified as VPN 100 (a standard approach in most switches). When a packet 2005 enters port a with a destination endpoint (e.g., the destination MAC is m3) attached to node B 2030, it enters the hardware table look-up with VPN context 100. If there is no entry in the hardware table 2012 with (m3, vpn-100), a destination look-up failure (DLF) is triggered and this packet metadata is sent to the CPU. DLF triggers a residual table look-up in the Table Management System. A VPN residual table entry will be looked-up in the TMS, resulting an entry that will be programmed to the hardware L2 table 2012, e.g., (vpn-m3, vpn-100)→tunnel. With this hardware entry, the next time a packet with the same header enters A 2010, it will be classified as in vpn-100, and then forwarded by the hardware L2 Table 2012 to a tunnel, at which the packet will be encapsulated and sent out of A 2010 (as seen in FIG. 20, the output 2015 of node A is encapsulated in a 100-envelope). The encapsulated packet 2015 is then transported across the network to the destination node B 2030 as a normal L2 packet (as seen in FIG. 20, the 100-encapsulated packet is transported through C 2020 to B 2030); transport of these tunnels (or encapsulated packet 2015) is provided by a composite of topologies. At B 2030, the tunnel is terminated and the packet 2005 is decapsulated, and forwarded to the aces port by the hardware L2 table 2032 (another DLF process is used to trigger the programming of the hardware table).

Figure 21:
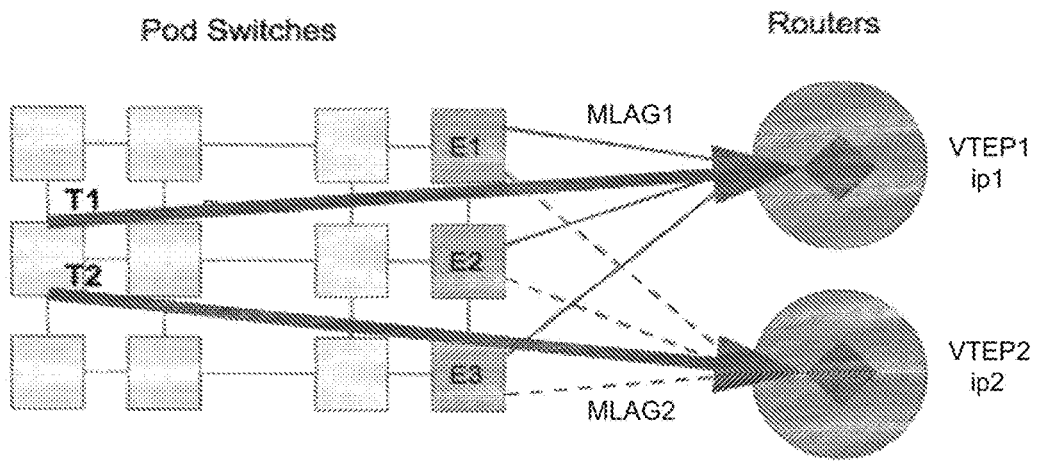
FIG. 21 is a block diagram of VxLAN tunnels from fabric nodes to external VTEPs.

A number of new USATs are defined. The composition of these USATs gives us the L2VPN service. These L2VPN USATs fall into two categories, transport and configuration. Transport USATs are USATs that transport packet from one place to another and span all participating nodes on a fabric graph. Configuration USATs are USATs that classify packets or perform mapping of glows to ports or graphs, and are USATs that only apply at ingress nodes. Below is the list of L2VPN USATs mapped to the two categories:

Configuration USATs
  Tunnel Creation USATs
    Creates unidirectional MiM tunnels from a source node to a destination node. MiM tunnels are used to transport L2VPN traffic within a fabric
    Creates unidirectional VxLAN tunnels from a node to an external VTEP. VxLAN tunnels are used to transport L2VPN traffic from a node to an external VTEP
  VPN Residual USATs—at ingress nodes, forward VPN unicast traffic to tunnels in the VPN context
  VPN BUM USATs—at ingress nodes, forward VPN BUM traffic to tunnels in the VPN context
  VPN Specification USATs—at ingress nodes, classify traffic to be in a VPN
  Attachment USATs
Tunnel Transport USATs
  D-MAC USAT—transports MiM tunnels to a root node identified by the destination MAC address within a fabric
  MLAG USAT for VxLAN tunnels—transport VxLAN tunnels to external VTEPs connected to a fabric using MLAG. Note that this is just one implementation: a VxLAN tunnel going to an external VTEP that is directly connected to an access port could also be transported by a D-MAC USAT The L2VPN packet flow in FIG. 21 can be described using the above defined USATs. At ingress node A, a VPN specification USAT specifies port a is in VPN 100. At ingress node B, a VPN specification USAT specification USAT specifies port b is in VPN 100. A VPN residual USAT maps the 100 VPN unicast traffic to a tunnel, which is looked up during the DLF process producing a HW L2 Table entry as shown in FIG. 21. A VPN BUM USAT maps the BUM traffic in VPN 100 to a tunnel to node B (this BUM flow is not shown in FIG. 21). The tunnel that both the VPN residual USAT and VPN BUM USAT map to is a MiM tunnel from node A to B. and it is created by a VPN Creation USAT. Transportation of the MiM-tunneled (Or encapsulate. Note that tunneled and encapsulated are used interchangeably in this document) traffic (unicast or BUM) is defined by the D-MAC USAT. This is just one embodiment. In another embodiment, transportation of tunnels may be by MLAG USAT, or just residual USAT, or other composites of topologies.

As an example of a workflow of L2VPN service specification, an end user or an integration software specifies the constitution of a VPN. There are multiple ways of specifying a VPN, for example:
  By port—port a at node A and port b at node B are VPN 100
  By VLAN—VLAN 100 is VPN 10000
  By a combination of port and VLAN-VLAN 20 on port a of node A is VPN 200
  By upper layer packet headers that the chip support.

C3 takes the input and creates VPN specification USAT and send them down to the switches: C3 also passes the set of nodes that are in the specified VPN and the associated affinity attributes to Fitting. Fitting generates the rest of the types of USATs and sends them down to the switches. The USATs on the switches are then operated in the Glow Management System, Fabric Graph Management System, and Table Management System.

The D-MAC USAT that supports L2VPN is created with station MAC addresses, and VLAN that Fitting creates in the glow specification. To transport residual L2VPN service, D-MAC USAT is associated with fabric graphs that are the same as residual topologies Fitting computes. To support other affinitized L2VPN service, the D-MAC USAT can be associated with different fabric graphs.

The GMS, FMS and TMS operations on D-MAC USAT are the same as above. Briefly, TMS keeps D-MAC USAT entries in the residual table, which is queried for during DLF to program hardware L2 table for the D-MAC.

MLAG USATs provide affinitized transport topologies to endpoints that are attached to the fabric using MLAG. MLAG USAT can be a service itself to provide special treatment to endpoints attached through MLAG, or it can be part of another service, e.g., L2VPN. In some situations in the context of L2VPN, a L2VPN includes external VTEP(s) (virtual tunnel end points) residing on external router(s), in which routers are connected to the fabric using MLAGs for redundancies. FIG. 21 shows an example of tunnels that are created from fabric nodes to VTEPs in external routers. In this example the routers only support VxLAN, and VxLAN tunnels are created to external VTEPs. The external routers are connected to the fabric through MLAGs, so is the connectivity of the external VTEPs. An MLAG USAT is used to transport a VxLAN tunnel to a VTEP to leverage the redundancy enabled by MLAG. Depending on the requirement on VPN traffic transport, MLAG USAT may be created to provide min-hop path, or to be resilient with bandwidth guarantee.

Figure 22:
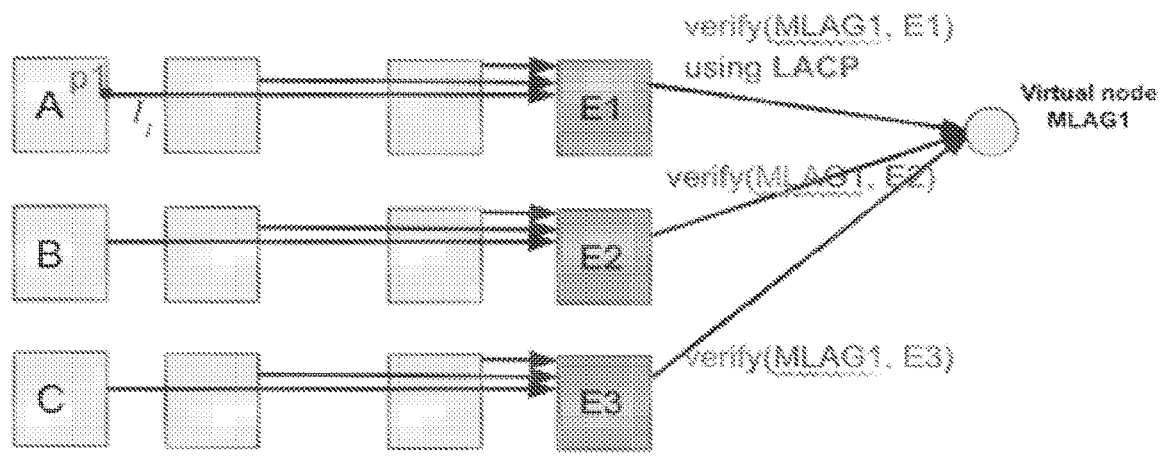
FIG. 22 is an illustration of an MLAG USAT with a min-hop attribute.

MLAG USATs manage table entries in residual table, which leads to entries in the hardware L2 table. MLAG USATs operate similarly as residual USAT. The differences between MLAG USAT and residual USAT are:

The glow encodes a residual flow with root node being an virtual node identified with MLAG_ID (e.g., MLAG1 in FIG. 22), which can be considered as the virtual root node for MLAG USAT The glow is encoded with a lower Level value, thus allowing MLAG USAT to overwrite residual table entries by Residual USAT The validity rule in fabric graph part includes virtual link status, e.g., virtual link E1→Virtual_node_MLAG1 as shown in FIG. 22. A function verify(MLAG1, E1) is used to represent the link state of the virtual link, e.g., verify(MLAG1, E1) returns True if virtual link E1→Virtual_node_MLAG1 is up, and otherwise returns False. Virtual link status can be provided by LACP (Link Aggregation Control Protocol)

Just as residual USATs, MLAG USATs are effective in the DLF look-up process. During DLF in which a (mac, vlan) pair are looked-up with an entry to be programmed in the hardware L2 table. This (mac, vlan) pair is identified as attached to an MLAG in the software P2 Table, and therefore, (mac, vlan, hash(mac, vlan), root=MLAG_ID) is used to lookup the residual table. If there is an MLAG USAT entry that map to this look-up value, then the outport of the MLAG USAT entry will be used to program the hardware L2 table. If the MLAG USAT is no longer valid, e.g., a fabric graph part of this MLAG USAT is invalidated, then the residual table look-up will continue with entries with higher Level values, and residual USATs and other USATs with higher Level values will be looked-up.

In summary, the DLF process can be enhanced to handle MLAG USAT as below:

Upon DLF, look up P2, if it's an MLAG, run MLAG hashing algorithm→mlag1, r
  First look at residual table for MLAG USAT for a match using mlag=mlag1
  If no match, perform residual table look-up using MAC, V, and root=r

TABLE 1 illustration of MLAG USAT entries in residual table in the TMS

| Level | MAC | VLAN | HB | ROOT | PORT |
|-------|-----|------|--------|-------|------|
| 150 | * | * | [1, 100] | mlag1 | p1 |
| 300 | * | * | [1, 50] | root | p2 |

Tunnel Creation USATs create and manage tunnels at ingress nodes. These USATs are only sent to ingress nodes.

On the high level, tunnel information is encoded in Tunnel Creation USAT as below:

Glow write-request:
  @ All
  Table=Tunnel,
  encapsulation_type=MiM
  flow=(tunnel_id, s-mac, d-mac, v, -, -) for MiM; flow=(tunnel_id, s-mac, outport_NH, v(d-ip), s-ip, d-ip) for VxLAN
    The flow descriptor is defined as:
      tunnel_id: a 64-bit ID created by Fitting
      S-MAC: source MAC address
      D-MAC: destination MAC address
      VLAN
      S-IP: source IP address. "-" unspecified for MnM tunnels
      D-IP: destination IP address. "-" unspecified for VxLAN tunnels
  inport=null,
  outport=Residual_Table_outport(d-mac, vlan) for MiM; outport=Residual_Table_outport(d-ip) for VxLAN
FGPL: an empty FGPL with
  mode=None A new mode_of_operation for FGL and FGPL is defined, mode_of_operation="None". This is to indicate FMS not to do anything with "None" mode of FGPL. This is used together with role instruction @All, so that if role instruction is specified for "All" in the glow, GMS should not ask the FMS for a role. Instead, for "All" role instruction, GMS writes the request directly to TMS.

Table Management Operation
  Tunnels Table should take function specification for fields and resolve function specified entries into actual value and keep both in the table. In particular, for this feature:
    outport is specified through function specification residual_table_outport(mac, v) for MiM tunnels: an implicit assumption is that if there is no valid entry in residual table for the given (m, v), then look into P2 topology: the only case where look-up in P2 table fails is when the switch with station MAC m is disconnected→If this cannot be resolved through residual table and P2 topology lookup, e.g., the resolved result is NULL, then set TOPOLOGY_FAIL alarm to TRUE
    outport is specified through function specification residual_table_outport(ip) for vxlan tunnels instead of (mac, v). This indicates that the MAC and VLAN of the specified ip address should be first resolved in the Attachment_Table (e.g., using proactive ARP—Proactive ARP is a software construct on the switch. It periodically ARPs for IP addresses that have been registered with it to resolve the MAC and VLAN of IP addresses), and afterwards follow the same DLF lookup using (mac, v) as specified in the above VLAN is specified by Attachment_Table(ip), indicating the VLAN of the specified ip in the Attachment Table should be used. An implicit assumption in the context of L2 VPN is the vtep ip address has already been resolved in the Attachment Table using an ARP like mechanism D-MAC for VxLAN tunnel is specified as outport_NH, indicating
- if the outport of this entry is a fabric port, use station MAC of the switch the outport points to
- if the outport of this entry is an access port, use MAC of the D-IP from the Attachment Table
- if any of the above entry cannot be resolved, set Entry_Fail alarm to TRUE Operations of Tunnel Creation USATs creates tunnels in software Tunnel Table, which then leads to creation of tunnels on the hardware. When a tunnel status goes down, for instance, because of outport going down, the tunnel is marked as failed in the software table, and the corresponding hardware entries are removed too VPN Specification USAT specifies VPN at ingress nodes using (switch, port, mac, vlan) and VPN-ID. This can be a configuration USAT with all information encoded in the glow, and an empty FGPL. Note that in some implementations of L2VPN service, VPN Specification USAT is not used.

On the high level, a VPN Specification USAT looks like:
Glow write-request:
  Table=VPN Specification Table,
  flow=(switch, port, mac, vlan, VPN-ID),
  FGPL: a FGPL with mode "None"

TMS takes VPN Specification USAT and program the corresponding hardware table so configure the L2VPN. Note that using VPN Specification USAT is just one way of configuring L2VPN on the switches. These hardware entries creates VPN meta data that is associated with VPN packet in the switch processing pipeline, which is used in the pipeline later to perform lookups in the VPN context.

The default affinity attribute for a L2VPN service is load balancing that falls in the residual topology load distribution that Fitting creates by mapping VPN unicast traffic to tunnels which are transported by residual topologies identified by D-MAC USAT. This default load distribution can be overridden if a L2VPN is specified with a different affinity attribute. The underlying technology that carry out the load balancing across multiple tunnels, however, are similar. The difference is the transport USAT (e.g., D-MAC USAT) is mapped to topologies that are computed based on a different affinity attribute.

Figure 23:
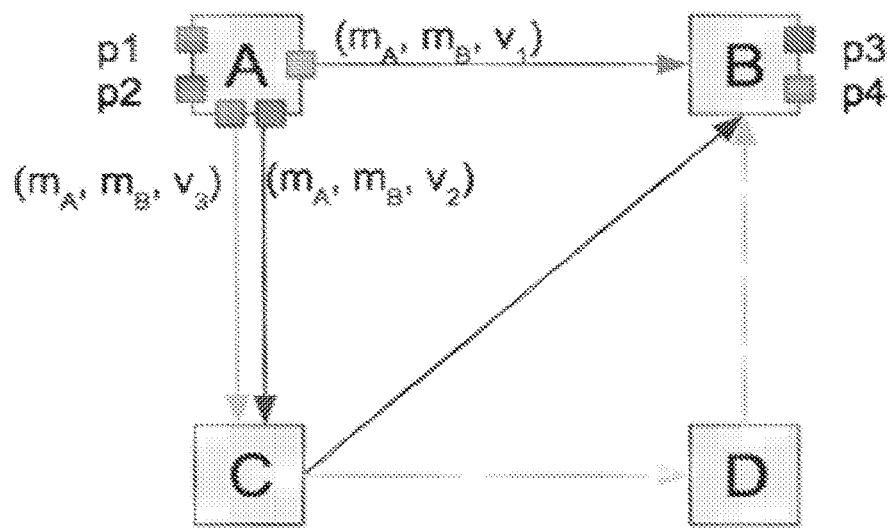
FIG. 23 demonstrates L2VPN Residual USATs for root node B.

To illustrate how unicast traffic is load balanced for a L2VPN, an example is shown in FIG. 23. In FIG. 23, p1 and p2 at A and p3 and p4 at B is classified as a VPN 100. In the default residual topology fitting computes there are three trees going to root node B, t1, t2 and t3, with corresponding weight of 40%, 30% and 30%. Fitting first creates three MiM tunnels, with headers (mA, mB, v1), (mA, mB, v2), and (mA, mB, v3); a MiM tunnels with a header (mA, mB, v1) means the source MAC address of the header is mA, the destination MAC address of the header is mB, and VLAN is v1. Fitting then creates three VPN Residual USATs, each maps a percentage of the VPN residual traffic to a tunnel, for instance:
USAT1 maps 40% of traffic to node B in VPN 100 to t1
USAT2 maps 30% of traffic to node B in VPN 100 to t2
USAT3 maps 30% of traffic to node B in VPN 100 to t3

One the high level, VPN Residual USAT looks like:
Glow write-request:
  @All
  Table=VPN residual table,
  flow=(*, VPN_ID, HB, root),
    *: all MAC address
    VPN_ID: the ID of the VPN
    HB: a range within [1, 100], e.g., a range of [31, 40] matches flow with hash values of (MAC, VPN ID) in range [31, 40] which corresponds to 10% of the residual flow of this VPN
  inport=all,
  output=virtual_port(tunnel_id)
    Referencing a tunnel virtual port
  FGPL: an empty FGPL with
    mode=None The TMS operations of this residual USAT maps VPN residual flow to tunnels in the software residual table, which are queried for during DLF to generate hardware L2 table entries for L2VPN packets. If tunnels are down, affected entries in the residual table are marked as BLOCK, and traffic can be dropped by the hardware.

BUM traffic within a L2VPN can be handled in different ways, for instance, 1) head-end replication, 2) multicast, and 3) broadcast. In 1) a packet that is classified as BUM at an ingress node is replicated at the node to all other nodes in the L2VPN using a tunnel from the node to any other node in the L2VPN; at each other node, the BUM packet is then forwarded to all access ports in the L2VPN, but never back into another tunnel (An exception is when a node is operating under gateway mode, in which a BUM packet will be forwarded to other tunnels but not the tunnels it comes from). In 2) a BUM packet is transported by a multicast scheme (L2 multicast or L3 multicast) to all nodes in the L2VPN, and then to access ports in the L2VPN. 3) is similar to 2, except a broadcast transport carries the BUM packet to all nodes, and only nodes within the L2VPN which accept the BUM packet and forward it to access ports. One, non-limiting example is an approach that uses 1). But the teaching of 1) can be extended to implement 2) or 3) on a multicast USAT.

Figure 24:
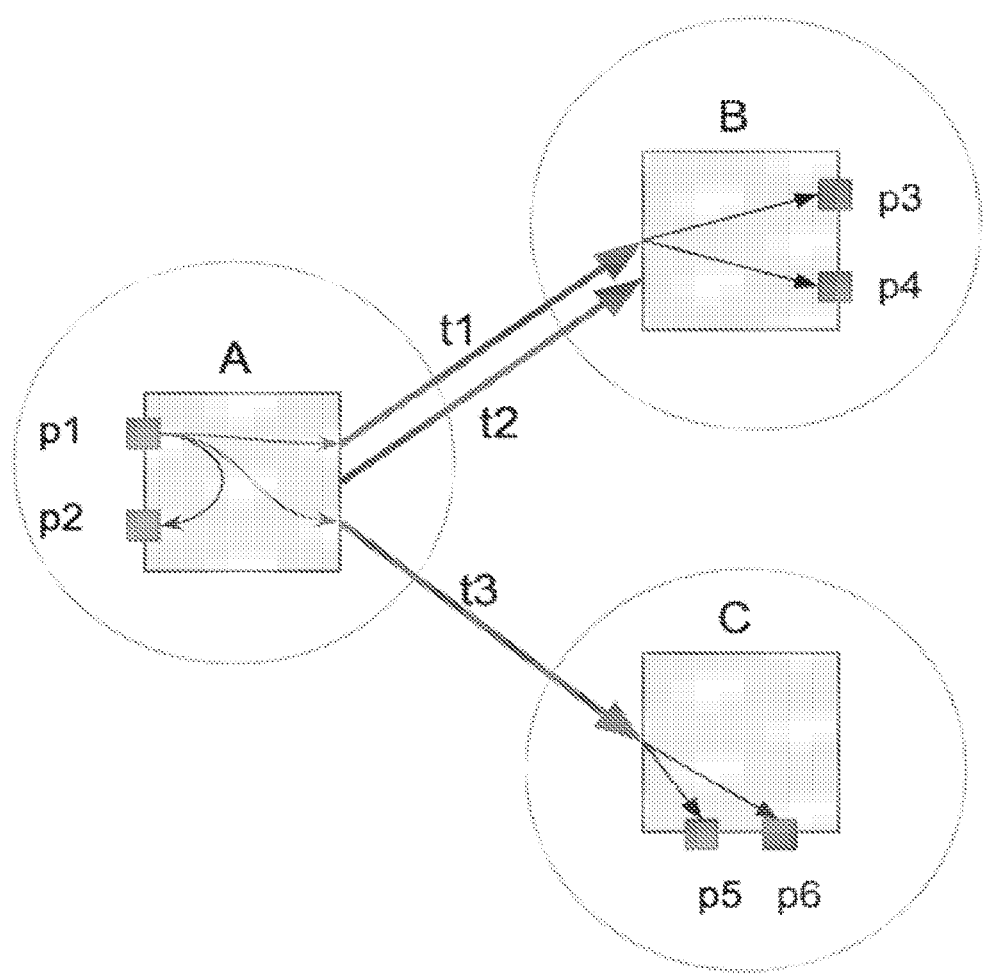
FIG. 24 is an illustration of L2VPN BUM USAT at node A.

FIG. 24 shows an example of the BUM traffic flow for a L2VPN. In this example, {p1, p2, p3, p4, p5, p6} are defined as VPN 100. A BUM packet enters the network at p1 at A. It then is forwarded to p2, t1 and t3. t1 and t3 transport the BUM packets to node B and C, at which the BUM packet is decapsulated and forwarded to p3, p4, p5 and p6. A composite L2PVN BUM USAT is responsible of forwarding the BUM packet into t1 and t3. Such a composite L2VPN BUM USAT is generated for each node in the L2VPN. Each constituent BUM USAT forwards BUM packet from a node to another node; if there are multiple tunnels between these two nodes (e.g., t1 and t2 from A to B), one tunnel is selected to be used in the constituent USAT. The selection of a tunnel can be random, or based on load-balancing, or round-robin, etc.

On the high level, a VPN BUM USAT looks like:
Glow write-request:
  @All,
  Table=VPN BUM Table,
  Level=200,
  C=composite id
  flow=(VPN-ID, root/VTEP),
  inports=null,
  output={virtual_port(tunnel_id)}
  FGPL: an empty FGPL with
    mode=None In TMS, upon changes on outport, e.g., a new virtual port, or NULL, update the Hardware multicast table following below rule:
  Query the software VPN BUM table using the composite-id of the entry with the change, group outports of resulted entries into a set, and program the hardware table with the new set of virtual ports Attachment USAT allows C3/Fitting to provision endpoint attachment to the switches. These endpoints could be external endpoints that our switches do not see directly, or station MACs/IPs Fitting chooses for internal transport purposes. The Attachment USAT is generic enough to provision both L2 and L3 endpoints, attached to either a switch, a port, or an external node (e.g., VTEP).

Provisioned attachments are installed in the software Attachment Table with level 100. Attachment Table is a generalization of P2 table that specifies attachments of not only L2 endpoints, but also L3 endpoints, endpoints attachment to VTEPs and external entities. It also specifies the scope of an attachment, for example, scope "VPN" indicating endpoint attachment is synchronized within a VPN. Today's P2 table can be considered as L2 Attachment entries with level 200, and scope "Domain". Entries of a higher level (smaller numerical value) override those of a lower level.

An Attachment Table describes locations of endpoints. This table is consulted during DLF process for both L2 and L3 pipeline, after which process the location of an endpoint is looked up, then other tables in the TMS (in this service. VPN residual table) are consulted so that a hardware entry is determined and installed.

On the high level, an Attachment USAT looks like:
  Glow write-request:
    Table=Attachment Table
    flow={(mac, vlan/VPN-ID, IP, Root, port)}
    FGPL: a FGPL with mode=None An embodiment is used for L2VPN service transported by USAT. A mechanism to provide affinitized L2VPN services includes;
  unicast VPN traffic is steered to a tunnel at an ingress node to the destination node, or load balanced across multiple tunnels to the destination node
  VPN BUM traffic is headend replicated to tunnels to other nodes which support the VPN, with at most one tunnel being used between any two nodes for BUM
  where the transport of the tunnels is provided by a D-MAC USAT, MLAG USAT, or other transport USATs in a hierarchal way as defined above Another embodiment is used for a mechanism where the transport USATs are computed that meets the requirement of the affinitized L2VPN service.

A further embodiment is used for Tunnel Creation USAT. The mechanism uses at least one tunnel that is created by:
  A Tunnel Creation USAT
    the operation of which instructs an ingress node that has Tunnel Creation USAT to create tunnels
    in the glow of which an outport is specified indirectly as the run-time port through table look-up with values that map to the flow specification of the corresponding transport USATs of the tunnel, e.g., a destination MAC address and a VLAN Another embodiment is used for VPN Residual USAT. The mechanism includes of a set of VPN Residual USATs, the operation and management of which:
  forward VPN unicast traffic to tunnels in normal situations, and if tunnels are down, drop the packets
  direct all or a portion of (e.g., 25%) VPN unicast traffic at ingress nodes, the traffic proportion of which is to provide load-balancing among multiple tunnels per affinity specification of the L2VPN service A further embodiment is used for VPN BUM USAT. The mechanism includes a set of VPN BUM USATs that are an embodiment of composite USAT:
  each constituent USAT forwards BUM traffic into a tunnel destined to another node in the VPN Another embodiment is used for Attachment USAT. The mechanism includes a set of attachment USATs that provides locations of endpoints, instructing switch software when looking-up forwarding instruction for endpoints to query topologies with root node being the location of the endpoints.

A further embodiment is used for VPN Specification USAT]. The mechanism classifies traffic matching to certain criteria to be belonging to a L2VPN:
  One implementation is using VPN specification USAT
  Another implementation is a configuration at the ingress node that is not implemented by USAT Another embodiment is used for combined actions. The mechanism, in which the combined operation of all the USATs provides the functional L2VPN service, in particular:
  For VPN unicast traffic, the unicast traffic is identified as belonging to a VPN at the ingress node by hardware entries which is resulted from the VPN specification USAT by TMS. This unicast traffic is steered to a tunnel port by entries in the L2 hardware table; this entry is a result of looking up of the VPN residual table which in turn is a result of management of VPN Residual USAT in the TMS. The encapsulated packet is sent out to the tunnel port at the ingress node, which then is transported to the destination on a topology that is a joint result of management of D-MAC USAT, MLAG USAT, and residual USAT, or others that may steer the encapsulated traffic to a destination location where the destination endpoint is attached to is based on the hierarchy [note, a hierarchy of the topologies is included in the generalization of partial path invalidation]; these topologies are selected because they all can transport the traffic to a location where the destination endpoint is attached to. At the destination node, packets are decapsulated and forwarded to the destination endpoints
  For VPN BUM traffic, BUM traffic is identified as belonging to VPN at the ingress node by hardware entries which is resulted from the VPN specification USAT by TMS. This BUM traffic is steered to at least one tunnel ports and any access ports that are also part of this VPN by entries in the L2 hardware table; the set of tunnel ports is a result of a combination of all valid tunnel ports of the constituent VPN BUM USATs. The encapsulated packet sent out to the tunnel port is then transported to each destination node on a topology that is a joint result of management of D-MAC USAT, MLAG USAT, and residual USAT, or others that may steer the encapsulated traffic to a destination location where the destination endpoint is attached to is based on the hierarchy; these topologies are selected because they all can transport the traffic to a location where the destination endpoint is attached to. At the destination node, packets are decapsulated and forwarded to access ports that is part of the VPN In further embodiments, the network switch systems may be configured to use generalized partial path definitions.

Generalized Partial Path (GPP) is a mechanism (method and system) for network elements to independently select their part of a graph from a list of candidate graphs such that the resulting composite graph is acyclic. Partial Path (PP) is a special case of GPP where all the candidate graphs are trees. Composite graphs can be used to build switching topologies in a variety of ways. GPP can be implemented distributively or centrally, or with a combination of the two.

To describe the PP and GPP, we use standard graph terms like directed graph, directed multigraph, etc. To avoid any confusion, the graph related definitions are provided below.

The network consists N network elements, or nodes, interconnected by 2E simplex communication links between those elements. Generally simplex links come in duplex pairs in which case there would be E duplex links.

A network element could be physical, virtual, or logical. Hardware elements include Ethernet switches, L2/L3 switches, IP routers, and Layer 1 cross connects. Software elements include virtual switches or processing units such as an Open vSwitch, a VMware vSwitch, and VxLAN Tunnel Endpoints (VTEP). Logical elements include groups of ports on the same or different physical elements such as the ports of a Multi-Chassis Link Aggregation Group (MLAG).

It is possible that multiple virtual and/or logical network elements are physically located on the same piece of hardware such as a server or network switch which may or may not be part of the network under consideration. For instance, a VTEP processing unit could reside on an Ethernet switch, each of which is a network element and is independently addressable. In other instances, this level of detail might not be needed and the multiple virtual elements existing on a switch may all be modeled along with the switch as one network element. In still other instances only the virtual or logical elements are of interest and the physical hardware is considered part of another network. Other possibilities exist.

The links could be implemented in many ways such as:
  direct physical connections between two network elements, such as between two IP routers,
  indirect connections traveling through other network elements that are a part of the network or a part of another network by using standard network layering such as IP (L3) over Ethernet (L2), IP over optical (L1), through tunneling, or thru a combination of the above. For example, two IP routers could be connected through an Ethernet network which is part of the network, through an Ethernet network which is not part of the network, or through another IP network using IP over IP as one possibility. Another example is the connection between two network elements using an encapsulation/tunneling technology such as Mac-in-Mac or VxLAN, whose packets carry the original information and then are either Ethernet forwarded or IP routed through the network.
  Encapsulation refers to the act of putting one stream of packets into another stream with a new set of packet headers. A tunnel represents the subsequent stream of encapsulated packets that travel through the network from the origin of the tunnel to the destination of the tunnel, where the intervening nodes operate on the encapsulated packets, but not on the contents of the tunnel, e.g., the unencapsulated packets. We use the terms interchangeably in this document which is sufficient for our purposes
  or software/hardware connections existing only within the hardware or software of a piece of networking equipment.

There are other possibilities. One common case is when multiple links are logically grouped together, such as in a Link Aggregation Group (LAG). In this case the LAG is considered two simplex links, one in each direction between the two endpoints of the LAG.

The network graph, N, is multigraph with N vertices v1, v2, . . . ,$v_N$, with one vertex representing one network element, and 2E directed arcs a1, a2, . . . $a_{2E}$, with each directed arc representing one simplex communication link. Since there may be multiple links between two network elements in the same direction, the network graph is a multigraph. When simplex links come in duplex pairs, an alternative network graph could be defined with E undirected edges; this document uses a directed network graph.

At any point in time the network has a state, consisting of a set of network state variables, S={s1, s2, . . . }, where S represent the set of network state variables and where each si is a Boolean network state variable representing some part of the state of the network which the controller wishes to reference.

The set S includes at least a state variable indicating the operational status of the participating arcs and vertices of all the networks fabric graphs. A preferred implementation would include each network arc and vertex. An arc is considered operational, and its network state variable TRUE, if and only if it can carry data, which implies the links, LAGs, tunnels, etc. associated with the arc are sufficiently operational to carry data. For instance, if an arc represented the simplex communication between two Ethernet switches with 3 constituent links which constitute a LAG, and two of those links were not operational, then the network state variable is still TRUE because the link can carry data. Similarly a vertex is considered operational, and its network state variable TRUE, if and only if its associated network element was operational for performing whatever data flow operations that element was designated for. (If a network element leaves the network, e.g. an operator moves a switch to another network within the data center, the associated vertex either could be considered inoperable, or removed from the network graph if and when all data structures which refer to it have been refreshed.)

There may be other network state variables associated with an arc or vertex, and others not associated with any arc or vertex. Some examples are.
  a network state variable indicating TRUE if the local time of day was between 1 pm and 2 pm,
  a variable indicating if congestion on a link were above a threshold value, e.g. si=TRUE iff arc ai is considered congested above a threshold value.
  a variable indicating if the number of operational links in a LAG are above a threshold value, e.g. si=TRUE iff a certain LAG had at least 2 of its 3 constituent links operational.
  A variable indicating if either of a set of parallel arcs from some node to another node are operational, e.g. si=TRUE iff there is a valid arc from n to m.

The last two examples indicate that the state variables do not need to be independent. In situations where multiple arcs traverse the same underlying physical infrastructure, many state variables could be completely correlated. In these cases, an implementation may optionally consolidate them into a smaller set, e.g. a state variable x could represent the operational state of two different links which always are operational or fail together.

Let s(x) indicate the state of network state variable x. So, e.g.:
s(v)=TRUE for any vertex v if and only if v is operational.
s(a)=TRUE for any arc a if and only if a is operational.
Note if an arc (n→m) is operational,
then it must be that n and m are both operational.

A candidate graph G is a graph which can be used to create one or more switching topologies. If all the vertices and arcs of a candidate graph are operational, we say the candidate graph is fully operational. Otherwise, we say the candidate graph is not fully operational.

A real time candidate graph is computed distributively by the network elements using only the operational elements of the network. There are many such protocols with variations of spanning tree protocols being particularly prevalent. These protocols are generally designed to modify or recompute the graph in response to network changes or failures. Thus, in steady state, e.g. ignoring communication, computational, and algorithmic transients, real time candidate graphs can be modeled as fully operational. Note that because they are resilient to network changes, they are not static objects. For instance, in Ethernet, the network nodes run a real time distributed protocol to find an operational spanning tree, e.g. a graph spanning all the nodes without a cycle where each undirected edge of the graph represents a duplex communication link of the network, and amend this tree in response to network changes. Ethernet then uses this spanning tree to build unicast and broadcast switching topologies, for example, if a destination address (DA) is located on switch n, then Ethernet would build a directed incasting tree to node n using only the links of the computed spanning tree. Since a single candidate graph is an inefficient use of network resources, other protocols have been developed to calculate a more diverse set of candidate graphs, such as a spanning tree per Ethernet virtual LAN (VLAN).

A pre-computed candidate graph could also be distributed computed, but are often computed at a controller. The controller which could be one of the network elements or a separate entity such as a central controller, and then is fully or partly distributed to some or all of the network elements. Generally such computation is not performed in real time, but rather is done only at certain times which could be determined by many factors such as time of day, time since last computation, a change in the network configuration or traffic, a new service requirement, just to name some. Unlike their real time counterparts, pre-computed candidate graphs may not be fully operational in the steady state because of a network change or failure after the computation. Even if candidate graphs are computed frequently by the controller, there is the possibility that the controller may be unavailable for some time, potentially because it is computationally busy, it is cut off from the network because of a communication failure, there is a maintenance window, software upgrade, or a software or hardware failure, to name a few reasons. Thus, like real-time graphs, pre-computed candidate graphs are dynamic objects, albeit in a different way.

Pre-computed and real time candidate graphs can co-exist in the same network being for different flows, or to give the elements an alternative for the same flows. For instance, a pre-computed candidate graph which could be optimized for some purpose unless it is not operational, in which case the real time candidate graph is used.

Pre-computation of candidate graphs can be very efficient; however pre-computation makes them less resilient to network failures and other topological changes. When parts of a pre-computed graph are no longer operational, the network elements determine if that graph is still usable in some way.

A simple approach is to invalidate any pre-computed graph which is not fully operational: we call such approaches full mechanisms. However, full mechanisms may use a very large number of pre-computed graphs to meet the network resiliency requirements because of the large number of different ways a network can fail. An alternative is to use a partial mechanism in which some or all of the operational parts of graph can be used. Generalized Partial Path is one such mechanism.

One implementation of GPP, and the one used by the USAT architecture, is to embed the pre-computed candidate graph into a fabric graph (FG) data structure, where a fabric graph fg contains at least:
an embedded graph g
a validation rule VR(v) for each vertex of g
a validation rule VR(a) for each arc of g
To distinguish the validation rule of a vertex from an arc, we can write nVR(v) for any vertex v, and aVR(a) for any vertex a. However, VR(x), where x is a vertex or arc is sufficient for most of our purposes.

The embedded graph g may be a candidate graph which is fully operational at the time of the computation, however that is not a strict requirement. For instance, a fabric graph could be constructed with the anticipation of network changes, e.g. that a failed link will be repaired, a planned new node brought on, etc. In such cases the implementation must have a method for identifying network elements and links that may not be part of the network graph at the time of the computation. The vertices and arcs of g are called the participating vertices and arcs of fg, and they are said to participate in fg. The participating vertices of fg do not change with network state. An FG implementation might have additional fields listing the participating vertices and/or arcs for efficient access.

A validation rule (VR) is a Boolean (TRUE/FALSE) function of some network state variables. If VR(v)=TRUE, we say that vertex v is valid in fg. Otherwise we say v is invalid. Similarly, arc a is valid (invalid) in fg if VR(a)=TRUE (FALSE). Note that some vertices (arcs) in fg may be valid while others are invalid. Also note that a vertex (arc) may be valid in fabric graph fg1 and invalid in fabric graph fg2 because fg1 and fg2 use different validation rules for vertex v. A vertex (arc) which is not a participating vertex (arc) of a fg is invalid by definition.

In any network state, a FG fg with embedded graph g can be used to construct a candidate graph G as follows:
The vertices of G are the vertices of g which are valid in fg.
The arcs of G are the arcs of g which are valid in fg.

We say that G is the valid subgraph of fg, or equivalently that G is the valid subgraph of g (using the validation rules of fg). Note that the valid subgraph of fg, G, is not the same as the operational subgraph of g. However, if the VRs are constructed so that a vertex or arc is invalid if it is not operational, then the valid subgraph of fg, G, is a subgraph of the operational subgraph of g. We call this a normal construction. GPP uses normal constructions and we assume this through the rest of the document.

The construction of G can be done by the network elements, the controller, and/or other processing units. In a preferred implementation, the construction is done by the network elements with each network element only computing the parts of the computation that it uses to perform GPP. For instance, a network element does not need to compute the validity of the vertices or arcs of a FG that it does not participate in.

An example fabric graph using the PP validation rules is:
embedded graph g: vertex set {v1, v2, v3, v4} and arc set (v1→v2, v2→v3, v3→v4).
Validation rules:
VR(v1)=s(v1) AND s(v1→v2) AND s(v2) AND s(v2→v3) AND s(v3) AND s(v3→v4) AND s(v4)
VR(v2)=s(v2) AND s(v2→v3) AND s(v3) AND s(v3→v4) AND s(v4)
VR(v3)=s(v3) AND s(v3→v4) AND s(v4)
VR(v4)=s(v4)

Note that since the endpoints of an arc must be operational for the arc to be operational, the above VRs could be further simplified. To illustrate the construction of this FG's valid subgraph, first suppose that all arcs and vertices of g are operational. In this case, G=g since all the vertices and arcs in this fabric graph are valid. Next suppose v1→v2 was not operational but all other vertices and arcs remained operational, including v1. In this case, G would consist of the path from v2 to v4. Thus v1 is excluded from the valid subgraph by the validation rules even though it is operational.

A fabric graph can also be used to describe the algorithmic output of a real time graph algorithm by embedding the result into the fabric graph and setting each of its vertex and arc validation rules to TRUE. Such a representation, even if it is only logical for exposition and not implementation, is useful to be able to 1) refer to any result of an algorithm, rather than a specific result, and 2) to use a common language to describe real time and pre-computed graphs. For instance, the output of a spanning tree protocol could be embedded into fg1 with the resultant spanning tree's node and arc validation rules always TRUE. Suppose fg2 was the fabric graph for a pre-computed candidate graph, then we can say for instance that fg2 should be used if fully operational, and if not, use fg1, meaning any candidate graph that fg1 constructs.

If a FG had an embedded graph which was pre-computed, we call that FG a pre-computed FG. If the FG had an embedded graph that was computed by a real time algorithm, we call the FG a real time FG. Generally, a real time FG would also be normally constructed, e.g. its embedded graph is fully operational, as described above, however variations are possible.

Fabric graphs can be combined into a fabric graph set (FGS), {fg1, fg2, . . . , fgk}, where each FG could be pre-computed or real time. The union of participating vertices (arcs) of fg1, fg2, . . . , fgk, are called the participating vertices (arcs) of the FGS, and a participating vertex/arc of the set is said to participate in that set.

In any network state, a FGS has a candidate graph set {G1, G2, . . . , Gk} which are the valid subgraphs of the embedded graphs of the set's fabric graphs. If all the FGs use normally constructed validation rules, then all the candidate graphs are fully operational over their vertices and arcs.

Other implementations are possible for networks using both real time and pre-computed candidate graphs. For instance:

Two sets could be formed, one with FGs and one with real time candidate graphs.

One or more of the sets could be represented in software in another way. For instance, in one implementation a FGS is created and a candidate graph G produced from this set. The vertices of G use G, and the other participating nodes of the FGS use the real time candidate graph.

Fabric graph sets can be used to specify alternative graphs to increase network resiliency. They can also be used to specify alternative graphs for load balancing. For instance, fg1 and fg2 could be primary candidate graphs with the network elements load balancing between them in some specified manner, and fg3 . . . fgk being back-ups to those graphs. As another example, suppose a FG set {fg1, fg2, fg3}, with fg1 and fg3 being real time FGs and fg2 being pre-computed. The network could be instructed to use fg1 if possible, otherwise fg2, and if neither fg3. For instance, fg1 and fg3 might be the output of the same underlying protocol, but where the algorithm discards the candidate graph in fg1 if some performance metrics are not met, e.g. some hop distances exceed a threshold.

There may be multiple candidate fabric graph sets, FGS1, FGS2, . . . which are used for different, potentially overlapping flows. For instance, fabric graph set FGS1 could be used for any L2 traffic on VLAN 1 destined to a vertex n, fabric graph set FGS2 for any L2 traffic on VLAN 2 destined to vertex n, and another fabric graph set FGS3 which is used for any traffic to vertex n, regardless of its VLAN identification, where FGS3 is used for any traffic not in VLAN 1 or 2 and for VLAN 1 (VLAN 2) traffic at any vertex which cannot reach n on one of the candidate graphs of FGS1 (FGS2) in the present network state.

Over time, new FGS can be added, old ones removed, and/or existing ones modified, as network requirements change. Typically the controller creates the sets, but other implementations are possible.

Each FGS is given a preference function where every fabric graph fgi in a FGS set {fg1, fg2, . . . , fgk} is given a real numerical value pref(fgi) indicating the preference in the set. If pref(fgi)<pref(fgj), then we say that fgi is preferred to fgj, and we write this in shorthand as fgi<fgj. Similarly, if pref(fgi)=pref(fgj), then we say that fgi and fgj are equally preferred, or equivalent, and write this as fgi~ fgj. Note that since preference is determined by a real numerical value, it follows that if fgi is preferred to fgj, then fgj is not preferred to fgi. Also if fgi~fgj, then fgj~fgi, and also that the preferred relationship < and the equivalent relationship ~ are transitive, so that if fgi is preferred to fgj and fgj to fgk then fgi is preferred to fgk. The shorthand notation fgi<fgj can mean either fgi<fgj or fgi~fgj.

For instance, one implementation is to give the each graph an integer preference value. Furthermore, FGs could be named using the format fgx.y, where x indicates their preference value and the decimal is used to distinguish FGs with the same preference. In this schema, fgx.y<fgw.z if x<w and fgx.y~fgw.z if x=w. Optionally, the decimal value could be used to provide additional information to the network elements, for instance, a lower decimal value could indicate to the network elements a secondary non-binding preference.

Other implementations may be used as long as they could be represented as above. For instance, the preference could be represented as an ordered list of sets where order in the list determines preference and inclusion in a set determines equivalence. For instance, ({fg1, fg2}, {fg3}, {fg4, fg5}, . . . ) means that fg1~ fg2, both of which are preferred to fg3, which in turn is preferred to the two equivalent graphs fg4 fg5.

If no two fabric graphs are equivalent, we say that the preference is strict. A strict preference can be represented as an ordered list (fg1, fg2 . . . , fgk), where fg1<fg2< . . . <fgk.

Note that each FGS is given its own preference function. A fabric graph may be part of multiple FGS, and it is possible that its preference is different in those sets. For instance, it's possible that fg1<fg2 in FGS1 but fg2<fg1 in FGS2.

In any network state, each FG fgi of the set {fg1, fg2, . . . , fgk}, has a candidate graph Gi which is fully operational if the validation rules are normally constructed. However, there may not be a single candidate graph from the set which meets a flow's connectivity requirements. For instance, consider a flow which could originate at any node but is destined to node n. It may be that in a network state, none of G1, G2, . . . Gk spans all the nodes. In some cases it may be that some candidate graph Gi meets all of flow's connectivity requirements, but using the same candidate graph at all the network elements where the flow could exist means that some network elements are not using their most preferred graph that appears operational to them.

A composite graph G is formed by taking the union of subsets of {G1, G2, . . . , Gk}. There are many different ways such a process could be done. For instance, G could be formed by taking the union of all the candidate graphs, G1, G2, . . . Gk, however such a process could produce a graph G with cycles. In addition, taking the union of all the graphs ignores the graph preferences in this FGS.

GPP is a mechanism to form an acyclic composite graph from a FGS with a preference function. GPP can be efficiently implemented distributively, although a distributed implementation is not required. PP is a special case of GPP which is described separately.

There are three parts to the Partial Path mechanism:
1. Part 1 creates fabric graphs with embedded trees suitable for use in PP, e.g. PP-FGs.
2. Part 2 organizes these PP-FGs into a FGS with a strict preference function.
3. Part 3 forms the acyclic composite graph from the FGS using the preference function.

In Part 1, the controller creates fabric graphs, fg1, fg2, . . . , each satisfying the following conditions:
  embedded graph g: a directed tree to a root node r.
  Validation rules:
    $VR(r)$=TRUE if and only if r is operational.
    For each vertex v in g, $v < > r$, $VR(v)$=TRUE if and only if there is an operational directed path in g from v to r.
    For each arc in g, $VR(a)$=TRUE, if and only if there is an operational directed path in g from the head of a to r.

Note that for PP, the arc VRs are redundant since if v is valid, and v is not the root, then v's unique out arc are also valid. Therefore, an implementation could use just one validation rule.

In any network state, a PP-FG's constructed graph can either be i) a directed tree rooted to r, ii) an isolated node consisting only of r, or iii) an empty graph. Case iii) occurs when r is not operational. Case ii) occurs when r is operational but no other node of g can reach r through an operational path in g. Case i) occurs in the remaining network states.

For real time FGs, the above conditions are met for any algorithm which finds an operational tree rooted at r. For these, the controller creates a real time FG indicating the algorithm used to embed the graph.

In Part 2, the fabric graphs are organized into a FGS, FGS1={fg1, fg2, . . . , fgk}. As many real time and pre-computed FGs as desired can be included in the set, the only requirement being that all FGs meet the conditions above to a common root node r. The set is then strictly ordered, e.g. the FG's can be put into an ordered list of the form (fg1, fg2, . . . , fgk) with fg1<fg2< . . . <fgk. One preferred implementation is for the least preferred FG, fgk, to be a real time FG, and all the other FGs to be pre-computed. In many implementations, the FGs are computed and ordered at the same time, e.g. the most preferred FG is computed first and put into the list, then the second most preferred FG is computed and put into the second place in the list, etc.

In Part 3, each operational v is assigned its most preferred valid FG out of FGS1. This could be done centrally, or distributedly with vertex v selecting its most preferred valid FG. In other words, for v to select fgi, v must be operational, fgi must be valid at v, and fg1, fg2, . . . , fg(i−1) are not valid at v. If such a selection is possible, then v and the v's unique out arc in fgi are added to G. If not, or if v is not operational, then v is not in G. In other words, each operational vertex v selects the most preferred operational path to r.

The composite graph G can either be i) a directed tree rooted to r, ii) an isolated node consisting only of r, or iii) an empty graph. Case iii) occurs when r is not operational. Case ii) occurs when r is operational but no other participating node of FGS can reach r through any of its operational candidate graphs. Case i) occurs in the remaining network states. The proof of this relies on the fact that a path to the root from any operational non-root vertex v passes through a set of vertices which have select FGs whose preference is non-increasing. Thus a cycle would have to be formed from a set of vertices which selected graphs whose preference is constant which is not possible since each embedded graph is a tree.

Note that the arc validation rules were not used and thus an implementation may only use one validation per node for PP. In the USAT implementation of PP, only the part of the FGs that a network element uses to perform Part 3 are distributed to it, that part including the FG's single VR and its out arc. The fabric graph parts, FGPs, are organized into a fabric graph part list (FGPL), which serves to strictly order the FGPs, and thus the embedded graphs, using the same preference function as for the FGS. The network elements then select the first valid FGP in the list, if it exists. If it does not, the network element does not use this composite graph to create any switching topologies and the network element either blocks the flow or attempts to use an alternatively specified composite graph.

There are some variations to the selection step (Part 3) in the PP mechanism:
  If a vertex v is a leaf in each of its valid graphs, then v can break the strict preference and select any valid graph. Note that v does not need to be a leaf in each embedded graph.
  If a vertex v is directly connected to r in one of its valid graphs, then v can break the strict preference and select the direct connection to r.
  If a non-root vertex v is directly connected to another non-root vertex m in one of its valid graphs and m has a valid graph which is directly connected to r, then v may break strict preference and choose the graph which connects to m if m chooses the connection to r, either because i) m prefers the direct connection to r, or ii) m selects a valid direct connection to r if it exists, or iii) v and m coordinate, or for another reason.

Some useful generalizations of the PP mechanism are:
  The PP mechanism does not include a non-vertex v which cannot reach the root on one of its candidate graphs, whether or not the vertex is operational. Alternatively, the mechanism can be adjusted to include v as an isolated node in G. This might be useful to indicate to the network element that something alternative should be done with the flow, such as blocking the flow's packets. However, other implementations can perform this same function without implementing this variation.

The embedded graphs can be generalized to include multi-trees where there may be multiple links between two vertices.

The embedded (multi) trees do not have to have a common root.

These generalizations can be applied individually or in combination to the PP mechanism with or without the selection rule variations.

For the first generalization:

Part 1 of the mechanism is modified so that the fabric graphs are created satisfying the following conditions:
embedded graph g: a directed tree to a root node r.
Validation Rules:
VR(r)=TRUE if and only if r is operational.
For each non-root vertex v of g, VR(v)=TRUE if and only if it is operational.
Each arc a of g, VR(a)=TRUE if and only if there is an operational directed path in g from head(a) to r.

Part 2 is unchanged

Part 3 is modified so that for each operational participating node v,
v is added to G.
If v is not the root, select if possible the most preferred FG in the set which has VR(a)=TRUE where a is the unique out arc of v. In other words, for fgi to be selected for node v, it must be true that fgi has an operational path to the root and fg1, fg2, . . . , fg(i−1) do not have operational paths to the root. If such a FG can be selected, add v's out arc in that FG to G.

Using this generalization, a PP-FG generates a graph which is the union of a possibly empty set of isolated nodes and a possibly empty directed tree to r. To see this, suppose first that the root is not operational. In this case no non-root vertex has an operational path to the root and therefore the graph consists of isolated vertices, e.g. those vertices of g which are operational. Suppose now that the root is operational and consider any non-root vertex n. If n is not operational, then it is not be part of the graph. If n is operational but it's unique path to the root is not operational, then the composite graph contains n as an isolated node. On the other hand, if n is operational and its unique path to r is operational, then the composite graph contains n and its unique out arc. This out arc could land on the root or it could land another non-root operational vertex m. Because the path m takes to the root is a subset of the path n took, m is also part of the composite graph, and so on to the root. Note it is also possible to include isolated nodes in the embedded graphs. For instance, if a service were specifically not to be offered at a vertex, it could be included as isolated node in any embedded graph of the FGS which was not using it as a transit node.

For the second generalization, the PP mechanism can be applied grouping parallel arcs together into a new arc which is not operational if and only if each of the constituent arcs is not operational. For instance, if in fg1, there are 2 arcs between vertices v1 and v2, then create a new arc between v1 and v2 representing both arcs. This new arc is considered operational if and only if one of the constituent arcs is operational. Repeat this for each instance of parallel arcs in each FG of FGS1. The PP mechanism can then be applied as specified above.

For the third generalization, amend the network graph to include a new logical node, r', and directed arcs from each root of the embedded graphs of FGS1 to the new logical node in the network graph as well in the FG. The resultant embedded graphs are now trees to a common root, r'. The PP mechanism can be applied as specified above to the modified network and fabric graphs, with the validation rule to the root meaning to r'. The logical node and its incident arcs can either be considered always operational, or defined in some other way. For instance, the root nodes of the FGS (e.g. the nodes which are a root node in any FG of the set), could be Ethernet switches where an MLAG is attached, the logical root node r' representing the MLAG, r' being considered operational if the MLAG is operating, and the arc from a root node to r' considered operational if that MLAG is operating at that node.

Alternatively, the all 3 generalizations can be implemented by using the General Partial Path mechanism described below.

FGs can be generalized to include one or more node roles, which can be arbitrary labels on the vertices of the embedded graph, which can augment the instructions to a network element. So, for example, the selection of a FG for a vertex v in Part 3 of the PP mechanism results in the vertex being assigned the node roles of vertex v in the selected FG. This allows roles to change depending on the selected FG and thus network state. For instance, a rate limiting role could be added at the source nodes to all backup FGs but not to the primary FG.

Node roles are not required for PP or GPP, however it can still be convenient to include them. A preferred implementation might have roles root, source, and transit. In addition, an implementation might include role leaf if a vertex were a leaf in all the FGs of the FGS in order for a network element making the FG selection to quickly see that it can break strict preference, e.g. the element can run the standard PP mechanism, and if it finds it has a role of leaf in the most preferred graph, it can optionally break preference. For instance, it might choose to do so if it finds the link out of it using the most preferred graph to be unexpected congested.

GPP generalizes PP in a number of ways:

The embedded graphs can be directed acyclic multigraphs (DAMGs)

The validations rules are both adjusted to work with DAMGs as well as generalized to allow more design options. The rules now consider the potential alternate paths provided for by a DAMGs, as well as focus on valid paths, rather than operational paths.

The preference function is relaxed to allow equivalence between some DAMGs that meet a certain condition.

There are three parts to the GPP mechanism:

1. Part 1 creates fabric graphs with embedded DAMGs suitable for use in GPP, e.g. GPP-FGs.

2. Part 2 organizes these PP-FGs into a FGS with a preference function.

3. Part 3 forms the acyclic composite graph from the FGS following the preference function.

For Part 1, the controller creates the fabric graphs fg1, fg2, . . . , such that each satisfy the following conditions:
Embedded graph g: the embedded graph must be a directed acyclic multi-graph. The graph can have any number of roots and isolated nodes but must not have a directed cycle.
Validation Rules:
for any vertex v of g,
If v is not operational, then VR(v)=FALSE
If VR(v)=TRUE→either v is a root of g OR v has an out arc a such that VR(a)=TRUE for any arc a of g,
  If a is not operational, then VR(a)=FALSE
  If VR(a)=TRUE, then it must be true that both VR(n)=TRUE AND VR(m)=TRUE, where n and m are the endpoints of a.

The above conditions ensure that in any network state, a GPP-FG's constructed graph G is a DAMG with a valid path from any node to some original root, e.g. the graph is acyclic and if r is a root of G, then r is a root of g, so that no new roots are introduced. A path in g is valid if each vertex and arc of the path has a TRUE validation rule.

Consider the following example:
Embedded graph g: a network with 3 vertices, {v1, v2, v3}, and 3 arcs {v1→v2, v2→v3, v1-->v3}.
The following validation rules:
  VR(v3)=TRUE iff s(v3)=TRUE
  VR(v2-->v3)=TRUE iff s(v2-->v3)=TRUE
  VR(v2)=TRUE iff s(v2-->v3)=TRUE
  VR(v1-->v2)=s(v1-->v2) AND VR(v2) AND s(x)
  VR(v1-->v3)=s(v1-->v3)
  VR(v1)=VR(v1-->v3) OR VR(v1-->v2)

Where x is an additional state variable and s(x) it's value. For instance, suppose all the arcs and vertices of g were operational and x was a time of day variables such that s(x)=TRUE iff it's between the hours of 8 pm and 8 am, then vertex v1 has two valid paths to v3 between 8 pm and 8 am, but only has one valid path, the direct path v1→v3, during the other hours. If v1 selected this graph during the selection process, then v1's network element could use one or both of these paths during the night, but only one during the day. Note that would mean that v1 could not reach v3 during the day if its direct connection failed, and thus v1 could not choose this FG, but could potentially choose another FG. Alternatively, the VR's could be amended to account for this possibility amending VR(v1-->v2) so it is TRUE during the busy hours if v1→v3 is not valid.

For real time FGs, the above conditions are met for any algorithm which finds an operational DAMG rooted at the specified root nodes.

In Part 2, the multiple FGs are put into a FGS, FGS1. As many real time and pre-computed FGs as desired can be included in the set. The set is then ordered in such a way that it could be represented by an ordered list of the form ({fg1.1,fg1.2, . . . }, {fg2.1,fg2.2, . . . }, . . . , {fgk.1,fgk.2, . . . }) with fg1.*<fg2.*< . . . <fgk.* and with fg1.*~fg1.*, so that the sets within the ordered list contains exactly those FGs which are equivalent to each other. Furthermore, when constructing the order, the union of all graphs in each equivalence set is a DAMG, e.g. Union(fg1.1, fg1.2, . . . ) is a DAMG. One preferred implementation is for the last set to be a single FG, {fgk.1} which has embedded a real time FG, and all the other FGs to be pre-computed.

In Part 3, each operational vertex v which participates in FGS1 selects its most preferred FGs in the set which has VR(v)=TRUE. Note that all FGs within an equivalence set are not all necessarily valid at the same vertices. In other words, if fg were one of v's selected FGs, then VR(v)=TRUE in fg, and there is no other fg'<fg with VR(v)=TRUE. If v can select a valid FG, then add v to G, and add each out arc of v which is valid from each selected FG. If an out arc appears in multiple selected FGs, it is only added once to G.

GPP produces a composite graph G which is a DAMG with no new roots, e.g. if r is a root of G, then r is a root of one of the embedded graphs in FGS1. The proof of this relies on the fact that a valid path from a non-root vertex n to some root r follows a set of vertices which select FGs whose preference is non-increasing. Thus a cycle would have to be formed from a set of vertices which selected graphs whose preference is constant which is not possible since each embedded graph is acyclic and because the union of each equivalence set is acyclic.

One implementation is USATs. In USATs, only the part of the FGs that a vertex uses are distributed to it, that part including the FG's VR for v and all of v's out arcs in the embedded graph. The fabric graph parts are organized into a modified fabric graph part list (FGPL), which serves to order the FGPs with possible equivalence classes, using the same preference function as for the FGS. Each network element then selects the most preferred valid FGPs, and uses all its valid out arcs.

In GPP, a vertex may have more than out arc in the composite, leading to one or more roots on one or more different paths. The network element can choose one or can choose to load balance across those paths. For instance, the network element may put a new flow on the least congested arc, a variable which may not have been available to the central controller at the time of the candidate graphs were computed. In USATs, the network elements do not make these decisions themselves, but rather are given instructions on how to operate, these instructions combined with the candidate graphs, distributedly build switching topologies for different flows. Node roles can be used to adjust these topologies based on the network state. GPP gives the network elements more flexibility in creating and loading these topologies.

A generalization of the GPP mechanism is where each operational vertex v which participates in FGS1 selects one or more of its most preferred FGs in the set which has VR(v)=TRUE. Note that all FGs within an equivalence set are not all necessarily valid at the same vertices. In other words, if fg were one of v's selected FGs, then VR(v)=TRUE in fg, and there is no other fg'<fg with VR(v)=TRUE. If v can select a valid FG, then add v to G, and add one or more valid out arcs of v from the set of selected FGs. In other words, if v selects FGs for which it is a root in each, then only v is added to G and it becomes a root in the composite graph. In all other cases where v is valid, v is added to G and at least one valid out arc from the set of selected FGs is added. If an out arc is valid in multiple selected FGs, it can only be added once to G.

For instance, suppose fgx.1 has an embedded graph of v1→v2, and fgx.2 has an embedded graph of v1→v2→v3. Suppose further than fgx.1~fgx.2, and both are valid at v2. Then v2 can optionally select only fgx1.1 making it a root node in the composite. In the other cases where v2 selects only fgx.2 or both fgx.1 and fgx.2, v2 becomes a transit node in the composite. In the original GPP mechanism, v2 would select all the valid equivalent fabric graphs. This is a limitation when one or more of those equivalent fabric graphs is a root node and one or more of them is not a root node since the composite will then not be a root node at v2. The generalization above removes this limitation.

An alternative way to deal with the original limitation is to use node roles and allow v2 to declare itself, or act like, a root node if it selects a FG with that role.

Each operational vertex v which participates in FGS1 selects one or more of its most preferred FGs in the set which has VR(v)=TRUE. Recall that if v is not a participating node in a FG, then that FG is not valid at v by definition and so cannot be selected. An alternate implementation would be to only distribute to v those FGs in FGS1 in which v participates, omitting the others from consideration at v. This is the approach taken in USATs.

GPP produces an acyclic composite graph with no new roots. The proof consists of two theorems. Theorem 1 proves that GPP produces acyclic constructed graphs with no new roots.

Theorem 1: In any arbitrary network state, let g' be the constructed graph of GPP-FG fgx with embedded graph g. Then g' is operational, valid, and acyclic with no new roots, e.g., if r is a root of g', then r is a root of g.

Proof: First note g' is a valid and operational graph in the network state. Validity follows from the fact that the definition of constructing a graph from a FG takes only the valid vertices and arcs. Operational follows from the fact that for a component to be valid it must be operational. The fact that g' is a graph follows from the validation rules which insists that for an arc to be valid, both its endpoints must be valid.

Second, note that g' is acyclic because it is a subgraph of g, which is acyclic.

Third note that g' has no new roots since if r is a root of g', then VR(r)=TRUE, and by the validation rules, either r is a root of g OR r has an out arc a such that VR(a)=TRUE, which in turn implies that VR(m)=TRUE where m is the tail of arc a. In the latter case, r is not a root of g', and so the only possibility left is that r is a root of g. QED.

Theorem 2 shows that a composite graph is produced with the desired properties, given that each candidate graph produced is acyclic with no new roots.

Theorem 2: In any arbitrary network state, The composite graph G, produced by the GPP mechanism, is an operational acyclic graph with no new roots, e.g., if r is a root of G, then r is a root of some embedded graph in the fabric graph list.

Proof: First G is operational. Let v be a vertex in G. Then by the selection process above, v must be operational since only operational vertices choose a FG. Note also that v must be valid in some FG, which also implies v is operational. Now consider any arc a in G. For a to be included in G, it must be true that VR(a) is valid in some FG of the fabric graph list in this network state. Therefore a is operational.

Second, note that G is a graph since each of its arcs has endpoints in G. Consider any arc a in G. Then the selection process ensures that head(a) is in G because only vertices which have been put in G can select an out arc. It must also be true that tail(a) is in G, since for arc a to be included, it must be that it is valid in some FG of the fabric graph list, and therefore both its endpoints are valid. Since tail(a) is valid, it must operational, and therefore goes through the selection process, and has at least one valid FG, and therefore is included in G.

Third, G is acyclic by contradiction. Suppose there is a cycle in G, consisting of vertices m1, m2, . . . , mL, and arcs m1→m2, m2→m3, . . . , mL→m1. Since m1 is in G, it follows that m1 must have selected at least one valid FG fg(m1) with valid out arc m1→m2, and furthermore fg(m1) must be one of m1's most preferred valid FGs. Similarly, m2 is in G and has selected at least one valid FG fg(m2) with valid out arc m2→m3, and fg(m2) must be one of its most preferred valid FGs. Now note that it cannot be true that fg(m2)>fg(m1) since fg(m1) is valid at m2 (otherwise m1→m2 would not be valid at m1). The same argument goes for each hop of the cycle, and this along with the transitivity of the preference function, implies that the sequence of selected FGs, e.g., fg(m1), fg(m2), . . . , fg(mL) is monotonically non-increasing in preference. Also, by the same logic, it cannot be true that fg(m1)>fg(mL), and so it must be true that fg(m1)~fg(m2)~ . . . , ~fg(mL). However, from the ordering rules, Union(fg(m1), fg(m2), . . . , fg(mL)) is a DAMG which cannot contain a cycle. Hence we have a contradiction and G is acyclic.

Fourth, G has no new roots. Let r be a root of G. Then for r to be a root, it must be true that r is valid and has only selected FG's which are roots at r. From the previous theorem, r must be an original root of one of the embedded graphs. QED.

The GPP mechanism can be modified in different ways for different applications.

The embedded graphs could be generalized further to allow cycles as long as the validation rules guarantee that the constructed graph is acyclic. For instance, a directed cycle could have one arc in it with a validation rule making that arc invalid if all the other vertices and arcs of the directed cycle are valid. Note that in this case it's possible that a new root could be created in the composite topology and appropriate measures to deal with that can be put in place ensuring that no flows are put on the topology that could not terminate on the new root.

Cycles could be allowed in the constructed or composite graphs if flows were only put on them which had an exit node on the cycle. For instance, in a ring network, a composite graph which is a directed cycle around the ring could be allowed if the network elements only put flows on it which had destination addresses attached to one of the network elements. In this way, a cyclic composite graph can be used to construct different acyclic switching topologies.

The validation rule restrictions above of the GPP mechanism ensure no new roots. As evident by the proof, if these rules are relaxed, the GPP mechanism would still construct an acyclic composite graph, albeit one with potentially new root nodes. Other mechanisms could be put in place to deal with this.

The preference functions can potentially be generalized in a number of ways. For instance, Some FGs can be uncomparable in the ordering. For instance, if two FGs are disjoint, or only overlap at nodes where they are identical (identical out arcs and validation rules, and the optional node roles) if both are valid, then they do not need to be comparable in the ordering. For instance, consider two sets of FGs, the first being invalid in the am time period, the second being invalid in the pm time period. Then each set could be ordered according to the GPP rules but a preference function between them does not need to be specified. As a second example, two sets of trees (the Red trees and the Blue trees) with a common root node r could be made incomparable if they were completely disjoint except for r. Such a situation could occur if r were a hub node where the Red and Blue trees existed only on separate subnetworks hanging off the hub node.

The proof relied on the transitive nature of the ordering. If transitivity is removed, cycles can be created. However, transitivity need only apply for FGs which could potentially form a valid cycle as in the proof.

The FGs in GPP were ordered the same at each network element. It's possible in some cases to provide a different ordering at different network elements. The generalizations of the selection rules which allowed a network element to break preference are examples of this.

There are variations of the selection function for GPP like PP, as discussed above. For instance, for GPP, if a vertex v is a leaf in each of its valid graphs, then v can break the strict preference and select any valid graph.

Network elements can assign flows to candidate graphs and form a switching topology by programming hardware or software tables. For instance, a directed spanning tree to a root node r would be an appropriate graph to assign Ethernet flows with destination address DA if it was known that the host with that address was attached to the network element with associated vertex r. In this case, the network elements program DA into its chip forwarding table with the outport associated with the composite graph's out arc at that network element's vertex. The root node would then forward the packet out the correct access port, with its forwarding table's entry either learned or specified in some other way.

By using the GPP mechanism, network elements can assign flows to composite graphs as well, being sure that in steady state these graphs are acyclic. Construction of an acyclic graph does not guarantee network wide loop free behavior, only that there are no loops from when the network element injects the flow into the composite graph and when the network element hits a root node of the composite graph. To ensure network wide loop free behavior, it is sufficient for the root node ensure that the packet is not re-injected unaltered back into the network fabric. The root node can ensure this by terminating the flow in any number of ways, e.g. by:

delivering the packet to the required destination, if the destination is attached to it.

delivering the packet out of the network to another network or gateway node, if the destination were located in a different network domain. If so, other mechanisms can be enacted to ensure that another domain does not re-inject the packet at this or another location. GPP can be used here at the internetworking level.

discard the packet, e.g. if it finds that it has been assigned the root node role by the FG, or determines it is a root node because it has no valid out arc. This could occur for instance if a flow were put on an incorrect composite graph which delivered the flow to the wrong destination node, such events could occur transiently if a host moves nodes.

altering the packet and re-injecting the packet into the network. The packet can be altered sufficiently that it no longer meets its flow definition. Example alterations would be encapsulating the packet into a tunnel, performing address translation of some kind, e.g. VLAN translation, or performing a routing function if the original flow was described including its L2 address.

The GPP mechanism ensures that no new root nodes are created in steady state. Thus, it is sufficient in steady state that only the network elements associated with the root nodes of the embedded graphs be prepared to terminate a flow. These root nodes are generally chosen to be termination points of the flows which could be assigned to those FGs.

When a network element constructs its portion of a composite with more than one outport, the network element can load balance the flow across the outports. The weightings on the out arcs could be determined by the central controller, specified perhaps as part of the FGs or perhaps as part of the data structure defining the flow, or could be determined by the network element itself, or through some combination of those methods. The load balancing itself can be done in many ways depending on the flow definition. For instance if the flow were a group of MAC addresses, then the load balancing could be done by assigning different DAs to different out arcs. The load balancing could be done by hashing packet headers as is done in Equal Cost Multiple Path (ECMP).

For unicast traffic, the network elements should only send a packet out at most one out arc in order to avoid delivering duplicate packets.

For any given flow, the network elements could make these decisions implicitly based on the flow definition, e.g. as the software in the system determines, or could be instructed how to do it explicitly by the central controller, perhaps by providing instructions in the data structure containing the flow definition, or a combination of these two methods. USATs rely heavily on explicit instructions in the glows, which contain the flow identification. By using node roles, these instructions can changed based on the selected FGP.

In one instance, a network element could have selected a root FG as well as non-root FGs with equal preference. In this case the vertex is not a root of the composite graph, but the network element could load balance between the out arcs as well as terminating some or all of the flow, e.g. by sending it out via an access or internetworking port.

For multicast traffic, the PP mechanism can be reversed to stitch together an operational path from a root node. In doing so, a network element communicates its selection to the upstream neighbor so that network element knows which outports to multicast to.

Fabric Graph Sets can be ordered as well by using a hierarchy and assigning each FGS to a level of the hierarchy. A given flow then could be assigned to different FGS on different hierarchies, and a network element selects the first valid FGP from the highest hierarchy which matches the flow.

For instance, in a 2 level hierarchy, FGS1 and FGS2 could be assigned into Level 1 and FGS3 into Level 2. Flow f1 is assigned FGS1 and FGS3; flow f2 is assigned FGS2 and FGS3. If some network element cannot find a valid FGP in FGS1 for f1, it would attempt to find one in FGS3. Similarly, if some network element could not find a valid FGP in FGS2 for f2, it would attempt to find one in FGS3.

Network elements do not need to choose a FGP from the same level. Thus no extra coordination is needed in a distributed system versus a single layer system. For any given flow, the mechanism behaves the same as a single layer system with all the assigned FG's (FGP's) of Level 1 being strictly preferred to all the assigned FG's (FGP's) of Level 2, etc. The hierarchy of FGS is an alternate implementation to a single level with larger FGS. If the less preferred levels of the FGS hierarchies carry larger and larger flows, then collapsing to a single layer would produce FGS which were identical after some point. For instance, in the example above, a single layer implementation would be {f1})(FGS1. FGS3) and {f2}:(FGS2. FGS3).

GPP can be implemented centrally or distributedly.

In a distributed implementation, a FGS and its preference function is distributed to at least the participating network elements of that FGS. This can be done together using a single list. If hierarchies are used, each FGS could be assigned a level of the hierarchy. An alternative to put the level assignments into the data structures containing the flows which are attached to the FGS. The latter is the approach taken in USATs. Thus, FGS could be used by one flow in Level 1 and another flow in Level 2.

The fabric graphs can also be distributed to their participating network elements. In one implementation, the fabric graph is divided into fabric graph parts, each part representing one vertex in the fabric graph's embedded graph. That part contains at least the information used for the network element to perform its portion of GPP, e.g. the out arcs, the vertex VR, and the VR of each out arc of the vertex in the embedded graph. This reduces the quantity of information transfer and storage. In addition, it may turn out that different fabric graphs have fabric graph parts which are identical at some vertices, enabling different fabric graphs to share the same part, further reducing information transmission and storage requirements. Furthermore, validation rules may also overlap, allowing further information consolidation. Other optimizations are possible.

If FGPs are used, then they inherit the preferences of their parent FG, before any consolidation or sharing of FGPs is done. This can be done by using a fabric graph part list, FGPL, or a fabric graph part set (FGPS) with a preference function. If two FGPs are identical at a vertex in the same FGPL or FGPS, then the least preferred one can be discarded; if they are equivalent, then either can be discarded.

The network elements also know the current state of the network state variables used in any validation rule it might evaluate. Such knowledge can either be directly known by the element, or obtained from another network element. A preferred implementation would synchronize all state variables amongst all elements. The amount of information to synchronize is small given that the variables are Boolean. It is also possible that some state variables come from the central controller, for instance if those variables represented the state of some other information system using the network.

Directed graphs can include a vertex represents a network element and an arc represent a fabric simplex communication link (access links and gateway links are not modeled).

If there is at most one arc between any two vertices in each direction then the graph is called simple, otherwise it is called a multi-graph. A multi-graph can be turned into a simple graph by creating an arc representing all the arcs between two vertices.

We assume that if a network element had a self-loop that loop would not be used in any candidate or embedded graph. Therefore, without loss of generality, we limit discussion to graphs without self-loops.

Let H be a directed multigraph with no self loops:

Graph ID
  Each graph has an ID. Use of a graph ID means that two graphs are considered distinct if their IDs are different, even if their vertex and arc sets are identical. So, for instance, if two different FGs with different embedded graphs end up constructing the same graph in a network state, those two constructed graphs are different because they have different graph ID's.

Components:
  vertices(H) is the vertex set with |vertices(H)| vertices. Each vertex has a vertex id.
  arcs(H) is the arc set with |arcs(H)| arcs. Each arc has an edge id which serves to distinguish multiple arcs between vertices. In the special case of a simple graph, an arc from n to m can be represented uniquely by (n,m) or n→m. The origin node of the arc is called its head. The destination node of the arc is called its tail. The arc is said to be incident to its head and tail, which collectively are called its endpoints. Given an arc, a, its head is expressed, head(a), and its tail, tail(a).

Distances:
  h(n,m,H) is the minimum distance in hops (# of arcs) between n and m in H. h(n,m,H) is infinite if there is no directed path between n and m in H. h(n,n,H)=0 by definition.

Downstream Neighbors
  downstream(n,H) are the downstream neighbors of a vertex n, e.g. the vertices m such that h(n,m,H)=1.
  out_vertex_degree(n)=|downstream(n,H)| is the number of downstream vertices of n
  out_arc_degree(n) is the number of arcs out of vertex n. If H is simple, then out_arc_degree(n)=out_vertex_degree(n) for all vertices n of H.
  Any vertex reachable from n, e.g. all m such that h(n,m,H) is finite, is called a descendent.

Upstream neighbors
  upstream(m,H) are the upstream neighbors of a vertex m, e.g. the vertices n such that h(n,m,H)=1.
  in_vertex_degree(m)=|upstream(m,H)| is the number of upstream neighbors of n.
  in_arc_degree(m) is the number of arcs into a vertex m. If H is simple, then in_arc_degree(m)=in_vertex_degree(m) for all vertices m of H.
  Any vertex which can reach in, e.g. all n such that h(n,m,H) is finite, is called an ancestor.

Special vertices
  A root vertex of H is a vertex r with no downstream neighbors.
  A leaf vertex of H is a vertex n with no upstream neighbors.
  A transit vertex of H is a vertex which is not a root or leaf.
  An isolated vertex is both a root and a leaf Note also that the upstream neighbors of a root r are those vertices n such that h(n,r,H)=1, and the upstream neighbors of the upstream neighbors of a root r are those vertices n such that h(n,r,H)=2.

Given two multigraphs G and H, each with no self loops, define:
  Disjoint(G,H)=TRUE iff they have no common vertices or edges. If TRUE, then G and H are said to be disjoint. If FALSE, then G and H are said to overlap. Similarly Disjoint(G1, G2, . . . , Gk)=TRUE iff each pairwise comparison of the graphs are disjoint.
  Subgraph(G,H)=TRUE iff G is a subgraph H, e.g. iff vertices(G) and arcs(G) are subsets of vertices(H) and arcs(H) respectively. If G is a subgraph of H and if vertices(G)=vertices(H) then we say that G spans H, or just that G is spanning if H is implicitly understood.
  Union(G,H) is the graph with vertex set vertex(G) U vertex(H), and arc set arcs(G) U arcs(H). Note the arc set union is taking using the edge id's, not the endpoints. Similarly, Union(G1, G2, . . . Gk) is the graph with vertex set vertices(G1) U vertices(G2) U . . . U vertices(Gk) and arc set arcs(G1) U arcs(G2) U . . . U arcs(Gk).

A Directed Acyclic Multi-Graph (DAMG) is a multigraph without a directed cycle. Note that DAMGs do not contain any self loops. A DAMG which is simple is called a directed acyclic graph (DAG).

Note that a DAMG is not connected in the usual sense since there is not a path from any vertex to any other vertex, e.g. leafs and transit vertices may be connected to some, but not all roots, and roots are not directionally connected to any other vertex. However, DAMG are connected in another sense: each non-root vertex which is not an isolated node has at least one directed path to at least one root vertex. Whether this connectivity is sufficient depends upon the flow requirements and how each vertex operates.

Two special cases of DAMGs are Trees and Forests.

A special case of a DAMG is a directed rooted multi-tree (DRMT) which 1) has a unique root vertex r, and 2) all other vertices n< >r have exactly one downstream neighbor. In a DRMT, there is a unique vertex path from any vertex to the root.

If a DRMT is simple, we call it a directed rooted tree (DRT), or just a tree for short. If T is a tree, then |arcs (T)|=|vertices(T)|−1 and there is also a unique arc path from any vertex to the root.

A directed rooted multi-forest (DRMF) is a union of disjoint DRMTs. In a DRMF, there is a unique vertex path from any vertex to some root. If the DRMT is simple, we call it a directed rooted forest (DRF).

Furthermore, for a non-root vertex, if the embedded graph g were a tree, then that vertex nVR and unique eVR could be consolidated into a single validation rule consisting of the logical AND of the two. Such a combination loses the ability to distinguish a vertex which is valid without a valid out arc and a vertex which is invalid. Such a distinction may be desirable if the vertex were to take other actions on a flow if no valid out arc were available, such as to block the flow. However, that information may not be needed for the desired service, or may be available in other ways, e.g. a network element seeing that a vertex nVR is invalid but knowing that itself is operational.

An embodiment is used for basic USAT. The mechanism is to manage flows on an SDN network, the mechanism consisting of:

[FG and FGL] At least one candidate fabric graph, each candidate having a Boolean validation rule on network state variables indicating whether that fabric graph is considered valid at each of its nodes in the current network state, a preference specification on the candidate fabric graphs sufficient to allow each node to determine its most preferred fabric graphs, and a link selection rule specifying how a node chooses its out and/or incoming links from the links of the set of most preferred fabric graphs. The result being called the composite graph.

[glow] A data structure containing at least
information on a flow sufficient for a node to identify data from that flow
Explicit or implicit instructions on how to manage the flow through a node

[USAT] An association between at least two glows to one FGL, the two glows differing in some way, enabling the same composite graph to be used in two different ways, the two different ways determined by the information within the glows.

A further embodiment is used for node roles.

At least one candidate FGs has a node role in at least one of its nodes, the node role being an arbitrary label indicating the function of that node in that FG, such functions possibly including source, destination, transit, add/drop, rate limiter, . . .

At least one glow contains at least two different instructions, the determination of which instruction to use being determined by the node role specified by the composite graph, the composite node role being determined by the node roles from the set of preferred candidate FGs at that node.

In a further embodiment, the validation rules are used to specify 1+1 protection.

In another embodiment, used for non-routing function, the instructions specify an advanced flow management that is not routing or forwarding, such as rate limiting, the flow is an L1 flow.

In another embodiment, used for packet flows, the flow is a packet flow, such as Ethernet (L2), IP (L3), or a packet encapsulation mechanism such as VxLAN, MAC-in-MAC (MiM), MPLS.

In a further embodiment, used for Placeholder FGPs, at least one candidate FG is a placeholder FG which has an isolated node n with a validation rule which is TRUE iff a path through the network is currently operational, that path not including node n, and that path being included in a different FG in the same candidate fabric graph set.

Another embodiment is used for USAT Levels which includes a mechanism to support multiple possible topologies for the same flow, each topology possibly supporting different overlapping flow specifications, the mechanism consisting of:

Specifying at least two mechanisms with an order preference being specified either by the USAT data structure, or within at least one of the glow data structures Each node choosing the most preferred candidate graph for a flow which matches multiple flow identifications within multiple glows.

A further embodiment is used for a Composite USAT where there is an identifier within the glow identifying it as part of a composite with other glows with the same identifier, at least one other glow being associated with a different USAT, and where a software program within at least one node performs an operation different on at least one of the glows because it is in a composite with another glow sharing at least one link in or out of that node with the glow.

Another embodiment is used for a composite graphs (such as where the composite graph is the combination of a directed tree and isolated nodes). A mechanism is used to create a composite graph, the mechanism consisting of:

A set of candidate fabric graphs, which could be precomputed, computed centrally or distributively. Each fabric graph consisting of at least A graph which is a directed tree where the graph vertices represent network switches and the graph arcs represent simplex communication links in the network, each of which may or may not be currently operational. Each candidate tree having the same root node r.

A set of partial path validation rules (PP-VR), with at least one per vertex except possibly the root r, where a vertex n's PP-VR is a Boolean formula of network state variables which evaluates to TRUE iff the unique path of vertices and links from vertex n to vertex r is currently operational, including the operational status of root r.

USAT Implementation: Fabric Graphs, which include the above fields plus additional fields, most notable node roles.

A strict preference on the candidate fabric graphs, e.g. for any two fabric graphs G and G', either G is preferred to G' or vice versa.

USAT implementation: a Fabric Graph List, which is an ordered list of the candidate fabric graphs. Some implementation include a candidate at the end of the list which always validates to TRUE. Another implementation would be to assign each candidate fabric graph a numerical value unique to the other fabric graphs in its candidate fabric graph set.

Where each network switch except possibly the switch represented by the root vertex has a fabric graph part for each candidate fabric graph that has a vertex representing it, its fabric graph part consisting of at least the switch's associated vertex, that vertex's PP-VR, and the vertex output link, if any.
  USAT implementation: this is done with a Fabric Graph Part.
Where each network node except possibly the root knows the candidate graph preferences
  USAT implementation: done with the Fabric Graph Part List.
  Alternative implementation: each FG is given a unique numerical value, with <used for preference.
Where each network node has an updated set of network state variables indicating the operational status of at least the network links and nodes that node uses to fully evaluate any of its parts VRs.
And where then given a network state, each node evaluates enough of its PP-VRs to determine the most preferred fabric graph with an operational path to the root. If the node does not have any such path in the candidate list, then the node does not choose a candidate.
The mechanism resulting in an acyclic composite graph which is either a set of isolated nodes, if the root is not operational, or the union of a tree to the root node r and a set of isolated vertices, where the vertices of the tree are the root and those other nodes which selected the preferred fabric graph with an operational path to the root, the arcs of the tree are the out arcs of the selected fabric graph part at those vertices, and the isolated vertices are those vertices representing those network switches which did not have some candidate fabric graph part with a PP-VR which evaluated to TRUE.
In a further embodiment, FG are created by standard protocol with TRUE VR's. At least one candidate graph is formed by a real time protocol such as spanning tree protocol and converted to a fabric graph by using the tree determined by the spanning tree protocol with validation rules at all nodes of the spanning tree being set equal to TRUE. As one example:
  Where the real time protocol is IS-IS
  Where the candidate (fabric) graph created by the real time protocol is the least preferred (fabric) graph.
  In another embodiment:
  Each candidate FG could have a different root
  The roots have PP-VR's. FGPs, and FGPLs, associated with them with a VR which evaluates to TRUE if the root is operational. This is to prevent a loop of the form with T1=1-->2 and T2=2→1. If vertex 2 does not have a FGP for T1, then it won't be able to select it, and instead selects T2 creating a loop.
  The composite graph is now a set of a set of disjoint trees+isolated nodes, the roots of the trees being a root of one of the candidate graphs.
In a further embodiment, where MLAG is supported:
The PP-VRs are amended to include a state variable indicating the operational status of the MLAG on the root associated with each vertex.
Alternative: create a virtual root, m, associated with the MLAG, then for each FG, create a virtual link between its root and m. Now apply Claim 1 to this new network graph and FGs, with the PP-VRs now representing the operational status to the destination outside of the network.

In another embodiment, where the composite graph includes an outcasting tree and isolated nodes:
  The nodes have PP-VR's which are TRUE iff the unique path from the root to the nodes are operational.
  The FGP's contain at least the incoming arc to a node
  The composite consists of the nodes and the selected incoming arcs.
In a further embodiment using generalized partial path:
  Each candidate FG is a directed acyclic graph, with possibly more than one root, and the different FGs can have different sets of roots, and possibly multiple arcs between nodes in the same direction,
  FGPs now have a plurality of out arcs
  Each out arc has a generalized PP-VR, (GPP-VR) associated with it, where GPP-VR satisfies the following conditions 1) if there is no operational path to some root then it is FALSE, and 2) if it is TRUE, then the landing vertex is a root or have at least one arc PP-VR which is TRUE.
  The graph preference is now not strict, allowing for the possibility that two or more fabric graphs are equally preferred. We require that the preference be specified such that it could be represented by a list of the form ({fg1.1,fg1.2},{fg2},{fg3.1,fg3.2,fg3.3}, . . . ) meaning that fg1.x is preferred to fg2.y and fg3.z, etc., and fg1.x~fg2.x, fg3.1~fg3.2~fg3.3. Equivalently, each FG can be given a number, with=indicating no preference and <indicating preference.
  The union of any equal graphs is acyclic
  A node may choose one or more out arcs from its most preferred FG set with true VR's
  The composite graph is then a directed acyclic graph, possibly with isolated nodes
In another embodiment using GPP with extra flexibility for the nodes:
  a node can choose any FGP if it's a leaf in all its FGPs
  a node can choose any FGP which is directly connected to the root
  a node which is not a root by its preferred FGP can choose any FGP which is directly connected to a node which has a preferred FG which makes it a root
  a node which is not a root by its preferred FGP can choose any FGP which is directly connected to a node which has a preferred FG which makes it a root
In a further embodiment using tunnel lists:
  the candidate fabric graphs arcs represent tunnels between nodes. (direct tunnels and multihop tunnels, network state for tunnels, etc.)
In another embodiment the composite graphs are provided a hierarchy.
A further embodiment is used for services built using composite graphs. Associating one or more unicast network flows with a composite graph, such that:
  The root nodes are destinations of the flow, those nodes extracting the packets of the flow from the fabric and either
    a) discarding them
    b) delivering them, possibly with alteration, to either
      i) to the intended destination attached to the node,
      ii) to another network node outside of the network for eventual delivery, or
      iii) to a processing unit within the node (routing, tunneling, address translation . . . ), and then re-injecting them into the network, delivering them to another network, or delivering to an attached destination.

Isolated nodes, which are a destination of the flow either
  a) deliver packets to the destination
  b) discard packets of the flow
  c) using the next composite graph associated with the flow [USAT levels].
Isolated nodes, which are not a destination of the flow either
  a) discarding the packets of the flow
  b) using the next composite graph associated with the flow [USAT levels].
Other nodes [leafs and transits], either
  a) delivering the packets to an attached destination, if applicable, or
  b) sending each packet of the flow out one of the node's out arcs on the composite DAG
In a further embodiment using Smart paths, load balancing is done based on DA, or based on packet counts.
In another embodiment using Smart links, load balancing is performed between arcs between same nodes.
In a further embodiment using VLAN (ISO) services, the flow is defined as a subset of the packets destined to a given root on one or more VLANs. In this embodiment;
  If ISO, then the FGs are reserved for this service only.
  If BLOCK then use the discard option for isolated nodes which are not a destination of the flow.
  Load balancing like above
In another embodiment using DMAC service:
  A common root node is provided
  Flow identified by L2 DA
  DA possibly associated with the node itself for further processing, e.g. terminating a tunnel or routing, which results in alteration of the packet.
In a further embodiment using Multicast service, one or more multicast network flows are associated with a composite graph, where a node now duplicates the packet on each out arc of the composite graph.
Another embodiment is used for USAT Implementation:
For composite graphs:
  A data structure is defined with at least VR and out arc (or in arc for multicast)
  the preference is specified as a list
For services:
  the node flow rules [spelled out in the service claims] are specified in a separate data structure than the FG or FGPs
  at least two different glows are allowed to be associated with a set of candidate FGs and their preference
  a software program can take the relevant information from the glow and FGPL and create a table entry, representing a flow and its associated composite graph part
  those entries may be organized in a hierarchy
  the most preferred hierarchy is chosen for a flow, the flow being defined by some description of its packets and possibly the destination endpoints, to program a hardware forwarding element.
A further embodiment uses a composite graph having a directed tree and isolated nodes. A mechanism is used to create a composite graph. The mechanism consisting of
  A set of candidate graphs, which could be pre-computed, computed centrally or distributively, or computed from a set of fabric graphs. Each graph being a directed tree with possible additional isolated nodes, where the graph vertices represent network switches and the graph arcs represent simplex communication links in the network, each of which may or may not be currently operational. Each candidate tree having the same root node r.
    USAT Implementation: these candidate graphs represent the graphs of the USAT Fabric Graphs with nodes with invalid FGs either removed or being made isolated nodes.
  A strict preference on the candidate graphs, e.g. for any two graphs G and G', either G is preferred to G' or vice versa.
  Where each network switch except possibly the switch represented by the root vertex has a graph part for each candidate fabric graph that has a vertex representing it, its graph part consisting of at least the switch's associated vertex and the vertex output link, if any.
  Where each network node except possibly the root knows the candidate graph preferences
  And where each node of any of the candidate graphs picks the most preferred fabric graph. If the node does not have any such path in the candidate list, then the node does not choose a candidate.
    The mechanism resulting in an acyclic composite graph which is either a set of isolated nodes or the union of a tree to the root node r and a set of isolated vertices, where the vertices of the tree are the root and those other nodes which selected the preferred graph, the arcs of the tree are the out arcs of the selected fabric graph part at those vertices, and the isolated vertices are those vertices representing those network switches which did not have some fabric graph part.
Another embodiment is one where candidate FGs are used to create candidate graphs. A mechanism is used to create at least one candidate graph from a candidate fabric graph, the mechanism consisting of:
  A set of candidate fabric graphs, which could be pre-computed, computed centrally or distributively. Each fabric graph consisting of at least
    A graph which is a directed tree where the graph vertices represent network switches and the graph arcs represent simplex communication links in the network, each of which may or may not be currently operational. Each candidate tree having the same root node r.
    A set of partial path validation rules (PP-VR), with at least one per vertex except possibly the root r, where a vertex n's PP-VR is a Boolean formula of network state variables which evaluates to TRUE iff the unique path of vertices and links from vertex n to vertex r is currently operational, including the operational status of root r.
    USAT Implementation: Fabric Graphs, which include the above fields plus additional fields, most notable node roles.
  Where each network switch except possibly the switch represented by the root vertex has a fabric graph part for each candidate fabric graph that has a vertex representing it, its fabric graph part consisting of at least the switch's associated vertex, that vertex's PP-VR, and the vertex output link, if any.
  Where each network node has an updated set of network state variables indicating the operational status of at least the network links and nodes that node uses to fully evaluate any of its parts VRs.
  And where then given a network state, the node evaluates it's PP-VRs to determine if it is an isolated node in the candidate graph.

The mechanism resulting in a candidate graph which is the union of a set of isolated nodes and a possibly empty tree to the root.

In a further embodiment using real time candidate graph, at least one candidate graph is generated from a candidate fabric graph and at least one candidate graph is determined by a real time distributed protocol.

In another embodiment the trees are generated based on uplink costs. The switch may dynamically assign certain uplinks as part of a tree, such as for a default BUM topology. Any uplinks allocated to ISO topologies can be avoided. To ensure this, the Fitting Engine can query the switches (e.g., via an API) to obtain a BUM tree that contains the uplinks currently in use by BUM. The Fitting Engine can then ensure the computed ISO topologies avoid these uplinks.

At certain times no free uplinks maybe available for BUM or the switch may need to reassign BUM to a different set of uplinks due to conditions in the network. In this situation the Fitting Engine can assign a cost on each interconnect in a topology; for example, residual topologies can have a default cost and ISO topologies can have a higher cost. When a BUM tree is computed by the switch it will attempt to assign the tree to uplinks with a lower cost, uplinks with a higher cost are assigned to the BUM tree only if no lower cost uplinks are available. Whenever the condition in a network has been restored the switch can then move the BUM graph back to lower cost uplink.

The BUM tree and the "BUM software" runs on virtual links. So if there are five uplinks between two switches the BUM software may be unaware of the different uplinks, it merely assigns BUM to the virtual links and higher level software is responsible for mapping the virtual link to a physical uplink.

So the virtual link can be a sorted list of tuples of {Cost,Uplink} for example: [{Cost,Uplink1},{Cost,Uplink2}] etc.

The list can be sorted such that the smallest cost physical uplink is presented to the BUM software. If that uplink becomes out of service then the next lowest cost is presented to the BUM software. The BUM tree and the cost information is also distributed to other switches this means if the cost of a virtual link exceeds the aggregate cost of other virtual links through the fabric then BUM maybe moved to a path with more hops, but a lower aggregate cost.

For example, when assigning a BUM tree between Switch A and Switch B, the costs may, be as follows:

Virtual link 1: Switch A—Cost 5000→Switch B
Virtual link 2: Switch A—Cost 1000→Switch C
Virtual link 3: Switch C—Cost 1000→Switch B Although the Virtual link 1 directly connects switch A and B, the algorithm can assign the BUM tree on switch A over virtual link 2 and virtual link 3 (via switch C) for a lower total cost.

The Fitting Engine (such as one operating on a Controller) can assign the costs to the links, for example, there may be two cost values: 1000 and 1<<20 for non-isolated and isolated respectively. Alternatively, cost values may be assigned based on other considerations. The cost of a link can be some function of the link capacity, affinity load, and affinity type. "Affinity" may include all affinities that use the link, such as FSAT-ISO, VLAN-ISO, VLAN-ISO-HOP-COUNT, MLAG-USAT, and residual affinity types.

Further reference to data center networks and affinity trees may be made to U.S. Pat. No. 9,065,582, titled "Optical Architecture and Channel Plan Employing Multi-Fiber Configurations for Data Center Network Switching", issued Jun. 23, 2015: U.S. Pat. No. 9,204,207, titled "Hierarchy of Control in a Data Center Network", issued Dec. 1, 2015: U.S. Pat. No. 9,288,555, titled "Data Center Network Architecture", issued Mar. 15, 2016; U.S. Pat. No. 9,301,026, titled "Affinity Modeling in a Data Center Network", issued Mar. 29, 2016; U.S. Pat. No. 9,325,604, titled "System and Method for Data Center Optical Connection", issued Apr. 26, 2016. U.S. Pat. No. 9,337,931, titled "Control and Provisioning in a Data Center Network With At Least One Central Controller", issued May 10, 2016: U.S. Pat. No. 9,397,747, titled "Method and Apparatus for Connectivity Control in a Data Center Network", issued Jul. 19, 2016; and U.S. Pat. No. 9,450,815, titled "Network Node Connection Configuration", issued Sep. 20, 2016; the disclosures of which are incorporated by reference herein in its entirety.

The various blocks shown in the Figures may be viewed as method steps, as operations that result from use of computer program code, and/or as one or more logic circuit elements constructed to carry out the associated function(s). Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

Instructions for implementing the network architectures disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-Ray disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

It will be appreciated by those skilled in the art that modifications to and variations of the above-described systems and methods may be made without departing from the inventive concepts disclosed herein.

What is claimed is:

1. A method comprising:
storing a plurality of hardware tables in hardware memory and a plurality of software tables in software memory, wherein the plurality of software tables include a software table for each hardware table that is pertinent to packet forwarding in the switch,
wherein entries in each table describe a glow and an outport for the glow, and
wherein each glow is associated with a fabric graph part list (FGPL), each FGPL being an ordered list of at least one fabric graph part (FGP) and each FGP describes a validity rule for the FGP;
receiving a network update, the network update indicating a change in the network state;
determining an affected FGPL describing at least one FGPL which may be affected by the change in the network state;
for each FGPL in the affected list, determining a selected valid FGP in the FGPL based on the validity rule for the associated FGP; and
in response to a change of which FGP in a FGPL is the selected valid FGP in the FGPL, updating at least one of: the plurality of hardware tables and the plurality of software table.

2. The method of claim 1, wherein the change in the network state comprises an indication that at least one link has changed state, and
wherein determining the affected FGPL includes identifying each FGPL having at least one fabric graph part (FGP) with a validity rule that is based at least in part on any one link of the at least one link which has changed state.

3. The method of claim 1, wherein updating at least one of: the first table, the second table, the third table and the forth table, comprises updating the entry describing the glow associated with the FGPL.

4. The method of claim 1, wherein each entry in the software table comprises a connection request and behaviors for a glow, glow status, entry alarm, and miscellaneous information including identification and timestamps.

5. The method of claim 1, wherein each FGPL is an ordered list of at least one fabric graph part, the at least one fabric graph parts including a first, primary fabric graph part and zero and more back-up fabric graph parts.

6. The method of claim 1, wherein a plurality of switching nodes form a network and each switching node in the network distributedly performs local topology validation/invalidation and collectively form a loop-free network topology in response to the network update.

7. The method of claim 1, wherein the validity rules of each FGP are based on the network state, and configuration parameters.

8. The method of claim 1, wherein a glow is a generalized definition of at least one network flow, the definition comprising at least one of: generalized source endpoints, generalized destination endpoints, filters of packet header fields, behavior attributes, and instructions on how to carry the at least one flow using the plurality of tables.

9. The method of claim 8, wherein the definition for a glow is based at least in part on at least one of: packet header information; and a function based on the packet header information.

10. A method comprising:
receiving a universally specified affinity topology (USAT) part specific to a switching node, the USAT part including a definition for at least one glow and a fabric graph part list (FGPL), the FGPL being an ordered list of at least one fabric graph part (FGP),
wherein each glow describes at least two flows of network traffic and role instructions for the switching node when handling each flow of the at least two flows, and
wherein each FGP describes a role that the switching node is to perform in the FGP and a validity rule for the FGP;
determining a selected active FGP in the FGPL based on the validity rule for the associated FGP;
initializing the at least one glow;
identifying which role that the switching node is to perform based on the selected active FGP in the FGPL;
determining the role instructions for the identified role;
storing at least one entry in a plurality of software tables based on the definition for the at least one glow and the role instructions for the identified role;
dynamically resolving conflicts among entries, and
granting table updates to hardware tables.

11. The method of claim 10, wherein the role instructions comprise at least one of: instructions for performing a transit role, instructions for performing an ingress role, and instructions for performing an egress role, instructions for performing a routing role, instructions for performing a policing role, and instructions for performing an encapsulation role.

12. The method of claim 10, wherein the plurality of tables include a first table stored in first hardware memory, a second table stored in a second hardware memory, a third table stored in a software memory representing the first table, and a fourth table stored in a software memory representing the second table.

13. The method of claim 10, wherein identifying which role that the switching node is to perform includes implicitly determining which role that the switching node is to perform.

14. The method of claim 10, wherein the selected valid FGP is a first valid FGP based on the order of the FGPs in the FGPL.

15. A method comprising:
receiving a universally specified affinity topology (USAT) part specific to the switching node, the USAT part including a definition for at least one glow and a fabric graph part list (FGPL), the FGPL being an ordered list of at least one fabric graph part (FGP),
wherein each glow describes at least two flows of network traffic and role instructions for the switching node when handling each flow in the at least two flows, and
wherein each FGP describes a role that the switching node is to perform in the FGP; a validity rule for the FGP;
managing the FGPL in a fabric graph management system (FGMS);
managing the at least one glow in a glow management system (GMS); and
managing a plurality of tables using a table management systems (TMS), the plurality of tables including a software table for each hardware memory that is pertinent to packet forwarding in the switch,
wherein managing the FGPL, managing the at least one glow and managing the plurality of tables include:
in the FGMS: determining a selected active FGP in the FGPL based on the validity rule for the associated FGP, a current network state and the order of the FGPs in the FGPL,
in the GMS: initializing the at least one glow, requesting the FGMS to identify which role to perform based on the selected active FGP in the FGPL, determining the role instructions for the identified role and instructing the TMS to update the plurality of tables, and
in the TMS: storing at least one entry in the plurality of tables based on the definition for the at least one glow and the role instructions for the identified role, dynamically resolving conflicts among entries, and granting table updates to hardware tables.

16. The method of claim 15, wherein the plurality of tables include a first table stored in a first hardware memory, a second table stored in a second hardware memory, a third table stored in a software memory representing the first table, and a fourth table stored in a software memory representing the second table.

17. The method of claim 16, wherein the first hardware memory is a TCAM table, the second hardware memory is an L2 table, the third table is a TCAM USAT table, and the fourth table is the residual table.

* * * * *